United States Patent
Speidel et al.

(10) Patent No.: US 12,207,086 B2
(45) Date of Patent: Jan. 21, 2025

(54) METHOD AND SYSTEM FOR PROVIDING AUTHENTICATION OF A WIRELESS DEVICE AND CELL BROADCAST SERVICE BETWEEN WIRELESS MOBILE DEVICES AND A SATELLITE NETWORK

(71) Applicant: Lynk Global, Inc., Falls Church, VA (US)

(72) Inventors: Tyghe Robert Speidel, Washington, DC (US); Clint Smith, Warwick, NY (US); John Meyer, Oakbrook, IL (US); Purnima Surampudi, Katy, TX (US); James Liu, South Riding, VA (US)

(73) Assignee: Lynk Global, Inc., Falls Church, VA (US)

( * ) Notice: Subject to any disclaimer, the term of this patent is extended or adjusted under 35 U.S.C. 154(b) by 0 days.

(21) Appl. No.: 18/585,440

(22) Filed: Feb. 23, 2024

(65) Prior Publication Data

US 2024/0349047 A1 Oct. 17, 2024

Related U.S. Application Data

(63) Continuation of application No. 17/494,782, filed on Oct. 5, 2021, now Pat. No. 11,956,629.
(Continued)

(51) Int. Cl.
*H04W 12/06* (2021.01)
*H04W 8/04* (2009.01)
*H04W 84/06* (2009.01)

(52) U.S. Cl.
CPC ............. *H04W 12/06* (2013.01); *H04W 8/04* (2013.01); *H04W 84/06* (2013.01)

(58) Field of Classification Search
CPC ........ H04W 12/06; H04W 8/04; H04W 84/06
See application file for complete search history.

(56) References Cited

U.S. PATENT DOCUMENTS 7,852,855 B1    12/2010   Gooding et al.
10,084,535 B1 *   9/2018   Speidel .............. H04B 7/18532
(Continued)

FOREIGN PATENT DOCUMENTS

| WO | WO-2011091313 A1 * | 7/2011 | ........... G06F 21/335 |
| WO | 2020051508 A1 | 3/2020 | |
| WO | WO-2022076548 A1 * | 4/2022 | ......... H04B 7/18565 |

OTHER PUBLICATIONS

International Search Report and Written Opinion, issued in PCT Application No. PCT/US2021/053758, mailed on Jan. 11, 2022.

*Primary Examiner* — Adam D Houston
(74) *Attorney, Agent, or Firm* — Haynes and Boone, LLP

(57) ABSTRACT

Authenticating a mobile user device with a mobile network operator in advance of an MNO authentication request from the mobile user device can be done by a satellite network sending an authentication request to the MNO system, obtaining a set of authentication vectors related to the mobile user device, storing them into a proxy home location register, receiving the MNO authentication request from the mobile user device, generating an authentication request response based on the authentication vectors, sending the authentication request response to the mobile user device, receiving an authentication response including a received signed response, comparing the received signed response with the stored signed response, and if the received signed response and stored signed response match, deem that to be a successful authentication, add an MNO location update message to a request queue and forward the MNO location update message to the MNO system over the channel when available.

21 Claims, 109 Drawing Sheets

Related U.S. Application Data

(60) Provisional application No. 63/088,213, filed on Oct. 6, 2020.

(56) References Cited

U.S. PATENT DOCUMENTS

| | | | |
|---|---|---|---|
| 11,659,389 B1* | 5/2023 | Sabeur | H04W 4/14 |
| | | | 455/411 |
| 2009/0233583 A1 | 9/2009 | Weiner et al. | |
| 2009/0267730 A1 | 10/2009 | Zhang | |
| 2010/0167740 A1* | 7/2010 | Vakil | H04W 36/00835 |
| | | | 455/436 |
| 2011/0004762 A1* | 1/2011 | Horn | H04W 12/04 |
| | | | 713/171 |
| 2012/0309416 A1 | 12/2012 | Whelan et al. | |
| 2014/0310738 A1 | 10/2014 | Derrenberger et al. | |
| 2016/0366587 A1 | 12/2016 | Gross et al. | |
| 2017/0332312 A1* | 11/2017 | Jung | H04W 60/00 |
| 2019/0253407 A1* | 8/2019 | Livanos | H04W 12/04 |
| 2020/0068391 A1* | 2/2020 | Liu | H04W 12/06 |
| 2020/0235807 A1 | 7/2020 | Mendelsohn et al. | |
| 2021/0368292 A1* | 11/2021 | Sinha | H04W 4/023 |
| 2022/0240084 A1* | 7/2022 | Speidel | H04W 8/04 |
| 2023/0224704 A1* | 7/2023 | Atarius | H04W 12/12 |
| | | | 726/6 |
| 2023/0262463 A1* | 8/2023 | Kunz | H04L 63/1475 |
| | | | 455/410 |
| 2023/0275878 A1* | 8/2023 | Winig | H04B 7/18565 |
| | | | 713/164 |
| 2023/0328520 A1* | 10/2023 | Ryu | H04W 12/08 |
| | | | 455/410 |
| 2023/0345341 A1* | 10/2023 | Speidel | H04W 24/04 |

* cited by examiner

USSD Notify call flow

METHOD AND SYSTEM FOR PROVIDING AUTHENTICATION OF A WIRELESS DEVICE AND CELL BROADCAST SERVICE BETWEEN WIRELESS MOBILE DEVICES AND A SATELLITE NETWORK

CROSS-REFERENCES TO PRIORITY AND RELATED APPLICATIONS

This application is a continuation of U.S. patent application Ser. No. 17/494,782, filed Oct. 5, 2021, entitled "Method and System for Providing Authentication of a Wireless Device and Cell Broadcast Service Between Wireless Mobile Devices and a Satellite Network", which in turn claims benefit of, and is a non-provisional of U.S. Provisional Patent Application No. 63/088,213 filed Oct. 6, 2020, entitled "Method and System for Providing Authentication of a wireless device and Cell Broadcast Service between Wireless Mobile Devices and a Satellite Network."

The following applications are related and may be referenced herein:
1) U.S. Pat. No. 10,084,535, issued Sep. 25, 2018, entitled "Method and Apparatus for Handling Communications between Spacecraft Operating in an Orbital Environment and Terrestrial Telecommunications Devices That Use Terrestrial Base Station Communications" (hereinafter "Speidel I");
2) U.S. Pat. No. 10,742,311, issued Aug. 11, 2020, entitled "Simplified Inter-Satellite Link Communications Using Orbital Plane Crossing to Optimize Inter-Satellite Data Transfers" (hereinafter "Speidel II"); and
3) U.S. Provisional Patent Application No. 62/490,298 filed Apr. 26, 2017, entitled "Method for Communications between Base Stations Operating in an Orbital Environment and Ground-Based Telecommunications Devices" (hereinafter "Speidel III").
4) U.S. patent application Ser. No. 17/274,374, filed Sep. 6, 2019, entitled "Orbital-Based Cellular Network Infrastructure Management System" (hereinafter "Speidel IV").

The entire disclosures of applications/patents recited above are hereby incorporated by reference, as if set forth in full in this document, for all purposes.

FIELD

The present disclosure generally relates to space communications networks generally and more particularly to network nodes of the network authenticating wireless devices to the network wherein the network nodes might operate in Earth orbit.

BACKGROUND

In a typical terrestrial cellular telecommunications network, a plurality of mobile devices communicates with a plurality of telecommunications infrastructure elements. Examples of telecommunications infrastructure might include towers, antennas, radios, transceivers, digital signal processors, electrical cabinets, servers, computers, etc. Achieving coverage in remote areas with limited population density has proven difficult for both capital and operational expense purposes. There is large amount of geographic area in the world that is presently unserved by wireless mobile services like voice, text, data, or a combination of all three.

Wireless mobile service is typically achieved through use of terrestrial cellular telecommunication networks that utilize discrete cell sites or radio stations to provide communication to and from wireless mobile devices. The range of cell sites or radio stations is limited by distance that might be determined by terrain and curvature of the Earth.

Providing wireless mobile service requires a network of cell sites to be deployed by various wireless operators. The placement of these cell sites is determined by population and usage density, which is a business-driven decision by the wireless operators. However wireless networks are deployed based on usage density leaving vast areas of unserved or underserved areas around the world where there is either intermittent or no wireless coverage.

Satellite networks have the ability to provide ubiquitous service enabling unserved and underserved areas to receive wireless service where no terrestrial network is able to provide this service.

Typical satellite networks require unique radio communication equipment to facilitate the radio link between the wireless device and satellite. This unique radio communication equipment needs to be installed in the wireless mobile device. The unique radio communication equipment not only increases the cost of the wireless device but is also specific and unique for each satellite network that it needs to communicate with.

Telecommunications infrastructure is typically organized by functionality and connects as an integrated system to manage telecommunications traffic volume and the various mobile devices that it serves. This integrated system may comprise one, or more, networks, and the networks themselves are typically designed to also connect to each other through a variety of interfaces and protocols. Some of these protocols and interfaces may include, but are not limited to TCP/IP, ISDN, SS7, etc. A terrestrial cellular network, and their functionalities, might be used in the context of a typical LTE cellular network, however, the structure and functionality behind this type of network could be used for other terrestrial cellular networks, such as a GSM, CDMA, EDGE, UMTS, or other networks.

Improved telecommunications network features are desirable.

SUMMARY

A method of authenticating a mobile user device with a mobile network operator (MNO) system, wherein the mobile user device having an MNO subscriber arrangement with the MNO and a satellite network operator (SNO) subscriber arrangement can connect to an orbital base station of a satellite network, includes determining a set of mobile user devices to be associated with an overpass region, wherein association indicates mobile user devices that can connect with the orbital base station when the orbital base station passes over the overpass region, and wherein the mobile user device is in the set of mobile user devices to be associated with the overpass region, sending, from the orbital base station, an authentication request to the MNO system, wherein sending is performed in advance of an MNO authentication request from the mobile user device, obtaining, in response to the authentication request, a set of authentication vectors related to the mobile user device, storing the set of authentication vectors into a proxy home location register, the set of authentication vectors including a stored signed response, receiving, at the orbital base station, the MNO authentication request from the mobile user device, generating an authentication request response based on the set of authentication vectors, sending the authentication request response to the mobile user device via the orbital base station, receiving an authentication response from the mobile user device, the authentication response including a received signed response, comparing the received signed response received from the mobile user device with the stored signed response, if the received signed response and the stored signed response match, which can be deemed to be a successful authentication, adding an MNO location update message to a request queue, and when a channel to the MNO system is available, forwarding the MNO location update message to the MNO system over the channel.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings. The accompanying drawings, which are incorporated herein and constitute part of this specification, illustrate exemplary embodiments of the disclosure. Together with the general description given above and the detailed description given below, the drawings serve to explain features of the disclosure.

DETAILED DESCRIPTION

Figure 1:
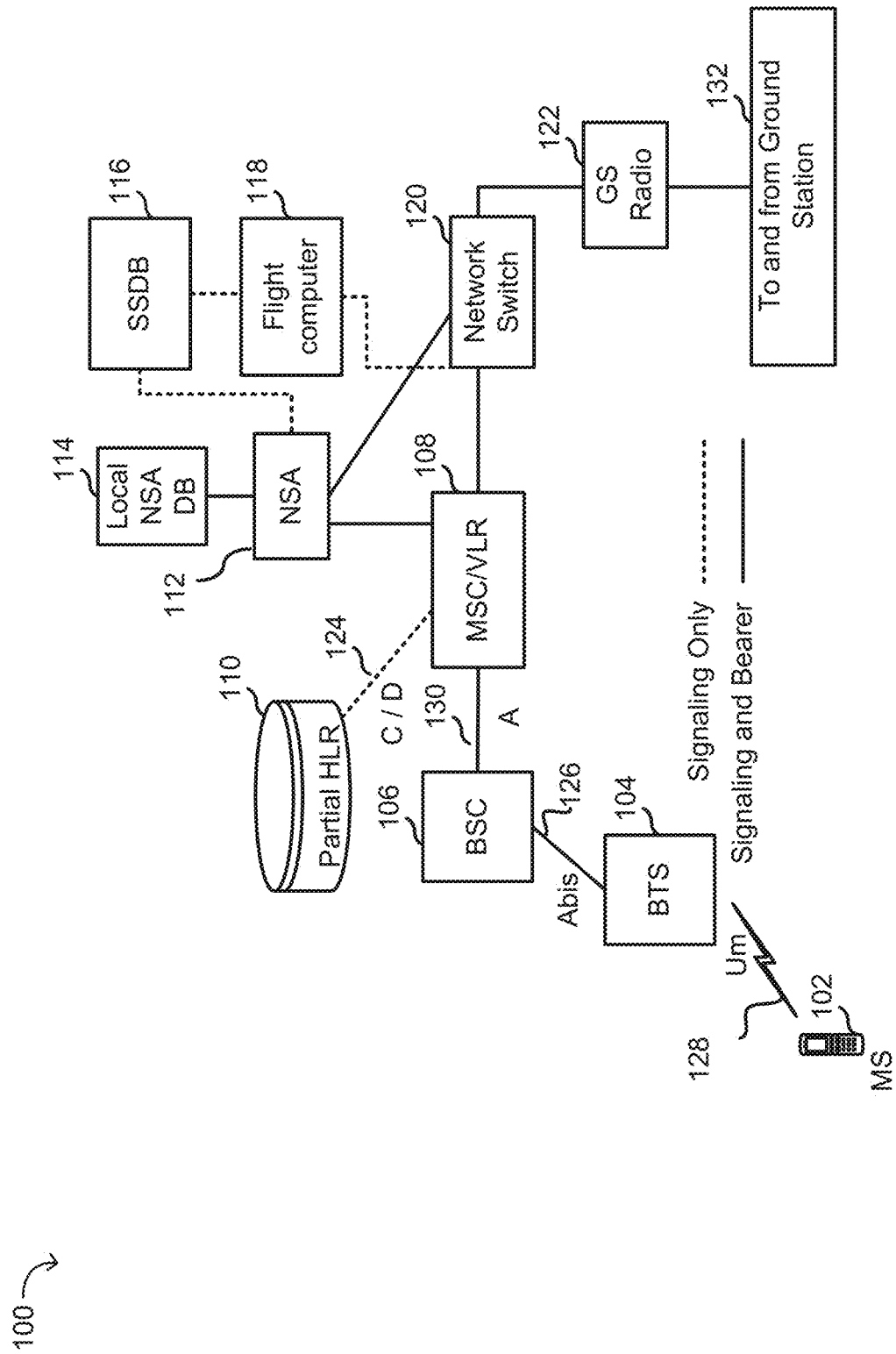
FIG. 1 illustrates an example communication and processing system that uses a GSM network architecture as might be used on an orbital communications network, according to an embodiment.

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

As explained herein, a satellite network can provide wireless mobile service to underserved or unserved areas, and can do so even in cases where the wireless mobile device has no satellite-specific radio communication equipment and uses what is used for terrestrial wireless communications. This allows for wireless devices to communicate with the satellite network using typical standard wireless mobile standards. By utilizing standard mobile devices to communicate with the satellite network the cost of the device used by the subscriber is not increased. Additionally, the subscriber can be a regular subscriber to the terrestrial wireless network, and when the subscriber is in an underserved or unserved area, they can utilize the satellite network for receiving and sending voice or text, data, or a combination of all three. As with a wireless device connecting to a network via a terrestrial base station where that wireless device can be a network subscriber, a wireless device can connect to a network via an orbital base station and be involved in authentication to the network in a manner similar to terrestrial wireless network authentication.

Various embodiment systems and methods to enable the authentication of a wireless mobile device connected to a satellite network are explained herein in detail. A method for authenticating and authorizing mobile devices on a satellite network using data onboard the satellite is described, even in cases where there may not always be connectivity to the terrestrial network. Certain data used in authentication of wireless devices is very sensitive to mobile network operators, such as the secret keys required for authentication. Therefore, a method of providing the required authentication without the keys can have substantial value.

A set of authentication vectors is created periodically to be stored on the satellite's proxy home location record (P-HLR), which can be stored at the satellite, at a ground station, or a combination. The P-HLR can be used for authentication in the absence of end-to-end connectivity to a home terrestrial network. This can be accomplished through an offline process using methods that might be implemented in roaming scenarios to create the needed authentication vectors. Authentication vectors can be updated periodically to maintain network relevance and subscriber information security.

The various embodiments will be described in detail with reference to the accompanying drawings. Wherever possible, the same reference numbers will be used throughout the drawings to refer to the same, or like, parts. References made to examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "wireless network", "network", "cellular system", "cell tower" and "radio access point", "internet", "local network", "cell site", may use generically and interchangeably to refer to any one of various wired or wireless systems. In an embodiment, wireless network may be a radio access point (e.g., a cell tower), which provides the radio link to the mobile device so that the mobile device can communicate with the core network.

Several different cellular and mobile communication services and standards are either available or contemplated in the future, all or some of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), public switched telephone network (PSTN), Wi-Fi Protected Access I & II (WPA, WPA2), Bluetooth®, integrated digital enhanced network (iden), land mobile radio (LMR), Zigbee, Z-Wave, ZWave, SigFox, LoRa, Each of these technologies involves, for example, the transmission and reception of voice, data, signaling and/or content messages. Any references to terminology and/or technical details related to an individual telecommunication standard or technology are for illustrative purposes only and are not intended to limit the scope of the claims to a particular communication system or technology unless specifically recited in the claim language.

The network aims to fill in the gaps of the current mobile networks by providing affordable cellular coverage everywhere on the planet by using a satellite constellation connected to various ground stations. The satellites are either operating as individual wireless networks or part of a network that provides wireless connectivity to terrestrial mobile devices without the need of proprietary software or hardware utilities in the mobile devices themselves.

The satellite network can comprise one, several, or a complete constellation of several hundreds, or thousands, of satellites providing coverage to terrestrial mobile devices.

Satellite networks can reach the remote places and the rural areas of the globe where terrestrial radio access networks currently do not exist for various economical and viability reasons. The key differentiator, and the success factor for the disclosed network, is that no hardware or software changes are needed on the existing mobile phones to access the network, and the mobile device can be authenticated without a real time connectivity to the home network of the device.

The satellite network might support GSM, GPRS, LTE, and/or 5G-NR (fifth generation mobile communication technology—new radio) technologies based on the frequency leases in a geographical area. In any given location, the satellite network may operate using the spectrum leased from a mobile network operator ("MNO") in that area and act as a visiting public land mobile network ("VPLMN") for all the MNOs including the one from which the spectrum is leased.

Each of the LEO satellites carry a payload that comprises either just the base station radio or the cell site (e.g., eNodeB, BTS, etc.) or the entire network-in-a-box (e.g., evolved packet core (EPC), mobile switching center (MSC), etc.) based on the type of deployment to provide network service, both intermittently and continuously. For a particular orbit architecture, the total number of satellites, availability of inter-satellite links, and latitude of desired coverage, may define "intermittent" and "continuous" service.

Unlike traditional terrestrial mobile networks, the cell site or network on the satellite keeps moving across geographies. As it moves, the satellite may switch transmissions to align with the frequencies that are licensed for use by the network for a certain geographic region. As the satellite keeps moving, the cell site or network keeps hopping or handing off from network to network serving mobile devices within the satellite footprint, which may comprise one or more beams. When there are not enough satellites and no inter-satellite links, services can be maintained in an intermittent fashion (potentially with limitations or delays), that satisfy certain use-cases (such as short message service (SMS), low data IP, or Internet of Things (IoT) use cases).

In addition to the standard network components, satellites may also host a range of databases, management systems, switches, and network service application(s) that can facilitate efficient service to terrestrial mobile devices when using orbital network infrastructure for delivery.

Ground stations might be used to communicate with the satellite to provide commands, controls, authentication, and connectivity with the terrestrial network. The ground stations might host the required network components except for the cell, to help satellites provide services to the mobile devices that are akin to the existing terrestrial networks. These components can also support connection to partner MNO networks and internet services. In a particular embodiment, they can host an intermediary network between satellite and terrestrial MNO networks to provide network services to mobile devices and to provide roaming services for the MNO users. In another embodiment, they can host the entire core network for the cell, or cells, on the satellite providing network services to the mobile devices and VPLMN services to the users of the MNO.

In addition to the network components, ground stations also host a range of databases, management systems, switches, and network service application (NSA) for efficient service delivery to the mobile devices.

The disclosed architectural elements enable a constellation of the satellites that can be built out in phases with increasing functionality and services, and can utilize one or more radio access technologies.

Prior to a complete constellation of satellites being deployed for ubiquitous coverage, the satellites may provide intermittent coverage to mobile devices in defined service areas. During periods of coverage mobile devices might, for example, send SMS, or IP-based, messages/packets and any SMS, or IP-based, messages/packets queued up in their handsets may be forwarded to the satellite. Queued packets and messages may also be delivered to handsets during the time of overpass.

There might not be simultaneous connectivity between the serving satellite and the ground network. In that case, messages forwarded to the satellite may be buffered until the satellite re-establishes connectivity with the ground network later in its orbit via a ground station connection. In these instances, a message may be sent to the mobile device informing them of the anticipated delay in message delivery.

Network deployment can include multiple radio access technologies like GSM, GPRS, LTE, NR and such technologies. Availability of continuous connectivity to the ground stations and the inter-satellite links would help provide better user experience with minimal delay in network services, but continuous connectivity is not required. With multiple technologies, thousands of satellites and inter-satellite communications, deployment may provide ubiquitous coverage all over the planet.

During ubiquitous coverage, each satellite might always have connectivity with the ground station either directly or through inter-satellite links. Each satellite may use transceivers for connection to UE's, other satellites, and ground stations, but may employ other wireless links such as optics/lasers.

When a satellite has a connection to a ground station, it can act as the gateway between satellites in the space network, and the ground station that connects to the terrestrial networks and the internet. Services that are supported in a traditional terrestrial network can similarly be supported on the satellite network.

1. GSM Network Architecture

FIG. 1 illustrates an example GSM communication system within which various embodiments may be implemented. Generally, the mobile station "(MS)" 102 may be configured to send and receive communication signals to and from a network 100, using a variety of communication systems/technologies (e.g., GSM, GPRS, LTE, cdmaOne etc.). In the example illustrated in FIG. 1, a GSM network architecture is shown in a satellite network in an embodiment. The components on the satellite are software components and can be dynamically turned on and off or be updated through a connection to the ground station.

A mobile station (MS) 102 communicates over the air interface with a Base Transceiver Station (BTS) 104. The MS 102 may typically include the handset itself, known as the Mobile Equipment (ME), and the Subscriber Identity Module (SIM), a small card containing an integrated circuit. The SIM contains user-specific information, including the identity of the subscriber, subscriber authentication information, and some subscriber service information. When a given subscriber's SIM is inserted into a handset, the handset acts in accordance with the services the subscriber has subscribed to.

A. GSM Network Components on Satellite

A BTS 104 in the GSM network may typically include the radio transceivers that provide the radio interface with mobile stations. One or more BTS 104s can be connected to a Base Station Controller (BSC) 106. In the satellite network, there can be one or more BSC 106 per satellite.

BSC 106 provides several functions related to radio resource (RR) management, several functions related to mobility management (MM) for subscribers in the coverage area of the BTS 104s, and a number of operation and maintenance functions for the overall radio network. Together, BTS 104s and BSC 106s can be referred to as a Base Station Subsystem (BSS). An interface between the BTS 104 and the BSC 106 might be a known Abis 126 interface.

A mobile switching center (MSC) and a visitor location register (VLR) might be combined into an MSC/VLR unit, such as MSC/VLR unit 108 depicted in FIG. 1. The VLR can be a database that may store subscriber-related information for the duration that a subscriber is in the coverage area of the MSC. This subscriber information may be obtained from the proxy/partial-home location register (P-HLR) 110 associated with the home public land mobile network ("HPLMN") of the roaming MS 102. A logical split may exist between an MSC and a VLR of the MSC/VLR unit 108, and the interface between them might use protocols defined in standards.

The P-HLR 110 may store a subset of MNO subscriber records from subscribed IMSIs (International Mobile Subscriber Identities) that are allowed to utilize the satellite network. The P-HLR 110 may store data for MNO partners of the network, and/or customers of, the satellite network service. In a particular embodiment, the P-HLR 110 can be on the satellite, SAT and on the ground station, GS. The P-HLR 110 might be produced in an offline process within the ground station (master).

Authentication of a roaming device without connectivity to a given MNO home network is a challenge. The present disclosure includes a description of a method to avoid needing the subscriber's secret key in the P-HLR 110 and still authenticate the roaming device to the network.

A state space database (SSDB) 116 provides a vast array of information on satellite network and ground network state spaces (e.g., positions, velocities, links, link qualities, etc.) that might be used as taught in detail in Speidel IV.

The MSC of MSC/VLR unit 108 can act as a switch—the node that can control SMS and many of the functions provided by a standard telecommunications switch. Because the subscribers are mobile, the MSC provides several mobility management functions. In the satellite network system, there may be one or more MSCs per satellite.

A flight computer 118 can control relevant satellite subsystems, including, but not limited to, Guidance Navigation and Control (GNC), telemetry, tracking, Control, Data Handling (TTC&DH), Attitude Determination and Control (ADC), propulsion control, power and thermal management. A network switch can provide routing for elements of the architecture.

Ground station links 132 provide connectivity between satellites (when in range) and the ground station. In one embodiment, a ground station link might be an RF wireless link 122, employing typical frequencies in the S band, K band, or X band, as an example. Ground station links can be, but are not limited to these bands. RF wireless links can be used, as well as optical or laser links that can be suitable for higher data rates and in accordance with the power available on the satellite.

The network can also include Network Service Application (NSA) 112 comprising software processes that can enable network behavior needed to provide subscriber services on the satellite network. These include, but not limited to, buffering location update command when there is no ground station link, buffering SMS commands when there is no GSL 132, cell broadcast functionality through the CBE application, USSD functionality through the USSD application, forwarding buffered message when GSL is available etc.

B. GSM Network Components on Ground Station

Figure 2:
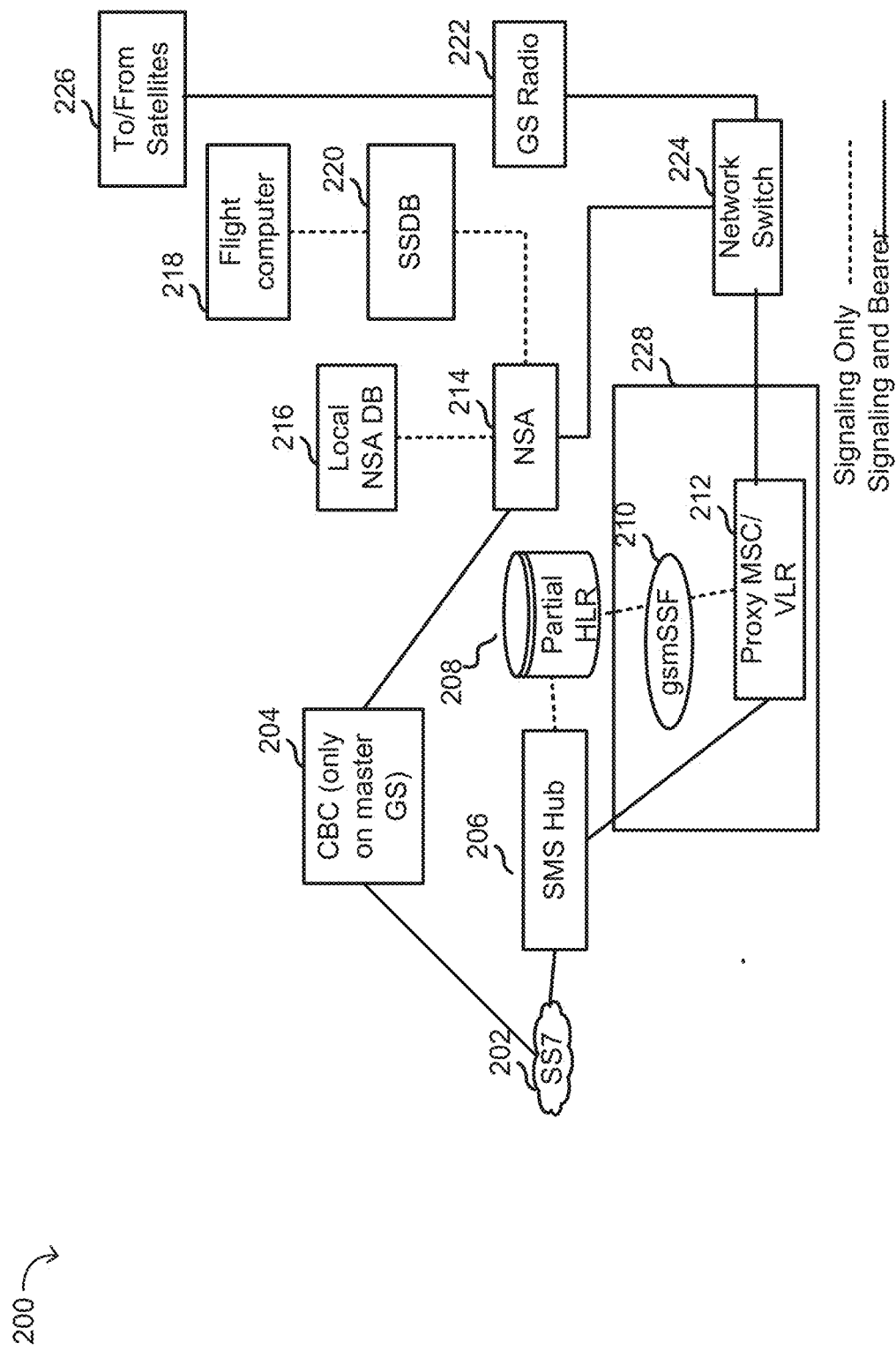
FIG. 2 illustrates an example communication and processing system that uses a GSM network architecture as might be used on a ground station talking to an orbital communications network, according to an embodiment.
Figure 3:
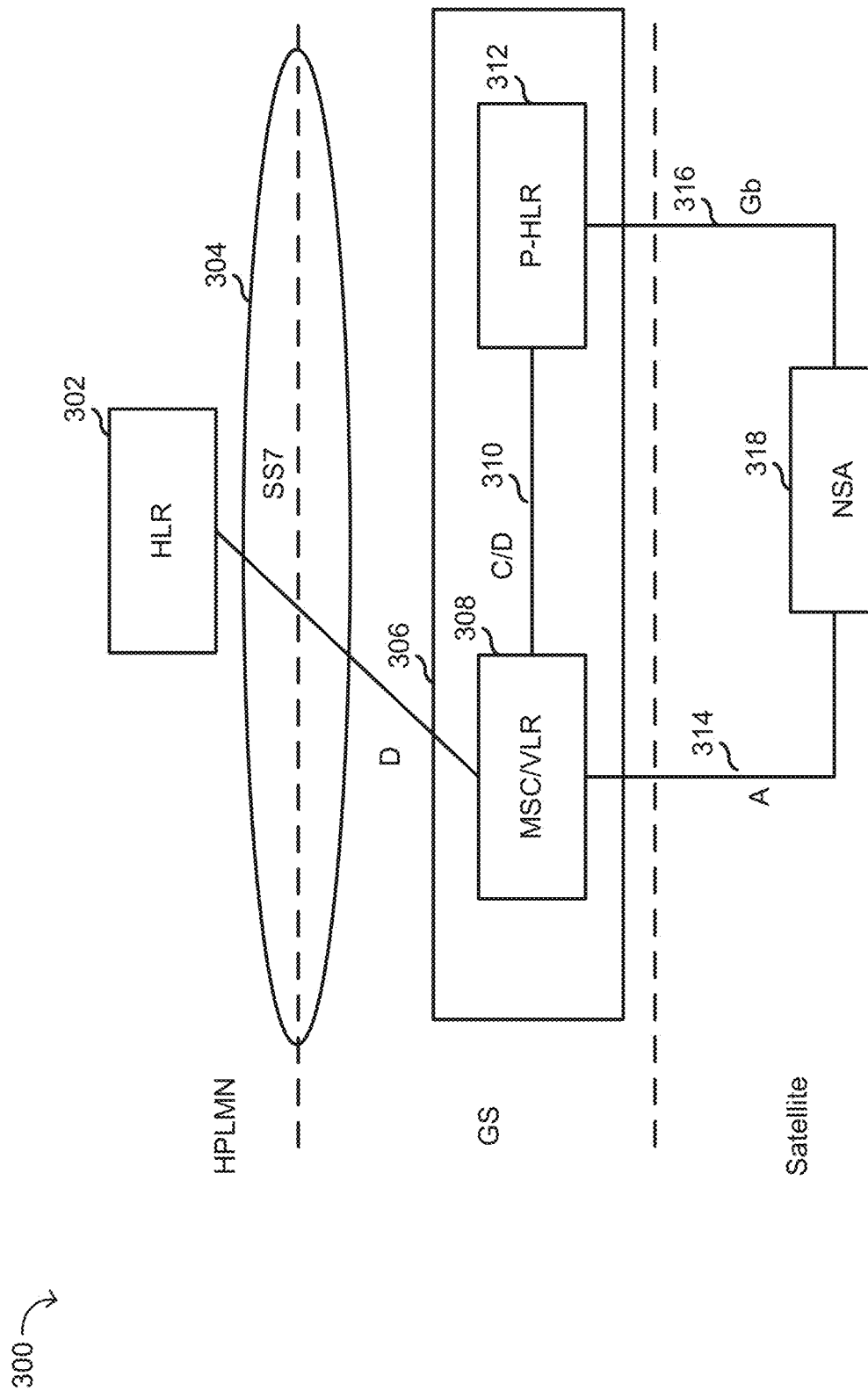
FIG. 3 illustrates GSM network interfaces across satellite, ground station and partner MNO networks, according to an embodiment.

FIG. 2 illustrates an example network on the ground station within which the various embodiments may be implemented. In the example illustrated in FIG. 2, the network components on the ground station may include the core networks for GSM along with the NSA 214, CBC 204, SMS hub 206, NSA database 216, SSDB 220 along with a flight computer 218, ground station radio 222 and a network switch 224. The core network components on the ground station network may interact with the access network hosted on the satellites and the external networks to provide the network services. The interfaces between the core network and satellite/ground station in FIG. 2 are illustrated in an embodiment described in FIG. 3.

In an embodiment, the proxy MSC of proxy MSC/VLR 212 in FIG. 2 on the ground station may process the requests received from its satellite's counterpart MSC.

The proxy VLR of proxy MSC/VLR 212 in FIG. 2 on the ground station may process the requests received from its satellite's counterpart.

The gsmSSF 210 (GSM service switching function) is integrated into the proxy MSC of proxy MSC/VLR 212 in the ground station (GS). This element can be used to query the proxy HLR 208 to obtain customized applications for mobile networks enhanced logic (CAMEL) parameters from the roamers HPLMN. If the subscriber has CAMEL parameter T22 (originating SMS) then CAMEL can be invoked. If not, the SMS can be sent to the HPLMN for credit check and billing. The HPLMN of the roamer may provide parameters for the handling of the session if CAMEL is invoked.

SMS hub 206 may route SMS message to proper destination of the message.

C. Databases on Satellite

In an embodiment, databases maintained either on satellites or on ground stations can be homogenous, distributed databases. They may be distributed as needed at various network sites/nodes (e.g., satellites, ground stations, etc.) and can be accessed by various users globally. It will be easier to manage the databases when they are homogenous and the operating system, database management system, and the data structures used can be same at all sites.

In addition to the P-HLR 110 database maintained on the satellite that hosts the data with all the IMSIs that have subscribed to satellite network services along with their subscription information and authentication vector sets, each satellite may host a network database, a user information database, and a location area database to facilitate the satellite network services.

1) Network Database

In a particular embodiment, the network database 114 hosted on the satellite may store a subset of the data stored on each ground station with the necessary details for the successful operation of the network. It may have the set of geographical/license boundaries, locations areas (LA) to serve, leased frequencies for each location, the corresponding MNO for that frequency at each LA, MSC/VLR number, location area identifier (LAI), cell global identity (CGI) to be used in the LA, network context (entire cell configuration along with transmit frequency configuration, each of the core network entity configurations) etc.

This network database 114 can be queried to receive the configuration for a location area while preparing the network to serve an upcoming location area, updated with the network changes as and when received from a ground station. This can be a configuration database with a possibility of having minimum updates from ground stations once created on the satellite.

2) User Information Database

Each satellite may also maintain a user information database 114 in an embodiment per MNO that may store the dynamic information for the users like the last location area in which the IMSI is seen, allocated temporary mobile subscriber identities (TMSI) for each of the IMSIs, location updates/or register requests received, SMS messages to be delivered and the information for the SMS messages sent and/or received by the mobile devices along with the timestamps. A temporary mobile subscriber identity (TMSI) can be used for identification of a user within various radio interface signaling procedures and can help provide identity confidentiality to protect a subscriber against being identified and located by an intruder.

This user information database 114 may be queried to create the push requests to the ground station with the user and/or mobile device information and requests that need to be forwarded to individual MNO networks and may be updated with the latest information received from the ground station for the mobile devices with their latest location and pending messages/reports. The information stored in this database can be of dynamic nature and may trigger bulkier updates and/or retrievals.

3) Location Area Database

In addition to the above two, in an embodiment, each satellite might also maintain a location area database 114 to store the dynamic information per location area. This may include, but is not limited to, the start and end timestamps when a particular location area is, will be, or was served by this satellite; the set of mobile devices seen in that LA; the activity log; network related statistics and mobile device statistics like number of mobile devices served, number of messages sent/received; KPIs etc. created/collected while serving the LA, the next upcoming time instance at which the satellite is expected to serve the LA, etc.

This location area database 114 may be queried to create the push requests to the ground station with the network operation information and may be updated locally by the NSA 112 on the satellite with the latest activity/log/statistics information of a particular location area. This database may expect less frequent updates from ground station.

D. Databases at Ground Station

In an embodiment, along with the P-HLR database 208 maintained on each ground station that may host the data per MNO with the IMSIs that have subscribed to satellite network services along with their subscription information and authentication vector sets, each ground station may host a network database, a user information database, a location area database, and the NSA database 216 to facilitate the satellite network services. NSA database 216 might hold data related to satellite information, user information, location area information, network details, configurations, and/or NSA details.

In one embodiment of the architecture, the ground stations might be connected to the master ground station through backhaul or the internet to keep the databases in sync. In such case, the databases across the ground stations can be expected to be replicas of the master ground station taking the responsibility of replication and synchronicity amongst them.

1) Network Database

Each ground station may host a network database of NSA database 216 that may be a superset of the network databases 114 stored on the satellites with the necessary details for the successful operation of the network. It may have the entire set of geographical boundaries/locations to serve, and for each location the leased frequency, the MNO whose frequency is leased for the LA, the satellite that served this LA last, the satellite expected to serve this LA in the near future, MSC/VLR number, LAI, CGI to be used in the LA, network context comprising entire cell configuration along with transmit frequency configuration, each of the core network entity configurations etc.

In an embodiment, the network database can be queried to receive the configuration for a set of location areas while preparing the configuration push requests to the upcoming satellite, updated with the network changes as and when a new LA needs to be created or a configuration change needs to be made to the existing LAs from the information received from the master ground station. This may be a configuration database of NSA database 216 with minimum updates from master ground station once created on a ground station.

2) User Information Database

Each ground station may also, in an embodiment, maintain a user information database of NSA database 216 per MNO with the dynamic information for the mobile devices like the last location area in which the IMSI/TMSI is seen, along with the satellite info that has seen the mobile device in that location area, allocated TMSIs, if any, for each of them, location updates, SMS messages to be delivered and a log of the SMS messages sent and/or received by the mobile devices along with the timestamps.

A user information database of NSA database 216 can be queried to create the push requests to the satellite with the user information and requests that need to be delivered by the satellite and can be updated with the latest information received from the master ground station or an MNO network for the users with their latest location and pending messages/reports. The dynamic nature of the data stored in this database triggers for bulkier updates/retrievals.

3) Location Area Database

A location area database of NSA database 216 may be maintained at each ground station in an embodiment and can store the dynamic information per location area, like the information of the satellite that served a LA last, the start and end timestamps when a particular location area is/was served by a satellite, the set of mobile devices seen in that LA, the activity log, network related statistics and user statistics like number of users/messages served or sent/received, KPIs etc. created/collected while serving that LA and the next upcoming time instance at which that LA may be served and the satellite that is expected to serve that LA.

The location area database of NSA database 216 can be queried to create the push requests to the master ground station with the network operation information and may be updated locally by the NSA 214 on the ground station with the latest activity/log/statistics information of a particular location area if received from a satellite or if an update is received from the master ground station.

4) Satellite Information Database

Each ground station may, in an embodiment, maintain a satellite information database of NSA database 216 that can contain the details of the satellites, the location areas each of the satellites recently served, the upcoming location areas for each of the satellites, the activity logs received from each of these satellites along with their overall statistics.

The satellite information database of NSA database 216 can be queried to create the push requests to the master ground station with the satellite's activity information and may be updated locally by the NSA 214 on the ground station if the information is received from a satellite or if an update is received for a satellite from the master ground station.

2. Interfaces

The air interface between MS 102 and BTS 104 on the satellite is called Um interface 128 and is used for location registration, location update, attach and SMS message transfer procedures in satellite network's GSM/GPRS network. The Um interface 128 can also be used for IP data transfer.

Figure 4:
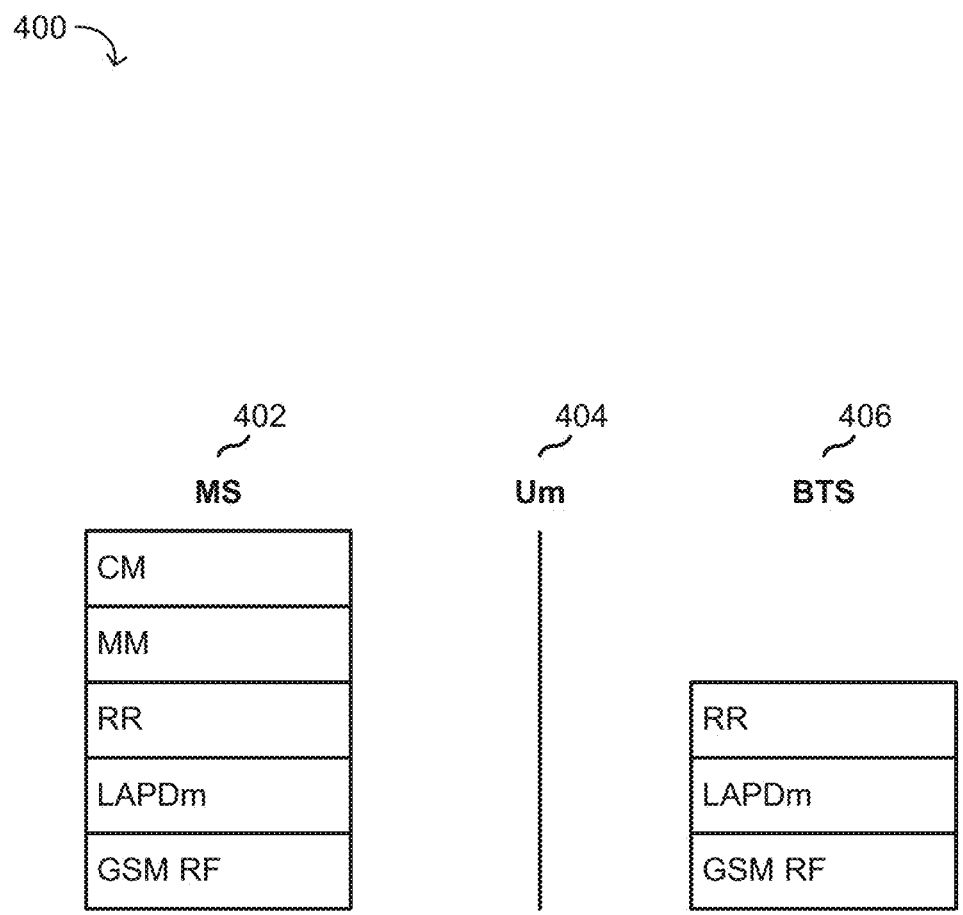
FIG. 4 illustrates the interface between a mobile station and an orbital base station, according to an embodiment.
Figure 5:
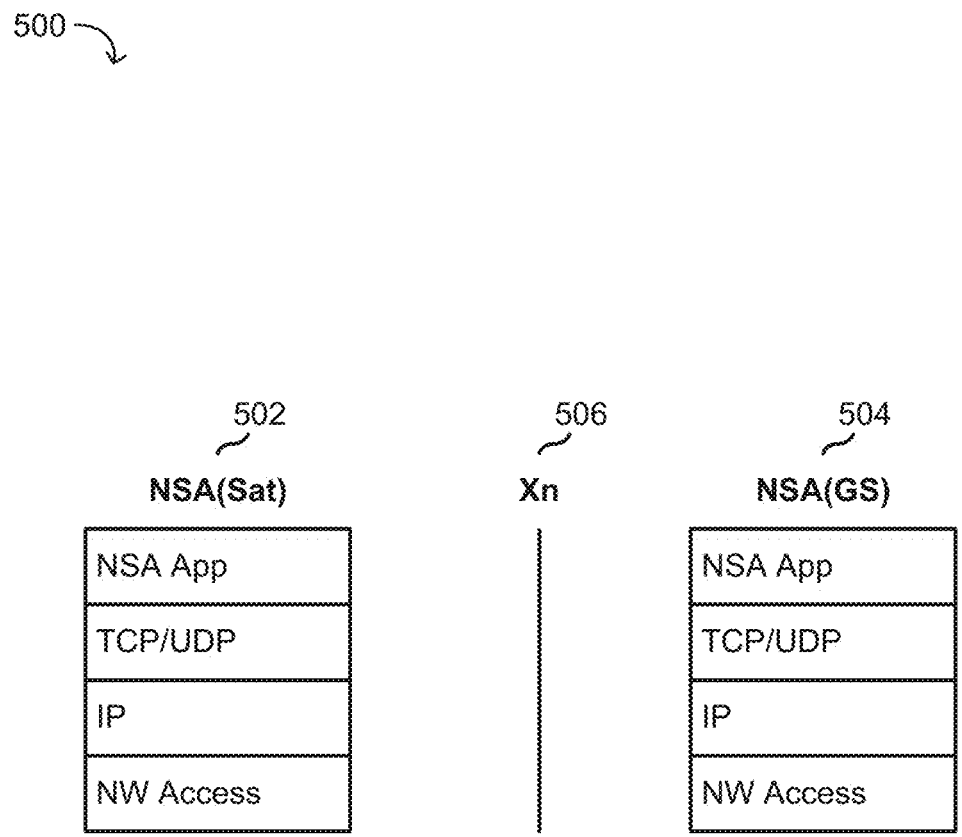
FIG. 5 illustrates the interface between a network service application (NSA) on the satellite and a network service application (NSA) on a ground station, according to an embodiment.

At layer 3, GSM signaling protocol between MS 102 and BSS is divided into radio resource management (RR), mobility management (MM) and connection management (CM) sublayers with CM stacking on MM that further stacks on RR as shown in FIG. 4. Within the satellite network, RR manages the radio channels including the allocation of dedicated channels, paging of a MS 102 while MM handles mobility of the MS 102, location of the MS 102, authentication and security aspects and CM manages the call related functions along with the short message service management.

In one embodiment, the NSA 502 on the satellite can interface with the NSA 504 on the ground station over an Xn interface that can be an IP-based interface using a custom application protocol between NSA components.

The Xn interface 506 may be used by the NSA components on both satellite and ground stations to transfer and receive the location updates, SMS messages, database updates from/to MSC/VLR, HLR entities and the activity logs, statistics, KPIs, and any other information of the satellite to and from the ground station.

The protocol to be used on an Xm interface between satellite network's master ground station and the MNO network can include multiple possibilities, and may be MNO specific based on discussions with the MNO, and/or what is available or feasible at MNO networks. The NSA 214 on the master ground station may talk to the MNO's HLR to get the list of users subscribed to the satellite network services. This list can be shared as a flat file, a csv file, an xml file, or can be based on what is supported at MNO's. NSA 214 on master ground station can extract information irrespective of the file format.

Figure 6:
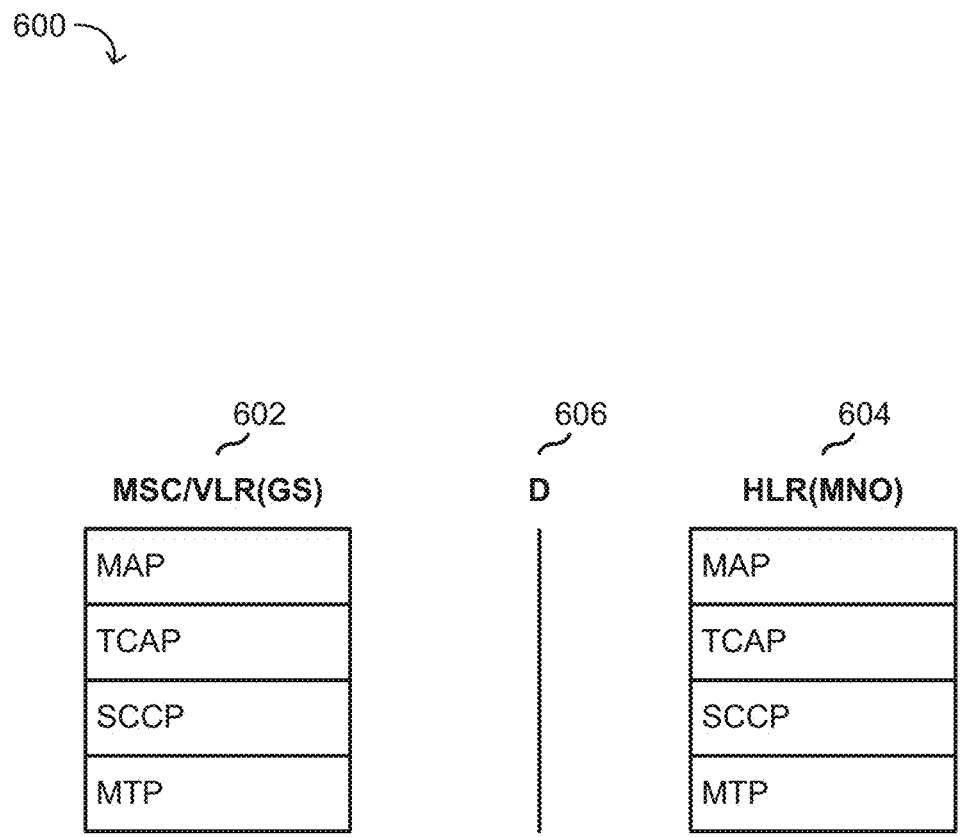
FIG. 6 illustrates the interface between the proxy MSC/VLR on a ground station and HLR of an MNO network, according to an embodiment.
Figure 7:
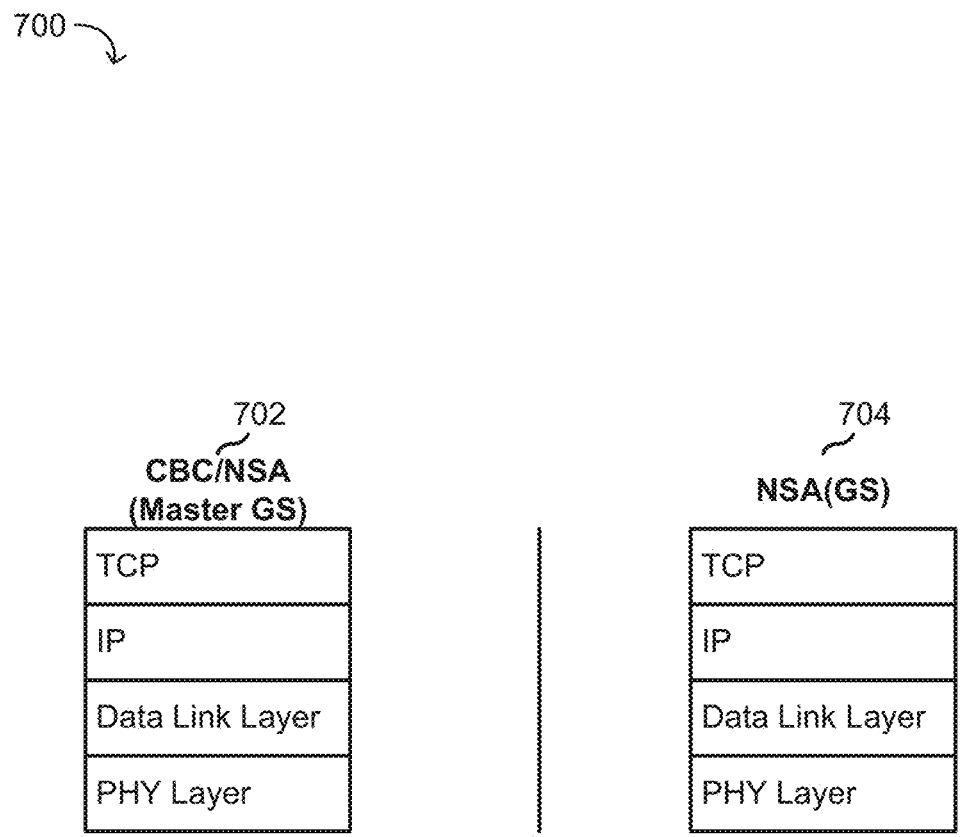
FIG. 7 illustrates the interface between CBC/NSA on the master ground station and NSA on another ground station, according to an embodiment.

For GSM procedures between the ground station (including the master ground station) and the MNO network, MAP and TCAP protocols can be used as shown in FIG. 6. MAP protocol can be used to retrieve and store routing information, and TCAP can be used to manage dialog between two network entities.

The master ground station may host the CBC 702 for the entire satellite network and may interact with both CBEs and the NSA 704 entities on the rest of the ground stations. In addition, the NSA 702 on the master ground station may also interact with CBC on MNO networks when an MNO wants to broadcast a message in a location area being served by the satellite network. With intermittent coverage, the delivery of the broadcast messages may have a known delay. The interface between CBE(s)/MNO's CBC(s) 702 and CBC/NSA 704 on the master ground station can be an IP link with emergency/warning message shared by CBE/MNO's CBC 702 comprising warning type, warning message, impacted area and time period as part of information elements.

The interface between the CBC and the NSA on the ground stations may comply with the standard BSC-CBC interface, CBSP (Cell Broadcast Service Protocol) and the CBS service. It may use TCP transport layer where the registered destination port might be number 48049/tcp for the transport bearers used for cell broadcast service.

3. User Scenarios During Intermittent GSM Coverage

A. User Authentication

In GSM networks, some of the scenarios that can trigger an authentication procedure are initial access to the network, location area update, access network to send or receive an SMS message, an attempt to make a voice call, or an attempt to change subscription information etc.

A standard GSM authentication procedure might involve five key components: (1) an individual subscriber authentication key, Ki, (shown as Ki 804 in FIG. 8) which might be a 32-bit value stored in a Subscriber Identity Module (SIM) environment and in an authentication center (an "AuC"), which for security reasons is typically not stored elsewhere, (2) a random value, RAND, (shown as RAND 802 in FIG. 8) which might be a 128-bit value generated by the AuC to authenticate the subscriber, (3) an authentication algorithm (shown as A3 806 in FIG. 8), which describes how to output a signed response for given inputs, (4) a ciphering algorithm (shown as A8 808 in FIG. 8), which describes how to perform a ciphering process to generate a ciphering key, Kc, and (5) an encryption algorithm (shown as A5 816 in FIG. 8), which describes how to perform an encryption process. The security information management environment might be implemented on a SIM card or other secure environment in hardware and/or software. The authentication algorithm, A3 806, might describe how to output a signed response 810, which can be 32-bit signed response and might be labeled "sRES" in the figures). The ciphering key Kc might be a 64-bit ciphering key stored in the SIM environment and the AuC. The authentication center AuC might be part of a home locator register (HLR) and might be used to validate SIM cards of devices attempting to connect to a secured wireless network, allowing authenticated users to access the secured wireless network and blocking unauthenticated users.

Figure 8:
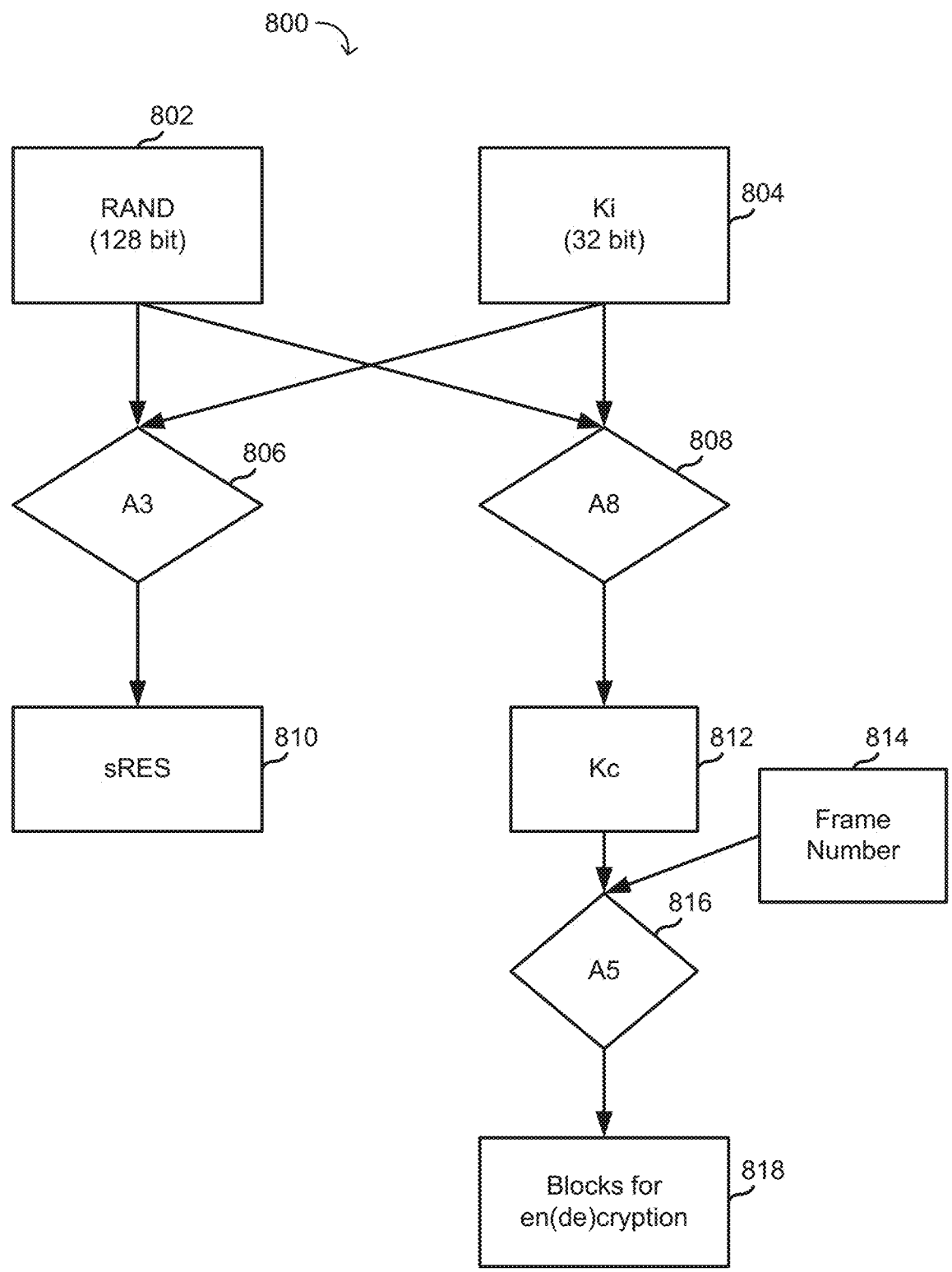
FIG. 8 illustrates the standard authentication procedure in GSM networks.

FIG. 8 shows how these might be used in authentication and encryption procedures in standard GSM networks. As shown in FIGS. 8, A3 806 and A8 808 both use RAND 802 and Ki 804 to generate signed response 810 and Kc 812 values that can be used for authentication and ciphering respectively. The signed response, generated and shared by the MS in an authentication response, can be used for authentication in that if the signed response matches the one generated at the base station, the base station would deem that to be a successful authentication of the subscriber and process data flows accordingly. The A5 816 encryption algorithm can use the generated Kc 812 ciphering key along with the frame number 814 to generate the encryption blocks 818 for user data. In a network, authentication Ki 804 specific to an IMSI or a subscriber is a secret key and is not usually transmitted over the network. Similarly, to avoid transmission of Kc 812 in the network, a ciphering key sequence number is generated for each Kc 812 and that sequence number is transmitted over the network to provide additional security for the ciphering of user data.

Figure 9:
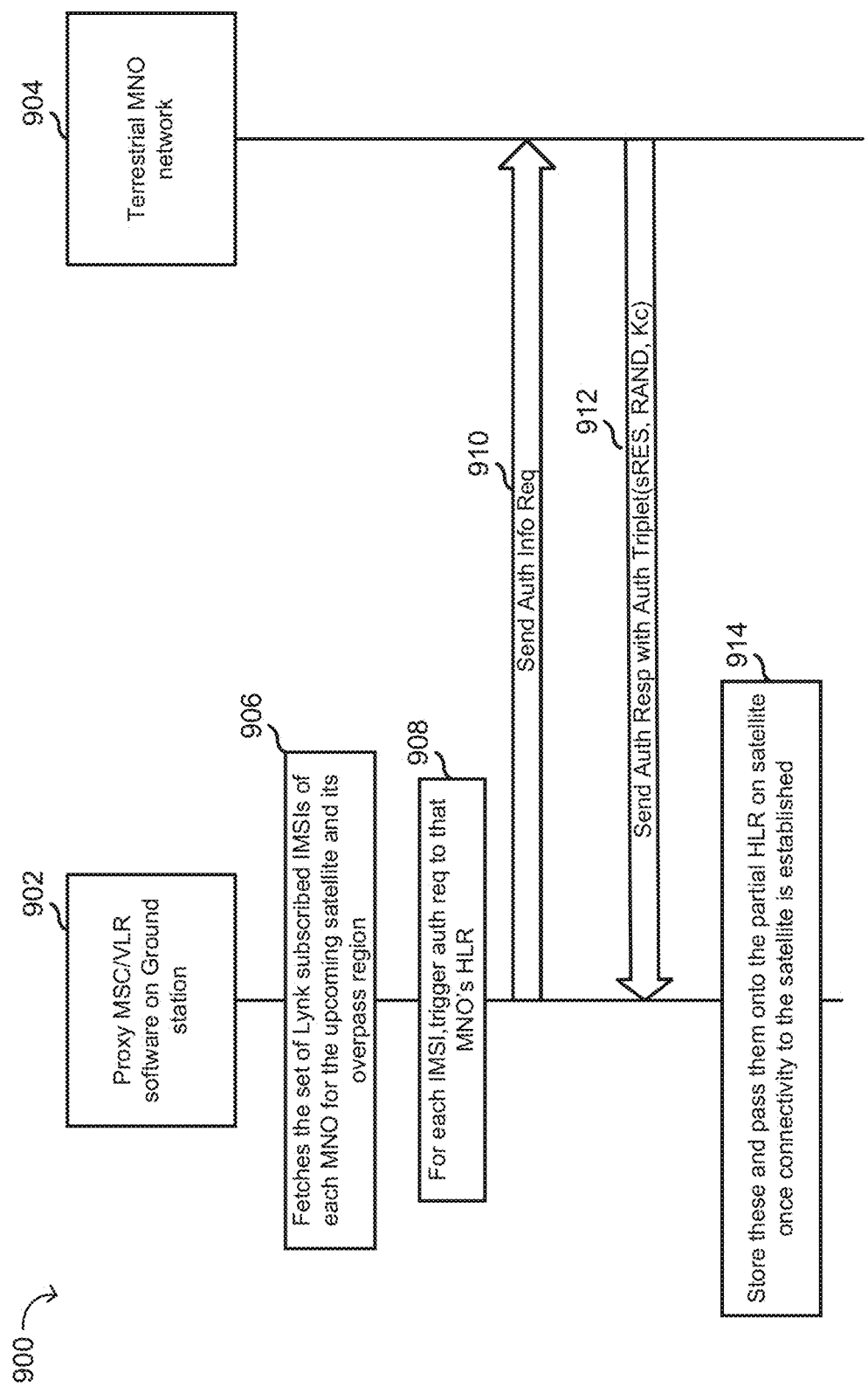
FIG. 9 illustrates the pre-authentication process between proxy MSC/VLR on ground station and an MNO network for P-HLR updates, according to an embodiment.

FIG. 9 shows the messaging that may take place prior to the actual satellite connectivity to the ground station. When the satellite network is a visiting network for the users of an MNO, it may not have access to the secret authentication key Ki of a subscriber, that resides in the subscriber's home network data base. Like the network procedures of a visiting PLMN, the satellite network can query the home PLMN of a subscriber to get the authentication vectors to authenticate a subscriber. But unlike terrestrial VPLMNs, an intermittent satellite network can acquire knowledge of these prior to receiving the actual trigger for authentication procedure from a user. This can be useful given the satellite's orbital base station having fleeting connectivity to ground stations due to orbital motion and thereby to the home PLMN of the user. To accommodate this, the master ground station might launch a set of authentication requests 908 to the MNO network 904 when a roaming agreement is made to get the authentication vector sets for each subscribed IMSI and store them in a P-HLR (proxy/partial-HLR) 208 that may be maintained and distributed across all the ground stations. This data 914 may be uploaded to the satellite when it is connected to the ground station. If supported by the MNO, more than one set of authentication vectors can be fetched per IMSI and stored in the P-HLR 208 database on the ground stations. This may help reduce the frequency at which the authentication vectors need to be refreshed at satellite network. In case multiple sets of authentication vectors are fetched for an IMSI, the network on the satellite can run the algorithm for choosing the RAND set to use for authentication. Such a request can be for one mobile user device or several mobile user devices. It may be that the requests are for the set of mobile user devices that a ground station anticipates will be in range of an orbital base station when that orbital base station passes over an overpass region.

B. Location Updating

Generally, a GSM network operator's PLMN service area is divided into a set of MSC areas where each MSC area is served by one MSC. Each of these MSC areas is further divided into location areas with a set of base stations in each location area (LA). These location areas help the network identify the location of a user/mobile station (MS) in its idle mode for MT calls to page and route an incoming call to the user/MS. Each location area is identified by a location area identifier (LAI), such as MCC+MNC+LAC (Location Area Code). LAC will be unique within a PLMN, and LAI will be unique globally to enable roaming across networks.

When a MS enters a location area for the first time, it does a location registration to update its location to the network. After this, the MS might use location update procedure to periodically update the network of its location or when the stored LAI on MS does not match with the broadcasted LAI in the network.

Figure 10:
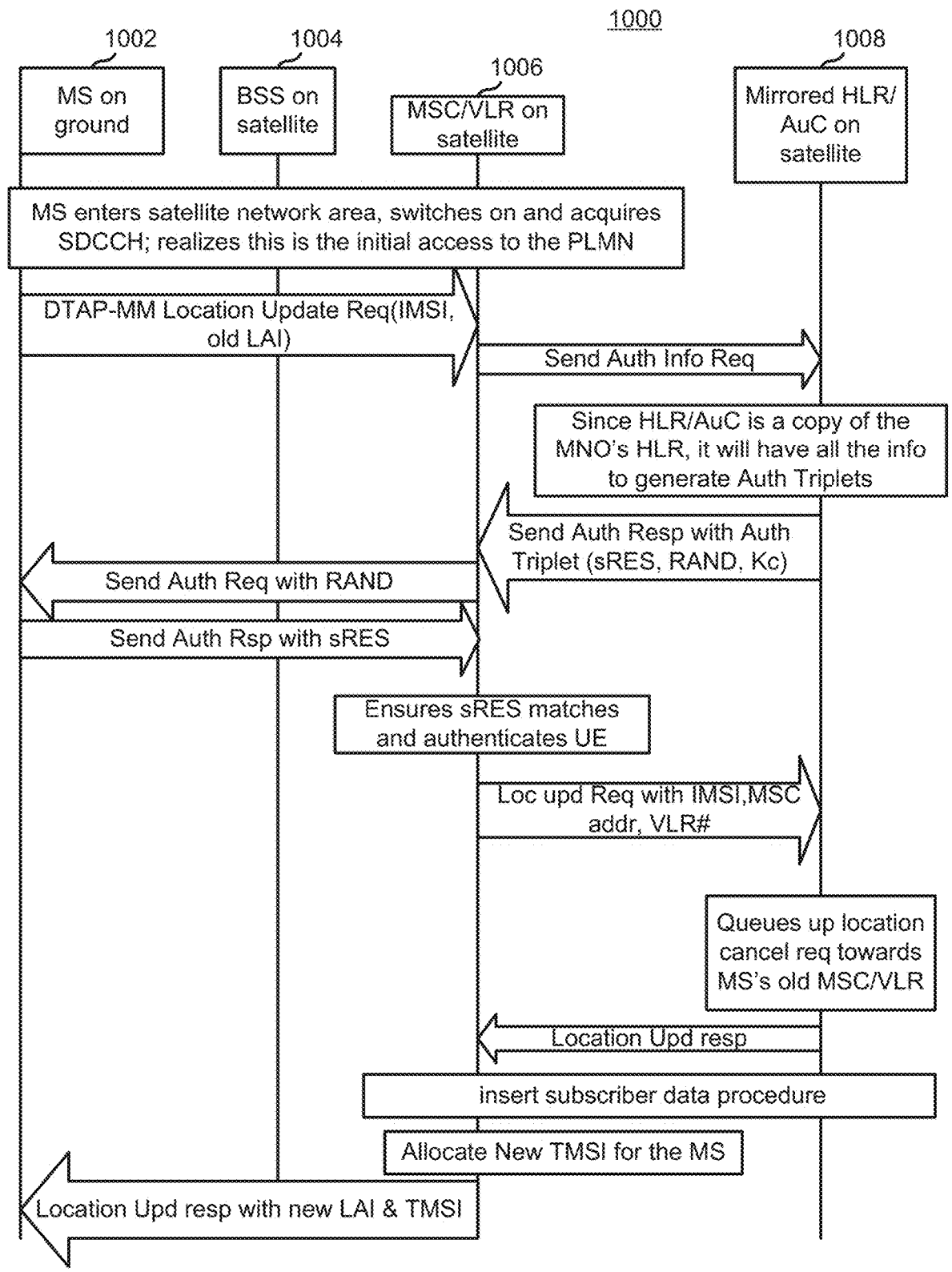
FIG. 10 illustrates the location update procedure from an MS when it is switched on in satellite network, according to an embodiment.

FIG. 10 illustrates the location registration procedure by a mobile station 1002 in a satellite network, where the P-HLR 1008 on satellite may be uploaded with the authentication vector data for all possible users of all MNO partners, and an authentication procedure with a mobile station can be completed within the satellite network without the need to communicate with the home network of the mobile station 1002.

The proxy HLR database 1008 on satellite can be used to authenticate the mobile station 1002 as required. The MCC+MNC value in the mobile station's IMSI can be used to determine the HLR 1008 to query for a faster lookup of the subscriber record. After the location update on the satellite, a cancel location request can be queued along with the current timestamp in the satellite to be sent to the ground station. When connected to the ground station, the network service application can forward the request to the ground station that can then be forwarded to the home MNO for a location update of the MS 1002 in the MNO's HLR.

Figure 11:
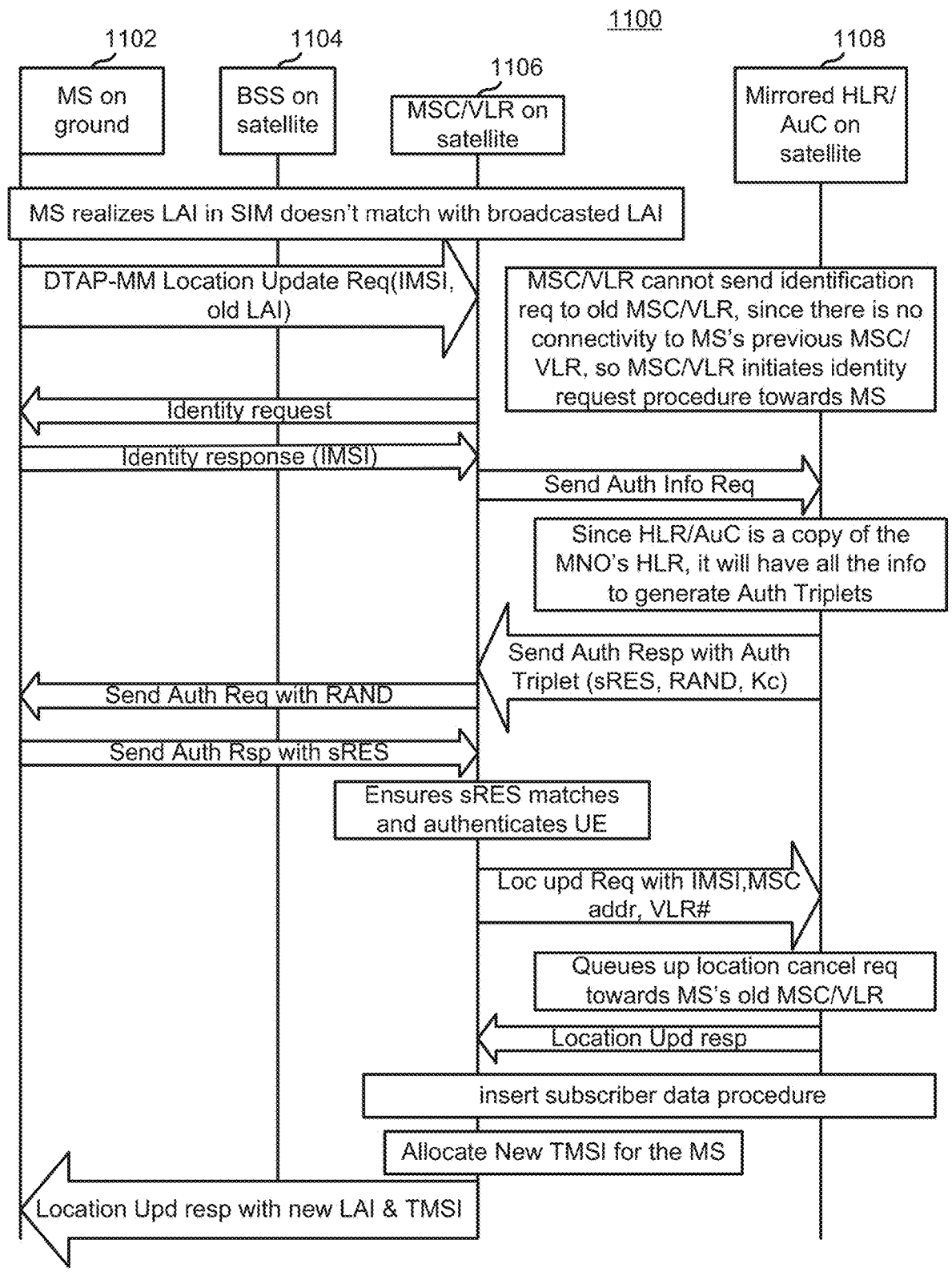
FIG. 11 illustrates the location update procedure on a location area identifier change in satellite network, according to an embodiment.

FIG. 11 shows an embodiment of the location update procedure by a MS 1102 in satellite network. The trigger for the location update can either be a periodic update or be a LAI mismatch between the one stored in SIM and the broadcasted value or a different one. If the MS 1102 thinks it's the same network in which it is updating its location, it may send TMSI instead of IMSI and expects the network to query its previous VLR to get the IMSI details. The satellite network may check if it received a TMSI-IMSI mapping from a ground station for this MS 1102. If not, since it does not have connectivity to the MS's previous network, it can use the identity request procedure to fetch the IMSI directly from the MS 1102. So, the identity request and response from MSC/VLR 1106 to MS 1102 can happen when either satellite's MSC/VLR 1106 has no connectivity to MS 1102's previous VLR which may be outside the satellite network or when MS 1102's previous VLR is a VLR on the satellite network but as that satellite did not connect to a ground station yet, the location update with TMSI details did not get uploaded to this satellite's MSC/VLR 1106.

Figure 12:
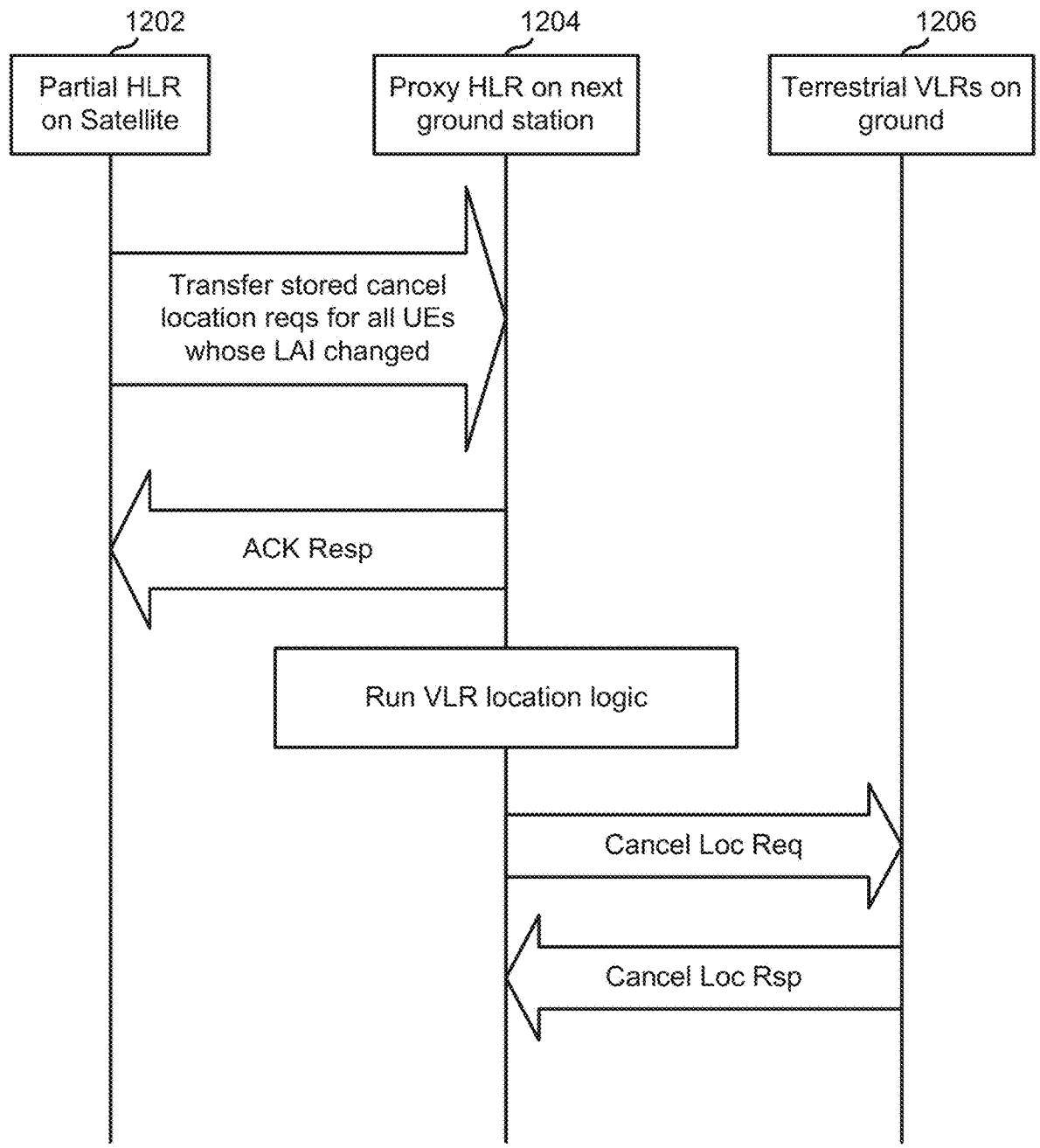
FIG. 12 illustrates the location updates of mobile devices from satellite network to terrestrial ground and MNO networks, according to an embodiment.

Once the satellite reaches the ground station, it can transfer the stored location cancel requests it has queued up during its overpass since its last connectivity to a ground station as shown in the FIG. 12. When the proxy HLR 1204 on the ground station receives a set of cancel location requests from a satellite, it can run a VLR location logic that can determine the processing of the request received.

In an embodiment, proxy HLR 1204 may check if the timestamp at which the stored location update for that IMSI is after the timestamp of the cancel location request (which might happen when UE moved onto terrestrial network and did a location area update which triggered a cancel location request to the MSC/VLR on the ground station). If so, the network service application on the ground station may store the timestamp and the received location of the MS internally and may not route the cancel location request for that IMSI. The NSA may then check if the destination MSC/VLR is within the satellite network (which might happen when MS moves between the location areas within the satellite network that are under different MSC/VLRs). In that case, the NSA may update the location of the MS in the user information database maintained and queue this up for the next satellite with the destination MSC/VLR. If the destination MSC/VLR 1206 is in a terrestrial network, may route the cancel location request to the appropriate MSC/VLR 1206. MSC/VLR on satellite can push the location updates it received from mobile stations to the MSC/VLR on ground station when it is about to leave the ground station so that the ground station can update the MSC/VLR on the next satellite that is going to cover the same region.

There can be a scenario where a MS moves to a terrestrial network between two satellite networks, for example moving from a satellite network to a terrestrial network to a satellite network. In that case, when a MS moves to terrestrial network from satellite network, it may send a location area update (LAU) to the terrestrial MSC/VLR with its previous MSC/VLR pointing to the one on the satellite network. This will trigger a cancel location request to satellite's VLR as per the procedure defined in telecommunication standards. MSC/VLR at the ground station may have the same MSC/VLR ID as that on the satellite, and the cancel location request may be routed to the ground station's MSC/VLR. By this time, the ground station may or may not have received the location update information of MS from satellite. But in both cases, as the timestamp will be old for that MS's location, the ground station will accept the request received from the terrestrial MNO.

When the satellite comes back with its location update to the ground station later, it may check the timestamp and, since it's a stale update, the ground station may store it in the user information database to be able to track the network activity, and not forward it to the MNO network.

C. SMS Transmission/Reception

Figure 13A:
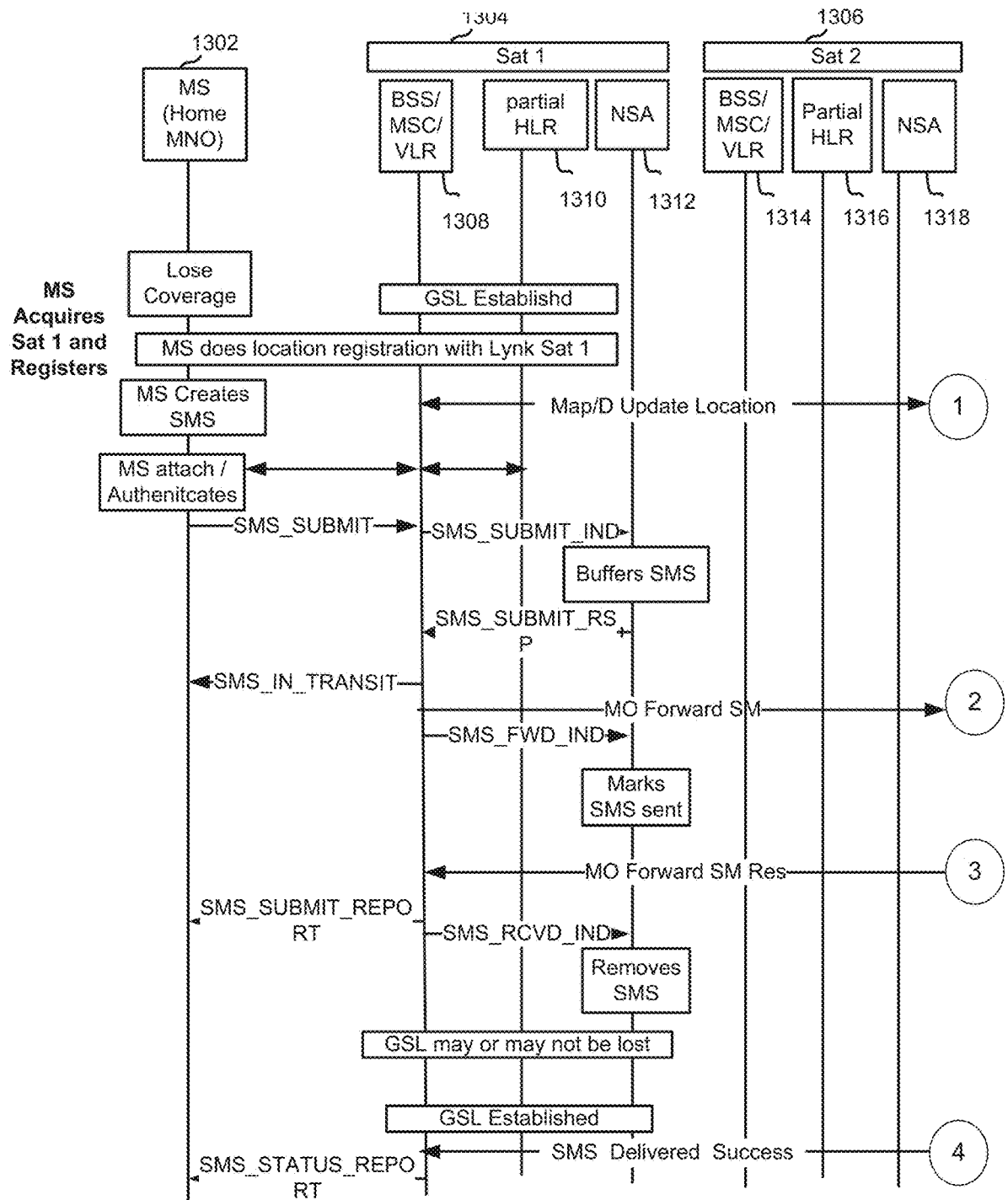
FIG. 13, comprising FIG. 13A and FIG. 13B together, illustrates an MO SMS over a satellite network with ground station connectivity using GSM technology, according to an embodiment.
Figure 13B:
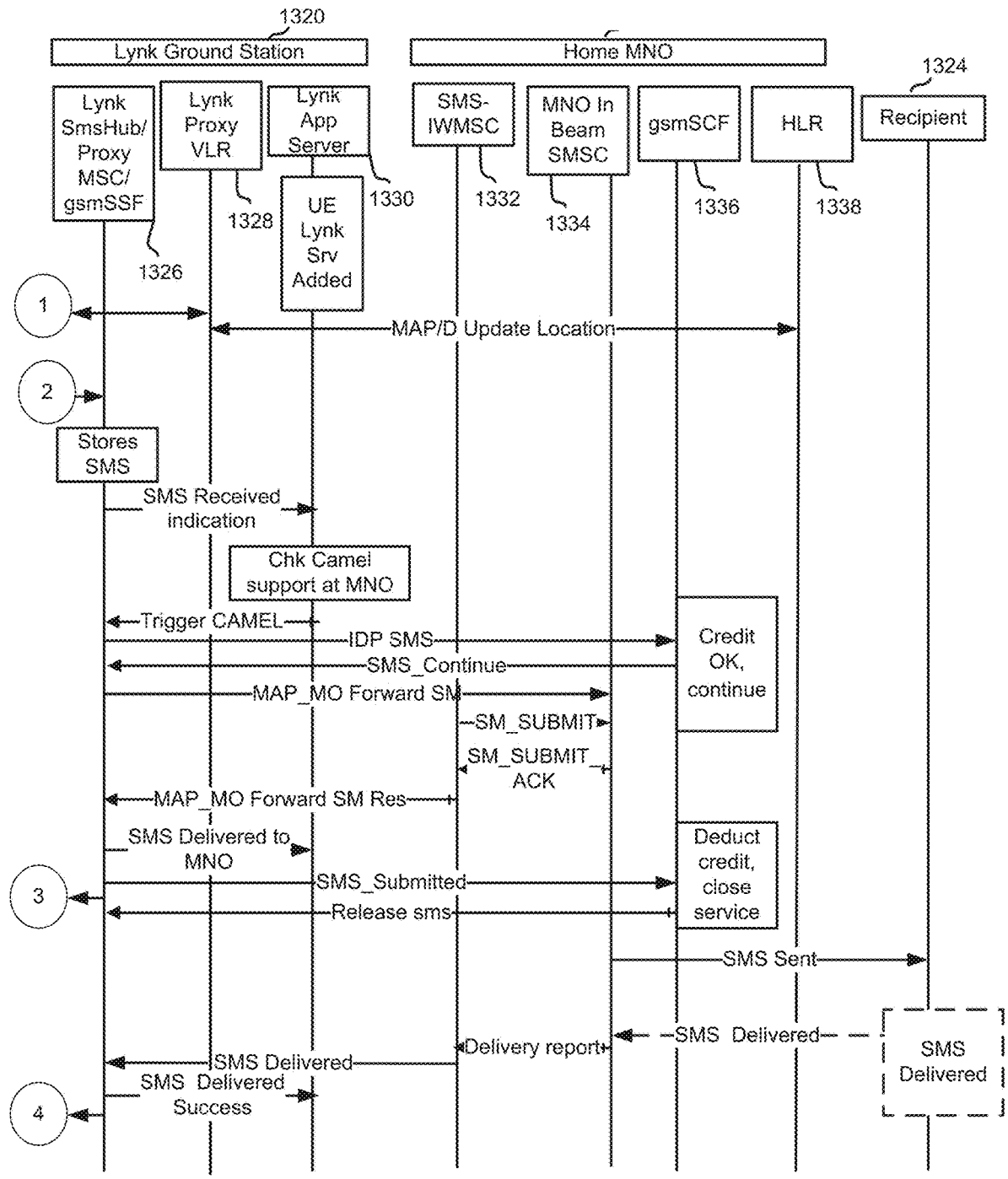

FIG. 13A and FIG. 13B together, illustrate the message flow for a mobile originated SMS on a satellite network with connectivity to a ground station in an embodiment. When the satellite starts serving the location area, the MS 1302 may realize the presence of the network and may execute a location update procedure. Since the satellite has connectivity to the ground station simultaneously, the location of the MS 1302 can be updated all the way to the ground station and to the home MNO network.

In an embodiment, when a mobile station 1302 submits an SMS, the MSC/VLR 1308 on the satellite may send an indication to the NSA 1312 so that the NSA 1312 can buffer it (optimization might be done to avoid buffering when ground station connectivity is available) and send a USSD based notification to the MS indicating that the SMS is in transit. Though the data flow might happen between NSA components on satellite and ground station and then forwarded to respective entities for processing, arrows are shown to individual entities on satellite/ground stations to indicate the responsible entities for processing the messages. The MSC/VLR 1308 on the satellite forwards the SMS to the proxy MSC/VLR 1328 on the ground station through NSA 1330 which may trigger CAMEL checks, which are optional based on the CAMEL 1336 support at MNO's network and the profile of the MS, for credit before forwarding the SMS to the MNO's SMSC 1334.

On receiving a submission acknowledgment from MNO, the gsmSSF of Lynk SmsHub/Proxy MSC/gsmSSF 1326 on proxy MSC/VLR 1328 may trigger credit and/or debit on a subscriber's account if CAMEL-based billing is supported on the MNO network and is required by the profile of the MS, shown in FIG. 13B. Whenever a delivery report is received from MNO's network, it can be sent all the way to the MS 1302 via satellite's network components as shown in FIG. 13A and FIG. 13B, and the successful delivery of the message along with the subscriber details and the timestamps may be tracked at NSA 1330 on the ground station network.

Figure 14A:
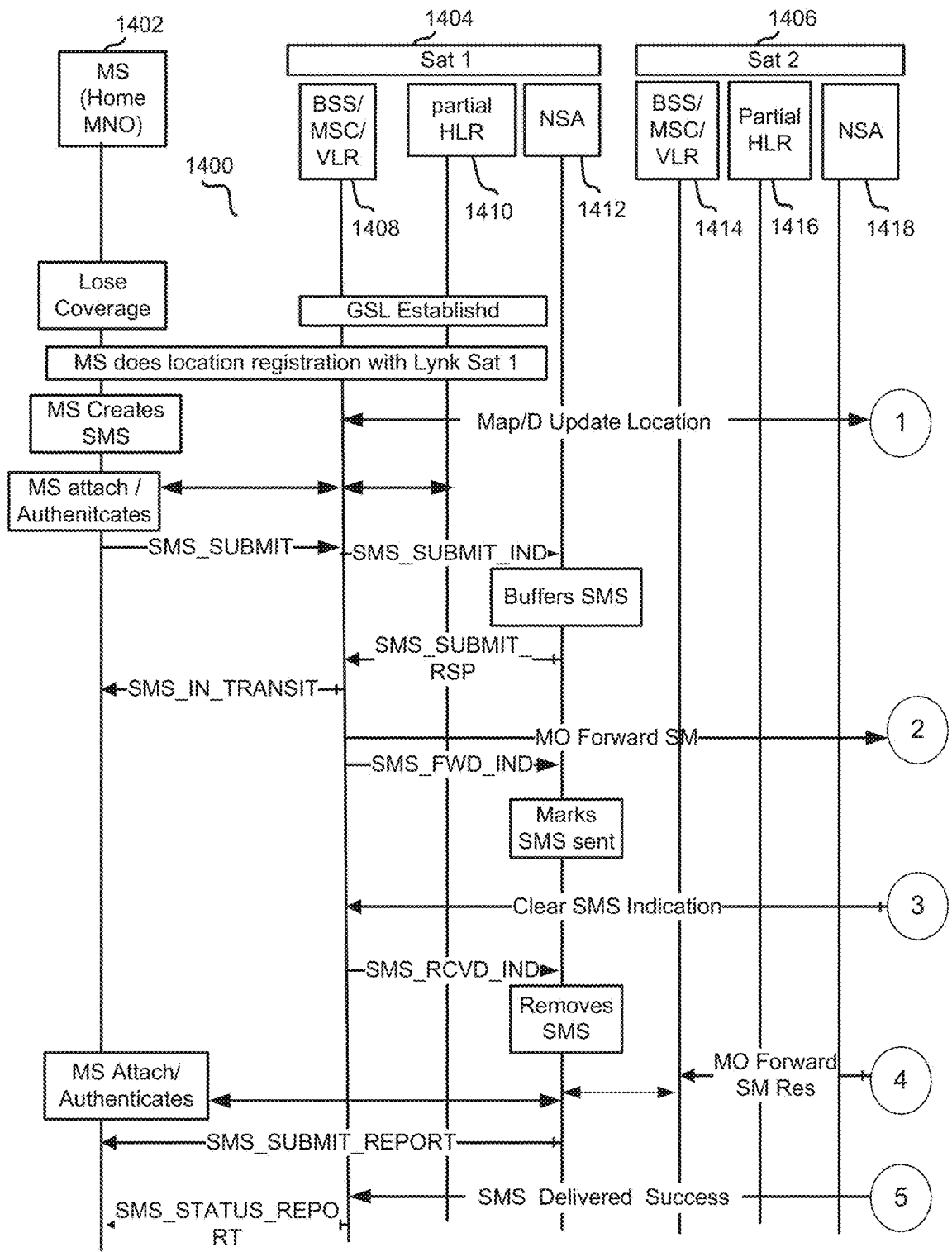
FIG. 14, comprising FIG. 14A and FIG. 14B together, illustrates an MO SMS over a satellite network without ground station connectivity using GSM technology, according to an embodiment.
Figure 14B:
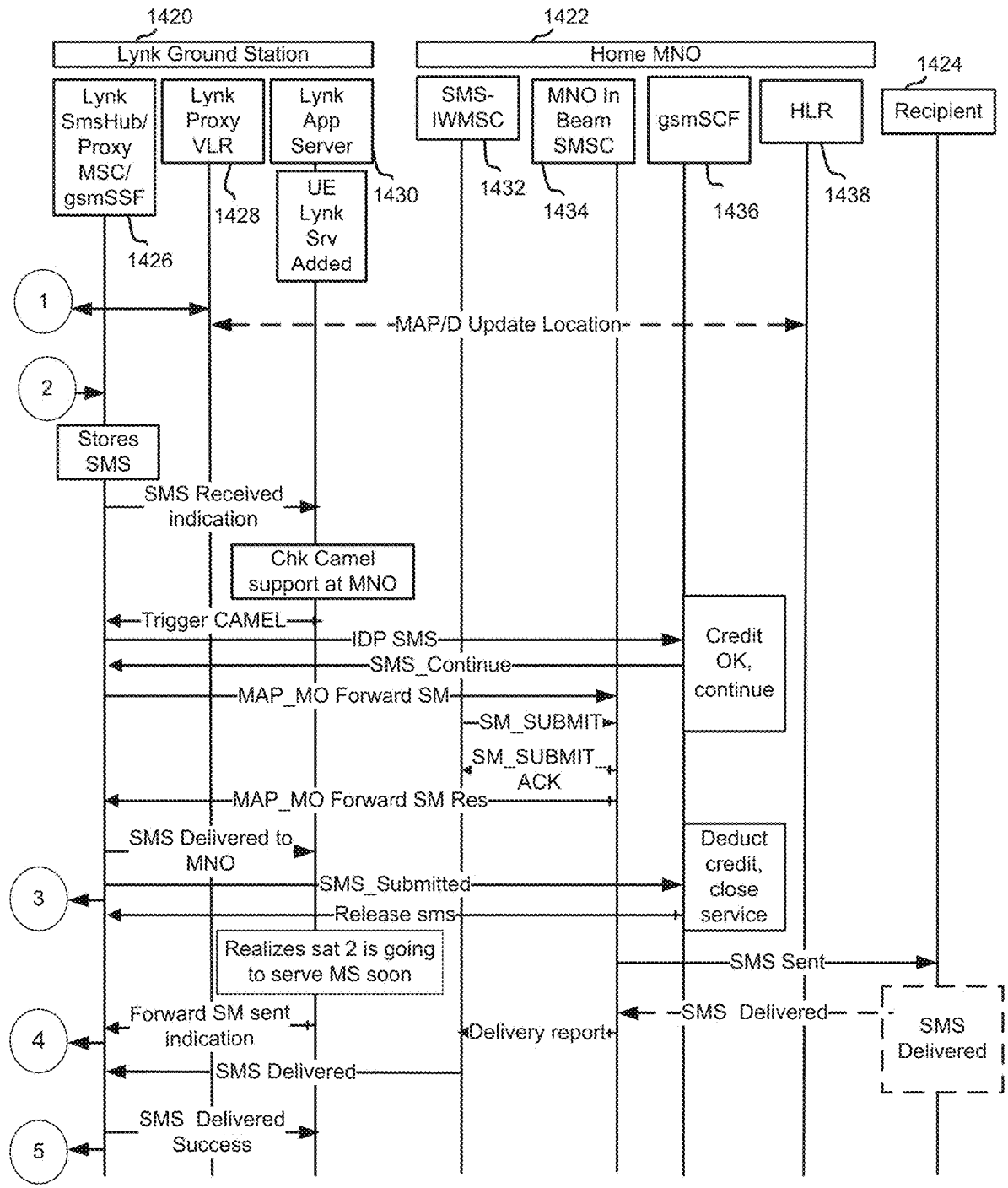

FIG. 14, comprising FIG. 14A and FIG. 14B together, illustrates a call flow for a mobile originated SMS on satellite network without connectivity to a ground station. When the satellite starts serving the location area, the MS 1402 may realize the presence of the network and may execute a location update procedure. Since the satellite is not connected to a ground station, the location of the MS 1402 can be stored locally on the satellite and queued up with the requests to be sent to ground station once a connection is established. In FIG. 14, dotted lines for location update between ground station and MNO's network indicate that this leg is optional and might be performed when there is no location update received for that MS from MNO's network that is later than the one received from the satellite.

In an embodiment, when a MS 1402 sends an SMS to the satellite that has no ground station connectivity, the NSA 1412 on the satellite may buffer the SMS and may queue up the SMS request along with the MS and timestamp details to be sent to ground station. NSA 1412 may also send a USSD based notification to the MS indicating that the SMS is in transit. The NSA 1412 on the satellite may wait until the satellite connects to a ground station to forward the SMS and may mark it as sent locally in its database. NSA 1412 may remove the buffered SMS on the satellite once it receives an indication from the ground station that the SMS has been delivered to the MS's home network.

NSA 1430 on the ground station may maintain a state for each SMS and may determine the best satellite to serve the related transactions of the SMS for the MS 1402. When a delivery report is received for a SMS that has been sent by a MS 1424, the NSA on ground station may check if the MS 1402 is either being served or going to be served by a different satellite than the one it has originally sent SMS on and sends the delivery report to that satellite so that it can be delivered to the MS 1402.

Figure 15A:
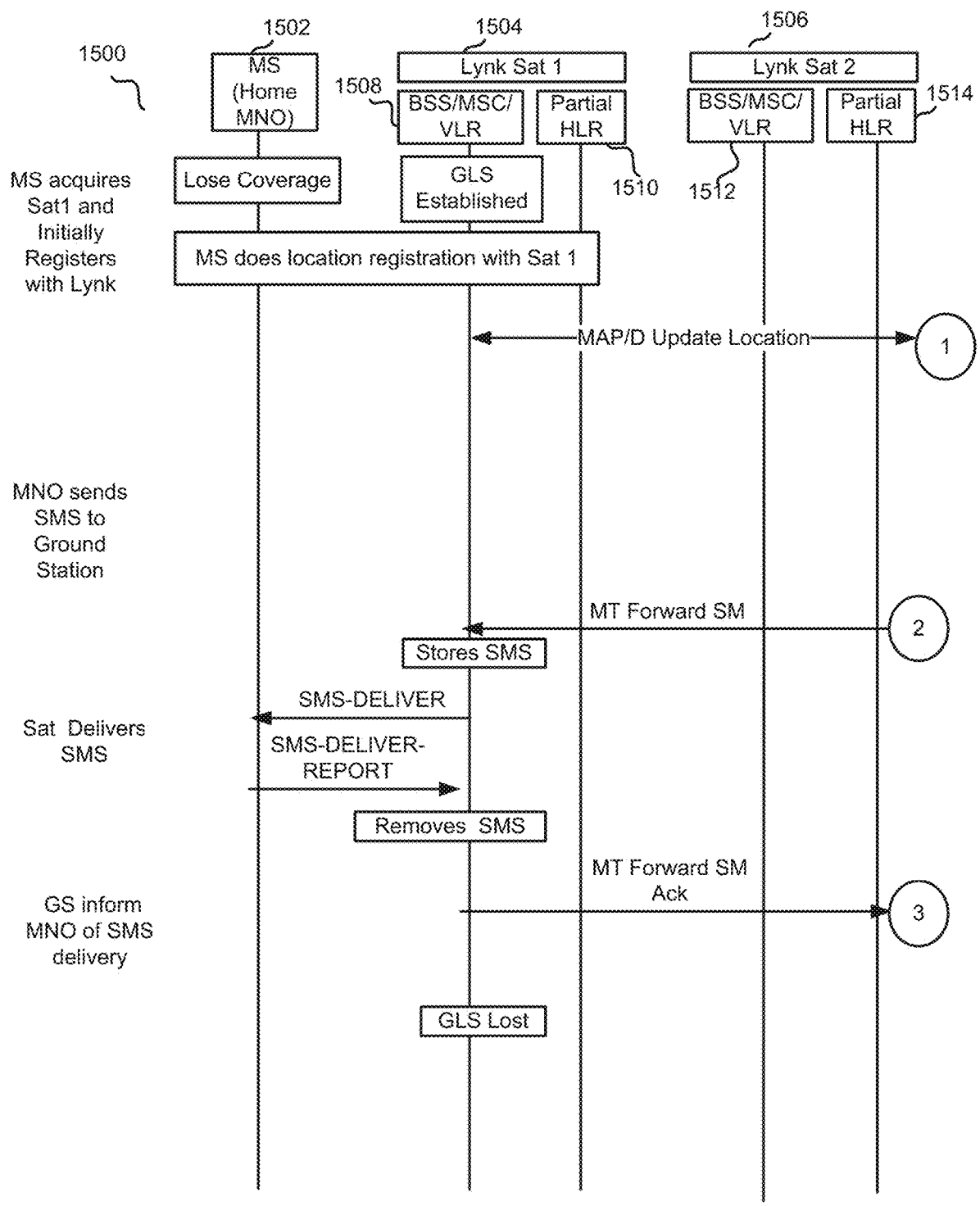
FIG. 15, comprising FIG. 15A and FIG. 15B together, illustrates an MT SMS over a satellite network with ground station connectivity using GSM technology, according to an embodiment.
Figure 15B:
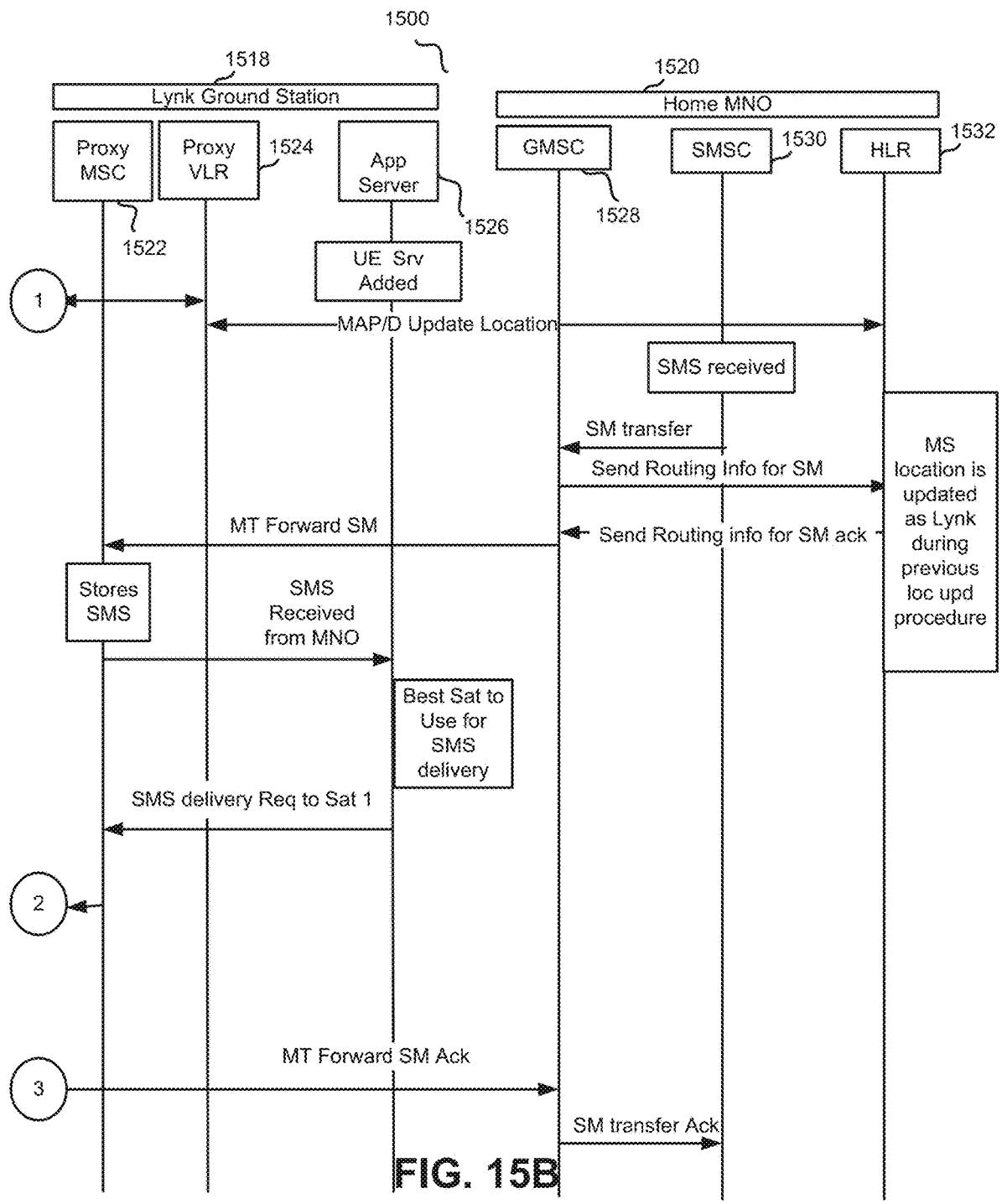

FIG. 15A and FIG. 15B together, illustrate an embodiment of the call flow for a mobile terminated SMS on satellite network with connectivity to a ground station. When the satellite starts serving the location area, the MS 1502 may realize the presence of the network and may execute a location update procedure. Since the satellite is connected to the ground station simultaneously, the location of the MS 1502 can be updated all the way to the ground station and to the home MNO network of the MS 1502.

When a SMS is sent from the home network to be delivered to the MS 1502, NSA 1526 on ground station may determine that the MS is currently being served by a satellite and may upload the message to that satellite. This might be a queued-up message at the ground station too for the MS 1502. The MS 1502 may be paged if it is in idle mode and the SMS may be delivered to the MS 1502 and a delivery report, if received from the MS 1502, can be forwarded all the way to the home network via the ground station.

Figure 16A:
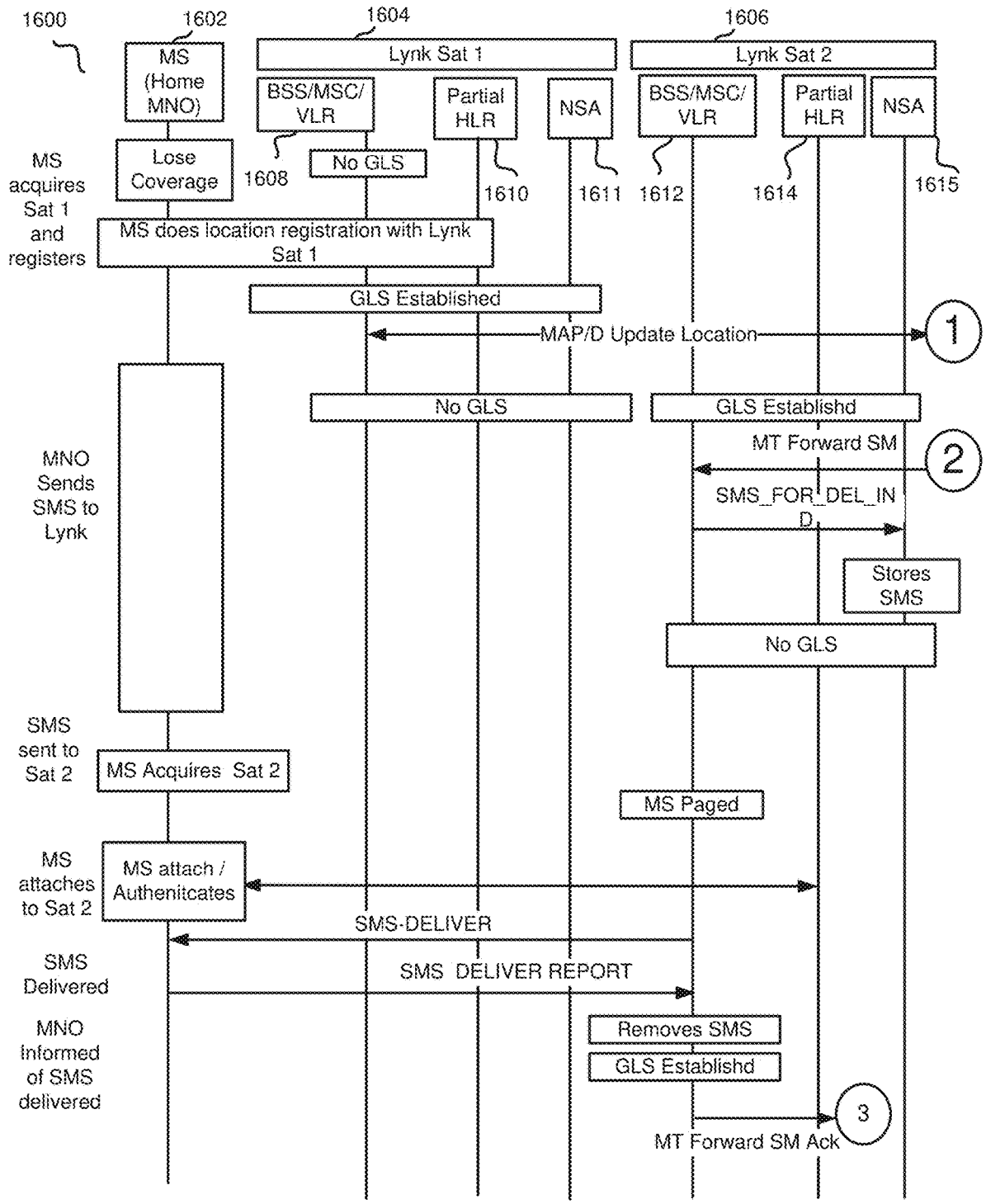
FIG. 16, comprising FIG. 16A and FIG. 16B together, illustrates an MT SMS over a satellite network without ground station connectivity using GSM technology, according to an embodiment.
Figure 16B:
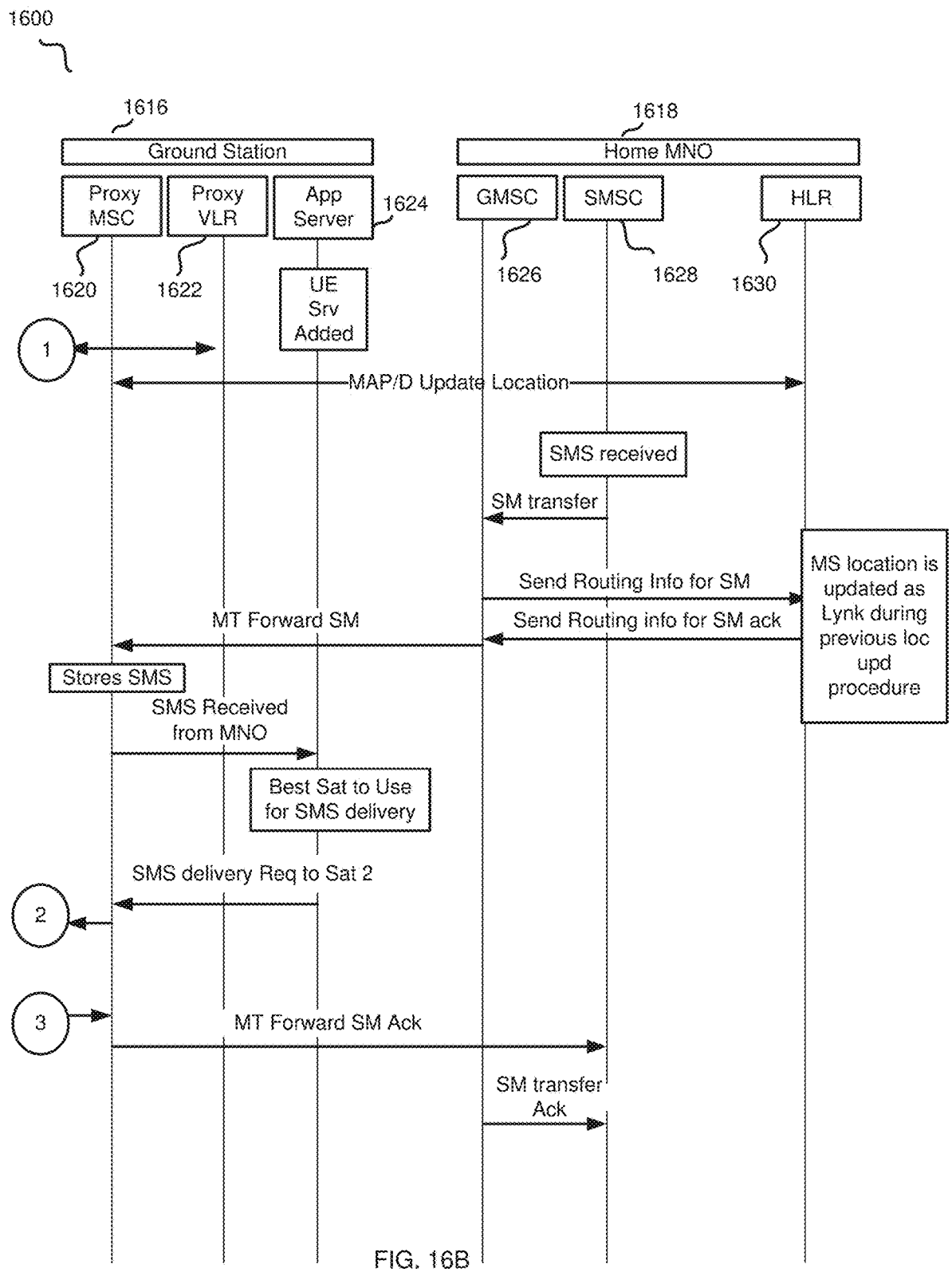

FIG. 16A and FIG. 16B together, illustrate an embodiment of the call flow for a mobile terminated SMS on satellite network without connectivity to a ground station. When the satellite starts serving the location area, the MS 1602 may realize the presence of the network and may execute a location update procedure. When the satellite is connected to the ground station simultaneously, the location of the MS 1602 can be updated all the way to the ground station and to the home MNO network of the MS 1602.

When a SMS is received for delivery from home network, the NSA 1624 on ground station may check for the MS location and determine if it is currently being served by a satellite, and if not, may determine the next upcoming satellite that can serve the MS 1602 best and may upload the message to the determined satellite for delivery to the MS 1602. The NSA on the satellite may store this until it reaches the location area of the MS 1602 and may try to initiate paging the MS 1602. The MS 1602 may see the network when satellite starts serving the location area, attach and may receive the message from the satellite network. Once the delivery report is received at the NSA on satellite, the NSA on the satellite may remove the buffered SMS, and the delivery report sent by the MS 1602 may be stored to be sent to ground station and home network once a connection is established to the ground station.

Figure 17A:
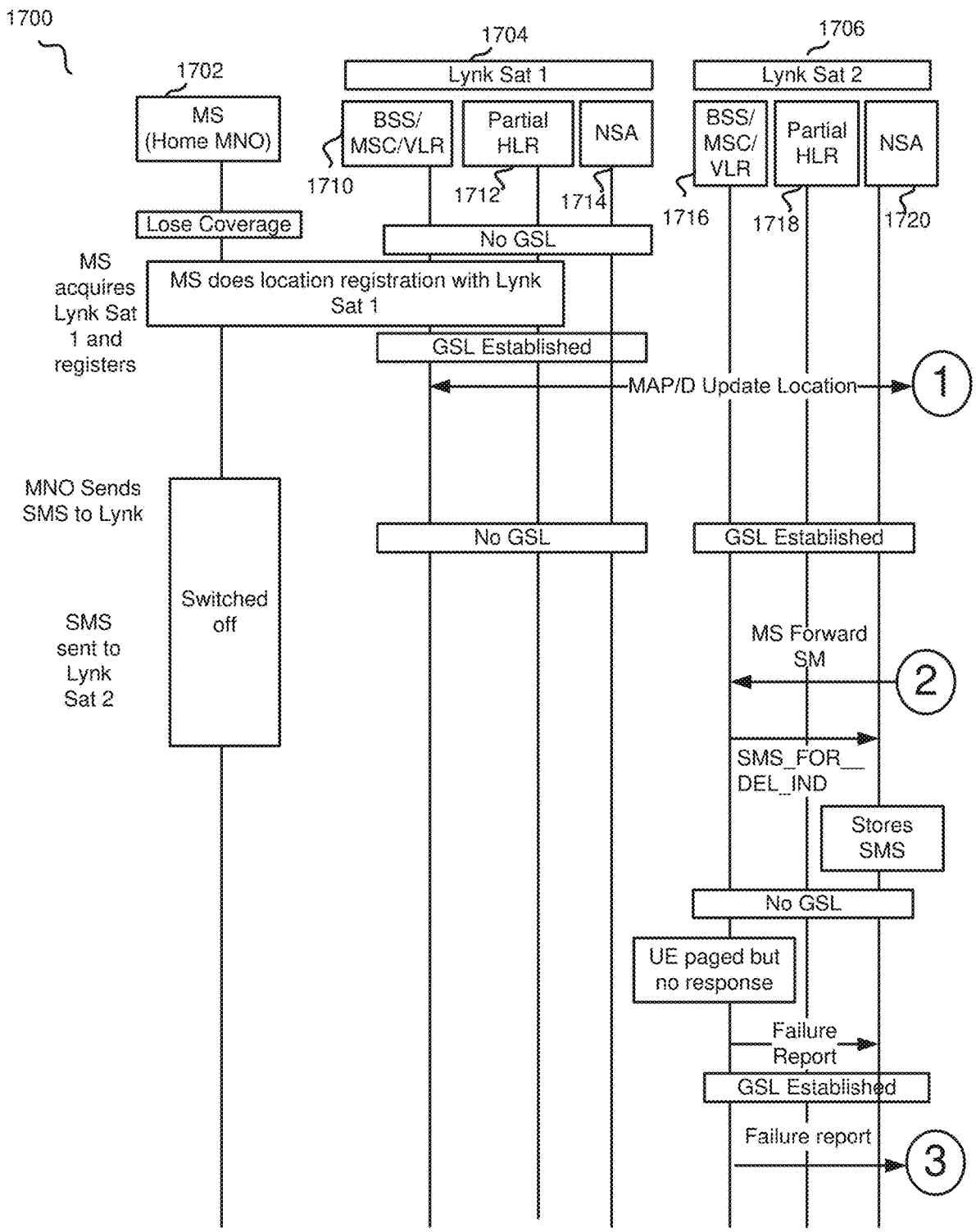
FIG. 17, comprising FIG. 17A and FIG. 17B together, illustrates an unsuccessful MT SMS over a satellite network without ground station connectivity using GSM technology, according to an embodiment.
Figure 17B:
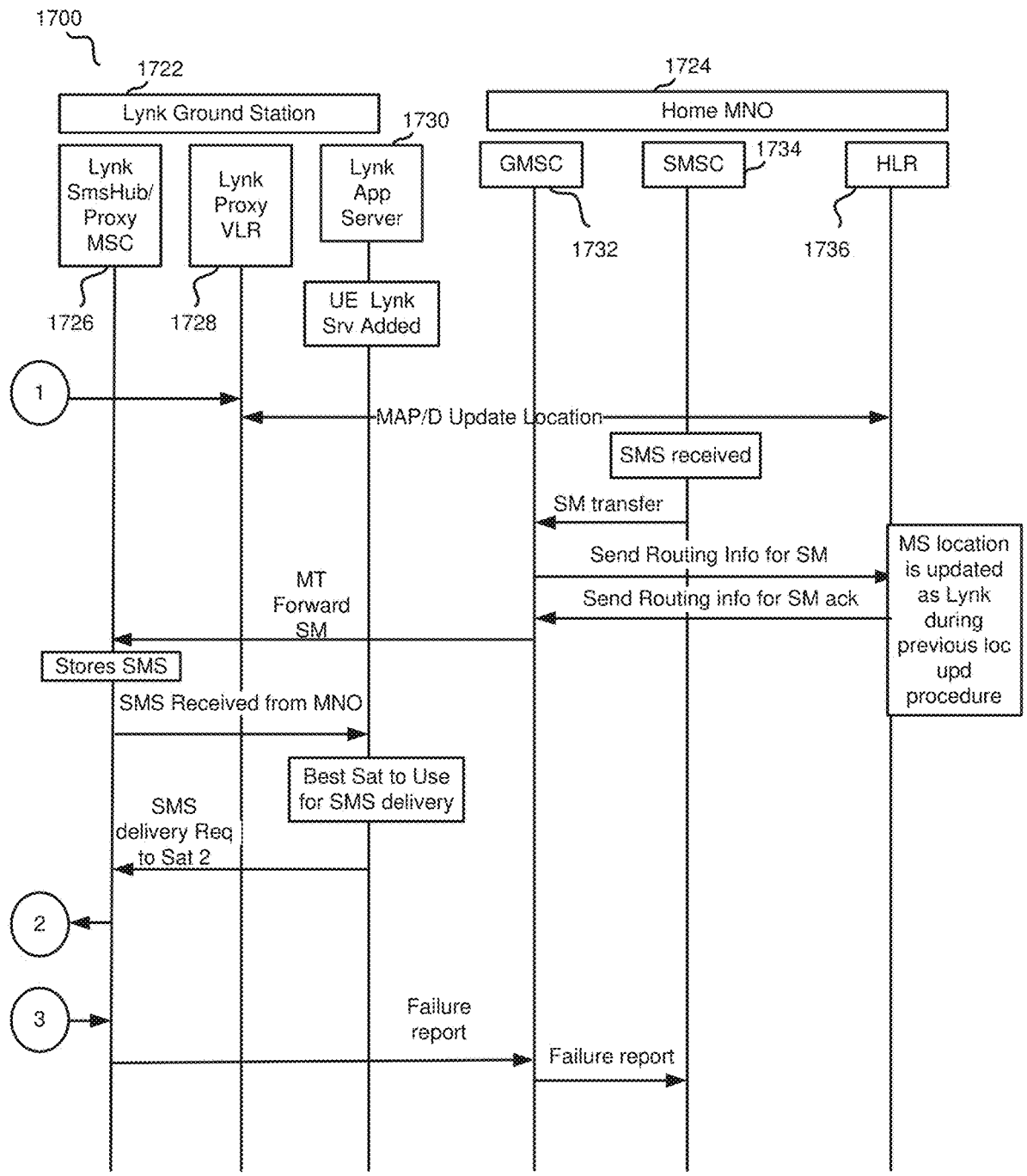

FIG. 17A and FIG. 17B together, illustrate an embodiment of the call flow for an unsuccessful delivery attempt of a mobile terminated SMS on satellite network without connectivity to a ground station. When a SMS is received for delivery from home network, the NSA 1730 on ground station may check for the MS 1702 location and may determine if it is currently being served by a satellite, and if not, may determine what is the next upcoming satellite that can serve the MS 1702 best, and may upload the message to the determined satellite for delivery to the MS. The NSA 1720 on satellite may store this until it reaches the location area of the MS and may try to page the MS. Meanwhile, if the MS 1702 is switched off, the network may not see a paging response from the mobile station when paged for SMS delivery. In that case, the network sends a failure report to local NSA 1720 which may be stored by the NSA 1720 to be sent to ground station and home network once a connection is established to the ground station.

D. Cell Broadcast Service

In GSM, the cell broadcast service can be used to transfer CBS messages related to public warning. This requires reception of CBS messages to be permanently activated in the mobile terminal. Warning message delivery, like cell broadcast service, permits a number of unacknowledged warning messages to be broadcast to MS/UEs within a particular area.

Figure 18A:
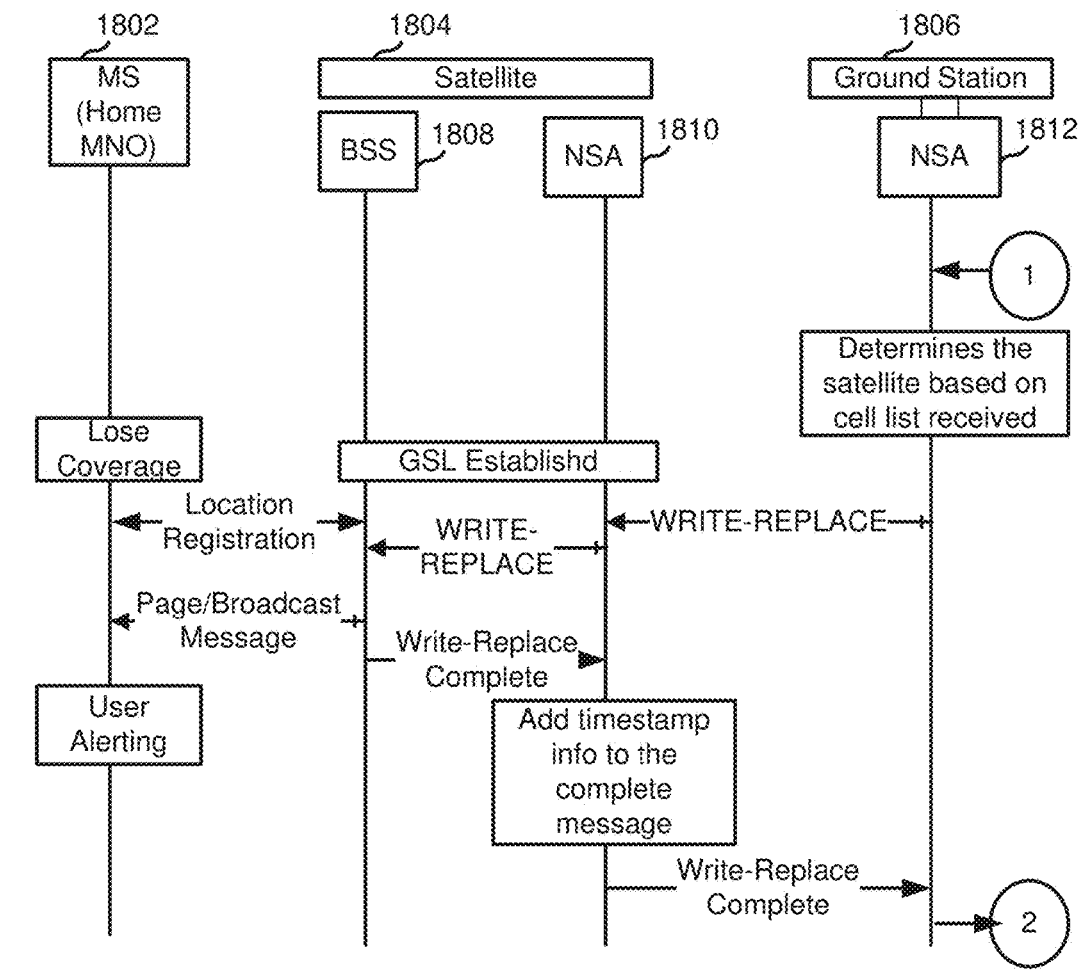
FIG. 18, comprising FIG. 18A and FIG. 18B together, illustrates the CBS message flow from an MNO network to a mobile station across master and regular ground stations, and an orbital base station system, according to an embodiment.
Figure 18B:
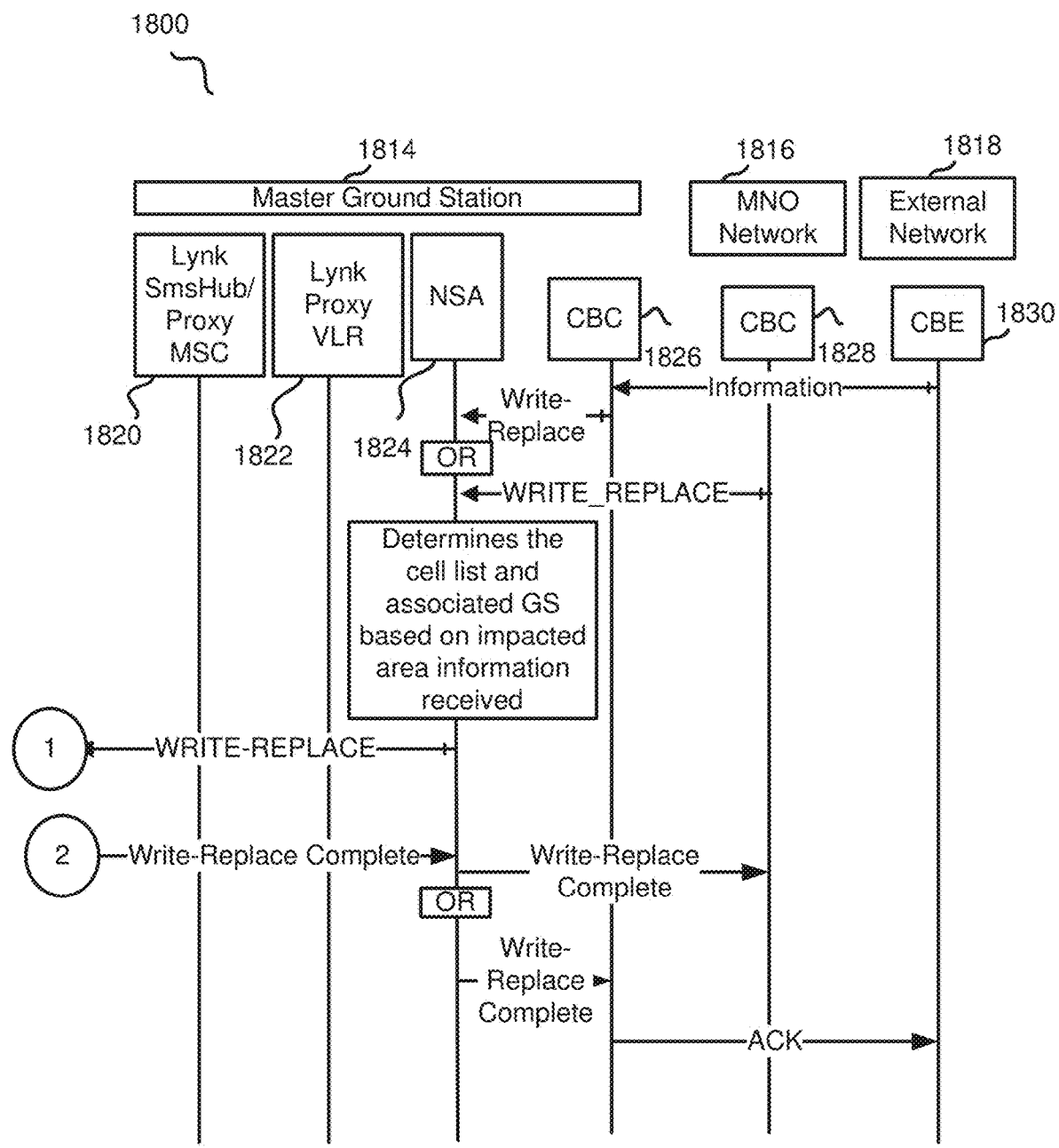

FIG. 18A and FIG. 18B together, illustrate the cell broadcast message flow to a MS 1802 on a satellite network from an MNO network in an embodiment. A cell broadcast message can be received from either a CBE 1830 or a CBC 1828 on an MNO network. While CBC (Cell Broadcast Center) 1826 residing on the master ground station may interface with a variety of CBE 1830s outside the satellite network like PSAP, regulator etc., NSA 1824 on master ground station may interface with MNO's CBC 1828s. When an emergency/warning message ("warning type", "warning message", "impacted area", and "time period") is received from CBE 1830, CBC 1828 may forward it to NSA 1824 on the master ground station. NSA 1824 on the master ground station can also receive an emergency/warning message from an MNO's CBC 1828. NSA may use the "impacted area information" to identify the set of BSCs that need to be contacted and may construct the "cell list" for the cells in which the information is to be broadcast. Based on the derived cell list, it can determine which ground station(s) (could include the master ground station itself) need to be contacted and can send WRITE-REPLACE message to the NSA 1812 entities on these ground stations. If it is a network wide message, then WRITE-REPLACE messages can be sent to the NSA 1812 entities across the ground stations.

On receiving the WRITE-REPLACE message (step 1 in FIG. 18) from NSA 1824 (part of master ground station 1814), the NSA 1812 on a ground station can determine the satellite(s) onto which the message needs to be forwarded based on the cell list shared by the CBC 1826 on the master ground station. Once the identified satellite contacts the ground station, the warning messages can be uploaded with highest priority so that they can be paged/broadcasted as soon as the satellite starts serving the cell. If the received message is a ETWS emergency message, the BSC/BTS 1806 can include it within the paging message and start sending the paging messages in all paging groups for the time duration requested by the CBC 1826 in the warning period. If the received message is a CBS message, BSC/BTS 1806 can broadcast it on the cell broadcast channel according to the repetition period and the repetition factor specified by the CBC 1826. The location registration procedure shown in FIG. 18 and the paging might only be required in the case of an ETWS emergency message and not required in the case of a cell broadcast message.

E. USSD Messages

The USSD procedure supports supplementary service signaling procedures which can allow PLMN specific services to be introduced. In the satellite network, this may be used to send welcome messages and messages for SMS progress to subscriber MS 1902 when they are served by the satellite network. The NSA 1910 within the satellite network system may use MAP_UNSTRUCTURED_SS_NOTIFY message defined in the telecommunication standards for this.

During the intermittent coverage, USSD can be utilized to deliver welcome messages and information messages regarding the satellite network services. When there is no ground station connectivity, these messages may originate on the satellite.

During the continuous ground station connectivity, conventional USSD use cases can also be supported as defined in the telecommunication standards. Few examples of such conventional USSD use cases can be communication between a user and the HPLMN for account inquiries, mobile banking etc.

Figure 19:
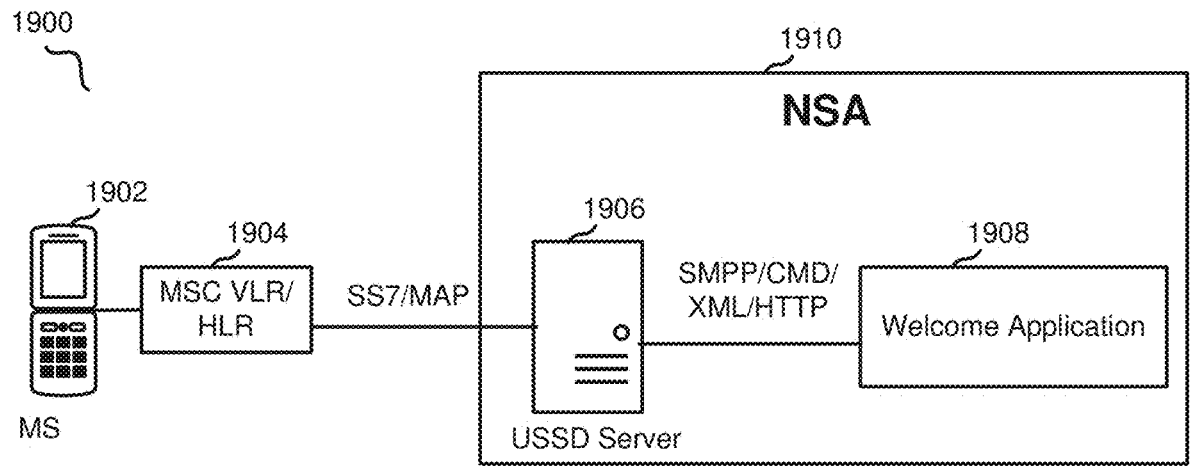
FIG. 19 illustrates a USSD notification message flow for welcome message to a mobile station, according to an embodiment.

FIG. 19 illustrates a USSD notification message flow for welcome message to a mobile station, according to an embodiment. The NSA 1910 may act as both the USSD application 1908 and the USSD handler 1906. It may be in the satellite to accommodate the intermittent GSL coverage. The welcome message may be sent to the MS 1902 as soon as NSA 1910 detects a new MS 1902 location update. The SMS received USSD message may be sent to the MS 1902 after a message is received on the satellite.

When an MNO becomes the satellite network's partner, they may supply their customized welcome message. The welcome messages from MNO partners may be periodically uploaded to the satellite (along with other data uploads). This may allow for an MNO changing the content of the message. The message may also contain a language indicator and alphabet designator for the USSD notify.

Example: "You are in a MNONAME extended satellite network coverage area. Message sent and received may experience delay due to satellite connectivity", English, alpha. The text can be 182 characters in length.

The procedure may be invoked by a USSD application 1908 local to the NSA 1910. They may start by using the MAP_UNSTRUCTURED_SS_NOTIFY service. If the request is initiated by a local USSD application, then the MSC of MSC/VLR/HLR 1904 may open a dialogue with the VLR of MSC/VLR/HLR 1904. The MSC of MSC/VLR/HLR 1904 may initiate a CM connection to the MS 1902. Once the connection is successfully established, the message received from the VLR of MSC/VLR/HLR 1904 or USSD application 1908 may be sent to the MS 1902 using the standard mapping.

Following transfer of the message the MSC of MSC/VLR/HLR 1904 may wait for a confirmation from the MS 1902. This may be sent to the USSD application 1908 as appropriate. Following this, the MSC of MSC/VLR/HLR 1904 may receive further uses of the MAP_UNSTRUCTURED_SS_REQUEST or MAP_UNSTRUCTURED_SS_NOTIFY services or may receive an indication to release the connection to the MS 1902. In the situation involving the welcome message the MS 1902 connection may be released. In the event of an error, the connection to the MS 1902 can be released, and the MAP process with the VLR of MSC/VLR/HLR 1904 can be aborted for network initiated unstructured supplementary service When an MNO becomes the satellite network's partner, they may supply their customized message received on SAT. Messages received from the MNO partners may periodically be uploaded to the satellite (along with other data uploads). This may allow for an MNO to change contents of the MNO message to subscribers or others. The message may also contain a language indicator and alphabet designator for the USSD notify.

Example: "Your SMS has been received in MNONAME extended satellite network coverage area. Message sent and received may experience delay due to satellite connectivity", English, alpha. The text can be 182 characters in length.

Figure 20:
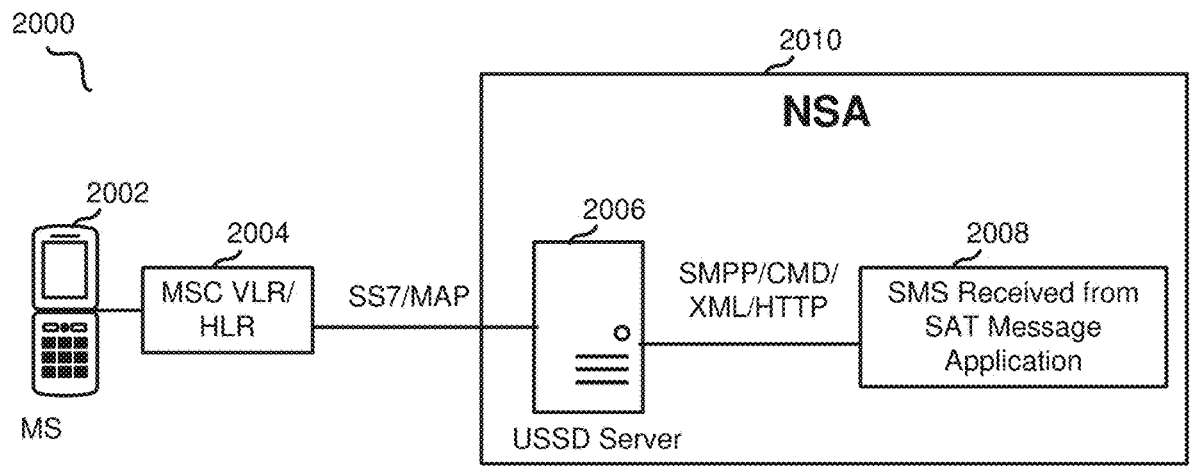
FIG. 20 illustrates a USSD notification for SMS reception at a mobile station, according to an embodiment.

FIG. 20 illustrates a USSD notification for SMS reception at a mobile station, according to an embodiment. The procedure may be invoked by a USSD 2008 application local to the NSA 2010. They may start by using the MAP_UNSTRUCTURED_SS_NOTIFY service. The request can be from local USSD 2008 application in NSA 2010, then the MSC of MSC/VLR/HLR 2004 may open a dialogue with the VLR associated with MSC of MSC/VLR/HLR 2004. The MSC of MSC/VLR/HLR 2004 may initiate a CM connection to the MS 2002. Once the connection is successfully established the message received from the USSD 2008 application may be sent to the MS 2002 using the standard mapping.

Following transfer of the message the MSC of MSC/VLR/HLR 2004 may wait for a confirmation from the MS 2002. This may be sent to the USSD 2008 application as appropriate.

Figure 21:
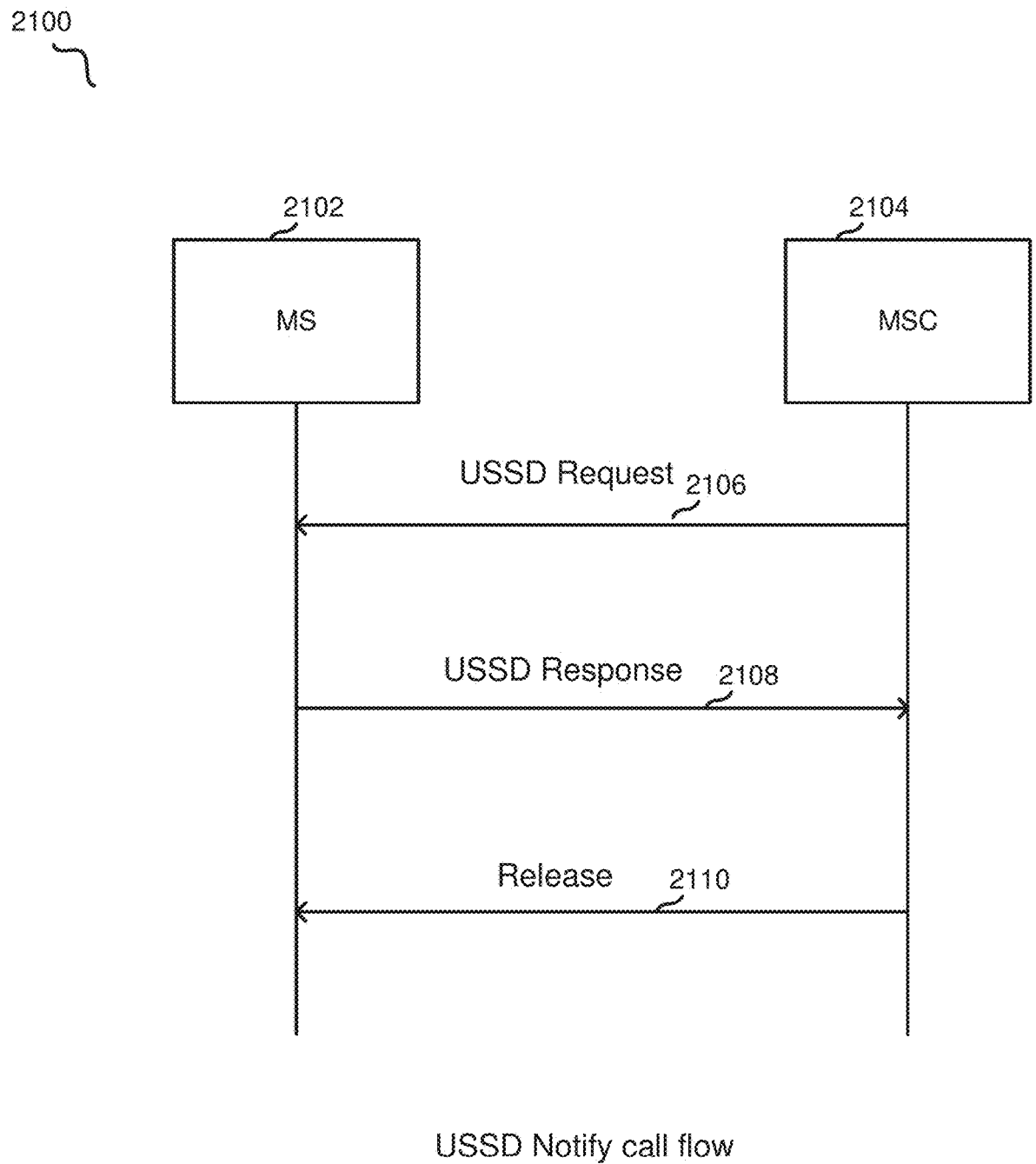
FIG. 21 illustrates a USSD call flow from a MSC on the satellite to a mobile station, according to an embodiment.

FIG. 21 illustrates a USSD call flow from a MSC on the satellite to a mobile station, according to an embodiment.

4. NSA on Satellite During Intermittent GSM Coverage

In an embodiment, for a network with intermittent coverage, the satellite may host both a BSS and some components of an NSS of a GSM network such as the MSC, VLR, proxy HLR (P-HLR) components. Along with these, to provide satellite network services to the users, a network service application (NSA) may also be hosted on each satellite. The BTS and the BSC can coexist and so does the MSC and VLR. In one embodiment, the P-HLR maintained at the satellite may be supported as one P-HLR per MNO (partnered with a satellite network) and may contain the attributes needed to provide satellite network's service for the users. At any given instance, the satellite network can be a single MSC/VLR service area with one location area that has a single cell or multiple cells within a single location area.

Figure 22:
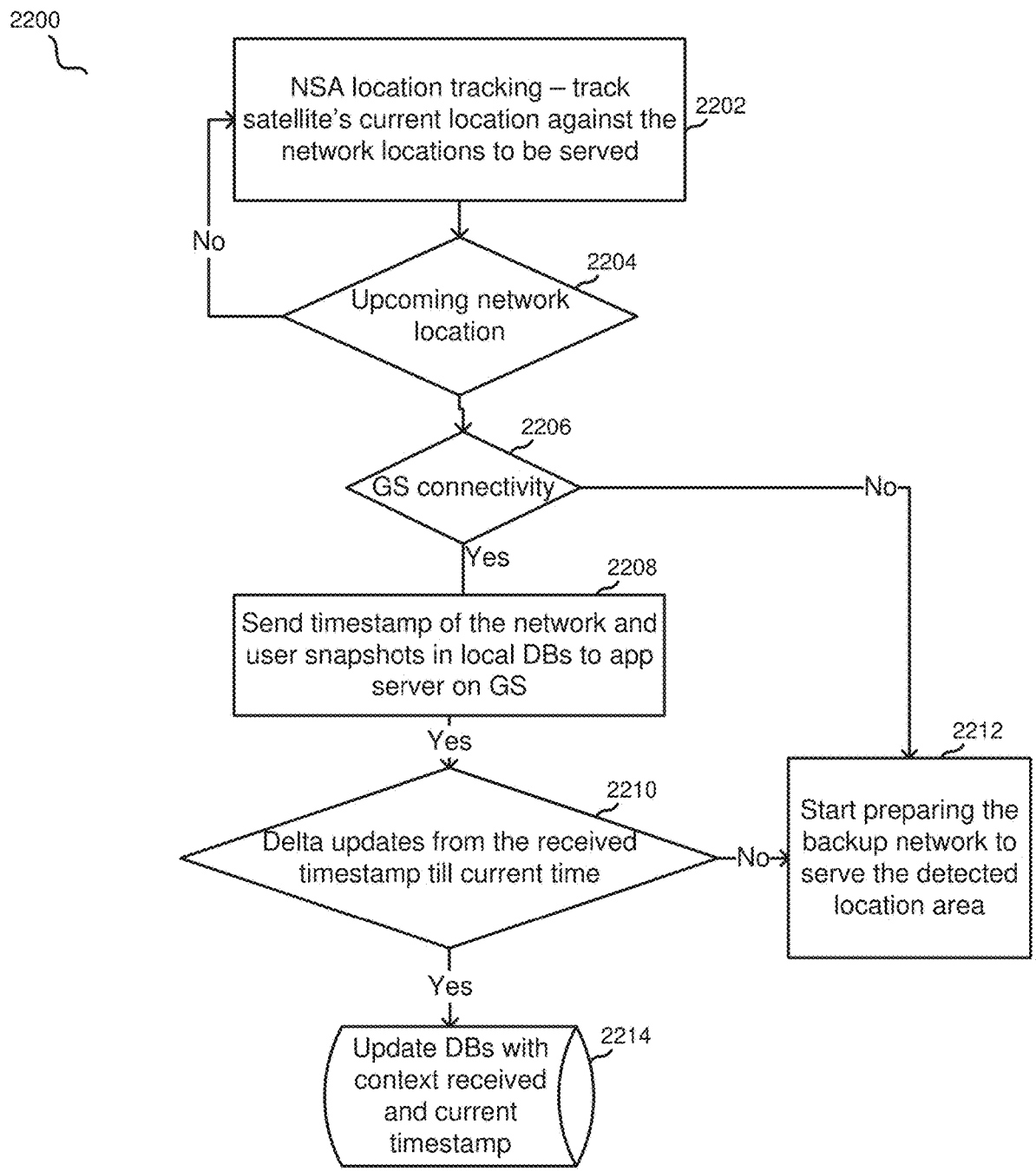
FIG. 22 illustrates the procedure for local database updates on satellite, according to an embodiment.

FIG. 22 illustrates an embodiment procedure for database updates on the satellite. In block 2202, NSA may track the current location of the satellite overpass it received from SSDB and may constantly check it against the locations to be served from network database in block 2204. And as the satellite is about to enter a geographical boundary to be served (the delta time needs to be calculated based on the time taken by network configuration and preparation), in block 2206, NSA may check if there is a connectivity to the ground station. If connected to the ground station, as shown in blocks 2208, 2210 and 2214, it can update the network context on its network database by fetching the delta updates from the ground station's NSA (currently the app server) since the timestamp of the last snapshot of its local database. In block 2210, it can also fetch the changes in its user information database from ground station since the timestamp of its local database snapshot as shown in FIG. 22. In the absence of ground station connectivity and/or lack of new updates from the ground station, NSA can prepare the network to serve the detected geographical area as shown in block 2212. The functional flows shown in figures can be implemented as parallel tasks/processes/sub-processes for an optimized implementation.

Figure 23:
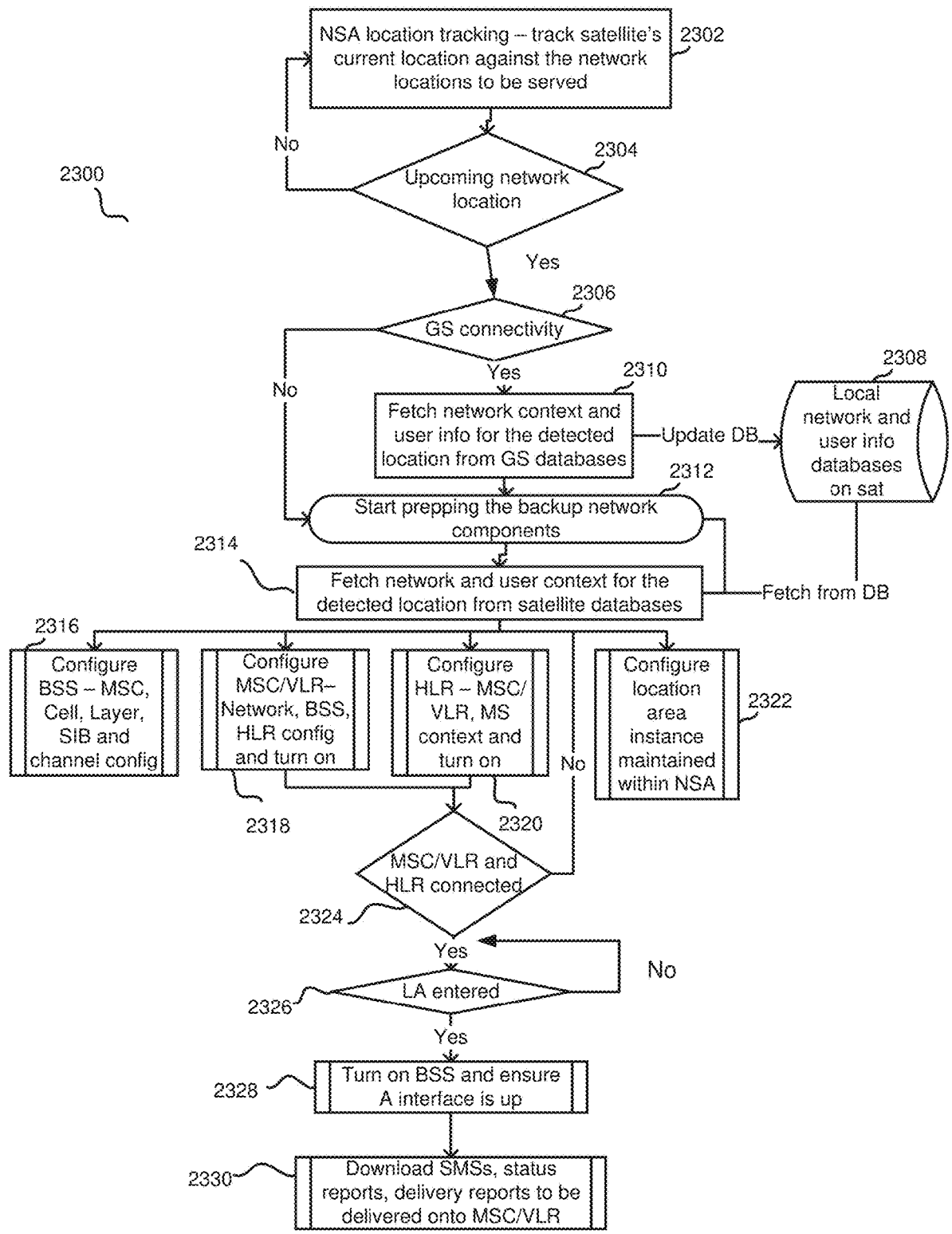
FIG. 23 illustrates the network startup procedure on satellite, according to an embodiment.

FIG. 23 shows the flow chart that depicts the logic at NSA on the satellite to serve an upcoming cell site, according to an embodiment.

In block 2316, NSA may download the entire cell configuration with the parameters for the system information to be broadcasted, channel related configuration and layer specific configuration onto the BSS that needs to be prepped for the upcoming cell. In block 2318, it may also download the network configuration, BSS information, P-HLR information and NSA related configuration onto the MSC/VLR entity, and P-HLR relevant configuration onto P-HLR entity to be prepped for the upcoming cell in block 2320. In block 2322, it may also update its own databases, contextual information to align with the upcoming cell. Once the configuration is downloaded onto the entities, it may turn on each of the MSC/VLR and P-HLR entities and may ensure they are connected to each other in block 2324. Once done, it may then download the network context (list of users seen in that location in the past etc.) received from network database for the location onto MSC/VLR and P-HLR entities and may wait to enter the location to be served.

Once the satellite enters the location, NSA may turn on the BSS and may ensure that the BSS is successfully connected to the MSC/VLR and the A interface is up and running in block 2328. Once this is done, in block 2330, it may download the SMSs to be delivered to the MSs expected to be served in the location area onto the MSC, pending forward SMS results (SMS status reports/delivery reports) to the MSC for the MSs to be served in the location area.

Once the BSS is up and running in a location area, it may start paging for all the MSs that have SMSs to be delivered and which registered earlier in the location. The paging can continue either till the user responds or the satellite leaves the location area. It may simultaneously accept location registrations/updates and receives SMSs to be sent from the MSs and updates NSA with all the incoming and outgoing procedures taking place in the network.

NSA may keep track of the location boundaries being served by the satellite and coordinates between the current and standby base stations to serve the upcoming cell/location area, or location areas (satellites may service multiple service areas simultaneously using multiple beams). In case of an adjacent location area with a different frequency/LA/CGI configuration to be served, the NSA may prepare the standby BSS and NSS components to take over at the border between the location areas so that the standby network can become active at the upcoming LA border and can turn off the current network towards the exit border of the current LA. In one embodiment, adjustments to be made to the spot beam to align with the lease area contours can be handled by the flight computer and on-board software defined radios.

Figure 24:
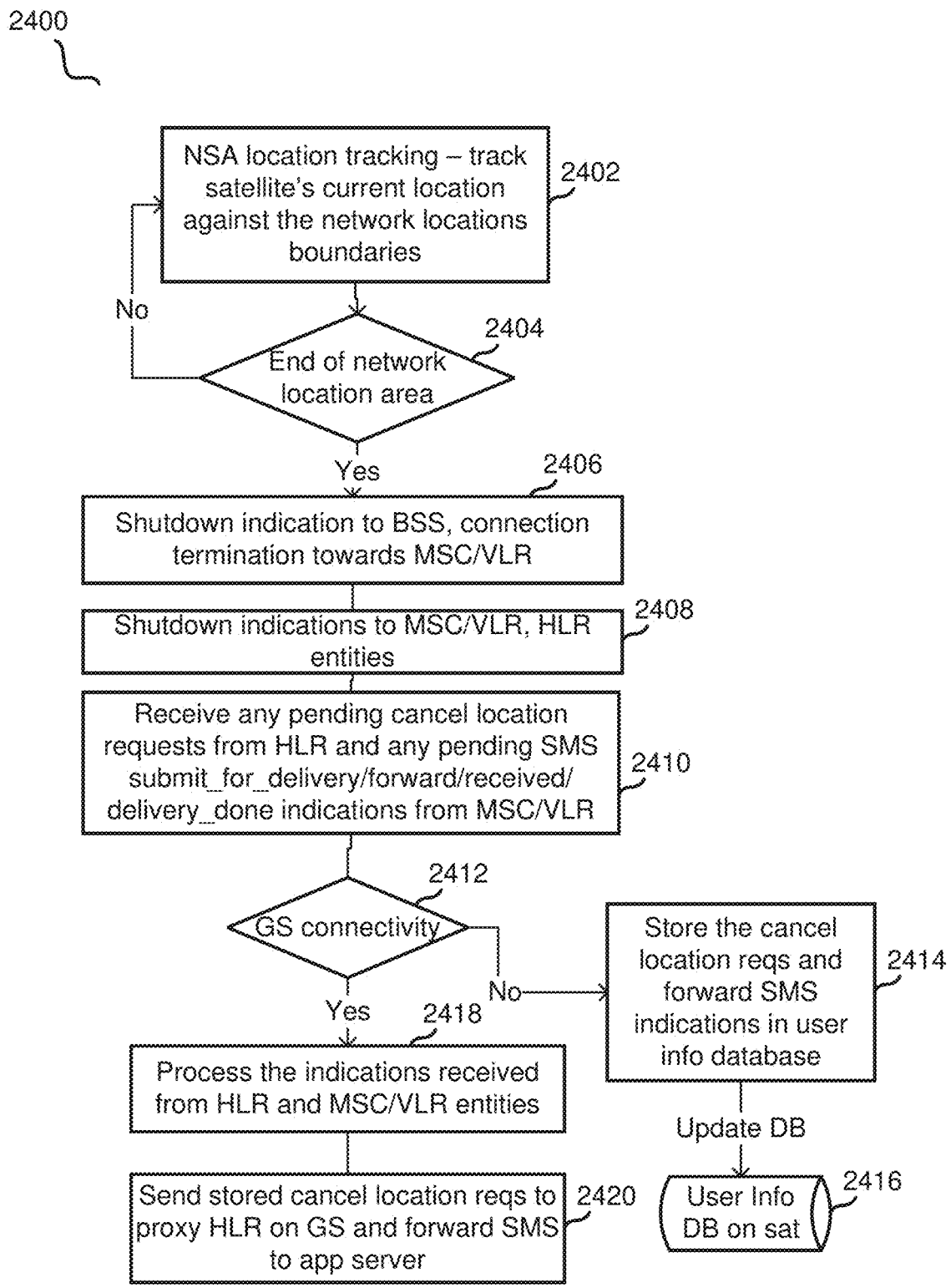
FIG. 24 illustrates the network shutdown procedure on satellite, according to an embodiment.

As shown in block 2402 of FIG. 24, due to its location tracking ability, NSA can determine when it is time for the satellite to leave the location area's boundary and trigger shutdown of the network components. In block 2406, it may first send a shutdown indication to BSS to avoid transmission across boundary. On receiving a shutdown indication, BSS can stop transmitting immediately and terminate the connection to the MSC/VLR gracefully. Once this is done, in block 2408, the NSA may trigger shutdown of the MSC/VLR and P-HLR entities. When a shutdown indication is received, as shown in block 2410, P-HLR may forward any pending cancel location requests to NSA before shutting down gracefully. Similarly, the MSC/VLR may forward the pending SMS indications (forward/received/for delivery/delivery done indications) to NSA before shutting down gracefully.

FIG. 24 depicts the logic in NSA on satellite to handle the network shutdown sequence in a location area, according to an embodiment.

Once the pending indications are received, in block 2412, NSA may check if there is a connectivity to ground station. If the satellite is connected to a ground station, it may transfer the requests and messages to be sent to MNO's network to ground station's P-HLR and NSA entities as shown in blocks 2418 and 2420 respectively. In the absence of connectivity to the ground station, it may buffer the cancel location requests and SMS messages received for delivery from the users and may wait till it reaches a ground station as shown in block 2414. NSA may also update the user information database maintained at the satellite with the users seen in the location area, their TMSIs, status of the requests sent/received along with the timestamps in block 2416.

Figure 25A:
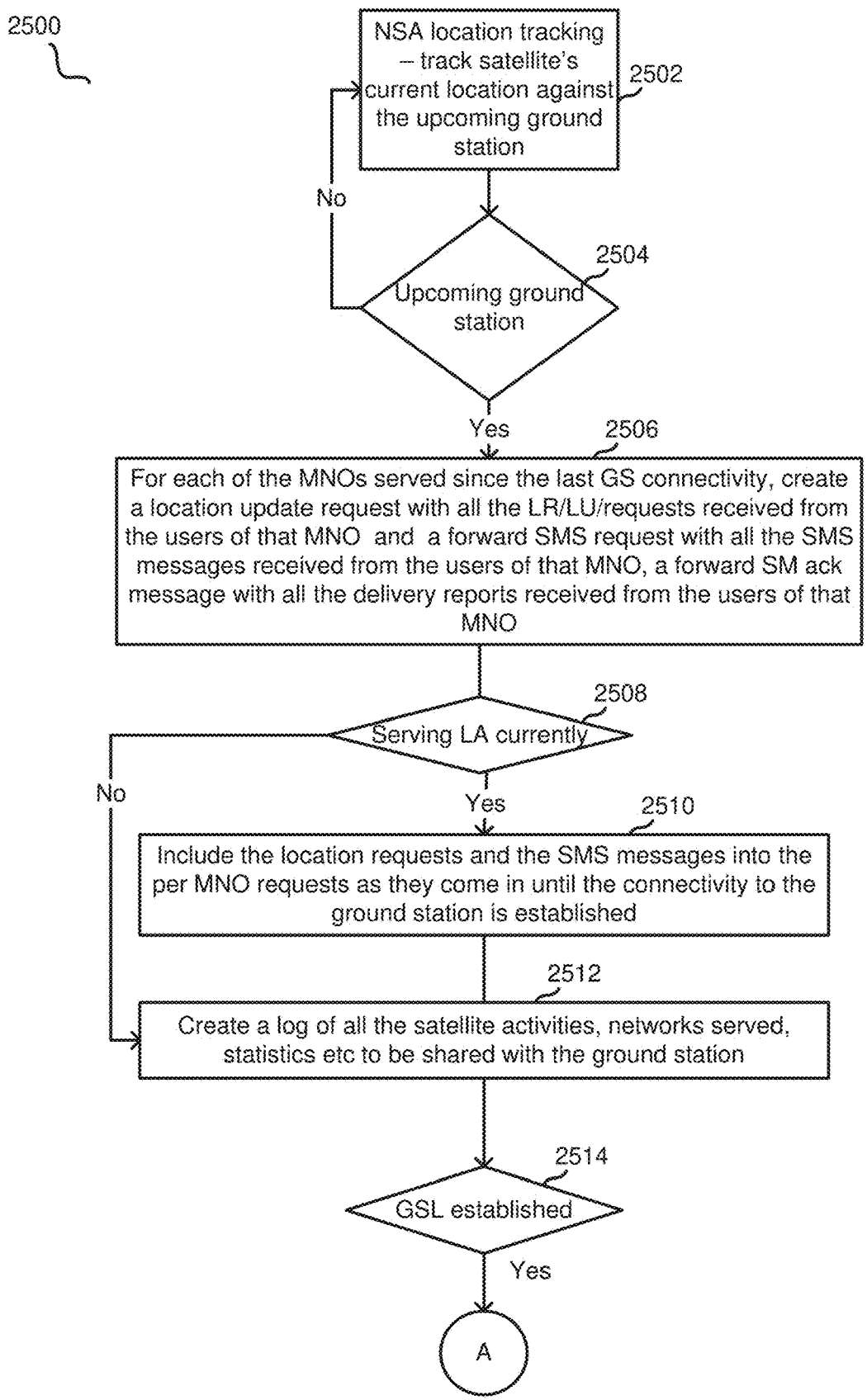
FIG. 25, comprising FIGS. 25A and 25B together, illustrates NSA functionality residing on a satellite when a satellite is about to contact a ground station, according to an embodiment.
Figure 25B:
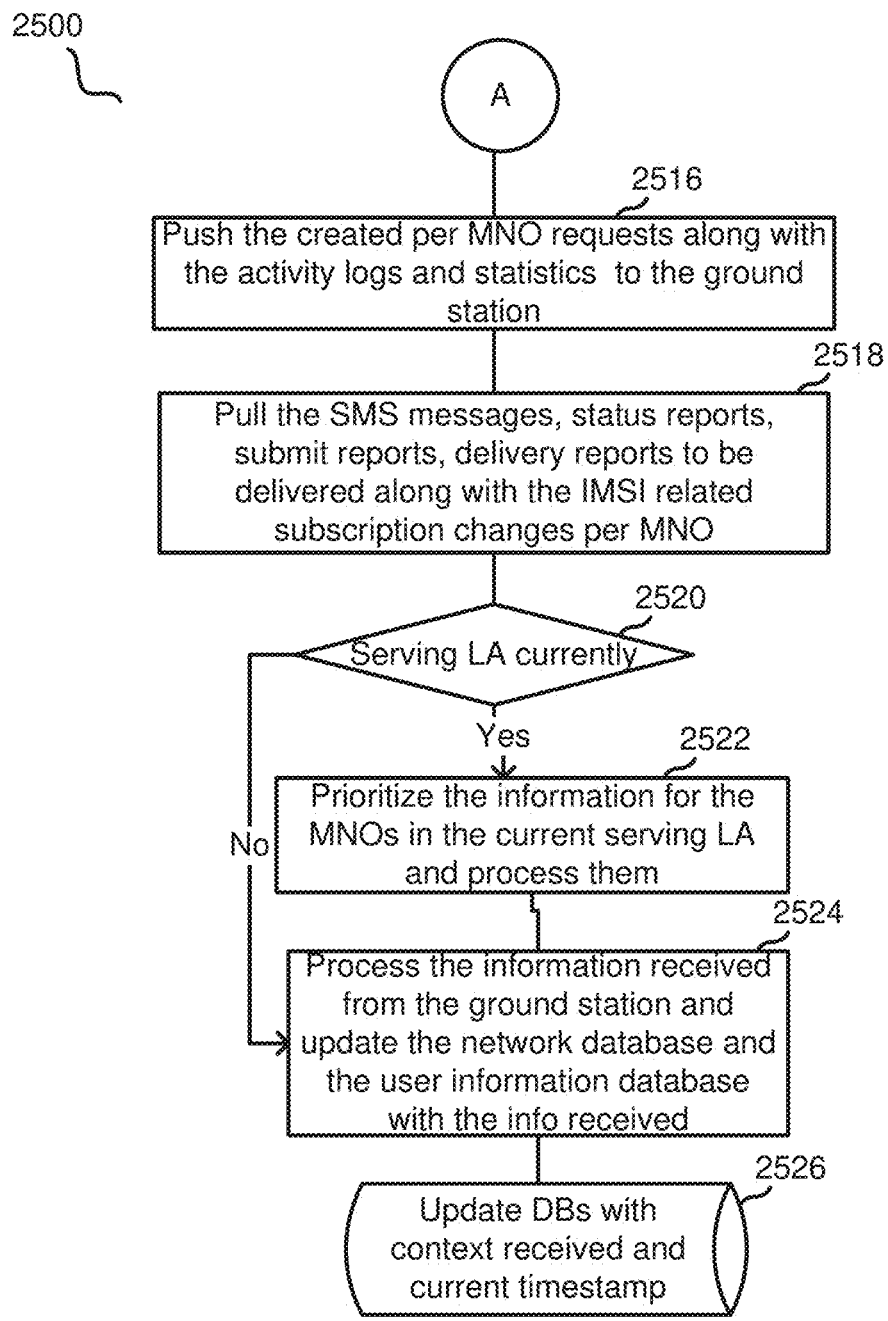

FIG. 25A and FIG. 25B together, illustrate an embodiment of the NSA's functionality residing in the satellite when the satellite is about to contact a ground station. When the NSA on the satellite realizes (from its location inputs from SSDB and location tracking) that a ground station is in vicinity, it may start accumulating the requests and information that it needs to send to the ground station since its connectivity to the previous one.

The NSA may gather the location registrations and location updates per MNO and may create one huge location request towards the ground station for that MNO as shown in block 2506. Similarly, it may create one request per MNO for each of the request types Forward SM Req and Forward SM Ack Req. In block 2512, the NSA may also create a log of the satellite activity over the course of its overpass since the connectivity to the previous ground station. This log can include the satellite identity, activity log, location areas served, MNOs served per location, number of users seen, number of SMSs delivered, number of SMSs received from users, number of paged users-successful and unsuccessful, number of status reports delivered to the users, number of delivery reports received from the users, number of ground station requests sent/received and processed-successful and unsuccessful, etc. along with any other defined KPIs configured for the satellite's network operation.

Once the requests/logs that need to be pushed to the ground station are created, the NSA may check if a location area is currently being served by the satellite and may keep including the requests received from that location area until the connectivity to the ground station is established as illustrated in block 2510. Once connected to the ground station, NSA may push the created requests and logs to the ground station's NSA for its processing in block 2516. Any upcoming requests from the serving location area may be logged at NSA for tracking and may be pushed down directly to ground stations as they come.

Also, once connected to the ground station, as shown in block 2518, updates to the databases may be pulled along with the requests and messages collected at the ground station for the location areas to be served by the satellite in its overpass till it reaches the next ground station.

Figure 26:
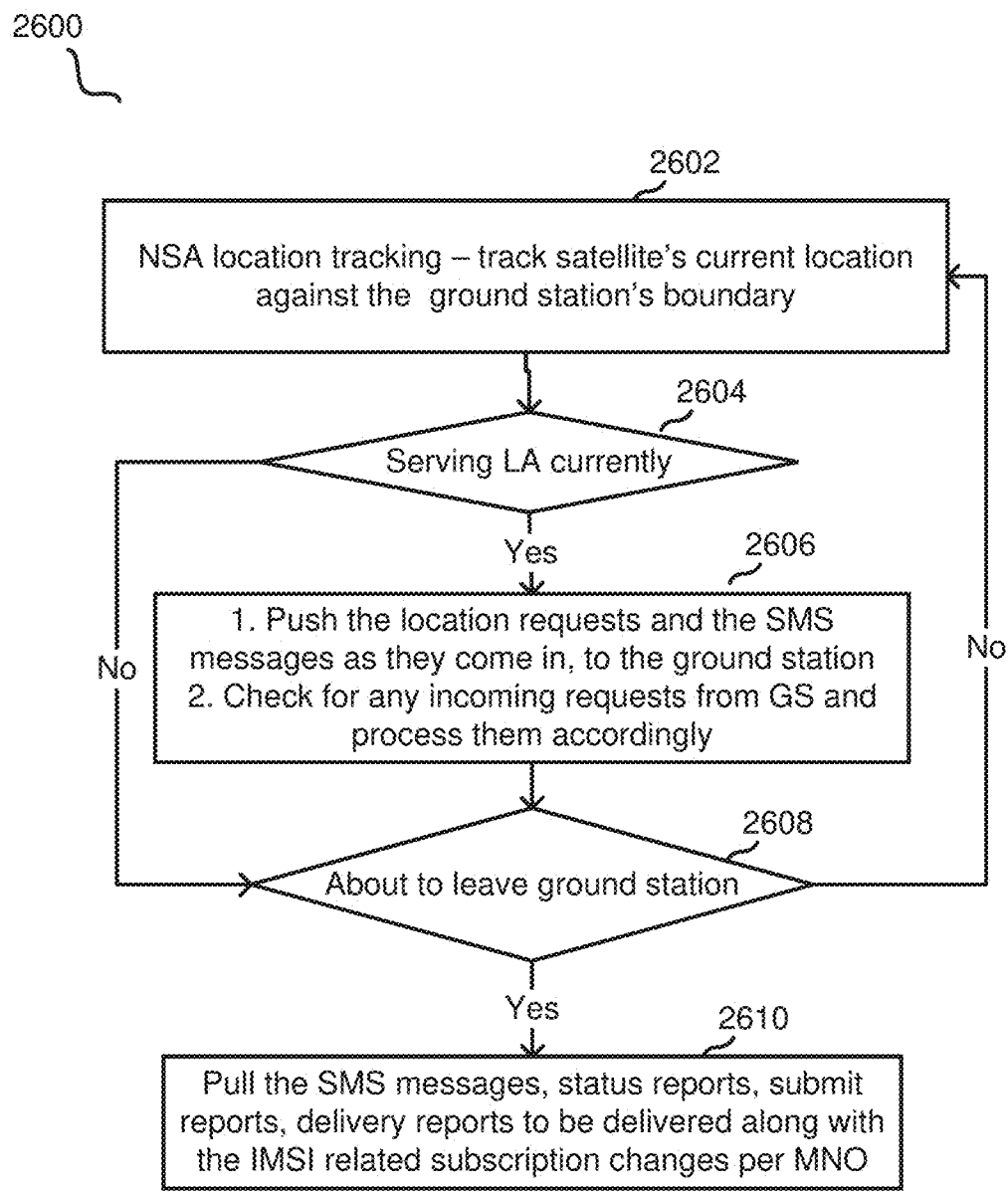
FIG. 26 illustrates NSA functionality residing on the satellite when a satellite is leaving a ground station, according to an embodiment.

FIG. 26 illustrates an embodiment of NSA's functionality on the satellite when it is about to lose its contact with a ground station. In block 2606, as the satellite is about to lose connectivity to a ground station, NSA may push any further requests and messages received from current serving LA, if exists, and may process the incoming requests and messages from ground station as they come if they are for the current serving LA, or may store them if they are not meant for the current LA as shown in FIG. 26. NSA on the satellite may also update the databases if any new information is received from the ground station for the location areas or users.

5. NSA at the Ground Station During Intermittent GSM Coverage

Figure 27:
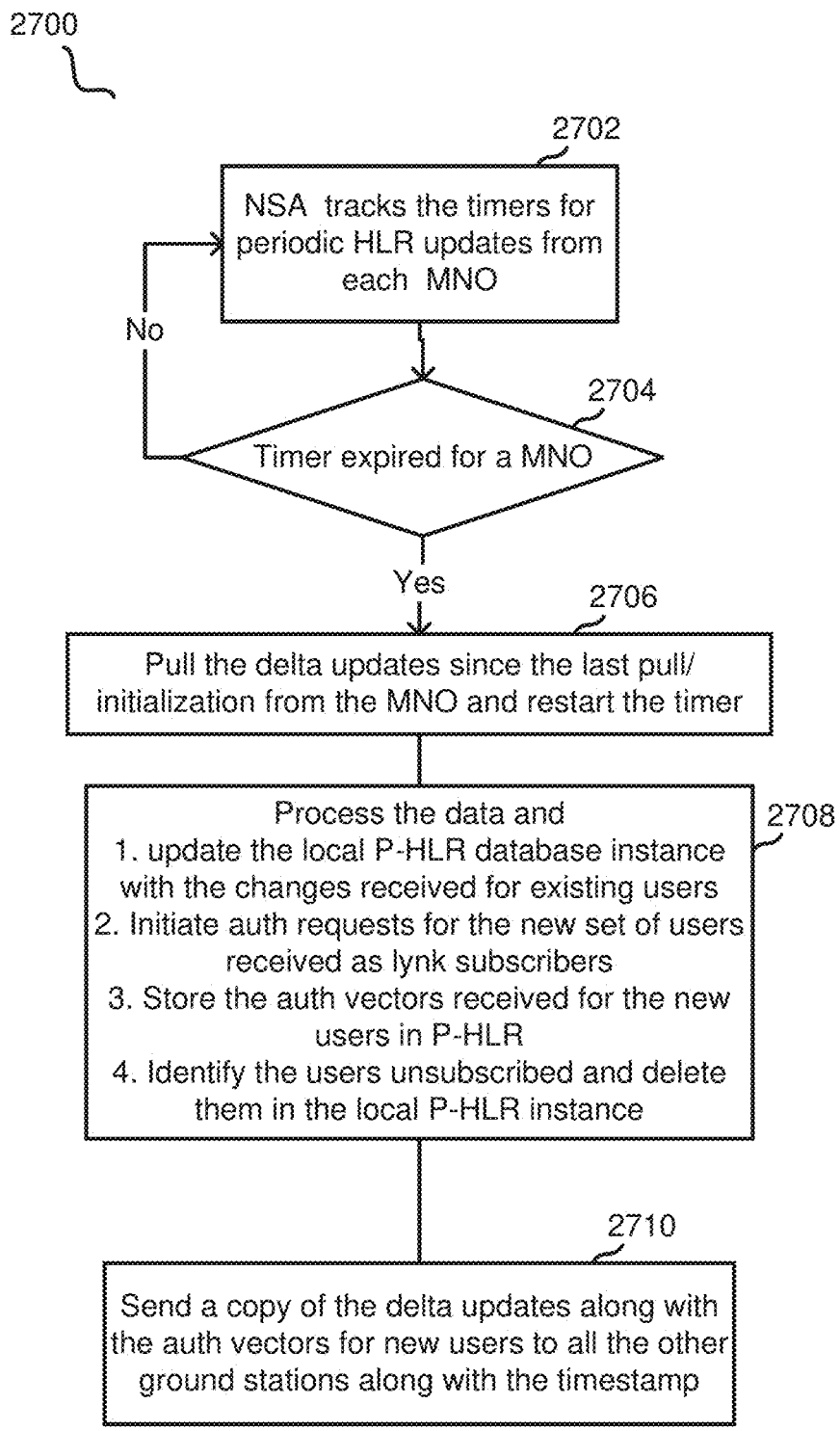
FIG. 27 illustrates an embodiment of the procedure for subscriber updates on master ground station from an MNO network.

There may be a few ground stations strategically positioned to provide global coverage. In an embodiment, one of these ground stations may act as a master ground station and, in addition to the regular ground station functions, it may also be responsible for additional functions as the manager of a global database of subscriber data; initial and periodic P-HLR's subscriber data pulls from the MNO networks; and distributing this data to the rest of the ground stations as illustrated in FIG. 27. In this embodiment, the master ground station may always be the point of contact for the MNO partners for HLR updates alone and may maintain sync between database updates amongst different ground stations. Each ground station, including the master, may host a proxy MSC/VLR, proxy HLR and an NSA entity along with the network and user information databases. MSC, VLR and HLR are proxies as they act as counterparts for the ones on the satellite. The functionality of the NSA entity and the contents of the databases on ground may be different than the ones on the satellite. NSA on each ground station may have connectivity to the ones on the other ground stations and the databases may be distributed across the ground stations.

FIG. 27 describes the functionality flow chart of NSA on the master ground station in an embodiment. It may receive the subscriber (HLR) database updates from the MNO networks. Initial bulk HLR update may be done when a roaming agreement is made and connectivity to the MNO network is established. The flow chart illustrated in FIG. 27 focuses on the periodic database updates from the MNO network. Periodicity for the updates can be agreed upon between the satellite network and MNO partner. As an example, these updates may occur based on a default value, perhaps once per week, once per day, twice per day, etc.

NSA on the master ground station can maintain subscriber database update timers for each of the MNO partners. In block 2706, when an MNO's timer expired, it can send a request to MNO network with the timestamp of the last update received (or initialized if this is the first periodic update) from that MNO. MNO network may calculate the delta changes in subscriber database (newly added Satellite network's subscribers, changes in subscription for existing Satellite network's subscribers, subscribers who unsubscribed from satellite network's service etc.) and may send it to the master ground station. This may minimize the transmitted payload size and the information handling can be with the MNO network in this case.

NSA on master ground station may restart the timer for the MNO once the information is received. For each subscriber's info received, NSA can process and take necessary actions of create/update/delete on its local user info database as shown in block 2708. For the newly created users (or the new satellite network's subscribers), it may instruct P-VLR on master ground station to initiate an authentication (Auth) request to the MNO network's HLR and acquire authentication vector sets and store them on the P-HLR. NSA can also be configured with an authentication vector refresh timer for each MNO which can be used to trigger authentication requests and acquire a new set of authentication vectors for the existing subscribers on a periodic basis, the periodicity of which could possibly be staggered for each MNO and is expected to be relatively long to avoid traffic burst and bulk updates between master ground station and MNO network. If supported by the MNO, a set of authentication vectors might be fetched for each IMSI.

Once done with processing, the master ground station NSA might send the database changes to the rest of the ground stations in block 2710.

Figure 28:
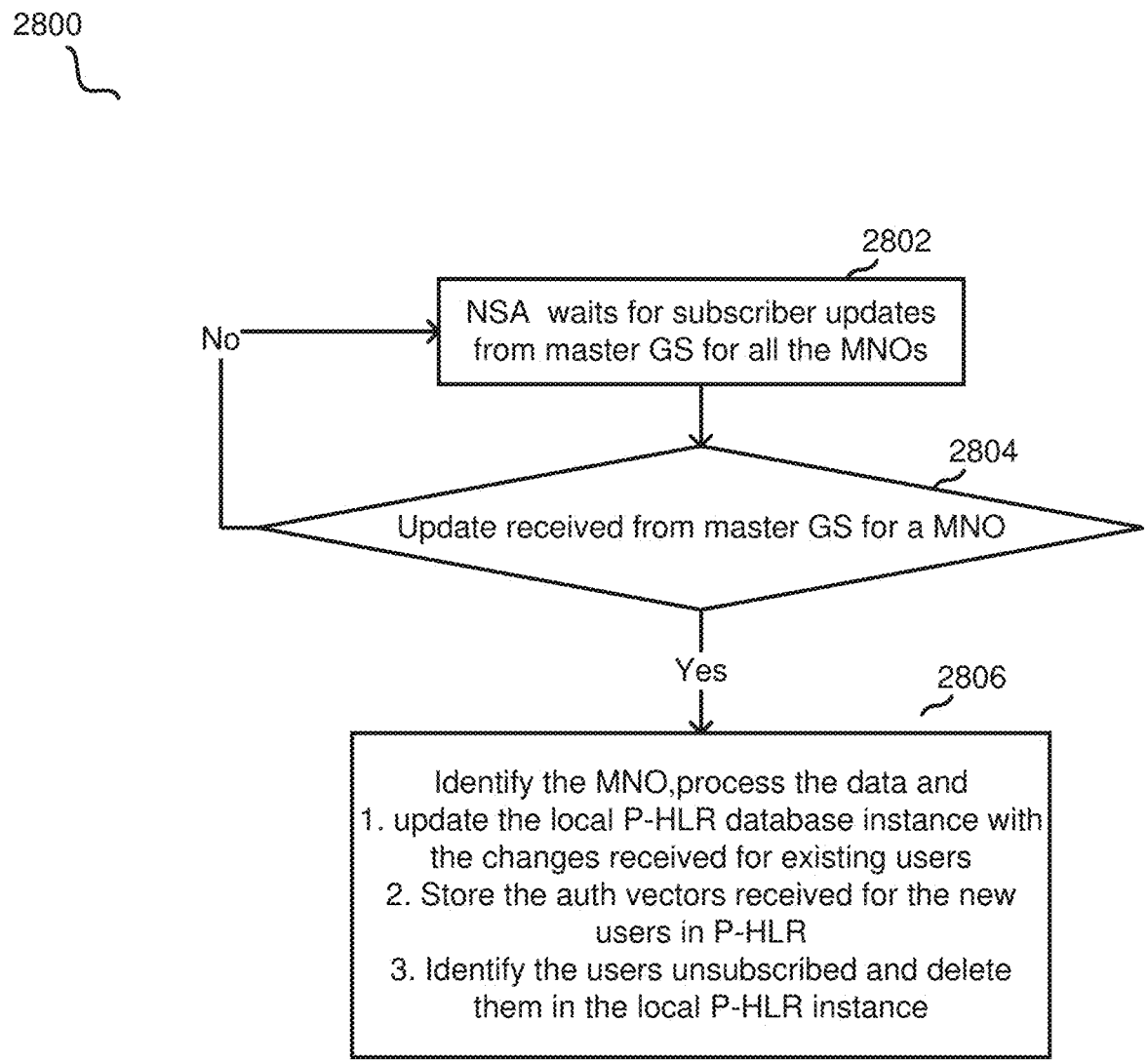
FIG. 28 illustrates an embodiment of the procedure for database updates received from master ground station at other ground stations.

Unlike the traditional HLR mirroring approach in telecommunication networks, which would be quite expensive, FIG. 27 and FIG. 28 illustrates an approach that uses communication between NSA on master and rest of the ground stations to transfer HLR database updates in an embodiment.

FIG. 28 describes the functionality flow chart of NSA on a ground station that is not a master, to receive the subscriber (HLR) database updates from the master ground station according to an embodiment. A sub-process on NSA can wait for updates from master ground station as shown in block 2802, and once an update is received from master GS, it can identify the MNO for which the update is received. In block 2806, once the MNO is identified, it may update the local user info DB instance with the information received from the master ground station. Since this is the update received from the MNO network and is not dynamic information (e.g., such as location, etc.), the NSA can simply overwrite its local DB instance from the info received from master ground station along with the received timestamp. It can store the received authentication vectors for newly added subscribers and delete the ones that have unsubscribed and take care of subscription changes for the existing users.

Figure 29:
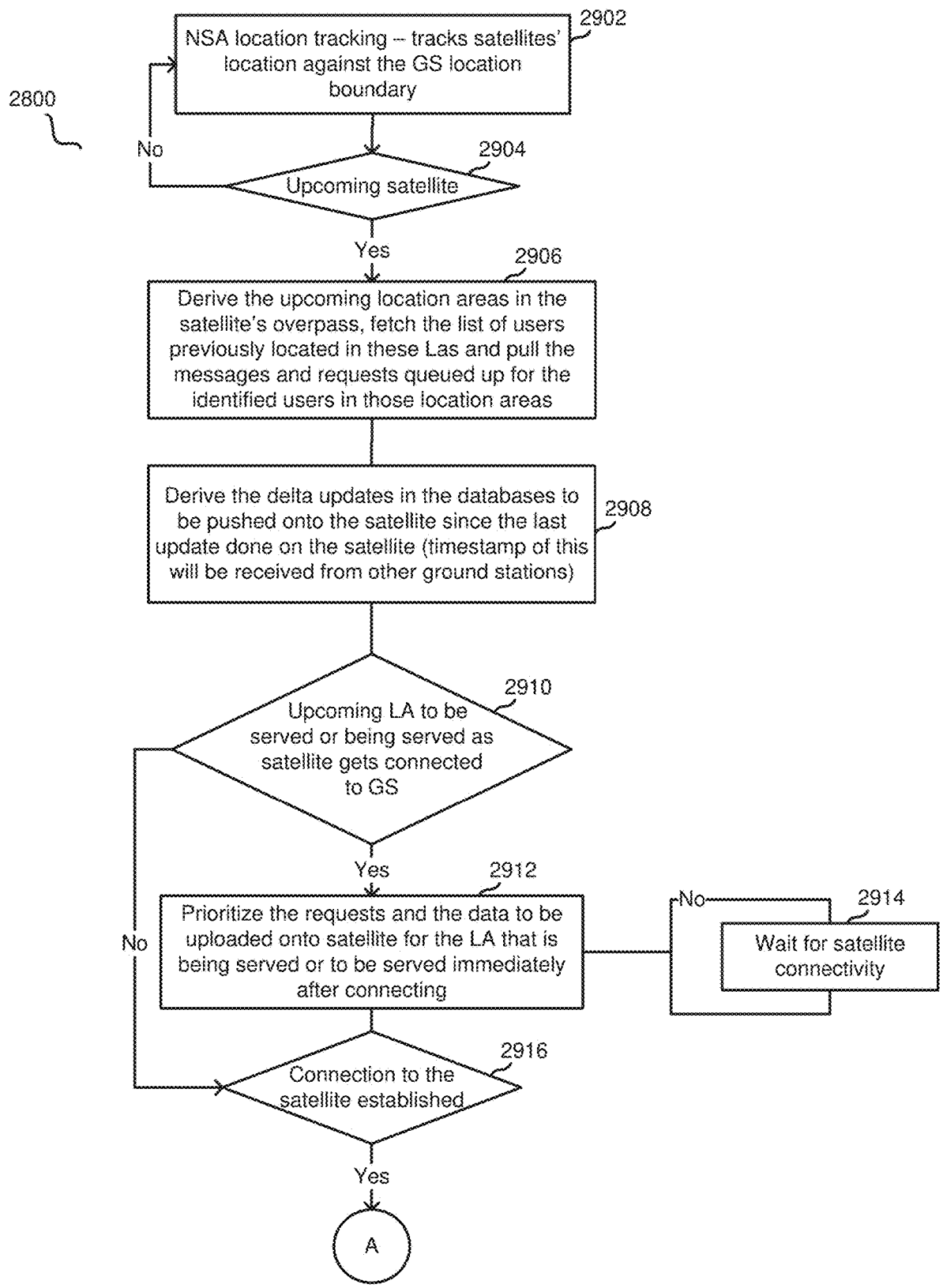
FIG. 29, comprising FIG. 29A and FIG. 29B together, illustrates NSA functionality residing on the ground station when a satellite is approaching to contact a ground station, according to an embodiment.
Figure 29:
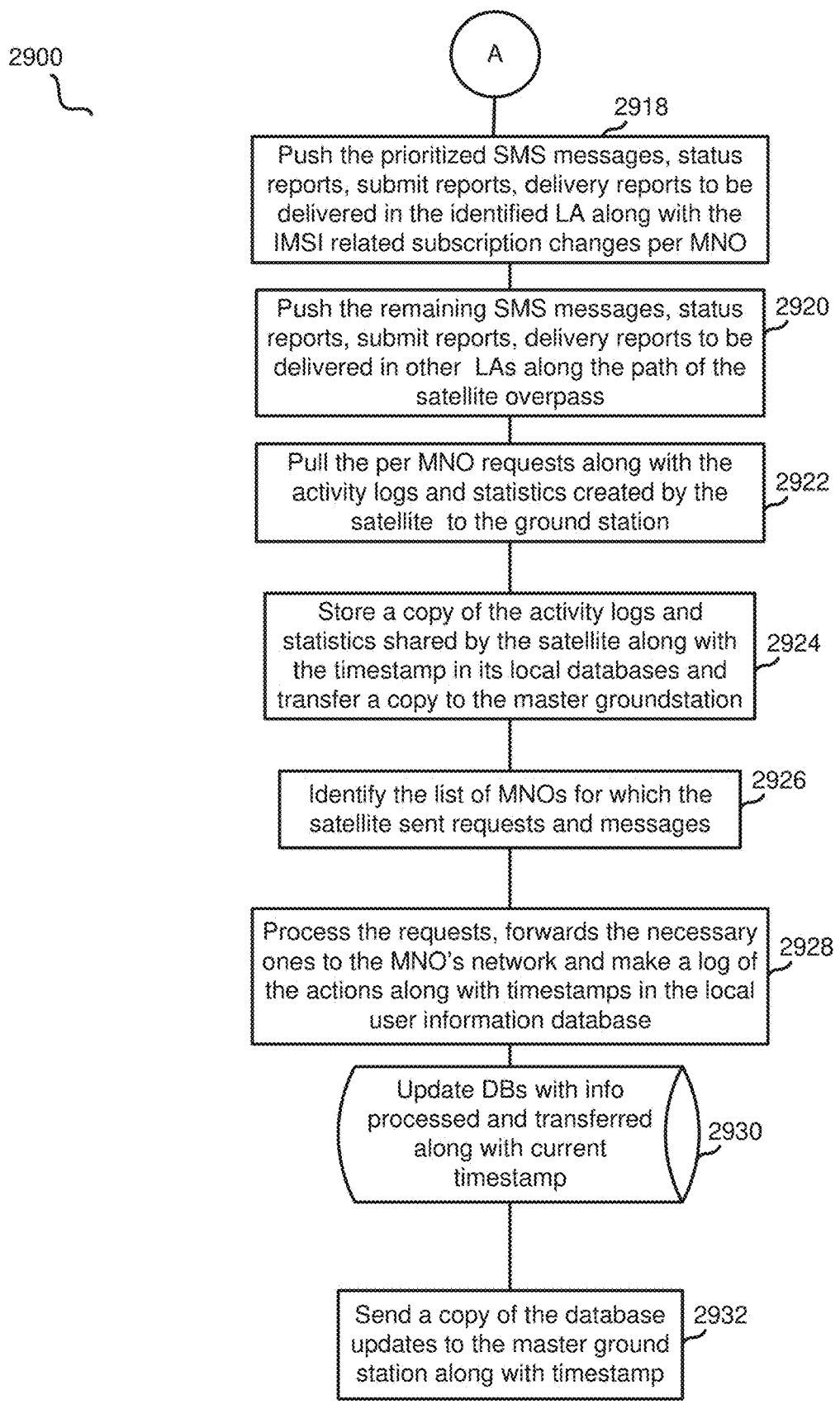

FIG. 29A and FIG. 29B together, illustrate an embodiment of the functionality flow chart of NSA on each of the ground stations when it detects an upcoming satellite to be connected to the ground station. In block 2902, NSA on each ground station may get a feed on the current satellite positions from, for example its SSDB, and may constantly check it against the ground station location to determine if there is an upcoming satellite. After detecting one, it may get information on the satellite overpass from SSDB and may calculate the location areas that overlap with the satellite's upcoming overpass.

In block 2906, for each of the identified location areas in the satellite's overpass, NSA may pull the list of users seen last in the location area and may pull SMS messages, status reports etc. pending to be delivered to these users. It might categorize these by location area (for easy paging and delivery) and per MNO (for tracking and stats collection) within each location area. The NSA may also create the delta database updates to be pushed onto satellite since the timestamp of the last update done on the satellite as shown in block 2908. If the NSA realizes that the satellite might be serving a LA while getting connected to ground station or the satellite needs to serve a LA soon after connecting to ground station, the requests/messages for that LA can be prioritized over others to be pushed onto satellite along with the subscriber database updates as shown in block 2912.

Once the satellite connectivity is established, NSA, in block 2918, can first push the requests/updates created in the priority order and then pull requests/updates/statistics/activity logs from the satellite. It can then process the info received and can send a copy of the satellite activity logs and the delta updates to user information database after processing as network updates to the master ground station as shown in blocks 2924 through 2932.

Figure 30:
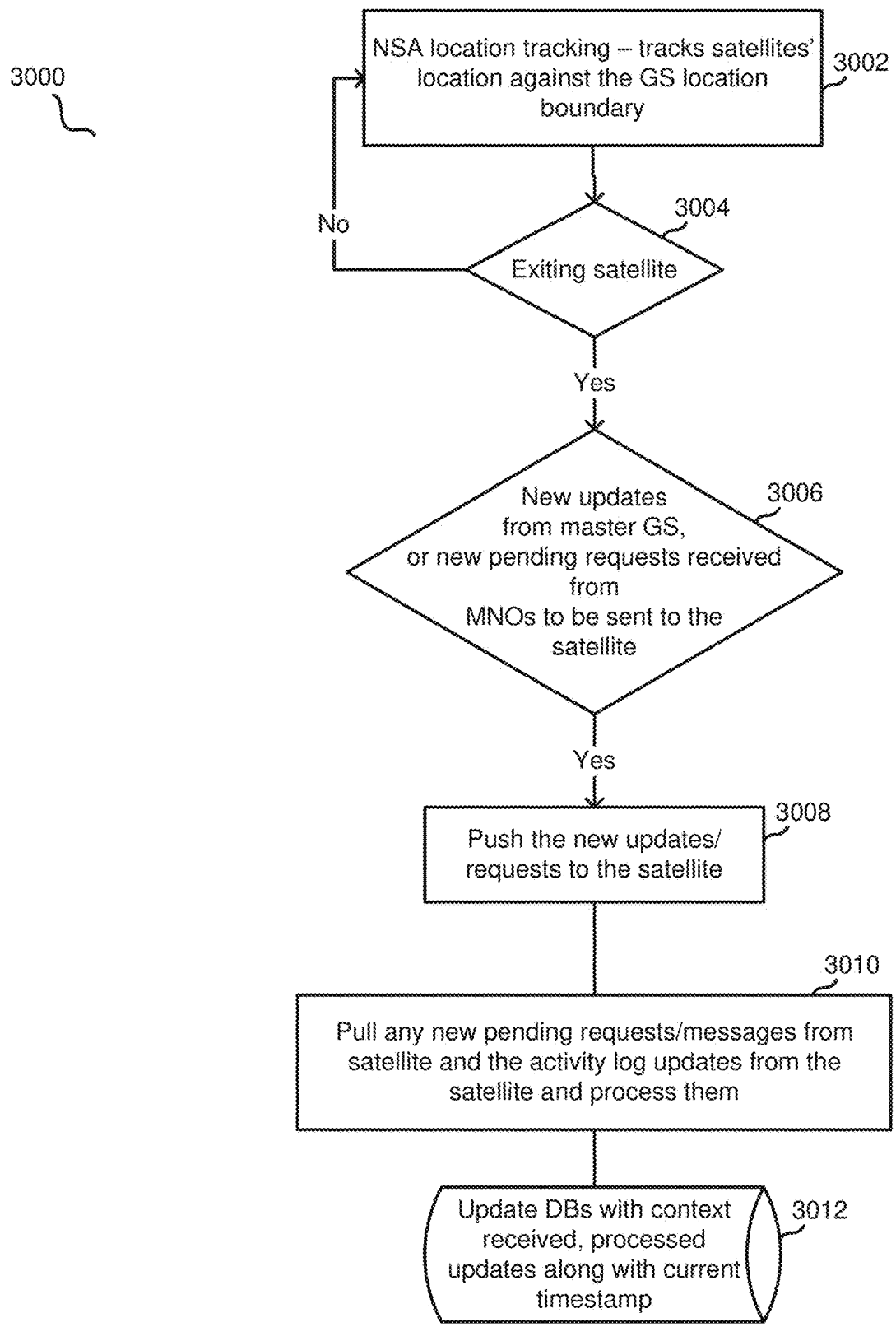
FIG. 30 illustrates NSA functionality residing on the ground station when a satellite is leaving a ground station, according to an embodiment.

FIG. 30 shows an embodiment of the flow chart that describes the functionality of NSA on each of the ground stations when it detects a satellite is about to leave a ground station as shown in block 3002. Using the feed on the current satellite positions from its SSDB, NSA may constantly check it against the ground station location to determine if there is a satellite that is about to leave the current ground station. This can also be done using a timer when the connection time to the ground station is constant. Once it detects such satellite through either way, in block 3006, it can check if any new database updates are received from master ground station or any new requests/deliveries are queued up since its last update to the satellite that needs to be pushed to the satellite and can send them in block 3008. In block 3010, NSA can also pull the queued-up requests/messages from the satellite before it loses connectivity to the ground station and may update its databases as shown in block 3012.

Figure 31:
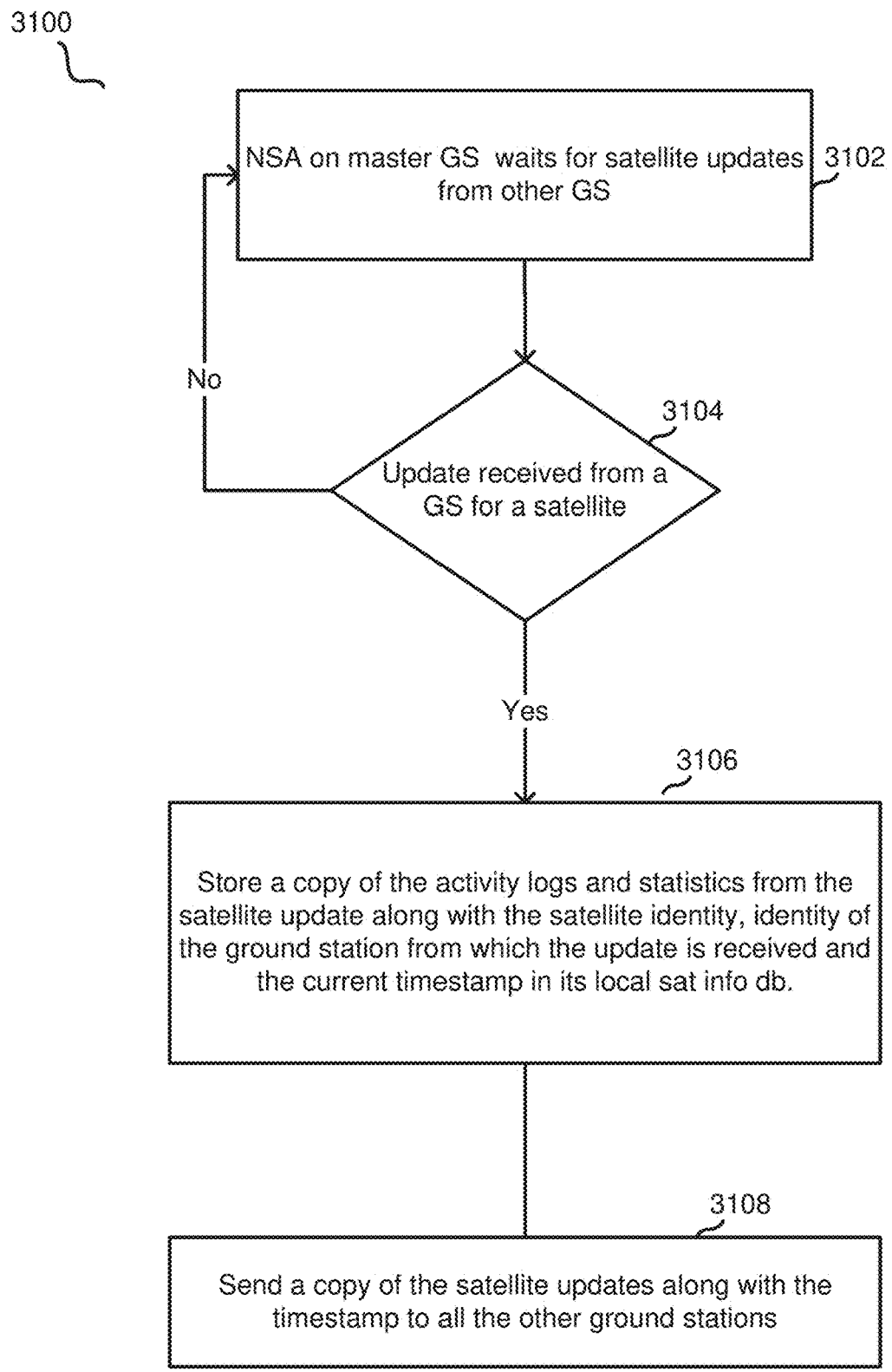
FIG. 31 illustrates an embodiment of the procedure for network updates received at master ground station from other ground stations.

FIG. 31 shows an embodiment of the flow chart that describes the functionality of NSA on the master ground station when it receives a network operation update from another ground station. In block 3102, a sub-process of NSA can wait for network updates to be received from the rest of the ground stations. Once such update is received, in block 3106, it can identify the sending ground station and the satellite to which the update belongs to. It can store the activity logs/statistics received against that satellite in its local satellite info database along with the id of the sender ground station and the timestamp received and can distribute a copy of the same to the rest of the ground stations, except the sender GS, for their update as shown in block 3108.

Figure 32:
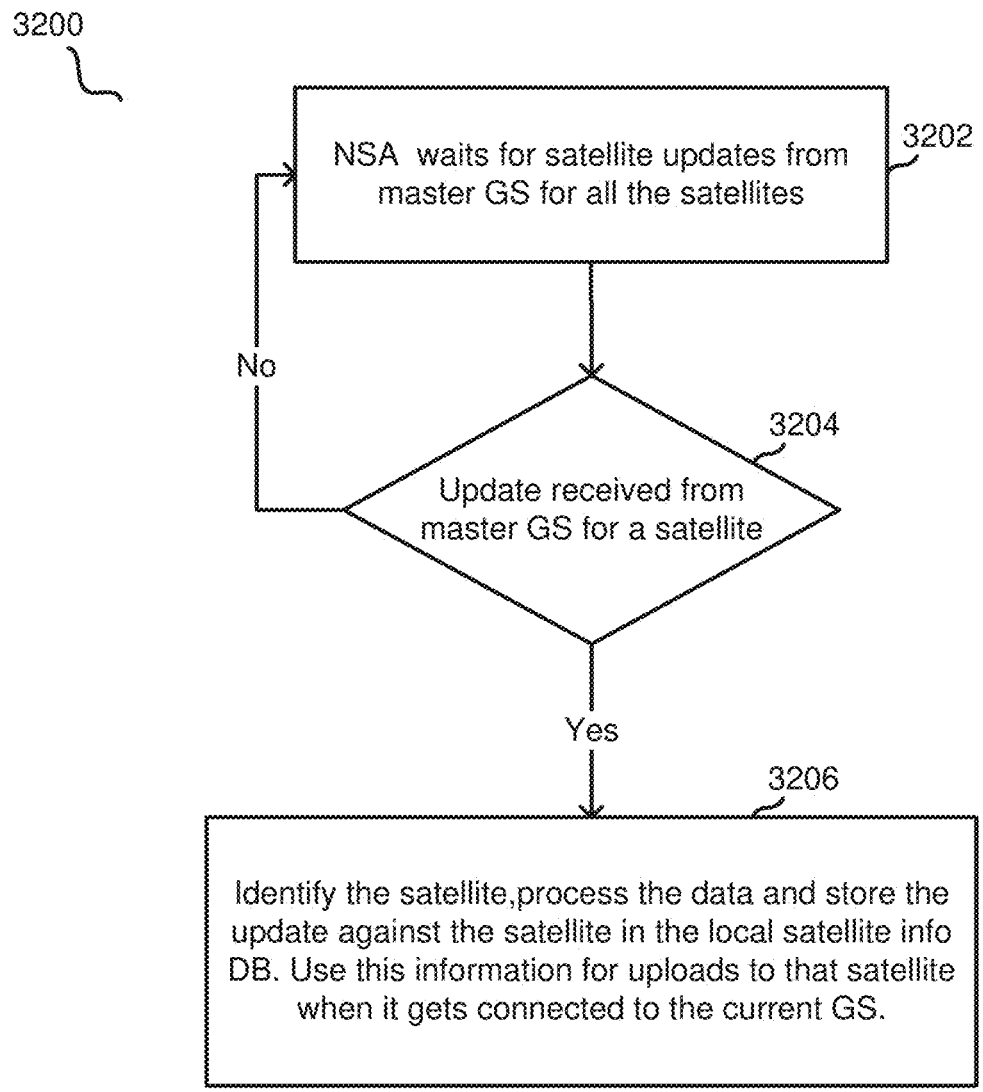
FIG. 32 illustrates an embodiment of the procedure for network updates received from master ground station at other ground stations.

FIG. 32 shows an embodiment of the flow chart that describes the functionality of NSA on each of the ground stations when it receives a network operation update from the master ground station. In block 3202, a sub-process of NSA on each ground station can keep listening to possible network updates from master ground station and when it receives one, it can identify the satellite for which the update is received. In block 3206, it can update its local satellite info database with the logs/stats and DB updates received for that satellite and can use them along with its existing information to derive a much current upload to the satellite when it is upcoming.

6. GSM/GPRS Network Architecture

Figure 33:
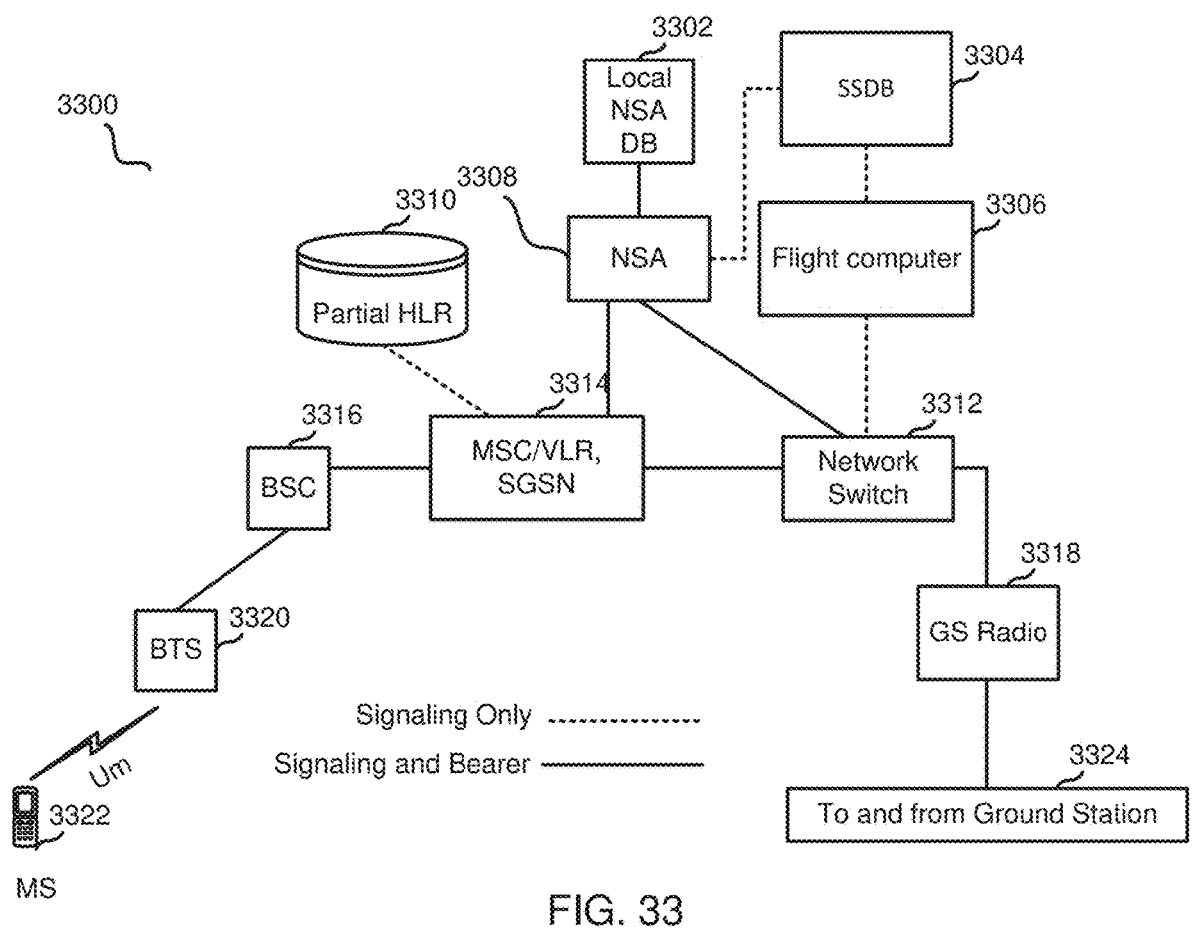
FIG. 33 illustrates example communication and processing methods that use a GSM/GPRS network architecture as might be used on an orbital network, according to an embodiment.

FIG. 33 illustrates an example GSM/GPRS communication system within which various embodiments may be implemented. GPRS is effectively a packet data network overlaid on the GSM network. It provides packet data channels on the air interface as well as a packet data switching and transport network that is largely separate from the standard GSM switching and transport network. In the example illustrated in FIG. 33, a GSM/GPRS network architecture is shown in a satellite network in an embodiment. The components on the satellite are software components and can be dynamically turned on and off or be updated through a connection to the ground station.

A. GPRS Specific Network Components on Satellite

In addition to the GSM components in the network described earlier in FIG. 1, a packet control unit PCU and a serving GPRS support node of SGSN of MSC/VLR/SGSN 3314 are shown as part of the network components on the satellite in FIG. 33. The PCU is a logical network element that is responsible for several GPRS-related functions, such as the air interface access control, packet scheduling on the air interface, and packet assembly and re-assembly. The PCU can be placed at the BTS 3320, at the BSC 3316, or at the SGSN of MSC/VLR/SGSN 3314. Logically, the PCU is considered a part of the BSC 3316 and generally in real implementations, the PCU can be found physically integrated with the BSC 3316.

The SGSN of MSC/VLR/SGSN 3314 is analogous to the mobile switching center (MSC)/visitor location register (VLR) in the circuit switched domain. Just as the MSC/VLR performs a range of functions in the circuit-switched domain, the SGSN of MSC/VLR/SGSN 3314 performs the equivalent functions in the packet-switched domain. These include mobility management, security, and access control functions. The service area of an SGSN of MSC/VLR/SGSN 3314 is divided into routing areas (RAs), which are analogous to location areas in the circuit-switched domain. When a GPRS MS 3322 moves from one RA to another, it performs a routing area update, which is similar to a location update in the circuit-switched domain. One difference, however, is that an MS 3322 may perform a routing area update during an ongoing data session, which in GPRS terms is known as a packet data protocol (PDP) context.

The SGSN of MSC/VLR/SGSN 3314 also interfaces to a home location register (P-HLR) 3310 via the Gr interface. This is an SS7-based interface, and it uses MAP, which has been enhanced for support of GPRS. The Gr interface is the GPRS equivalent of the D interface between a VLR or an SGSN of MSC/VLR/SGSN 3314 and HLR 3310. The Gr interface is used by the SGSN of MSC/VLR/SGSN 3314 to provide location updates to the HLR 3310 for GPRS subscribers and to retrieve GPRS related subscription information for any GPRS subscriber that is in the service area of the SGSN of MSC/VLR/SGSN 3314.

Figure 34:
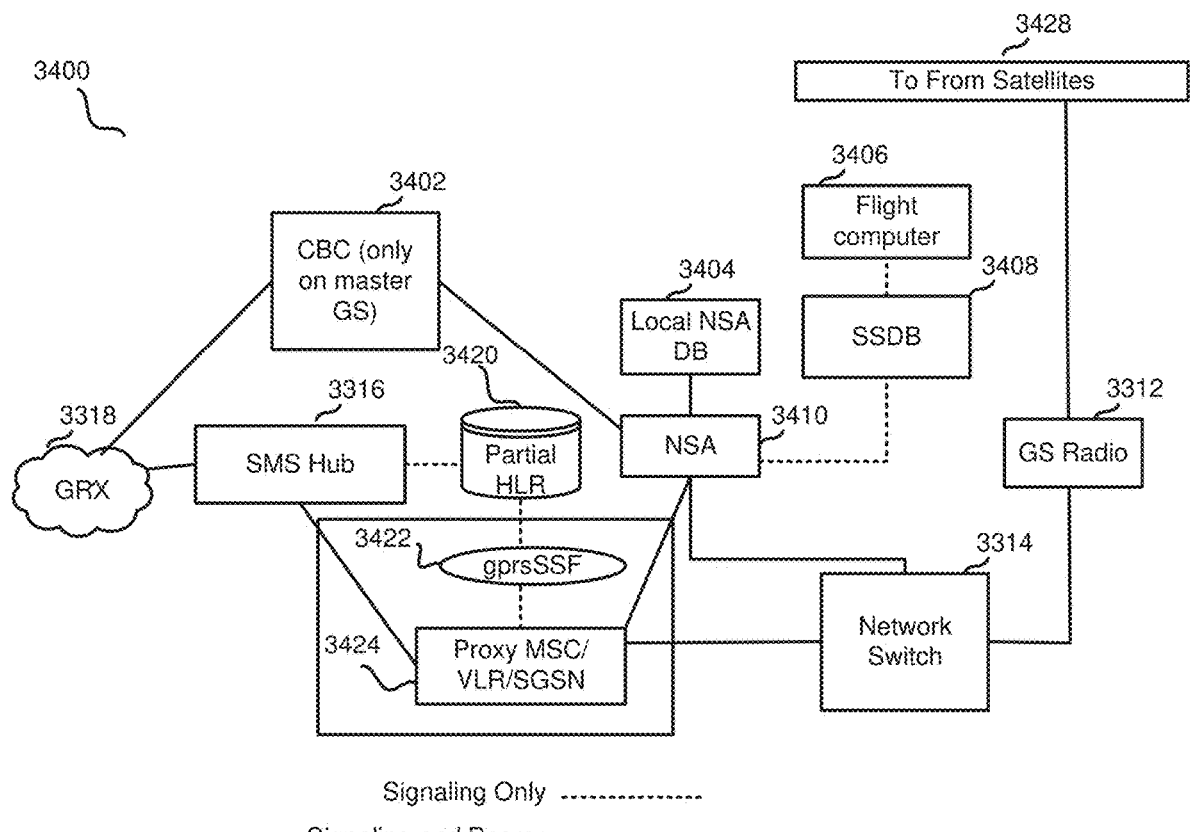
FIG. 34 illustrates example communication and processing methods that use a GSM/GPRS network architecture as might be used on a ground station talking to an orbital network, according to an embodiment.
Figure 35:
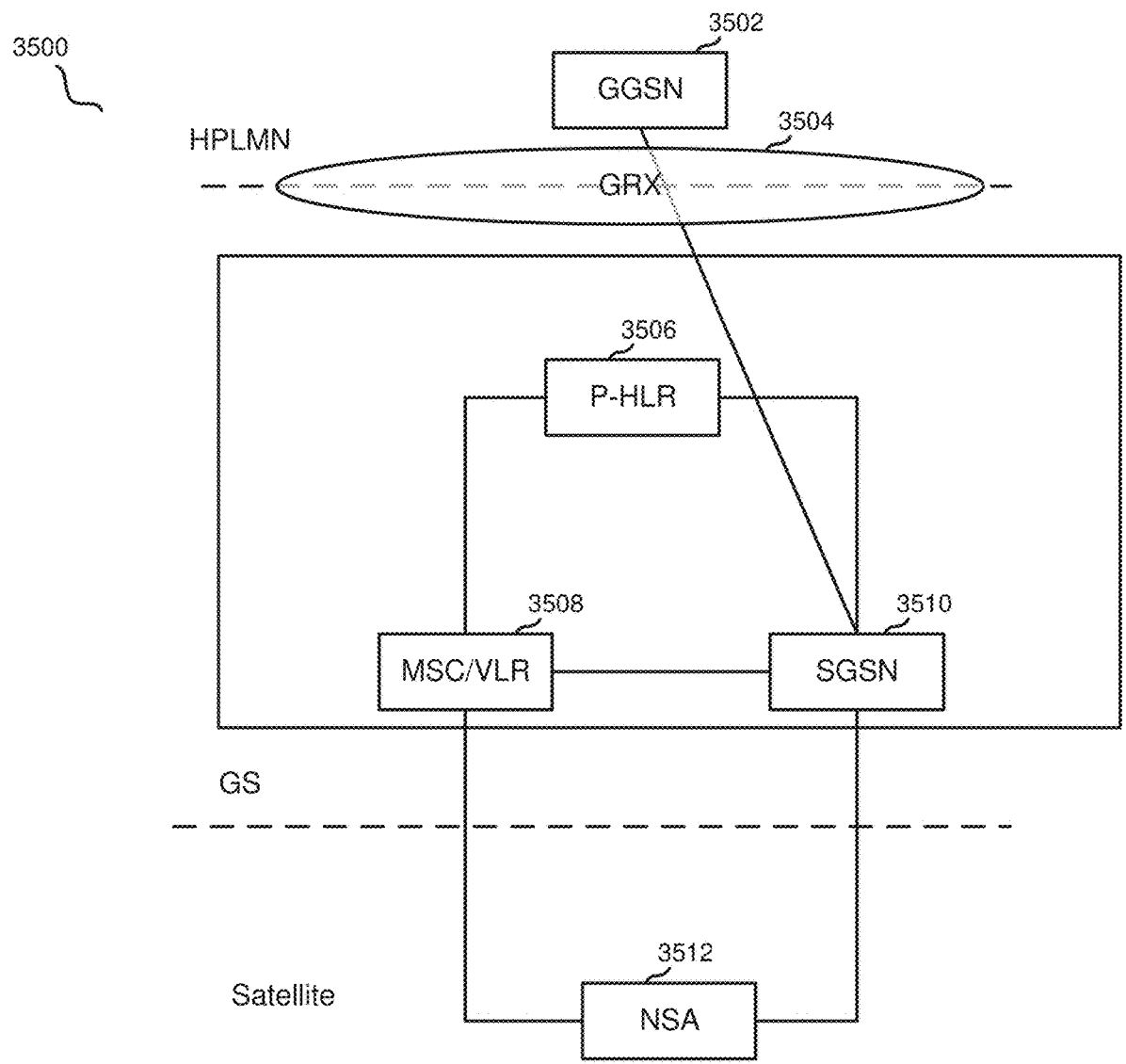
FIG. 35 illustrates the GSM/GPRS network interfaces across satellite, ground station and partner MNO networks, according to an embodiment.

FIG. 34 shows a GSM/GPRS network architecture as might be used on the ground station in an embodiment. The interfaces between the core network elements in FIG. 34 are expanded in FIG. 35.

B. GPRS Specific Network Components on Ground Station

The SGSN of Proxy MSC/VLR/SGSN 3424 on the ground station may process the requests received from its satellite's counterpart. It may handle the processing related to the connectivity to MNO networks due to the intermittent ground station connectivity at the SGSN of MSC/VLR/SGSN 3314 component on the satellite.

The gprsSSF (service switching function) 3422 can be integrated into the SGSN of Proxy MSC/VLR/SGSN 3424 on the ground station (GS). This element may be used to query the Proxy HLR 3420 to obtain CAMEL parameters from the roamer's HPLMN. If the subscriber has CAMEL parameter T22 (MO SMS) then CAMEL can be invoked. If not, the SMS can be sent to the HPLMN for credit check and billing. The HPLMN of the roamer may provide parameters for the handling of the session if CAMEL is invoked.

All the databases maintained both on satellites and on ground stations may be similar to the ones maintained for GSM network with added information for GPRS support.

GPRS functionality in an MS can be activated either when the MS itself is powered on, or perhaps when the browser is activated. Whatever the reason for the initiation of GPRS functionality within the MS, the MS can attach to the GPRS network, so that the GPRS network (and specifically the serving SGSN) can know that the MS is available for packet traffic. According to the terms defined in GPRS standard specifications, the MS can move from an idle state (not attached to the GPRS network) to a ready state (attached to the GPRS network and in a position to initiate a PDP context). When in the ready state, the MS can send and receive packets. Also, a standby state is available, which the MS can enter after a time-out in the ready state. If, for example, the MS can attach to the GPRS network but does not initiate a session, then it may remain attached to the network, but move to a standby state after a time-out.

Figure 36A:
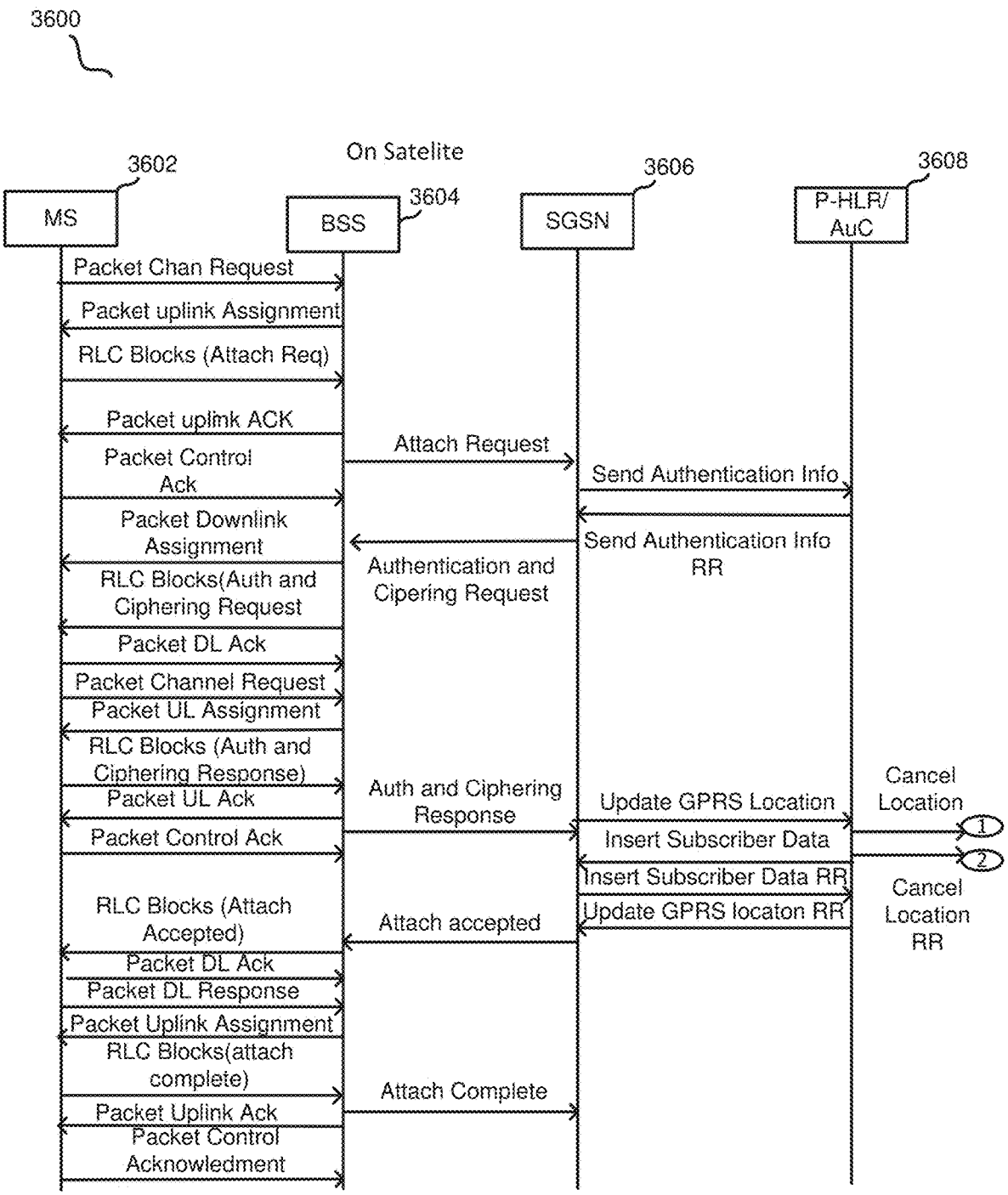
FIG. 36, comprising FIG. 36A and FIG. 36B together, illustrates an embodiment of a GPRS attach procedure on an orbital base station.
Figure 36B:
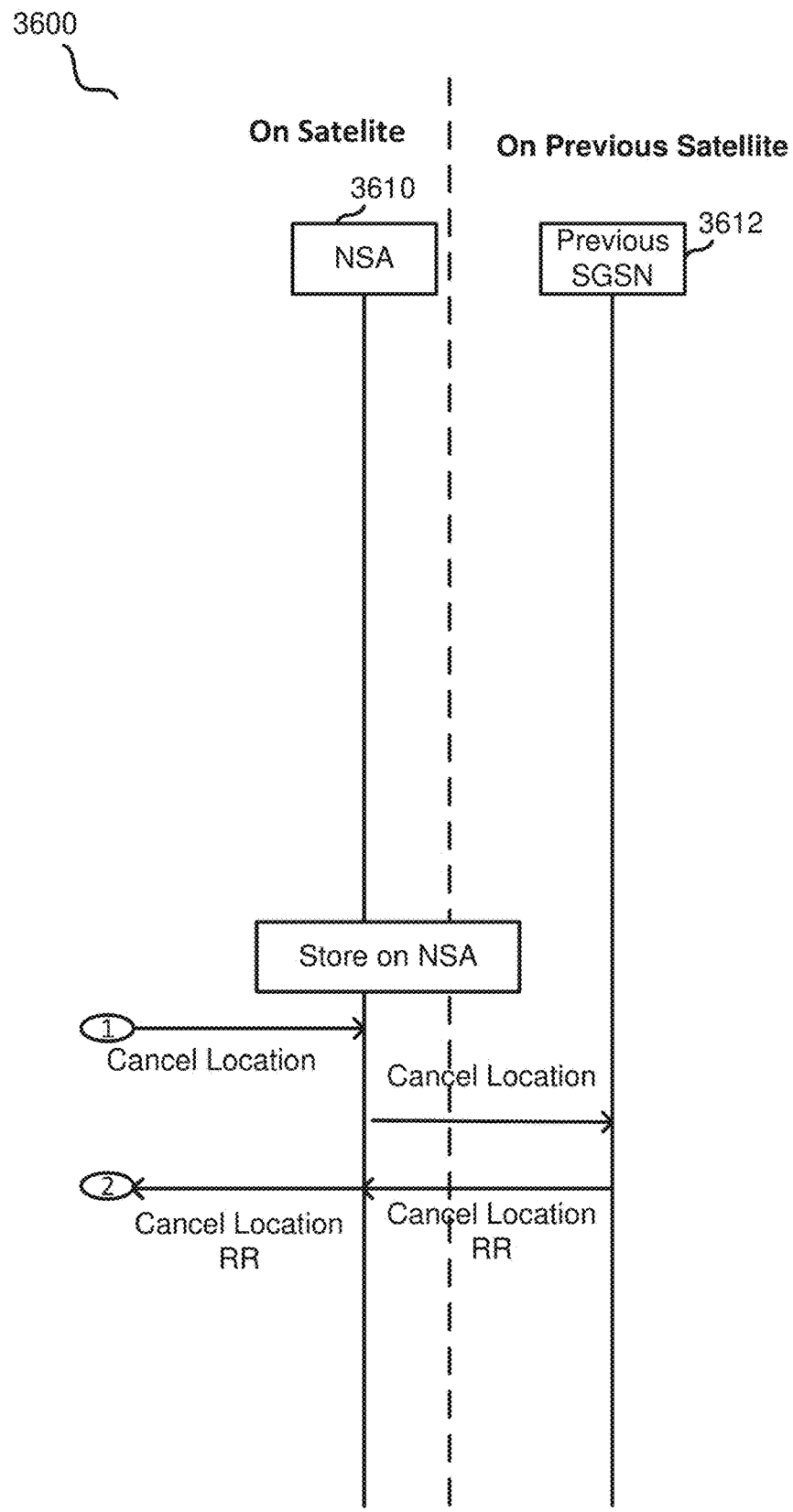

FIG. 36A and FIG. 36B together illustrate an embodiment of a mobile station (MS) 3602 performing a GPRS attach. Many of the air interface messages shown in FIG. 36 can be applicable to any access to or from MS 3602, whether that access is just for signaling or for the transfer of user packets.

A GPRS Attach is somewhat similar in functionality to a location update in GSM. The process can begin with a packet channel request from the MS 3602. In the request, the MS 3602 can indicate the purpose of the request.

The network may include a TFI (Temporary Flow Indicator) to be used by MS 3602, a USF (Uplink State Flag) value for the mobile on the timeslot(s) assigned (in the case of dynamic allocation), and an indication of the number of RLC (Radio Link Control) blocks granted to MS 3602 for the TBF (Temporary Block Flow) in question.

MS 3602 can then send the attach request in one or more radio blocks to the network on the assigned resources. The MS 3602 can send no more than the number of blocks that have been allocated by the network. Upon receipt of the attach request at a BSS 3604, BSS 3604 can use the PACCH to acknowledge the receipt in the packet uplink ack message. MS 3602 can send an indication that the information it sent is complete to the network. In this case, the acknowledgement from the network can be a final acknowledgement, and this can cause the MS 3602 to send a packet control acknowledgement message back to the network and can release the assigned resources.

BSS 3604 can forward the attach request to an SGSN 3606. SGSN 3606 may choose to invoke security procedures, in which case it can fetch triplets from an HLR 3608. A slight difference can be seen in GPRS regarding authentication and ciphering. Specifically, ciphering in GPRS can take place between MS 3602 and SGSN 3606 such that the whole link from MS 3602 to SGSN 3606 is encrypted. The authentication and ciphering can be initiated by the issuance from SGSN 3606 of the authentication and ciphering request to MS 3602 via BSS 3604.

BSS 3604 first sends a packet downlink assignment message to the MS 3602. This message can be sent either on the PCCCH or the PACCH, depending upon whether the MS currently has an uplink PDTCH. If it does, then the PACCH can be used. The packet downlink assignment can instruct the MS 3602 to use a given resource in the downlink, including the timeslot(s) to be used and a downlink TFI value. BSS 3604 can subsequently forward the authentication and ciphering request as received from SGSN 3606.

Upon receipt of the request, MS 3602 can acknowledge the downlink message and then can request uplink resources in the packet channel request so that it can respond.

The network can assign resources to MS 3602, which MS 3602 can use to send its authentication and ciphering response to the network. That response can be forwarded from BSS 3604 to SGSN 3606. BSS 3604 also can send an acknowledgment to MS 3602, and MS 3602 can confirm receipt of the acknowledgement, just as it might have done for the acknowledgement associated with the initial attach request.

Once MS 3602 can be authenticated by SGSN 3606, SGSN 3606 can perform a GPRS update location towards HLR 3608. This can be similar to a GSM location update, including the download of subscriber information from the HLR 3608 to the SGSN 3606. In the case where the satellite has no ground station connectivity, the cancel location requests can be queued in the NSA 3610. When connectivity is established, the NSA 3610 can check if the location update is stale or not before updating the location info.

Once the update location is accepted by the HLR 3608, the SGSN 3606 can send the message attach accept to the MS 3602. As for other messages, the BSS 3604 can first assign resources so that the MS 3602 can receive the message. Similarly, once the MS 3602 receives the message, it can request resources in the uplink so that it can respond with an attach complete message. The BSS 3604 can acknowledge receipt of the RLC data containing the attach complete and can forward the message to the SGSN 3606. The MS 3602 can confirm receipt of the acknowledgement.

Throughout the procedure, MS 3602 can request access to resources for each message that it sends towards the network. This can be done similar to a typical way a GPRS manages resources and allows multiple users to share limited resources. Of course, in this illustration, only signaling is occurring, which consumes very little RF capacity (very few radio blocks). In the case of a packet data transfer, many more data blocks would be transmitted for a given TBF. Not every block needs to be acknowledged, however. In fact, GPRS enables both acknowledged and unacknowledged operations. In the case of an acknowledged operation, acknowledgements can be sent periodically, with each acknowledgement indicating all the correctly received RLC blocks up to an indicated block sequence number.

In GPRS typically, each PDU to or from the MS is passed individually and no permanent resource is established between the SGSN and MS. Thus, if a subscriber moves from the service area of one SGSN to that of another, it is not necessary for the first SGSN to act as an anchor or relay of packets for the duration of the PDP context. This is fortunate as the PDP context could last for a long time. Thus, no direct equivalent of a handover, as it is known in circuit-switching technology, takes place where typically the first MSC acts as an anchor until a call is finished. Nonetheless, as an MS moves from one SGSN to another during an active PDP context, special functions need to be invoked so that packets are not lost because of the transition.

Figure 37:
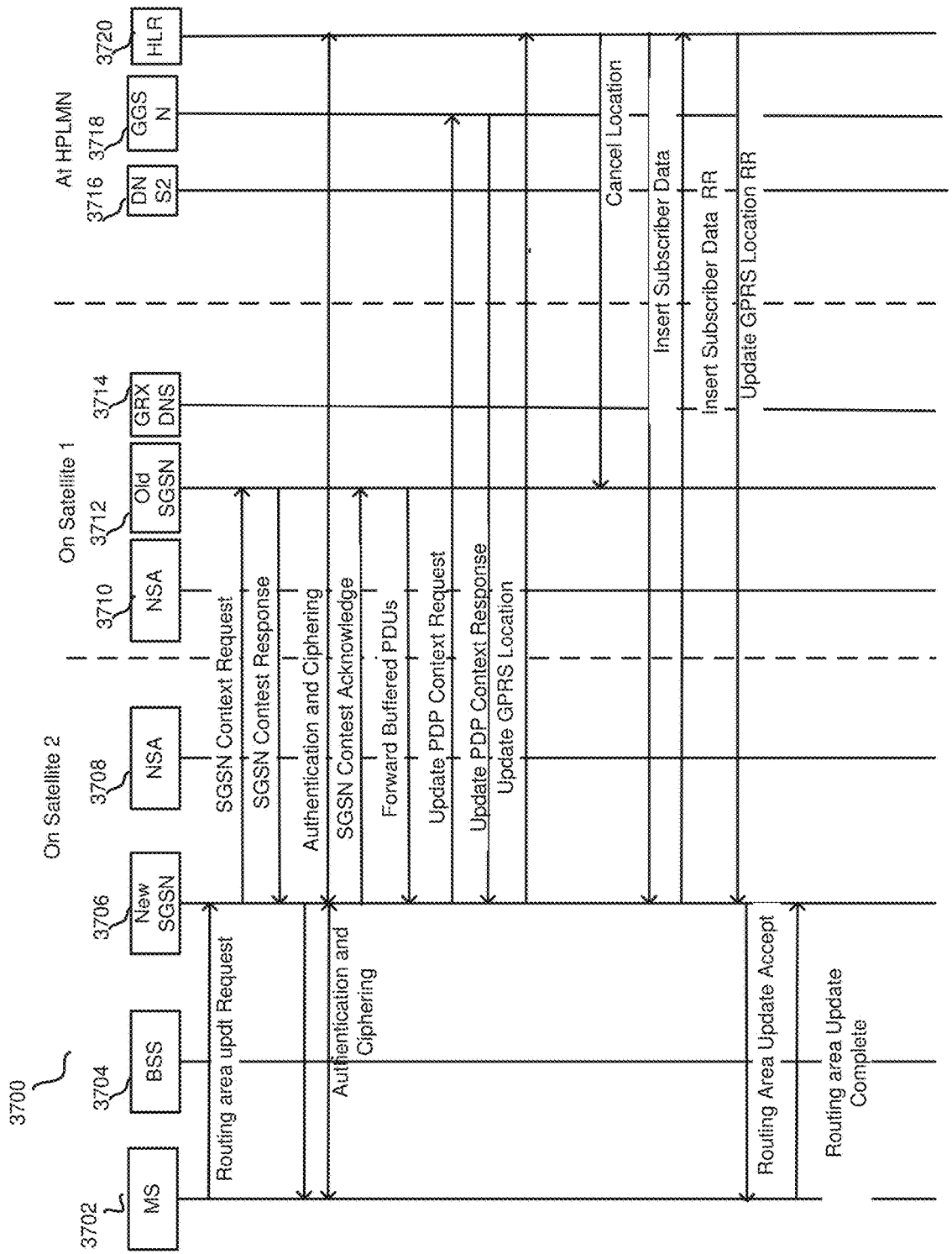
FIG. 37 illustrates an embodiment of a GPRS routing area update procedure on an orbital base station, where a user moves from the service area of one SGSN to another SGSN during an active PDP context.

The process is illustrated in FIG. 37, where an MS 3702 can move from the service area of one SGSN 3712 to that of another/new SGSN 3706 during an active PDP context. In the context of a satellite network with an orbital base station, the cell base station is the mobile element in the network. The MS 3702 may notice, from the PBCCH (or BCCH), that it is in a new routing area. Consequently, it can send a routing area update to the new SGSN 3706. Among the information elements in the message can be the TLLI, the existing P-TMSI, and the old Routing Area Identity (RAI). Based on the old RAI, the new SGSN 3706 can derive the address of the old SGSN 3712 and can send an SGSN Context Request message to the old SGSN 3712. This can be a GTP message, passed over an IP network between the two SGSNs.

The old SGSN 3712 can validate the P-TMSI and can respond with an SGSN context response message, with information regarding any PDP context and MM context currently active for the subscriber, the subscriber's IMSI etc. PDP context information can include GTP sequence numbers for the next PDUs to be sent to the MS 3702 or tunneled to the GGSN 3718, the APN, the GGSN 3718 address for control plane signaling, and QOS information. The old SGSN 3712 can stop the transmission of PDUs to the MS 3702, can store the address of the new SGSN 3706, and can start a timer.

The MM context sent from the old SGSN 3712 to the new SGSN 3706 may include unused triplets, which the new SGSN 3706 may use to authenticate the subscriber. If the old SGSN 3712 has not sent such triplets, then the new SGSN 3706 can fetch triplets from the HLR 3720 in order to perform authentication and ciphering.

The new SGSN 3706 can respond to the old SGSN 3712 with the GTP message, SGSN Context Acknowledge. This can indicate to the old SGSN 3712 that the new SGSN 3706 is ready to take over the PDP context. Consequently, the old SGSN 3712 can forward any packets that may have been buffered at the old SGSN 3712 so that the new SGSN 3706 can forward them. The old SGSN 3712 can continue to forward to the new SGSN 3706 any additional PDUs that are received from the GGSN 3718.

The new SGSN 3706 can send an update PDP context request to the GGSN 3718 to inform the GGSN 3718 of the new serving SGSN 3706 for the PDP context. The GGSN 3718 can respond with the update PDP context response message. Any subsequent PDUs from the GGSN 3718 to the MS 3702 can now be sent via the new SGSN 3706.

The new SGSN 3706 can then invoke an update GRPS location operation towards the HLR 3720. This can cause the HLR 3720 to send a MAP cancel location to the old SGSN 3712. Upon receipt of the cancel location, the old SGSN 3712 can stop the timer and can delete any information regarding the subscriber and the PDP context.

Once the MAP update location procedure is complete, the new SGSN 3706 can accept the routing area update from the MS 3702, which the MS 3702 can acknowledge with a routing area complete message. The new SGSN 3706 can proceed to send and receive PDUs to and from the MS 3702.

In a combined GSM/GPRS network, it is common for location area boundaries and routing area boundaries to coincide. In such a case, an inter-SGSN routing area update might also coincide with the need to perform a location update towards a new MSC/VLR. In that case, the SGSN can communicate with the MSC over the Gs interface and can trigger a location update at the MSC.

Figure 38:
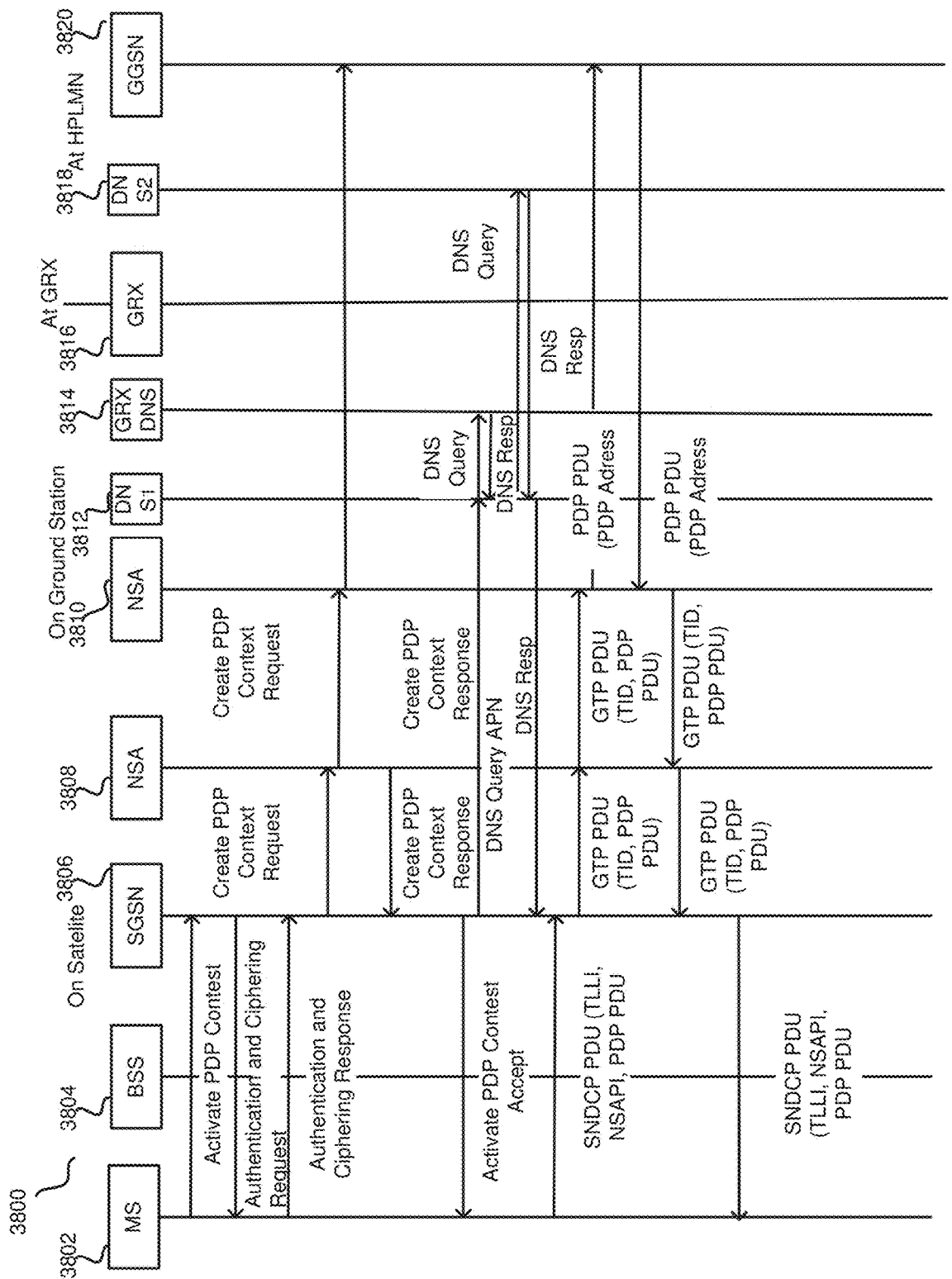
FIG. 38 illustrates a GPRS context activation procedure, according to an embodiment.

The transfer of packet data can be through the establishment of a Packet Data Protocol (PDP) context, which can effectively be a data session. Normally, such a context is initiated by the MS 3802, as would happen, for example, when a browser on the MS 3802 is activated and the subscriber's home page is retrieved from the Internet. When an MS 3802 or the network initiates a PDP context, the MS 3802 moves from the standby state to the ready state. The initiation of a PDP context in an embodiment is illustrated in FIG. 38.

During intermittent coverage of MS 3802 (or the UE thereof) and/or intermittent ground station link connectivity, PDP context can be established when both UE/MS satellite coverage and GSL connectivity exists.

An MS 3802 can initiate a PDP context with a request from the MS 3802 to activate a PDP context. This request can include a number of important elements, including a requested Network Service Access Point Identifier (NSAPI), a requested LLC Service Access Point Identifier (SAPI), a requested Quality of Service (QOS), a requested PDP address, and a requested Access Point Name (APN) etc.

The NSAPI can indicate the specific service within the MS 3802 that wants to use GPRS services. For example, one service might be based on IP; another might be based on X.25.

The LLC SAPI can indicate the requested service at the LLC layer. LLC can be used both during data transfer and during signaling. Consequently, at the LLC layer, it is necessary to identify the type of service being requested, such as GPRS mobility management signaling, a user data transfer, or a short message service (SMS) etc., which can be supported over GPRS as well as over GSM.

The requested PDP address can typically be either an IP address or will be empty. The network may interpret an empty address as a request that the network should assign an address. In such a case, the dynamic host configuration protocol (DHCP) might be supported in the network. The address can be assigned by the GGSN 3820, which can either support DHCP capabilities itself or can interface with a DHCP server.

The access point name may indicate the GGSN 3820 to be used and, at the GGSN 3820, it may indicate the external network to which the MS 3802 can be connected. The APN can contain two parts—the APN network identifier and the APN. In one embodiment of satellite network operations only roamers may be served and only GGSN 3820 (which can be an HGGSN) routing may be allowed. Correspondingly, in this embodiment, no VGGSN routing may be permitted.

Based on the APN received from the subscriber, the SGSN 3806 can determine the GGSN 3820 that might be used. The SGSN 3806 can send a query to a DNS server 3812. The query can contain the APN, and the DNS server 3812 can respond with an IP address for the appropriate GGSN, such as GGSN 3820.

Next, the SGSN 3806 can create a tunnel ID (TID) (GTP) for the requested PDP context. The TID can combine the subscriber IMSI with the NSAPI received from the MS 3802 and can uniquely identify a given PDP context between the SGSN 3806 and the GGSN 3820. The SGSN can send a create PDP context request message to the GGSN 3820. This can contain several information elements, including the TID, the PDP address, the SGSN address, and the QoS profile etc.

The GGSN 3820 can return the message, create PDP context response to the SGSN 3806. Provided that the GGSN 3820 can assign a dynamic address and if it can support connection to the external network as specified by the APN, then the response is a positive one. In that case, the response can include, among other items, GGSN addresses for user traffic and for signaling, an end user address (as received from DHCP), the TID, a QoS profile, a charging ID, and a charging gateway address etc.

Upon receipt of the create PDP context response message from the GGSN 3820, the SGSN 3806 can send activate PDP context accept to the MS 3802. This can contain the PDP address for the MS 3802 (in the case that a dynamic address has been assigned by the network).

Once the MS 3802 has received the PDP context accept message from the SGSN 3806, then everything necessary might be in place to route packets from the MS 3802 through the SGSN 3806 to the GGSN 3820 and on to the destination network. The MS 3802 can send the user packets as SNDCP PDUs. Each such PDU can contain the TLLI for the subscriber and the NSAPI can indicate the service being used by the subscriber, plus the user data itself. The TLLI and NSAPI can enable the SGSN 3806 to identify the appropriate GTP tunnel towards the correct GGSN, such as GGSN 3820. SGSN 3806 can encapsulate the user data within a GTP PDU, including a TID, and forwards the user data to the GGSN 3820. At the GGSN 3820, the GTP tunnel "wrapper" can be removed and the user data can be passed to the remote data network (such as the Internet).

Packets from the external network back to the MS 3802 can first arrive at the GGSN 3820. These packets can include a PDP address for the MS 3802 (such as an IP address), which enables the GGSN 3820 to identify the appropriate GTP tunnel to the SGSN 3806. The GGSN 3820 can encapsulate the received PDU in a GTP PDU, which it can forward to the SGSN. The SGSN uses the TID to identify the subscriber and service in question (that is, the TLLI and NSAPI). It can then forward an SNDCP PDU to the MS 3802 via the BSS 3804.

That access to and from the MS 3802 over the air interface might require the request and allocation of resources for use by the MS 3802. In other words, the PDTCH(s) that the MS may be using might not be dedicated solely to the MS 3802 either during the PDP context establishment or during a packet transfer to or from the external packet network.

Figure 39:
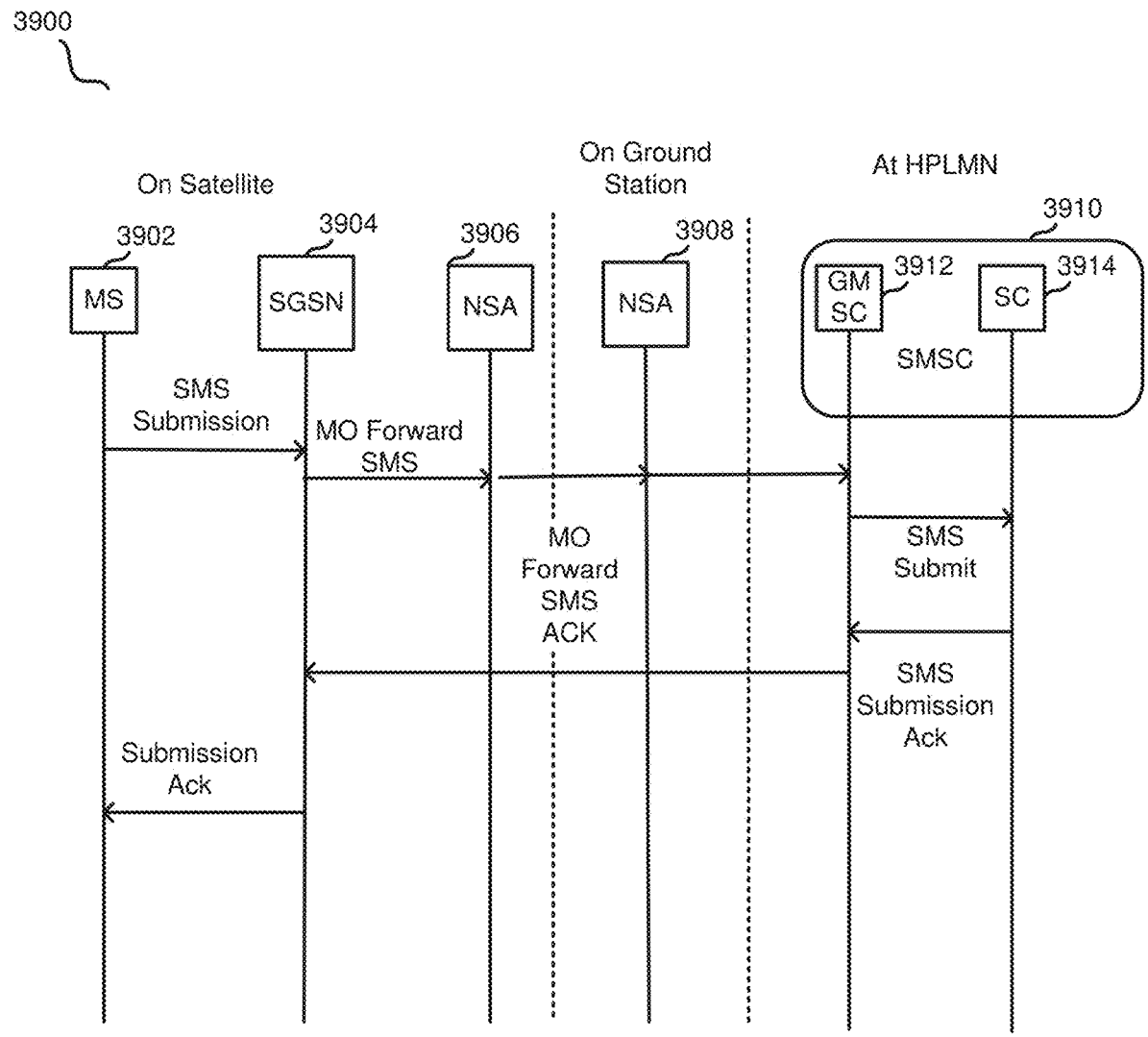
FIG. 39 illustrates an embodiment of a mobile station sending a mobile originated short message over a GSM/GPRS network, according to an embodiment.

FIG. 39 illustrates an embodiment of an MS 3902 sending a mobile originated short message over a GSM/GPRS network, where the handset of MS 3902 can send the text message over the air interface to the MSC/SGSN 3904. Along with the actual text of the short message, the address of the SMSC 3910 taken from the handset's configuration stored on the SIM card can be included. The SGSN 3904 can invoke the MAP service package MAP_MO_FORWARD_SHORT_MESSAGE to send the text to the interworking MSC 3912 of the service center.

This service can send the moForwardSMS MAP operation to the SMSC 3910 indicated in the short message submission from the handset, in a TCAP using the interworking MSC. On receipt of the moForwardSMS message, it can pass the SMS to the actual service center (SC) 3914 of the SMSC 3910 for storing, and subsequent forwards. The SC 3914 can return an acknowledgement indicating success or failure. MSC 3912 can send an appropriate indication back to the VMSC/SGSN 3904 of the sending subscriber. The message submission status can then be forwarded, over the air interface, to the MS 3902.

Figure 40:
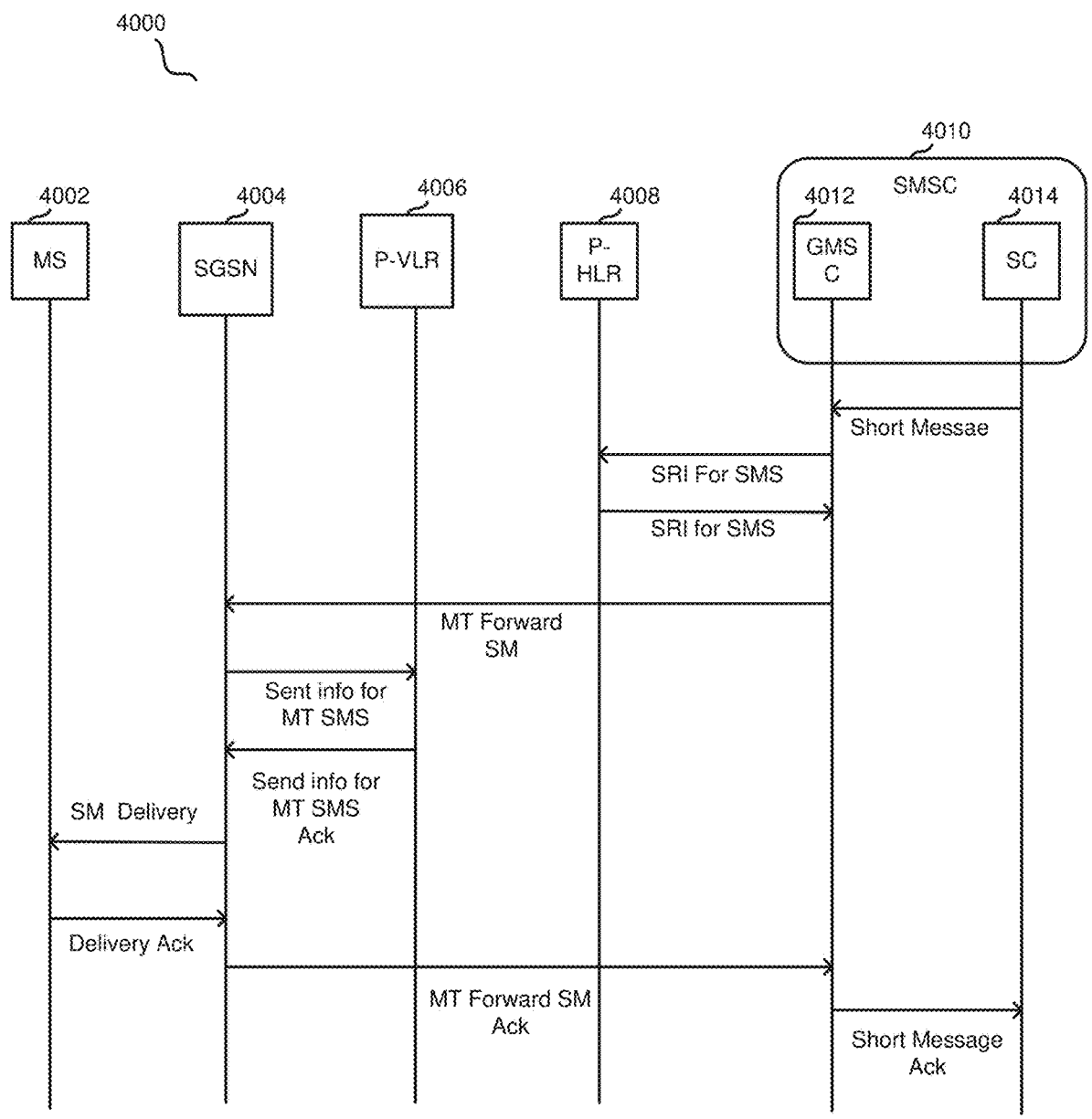
FIG. 40 illustrates a mobile terminated short message over a GSM/GPRS network, according to an embodiment.

FIG. 40 illustrates mobile terminated short message in an embodiment. A service center 4014 can send the SMS-PP APDU containing the text message, the destination, and other details to a gateway MSC (GMSC) 4012. GMSC 4012, on receipt of this short message, may need to discover the location of the destination from a P-HLR 4008. GMSC 4012 can invoke the MAP service package MAP_SEND_ROUTING_INFO_FOR_SM, which can send a routing information request for SMS (SRI-for-SM) MAP message to P-HLR 4008, requesting the current location of the destination.

The P-HLR 4008 can return destination in an acknowledgement message to the SMSC's GMSC 4012 entity. The GMSC 4012 can attempt to deliver the short message to its recipient. This can be done by invoking the MAP_MT_FORWARD_SHORT_MESSAGE service, which can send a MAP mtForwardSMS message to the visited SGSN 4004. The SGSN 4004 may request the information needed for it to deliver the short message to its recipient by sending a Send_Info_for_MT_SMS message to the VLR 4006.

The VLR may then instigate a page request, or subscriber search, for the destination subscriber's MISDN, and may return the result to the VMSC, VMSC may then send to the SMSC 4010 indicating successful delivery. The GMSC 4012 component of the SMSC 4010 can pass the result of the delivery attempt to the service center 4014.

Figure 41:
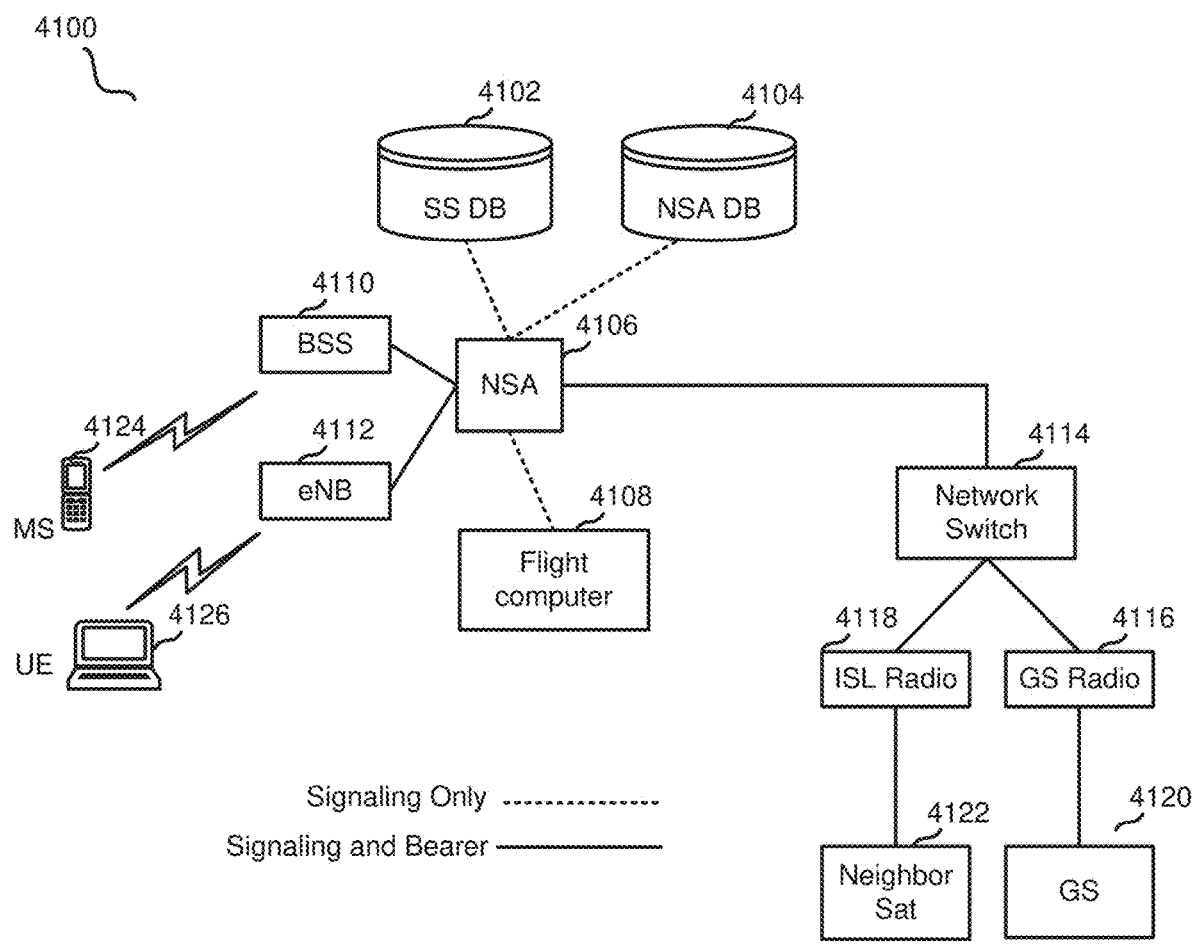
FIG. 41 illustrates an embodiment of a communication and processing system that uses a GSM/GPRS/LTE network architecture on satellite with ubiquitous coverage and continuous connectivity to a ground station.
Figure 42:
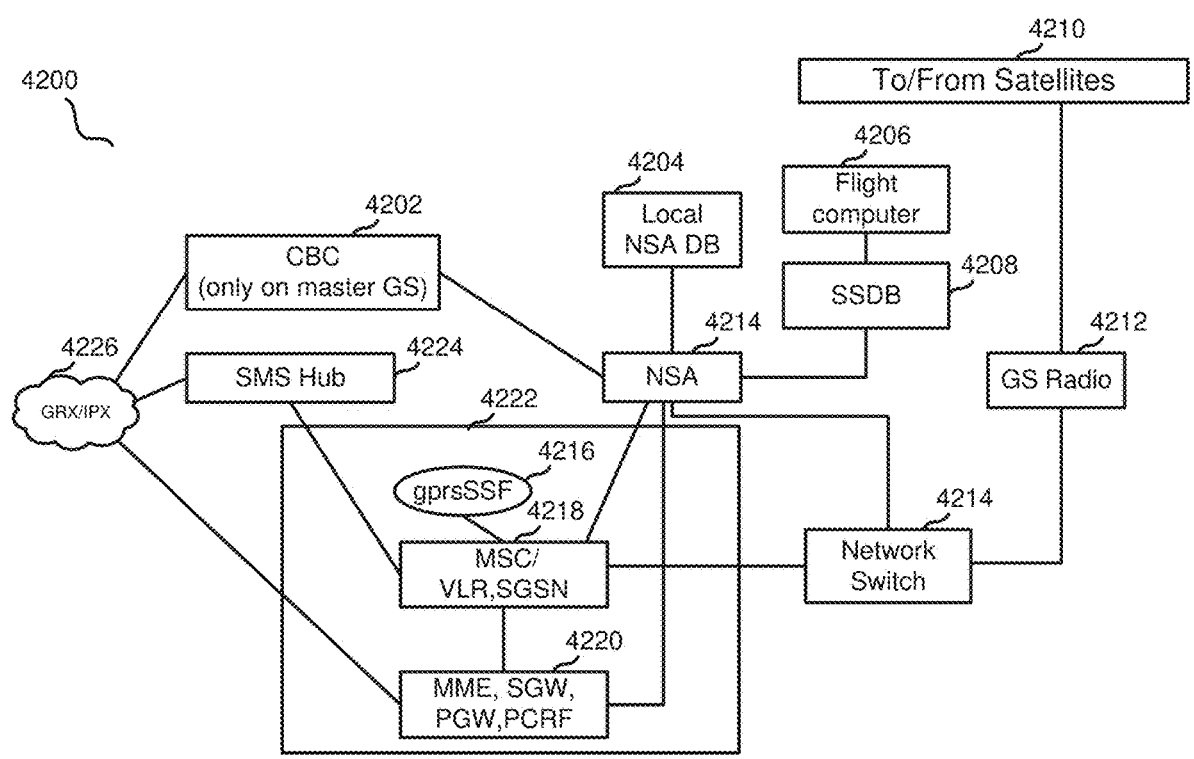
FIG. 42 illustrates an embodiment of a communication and processing system that uses a GSM/GPRS/LTE network architecture on a ground station that has continuous connectivity to a satellite.

FIG. 41 illustrates an embodiment of the network architecture with ubiquitous coverage, satellite may host both BSS 4110 and eNodeB 4112 to provide GSM, GPRS and LTE services in the network. The BSS 4110 with BTS and BSC may provide GSM/GPRS services and may be connected to the MSC and/or the SGSN of MSC/VLR/SGSN 4218 on the ground station as shown in FIG. 42. eNodeB 4112 on the satellite may provide E-UTRAN services and may talk to MME/SGW of MME/SGW/PGW/PCRF 4220 in the EPC on the ground station shown in FIG. 42. Each of the BSS 4110 and eNodeB 4112 components on the satellite can provide a GSM/GPRS cell and an LTE cell respectively. BTS and BSC can coexist on the satellite while the MSC and VLR co-exist on the ground station.

In LTE networks, evolved NodeB or E-UTRAN NodeB 4112 can be a radio access network component that bridges UE 4126 to an LTE core network, EPC (Evolved Packet Core). eNodeB 4112 can talk to various LTE capable devices over LTE radio frequency and can provide access stratum functionalities to them.

Network service application (NSA) 4106 may provide software processes needed to enable network behavior for satellite network's services. In a network where all the three access technologies coexist, NSA's functionalities can include relaying LU/RAU/TAU signaling to neighboring satellites when there is no direct ground station Link (GSL), relaying SMS messages to neighboring satellites when there is no direct GSL, relaying information/messages/commands etc. received from ground station to the satellite, providing USSD functionality through the USSD application etc.

Figure 43:
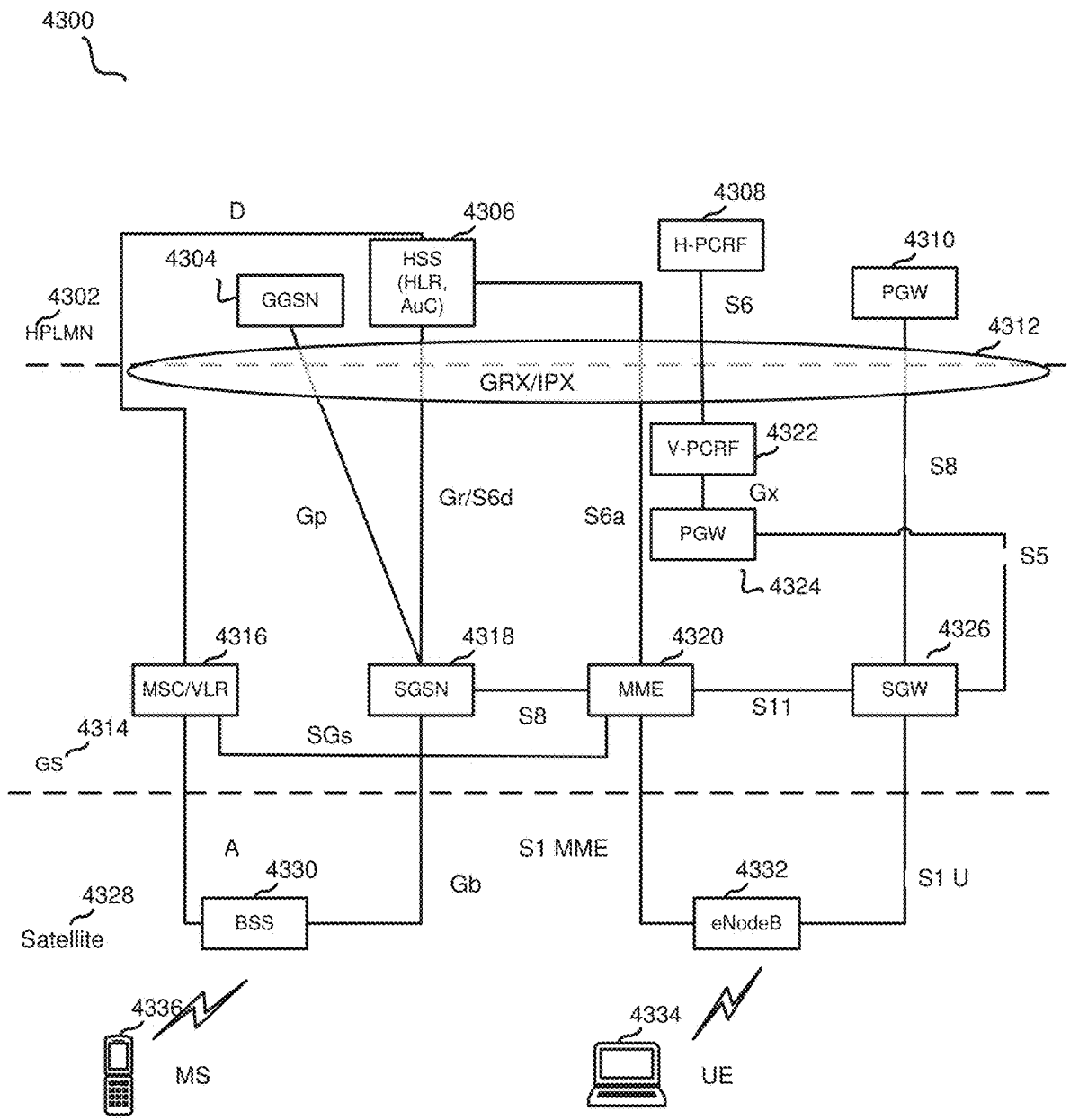
FIG. 43 illustrates the GSM/GPRS/LTE network interfaces across satellite, ground station and partner MNO networks, according to an embodiment.

FIG. 42 illustrates the network architecture on the ground station, in an embodiment, that can include the core networks for GSM/GPRS and LTE technologies 4222 along with the NSA 4214, CBC 4202, SMS hub 4224, and databases 4204 and 4208. The core network components can interact with the access network hosted on the satellites and the external networks to provide the network services. The interfaces between the core network and satellite/ground station in FIG. 42 is expanded in FIG. 43.

An MME 4320 is the mobility management entity in the LTE evolved packet core that is responsible for NAS signaling, its security, control and execution of paging, Tracking Area list management, PDN GW and Serving GW selection. It also is responsible for roaming (S6a towards home HSS), authentication, authentication and bearer management functions including dedicated bearer establishment and UE reachability procedures.

The serving GW 4326 is the entity that terminates the interface towards E-UTRAN. The functions of the serving GW 4326, in a typical LTE network, include being the local mobility anchor point for inter-eNodeB handover, sending of one or more "end marker" to the source eNodeB immediately after switching the path during inter-eNodeB handovers, especially to assist the reordering function in NodeB, packet routing and forwarding, transport level packet marking in the uplink and the downlink, accounting for inter-operator charging (for GTP-based S5/S8, SGW generates accounting data per UE and bearer), interfacing OFCS according to charging principles.

The PDN GW 4324 is the entity that terminates an SGi interface towards the PDN. PGW 4324 is responsible for per-user based packet filtering, UE IP address allocation, transport level packet marking in the uplink and downlink, accounting for inter-operator charging, UL and DL service level charging as defined in 3GPP TS 23.203 (e.g., based on SDFs defined by the PCRF, or based on deep packet inspection defined by local policy etc.).

The PCRF 4322 in satellite network may act as a visiting PCRF for all the MNO users roaming. It terminates the Gx and S9 reference points for roaming with local breakout and terminates Rx for roaming with local breakout and Application Function.

A cell broadcast center (CBC) 4202 controls the broadcast of messages to all active users. This include both emergency messages and standard messages. CBC 4202 can connect to multiple CBEs on external networks like PSAP, Regulators etc. CBC 4202 commands NSA 4214 to broadcast the message it received from external CBEs.

Due to the availability of continuous connectivity, authentication of the users can be done at ground station which may avoid the need to store user authentication vectors and service-related profile information (P-HLR in intermittent coverage network) on the satellite and ground stations. Following databases can be maintained at satellites and ground stations to enable the network operations.

The data to be stored in each of the following databases can consider the bandwidth, latency requirements to fetch from/update at ground stations and the amount of data that can be stored on satellite etc. Each satellite may host a network database, a user information database, and a location area database to facilitate the satellite network services.

The network database hosted on the satellite may be a subset of the data stored on ground station with the necessary details for the successful operation of the network. It may have the set of geographical boundaries/locations to serve, and for each location the leased frequency with the technology to be used, the MNO whose frequency is leased for the location, MSC/VLR, MME, SGSN, SGW information, area identifiers, network context (entire cell configuration along with transmit frequency configuration, each of the core network entity configurations) etc.

The network database can be queried to get the configuration for a location area while preparing the network to serve an upcoming location, updated with the network changes as and when received from a ground station. This can be more of a configuration database and can be expected to have minimum updates from ground stations once created on the satellite.

Each satellite can also maintain a database to store the dynamic information per location area, like the start and end timestamps when a particular location is/was served by this satellite, the set of users seen in that location, the activity log, network related statistics and user statistics like number of users/messages served or sent/received, KPIs etc. created/collected while serving the location and the next upcoming time instance at which the satellite is expected to serve the location. This may be stored per cell per location.

The activity log database can be queried, when the satellite is directly connected to the ground station, to create the push requests to the ground station with the network operation information and can be updated locally by the NSA on the satellite with the latest activity/log/stat information of a particular location. Very few or no updates from ground station can be expected for this database.

Each ground station may host a network database, a user information database, a location area database, and a satellite database to facilitate the satellite network services.

All the databases across all the ground stations can be replicas with master ground station taking the responsibility of replication and synchronicity amongst them.

Each ground station may host a network database that may be a superset of the network databases stored on the satellites with the necessary details for the successful operation of the network. It may have the entire set of geographical boundaries/locations to serve, and for each location the leased frequency, the MNO(s) whose frequency (or frequencies in case of multiple technologies in the location) is leased for the location, the satellite currently serving this location, network context (entire cell configuration along with transmit frequency configuration, each of the core network entity configurations) etc.

The network database can be queried to get the configuration updates for a location area, if any, to be sent to the next satellite going to serve the location, updated with the network changes as and when a new location area/routing area or tracking area needs to be created or a configuration change needs to be made to the existing areas from the information received from master ground station. This can be more of a configuration database and can have minimum updates from master ground station once created on a ground station.

Each ground station may also maintain a user information database per MNO with all the dynamic information for the users like the last location (location area/routing area/tracking area) and the cell in which the IMSI is seen, along with the satellite info that has seen the user in that location, allocated TMSIs for each of them, location updates and a log of the SMS messages sent and/or received by the users along with the timestamps.

The user information database can be queried to create the user/activity log by the satellite and can be updated with the latest information received from the master ground station or an MNO network for the users with their latest location and pending messages/reports etc. The dynamic nature of the data stored in this database can trigger for frequent updates/retrievals.

The location area database maintained at each ground station can store the dynamic information per location area, like the information of the satellite that is currently serving a location and the upcoming satellite that is going to serve that location, the start and end timestamps when a particular location area is/was served by a satellite, and per cell in the location, the set of users seen in that location, the activity log, network related statistics and user statistics like number of users/messages served or sent/received, KPIs etc. created/collected while serving the location.

The location area database can be queried to create the push requests to the master ground station with the network operation information and can be updated locally by the NSA on the ground station with the latest activity/log/stat information of a particular location as and when received from a satellite or when an update is received from master ground station.

Each ground station may maintain a satellite information database that can contain the details of all the satellites, the location areas each of the satellites recently served, the upcoming location areas for each of the satellites, etc. In addition to this, the master ground station can maintain the activity logs received from each of the satellites along with their overall statistics.

The satellite information database can be queried to create the push requests to the master ground station with a satellite's activity information and can be updated locally by the NSA on the ground station as and when the information is received from a satellite or when an update is received for a satellite from the master ground station.

Figure 44:
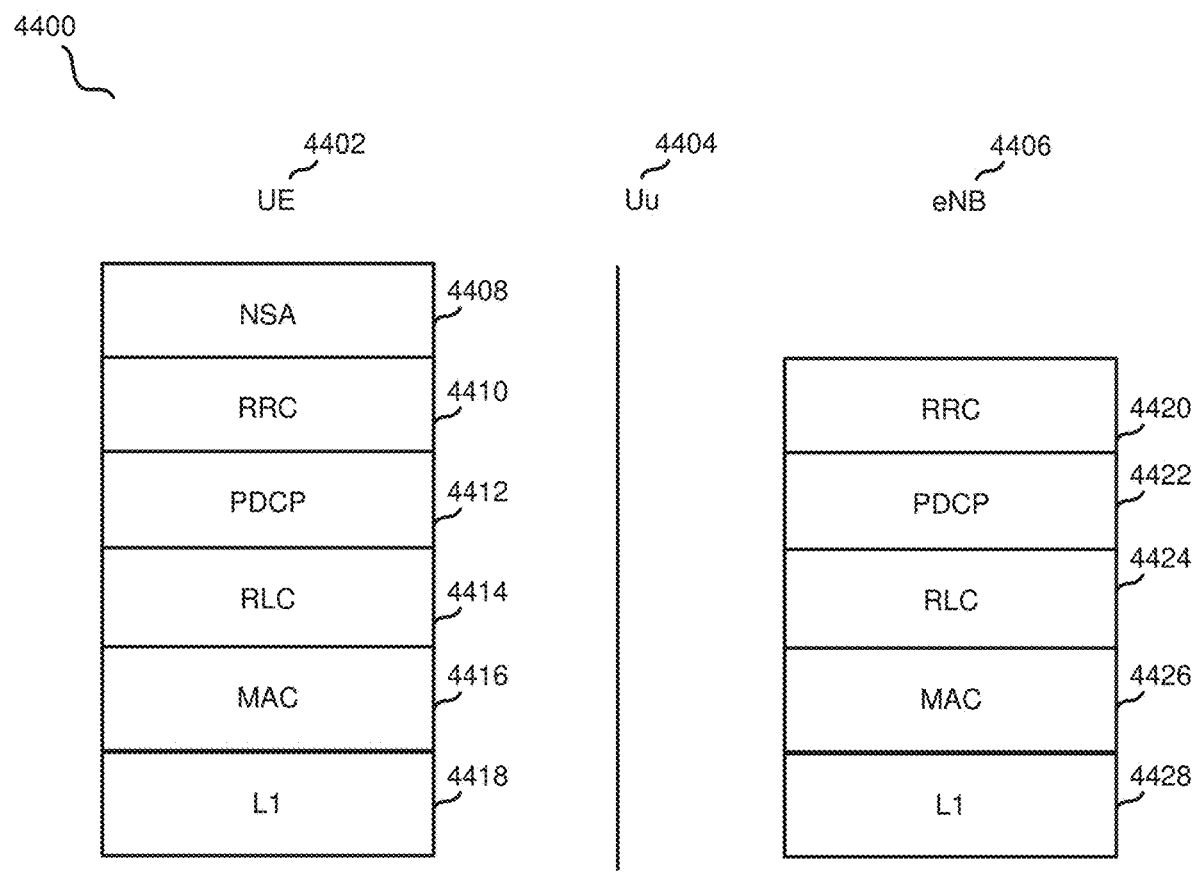
FIG. 44 illustrates a control interface between a UE and an eNodeB, according to an embodiment.

FIG. 44 illustrates the air interface between UE and eNodeB on the satellite, referred to as an LTE Uu interface 4404 and can be used for TA registration, TA update, attach, data and SMS message transfer etc. procedures in satellite's GSM/GPRS/LTE network.

LTE Uu interface 4404 can have both control plane and user plane stacks. Control plane stack can be used for all the signaling procedures like TAU, attach, detach etc., while data plane stack can be used for data sessions. SMS messages may be sent/received over control plane stack, shown in FIG. 44, and SGs interface between MME and MSC.

Figure 45:
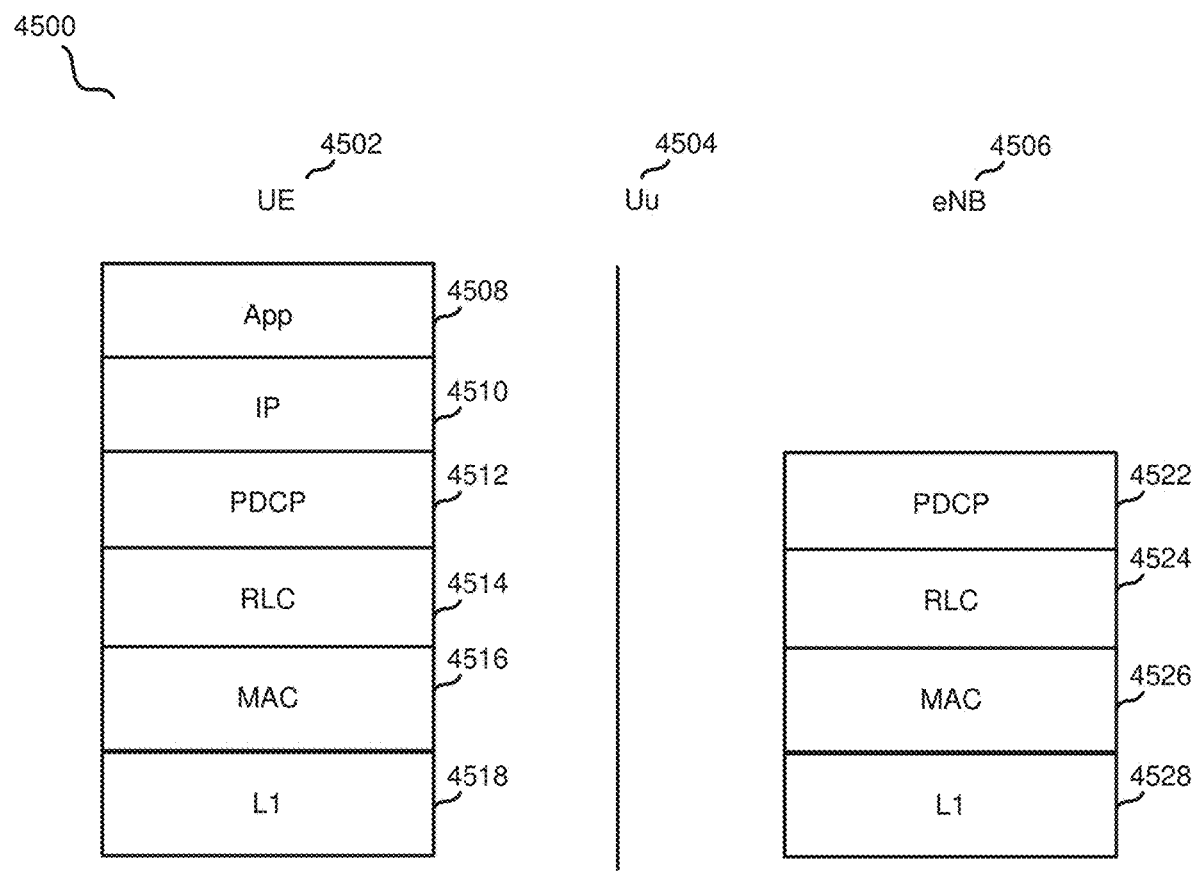
FIG. 45 illustrates the data interface between a UE and an eNodeB, according to an embodiment.

FIG. 45 illustrates the data plane stack of LTE Uu interface 4504 that can be used for data sessions.

Figure 46:
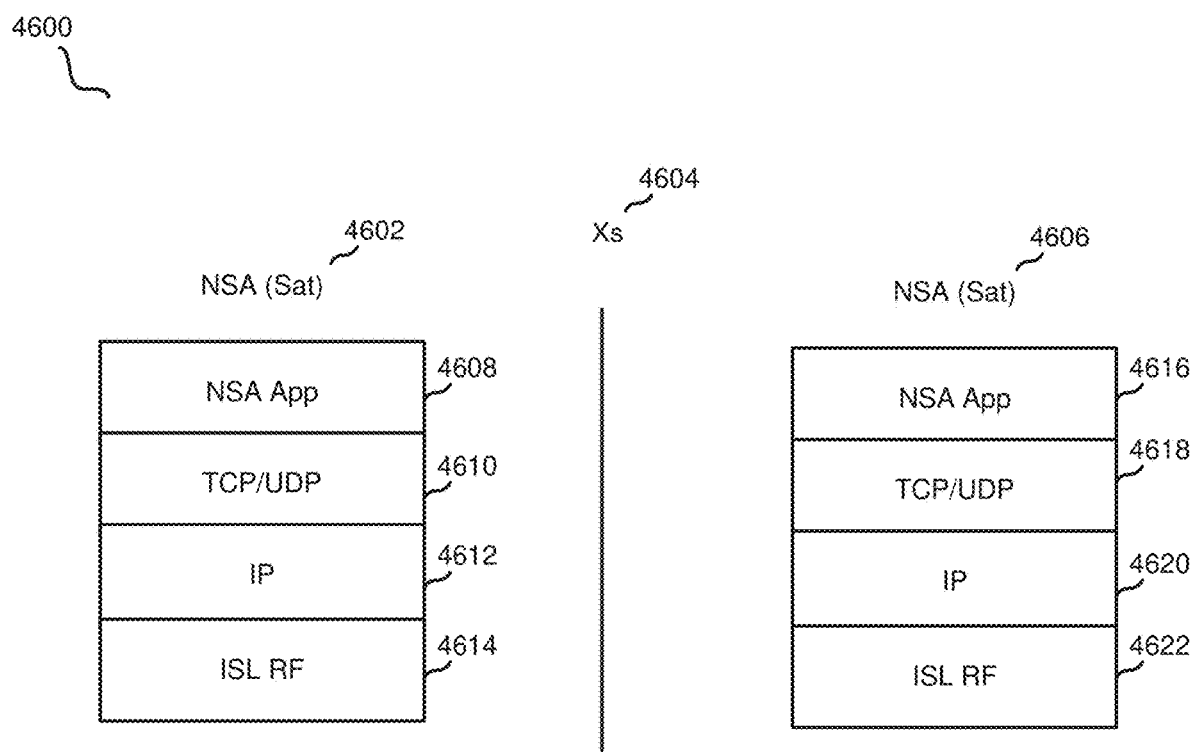
FIG. 46 illustrates an Xs interface between an NSA on satellite and an NSA on a neighbor satellite, according to an embodiment.

FIG. 46 illustrates the interface between NSA entities on satellites. The NSA 4602 on the satellite interfaces with the NSA 4606 on the neighboring satellite over an Xs interface 4604, which can be a RF based interface using a custom application protocol between NSA components. User data, control data and satellite metadata that needs to be sent/received to/from ground station may be sent over this interface. X2 interface between eNodeBs on the satellites that is used for handovers and neighboring cell information transfer etc., may also be encapsulated within the NSA App payload to be sent/receive over an Xs interface.

Figure 47:
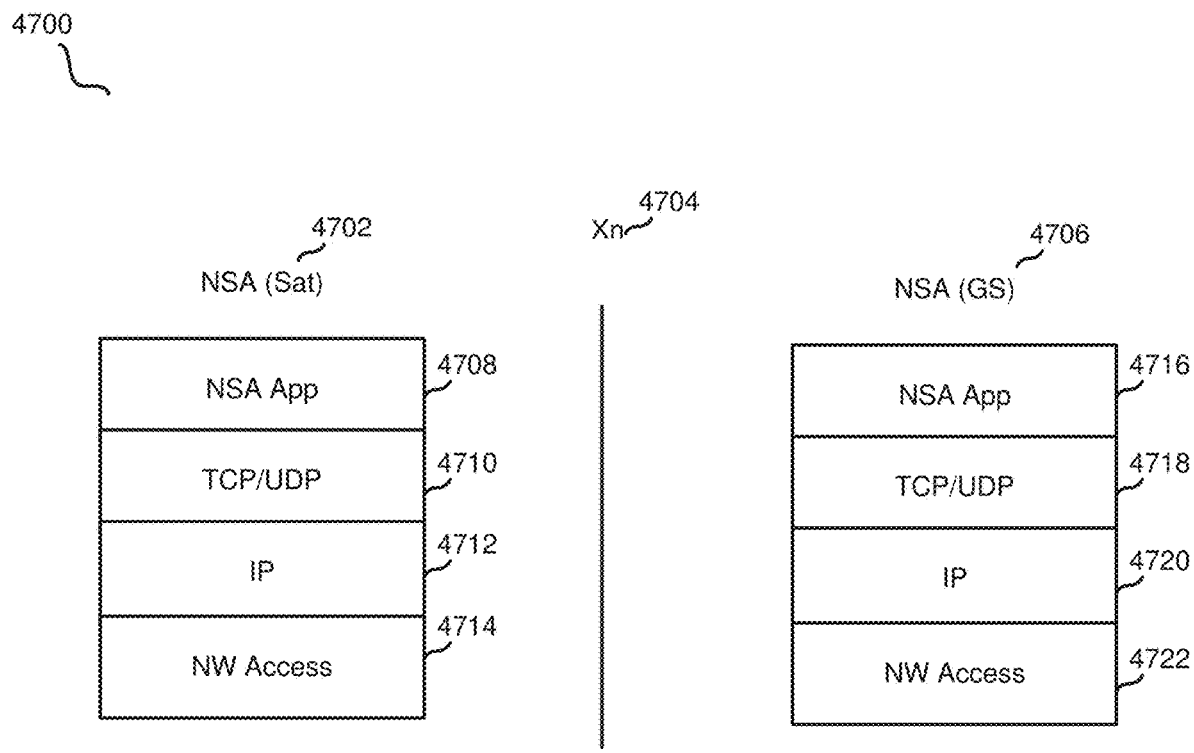
FIG. 47 illustrates an Xn interface between an NSA on satellite and an NSA on a ground station, according to an embodiment.

FIG. 47 illustrates the interface between NSA on satellite and NSA on a ground station. The NSA 4702 on the satellite interfaces with the NSA 4706 on the ground station over an Xn interface 4704, which can be an IP based interface using a custom application protocol between NSA components.

Xn interface 4704 may be used by the NSA components on both satellite and ground stations to transfer and receive the location updates, SMS messages, database updates from/to MSC/VLR, HLR entities and the activity logs, statistics and KPIs of the satellite to the ground station.

Figure 48:
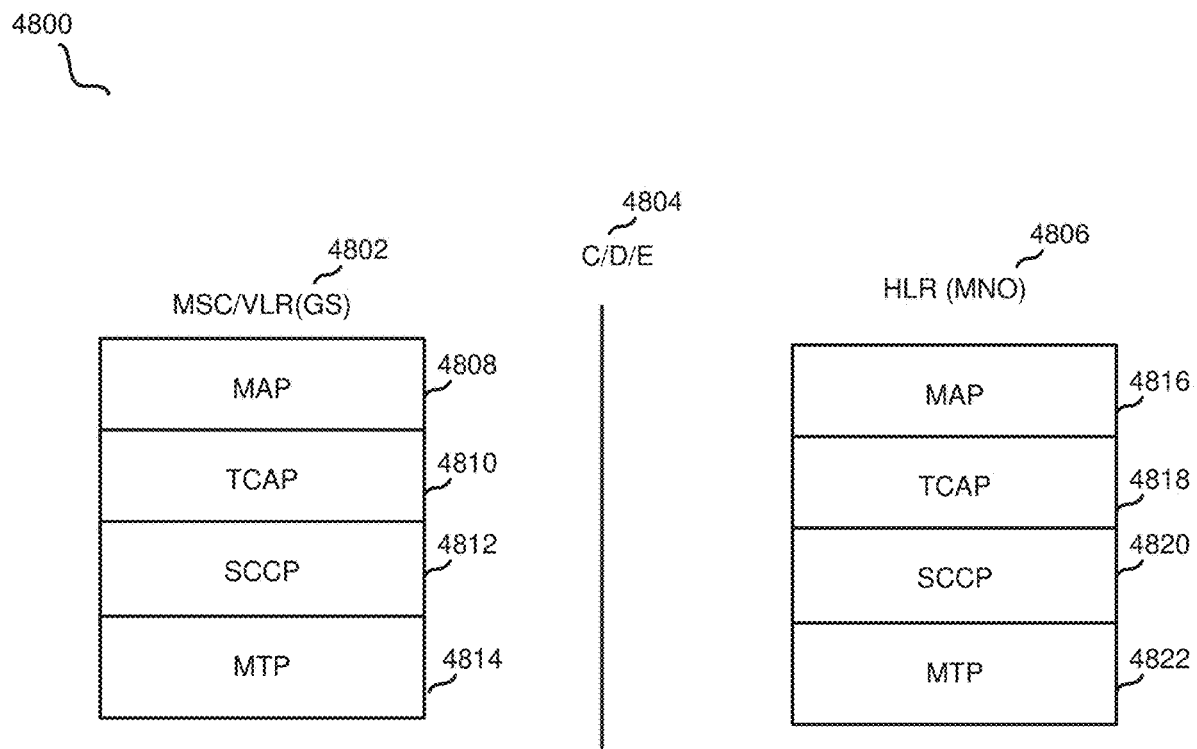
FIG. 48 illustrates the interface between MSC/VLR on ground station and HLR at MNO network, according to an embodiment.

FIG. 48 illustrates the interface between GSM components 4802 on a ground station and a HLR 4806 of an MNO network. For GSM procedures between the ground station (including the master ground station) and the MNO network, following interfaces can be used: C-interface between an MSC of GSM components 4802 and HLR 4806, D-interface between a VLR GSM components 4802 and HLR 4806, E-interface between the MSC/VLR to old MSC/VLR, MSC to SMS-IWMSC, and MSC to SMS-GMSC.

For the signaling procedures on these interfaces, Mobile Application Part (MAP), which in turn can use the services of Transaction Capabilities can be used as shown in FIG. 48.

Figure 49:
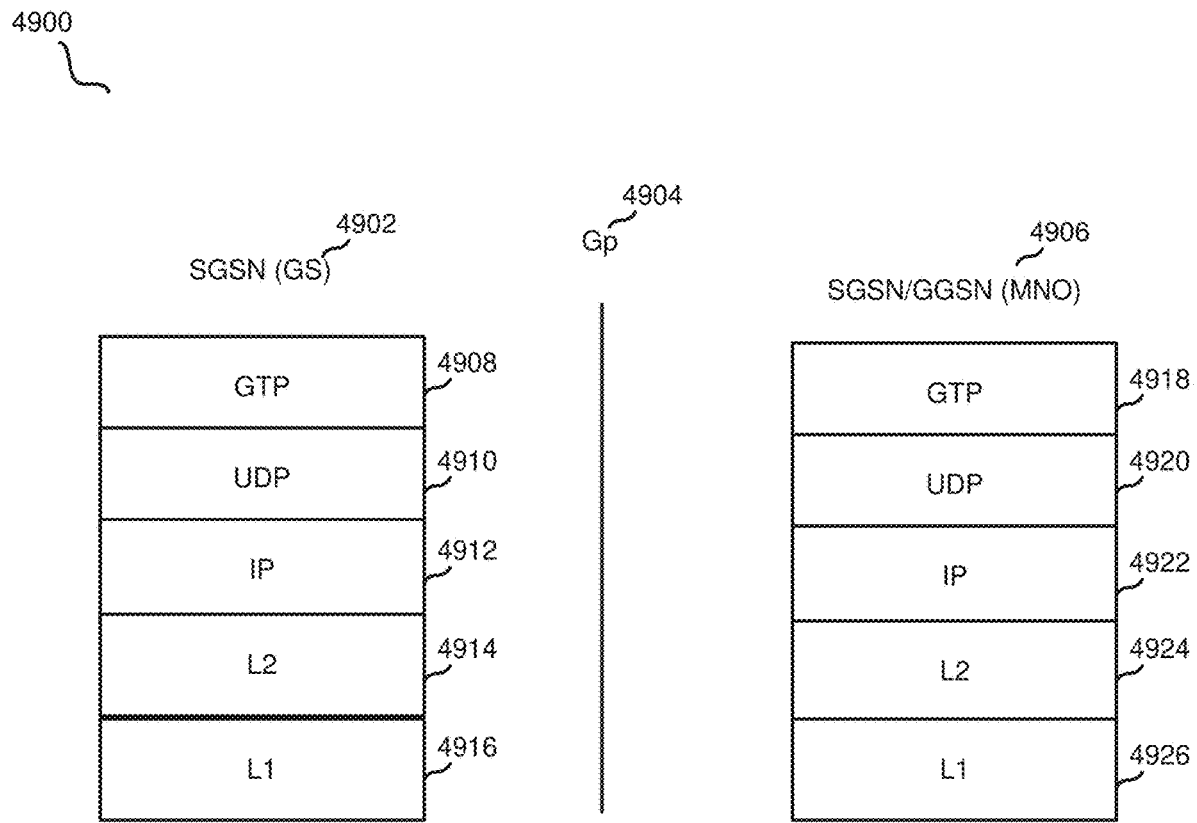
FIG. 49 illustrates the interface between SGSN on ground station and SGSN/GGSN at MNO network, according to an embodiment.

FIG. 49 illustrates the interface between GPRS components 4902 on a ground station and a SGSN/GGSN 4906 of an MNO network. For GPRS procedures between the ground station and the MNO networks, following interfaces can be used: Gr interface between SGSN and HLR, Gd interface between SGSN and SMS-IWMSC, and between SGSN and SMS-GMSC—Signaling on these interfaces uses MAP protocol shown above.

A GTP protocol based "Gp" interface 4904 between SGSN and GGSN and between SGSN to previous SGSN—signaling on this interface can use GTP-C for control plane and GTP-U for user plane as shown in FIG. 49.

Figure 50:
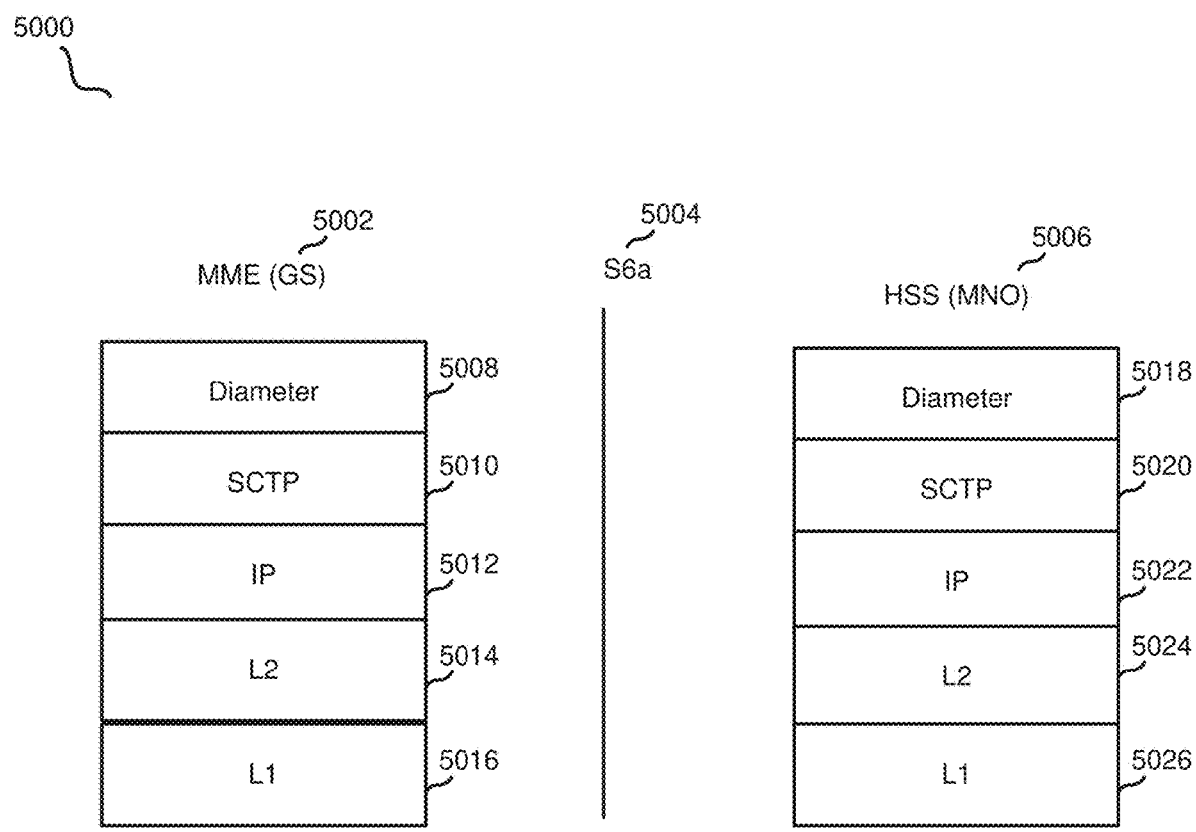
FIG. 50 illustrates the interface between MME on ground station and HSS at MNO network, according to an embodiment.

FIG. 50 illustrates the interface between LTE components 5002 on a ground station and a HSS 5006 of an MNO network. For EPS procedures between the ground station and the MNO networks, the S6a interface might be used between MME and HSS. Signaling on these interfaces might use diameter s6a/s6d application. The S3 interface between MME and SGSN and GTP-C might be used for signaling.

The master ground station can host the CBC for the entire satellite network and can interact with both CBEs and the NSA entities on the rest of the ground stations. In addition, NSA on the master ground station can also interact with CBC on MNO networks in case an MNO wants to broadcast a message in a location area being served by the satellite network. The interface between CBE(s)/MNO's CBC(s) and CBC/NSA on master ground station can be an IP link with emergency/warning message shared by CBE/MNO's CBC containing warning type, warning message, impacted area and time as the minimum set of information elements.

Some of the signaling flows in FIG. 51 through FIG. 73 are shown with 2 ISL hops between the originating satellite and the ground station. The number of ISL hops can vary based on the position of the satellite with respect to the ground station and may be zero in case the satellite is directly connected to the ground station.

When the network has continuous connectivity to the ground station, need for pre-authentication process where authentication vectors are fetched from the MNO networks can be eliminated. The signaling flows shown in FIG. 51 through FIG. 73 are with two ISL hops between the originating satellite and the ground station. The number of ISL hops can vary based on the position of the satellite with respect to the ground station and may be zero in case the satellite is directly connected to the ground station.

Different types of attach procedures that are accepted from a satellite network subscribed user can be a CS attach, wherein a user attaches for a CS-only service to the satellite's GSM network, a PS attach, wherein a user attaches for a PS-only service either to the satellite's GPRS or LTE network, and/or combined attach (EPS/IMSI), wherein the user attaches for both EPS and non-EPS services to the satellite's LTE network.

Figure 51:
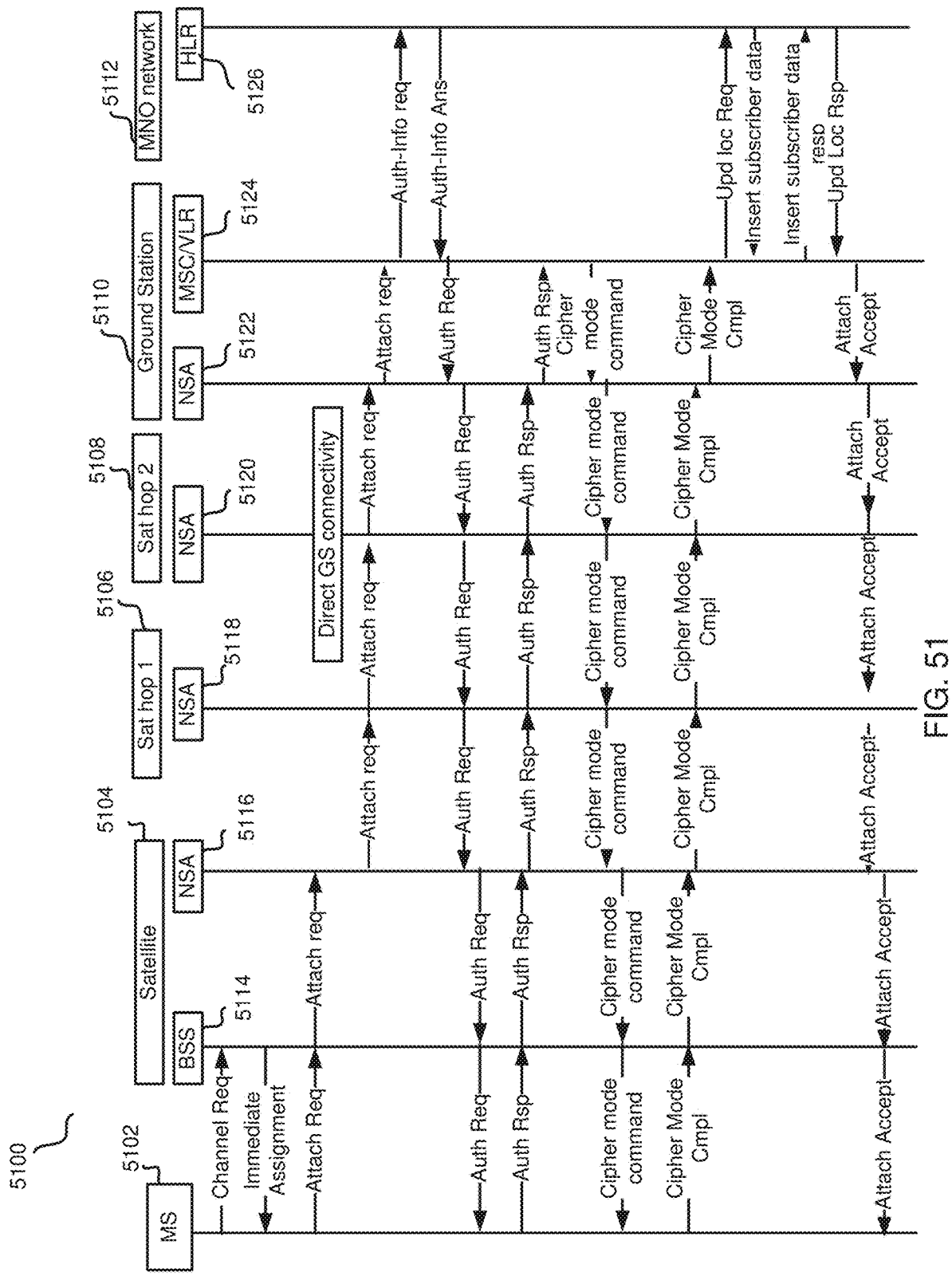
FIG. 51 illustrates the signaling flow of a CS only attach procedure, according to an embodiment.

A CS only mode user can initiate an attach procedure or a service request procedure to send a short message over satellite's GSM network. FIG. 51 illustrates the signaling flow for an embodiment of a mobile station 5102 initiating a CS only attach procedure across two hops using satellites 5106 and 5108 to a ground station 5110. All the messages from the mobile station 5102 can be forwarded to the ground station 5110 and the mobile station 5102's home MNO network 5112 through hops on satellites 5106 and 5108 and all the messages from the mobile station 5102's home MNO network 5112 can be forwarded to the mobile station 5102 via the ground station 5110 and hops on satellites 5106 and 5108. The NSA components 5116, 5118, and 5120 on the satellites 5104, 5106, and 5108, respectively, and the NSA component 5122 on the ground station 5110 may maintain a session and track the status of the transactions across the session till it terminates. The NSA components 5116, 5118, and 5120 on the satellites 5104, 5106, and 5108 and the NSA component 5122 on the ground station 5110 may store the session information and metadata related to the session such as timestamps, location etc. for future analysis and/or reference.

Figure 52:
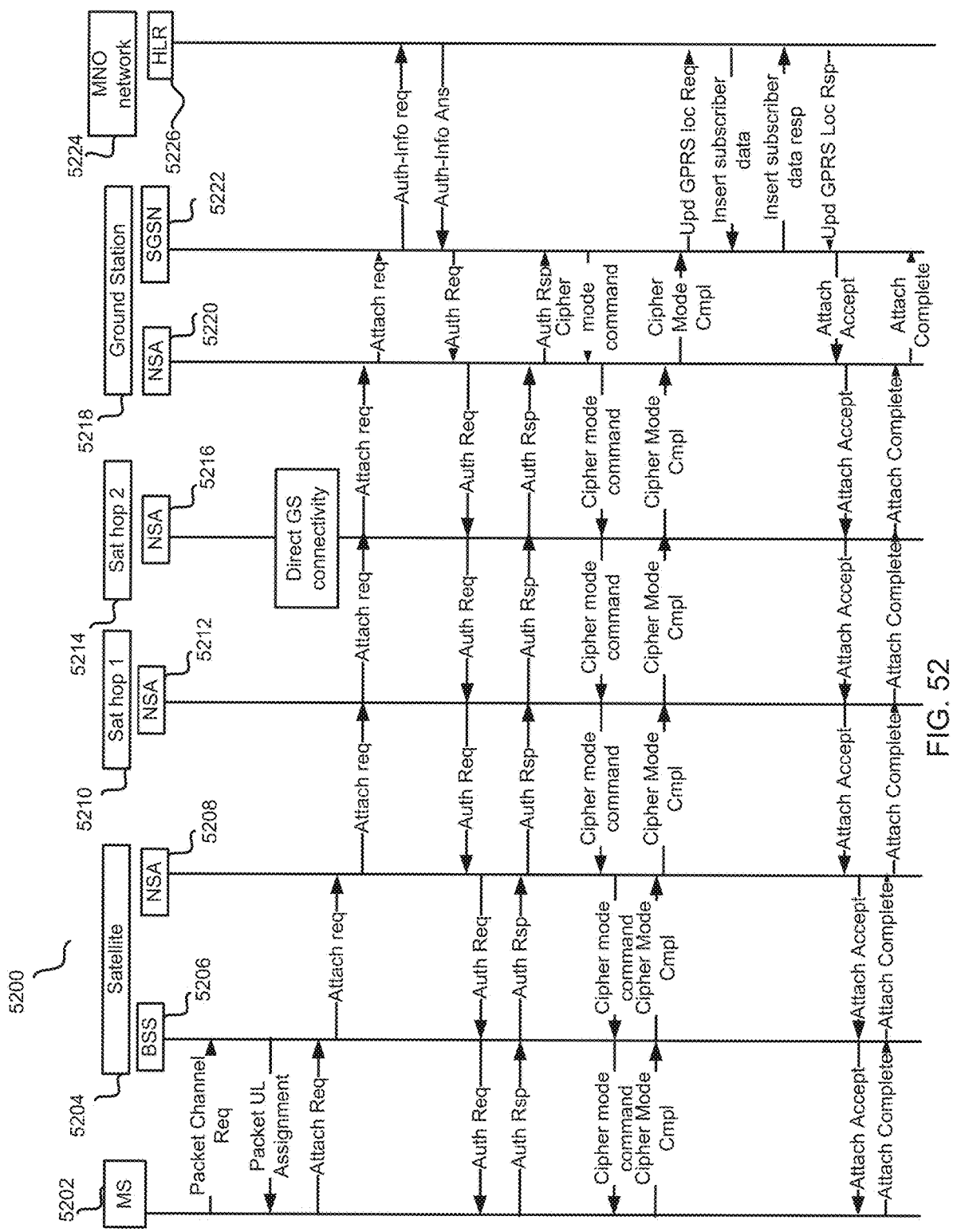
FIG. 52 illustrates the signaling flow of a PS only attach procedure, according to an embodiment.

FIG. 52 illustrates an embodiment of a user-initiated GPRS attach procedure for a PS service in a satellite network using a mobile station 5202 that can have connectivity to a ground station 5218. It illustrates one embodiment where a satellite 5204 can be connected to a ground station via hops using satellites 5210 and 5214. Messages from mobile station 5202 can be forwarded to a ground station 5218 and mobile station 5202's home MNO network 5224 through hops over satellites 5210 and 5214. Messages from the mobile station 5202's home MNO network 5224 can be forwarded to mobile station 5202 via ground station 5218 and the hops over satellites 5210 and 5214. The NSA components 5208, 5212 and 5216 on the satellites 5204, 5210 and 5214 and the NSA component 5220 on the ground station 5218 may maintain a session and track the status of the transactions across the session until it terminates. The NSA components 5208, 5212 and 5216 on the satellites 5204, 5210 and 5214, respectively, and the NSA component 5220 on the ground station 5218 may store the session information and metadata related to the session such as timestamps, location etc. for future analysis and/or reference.

Figure 53A:
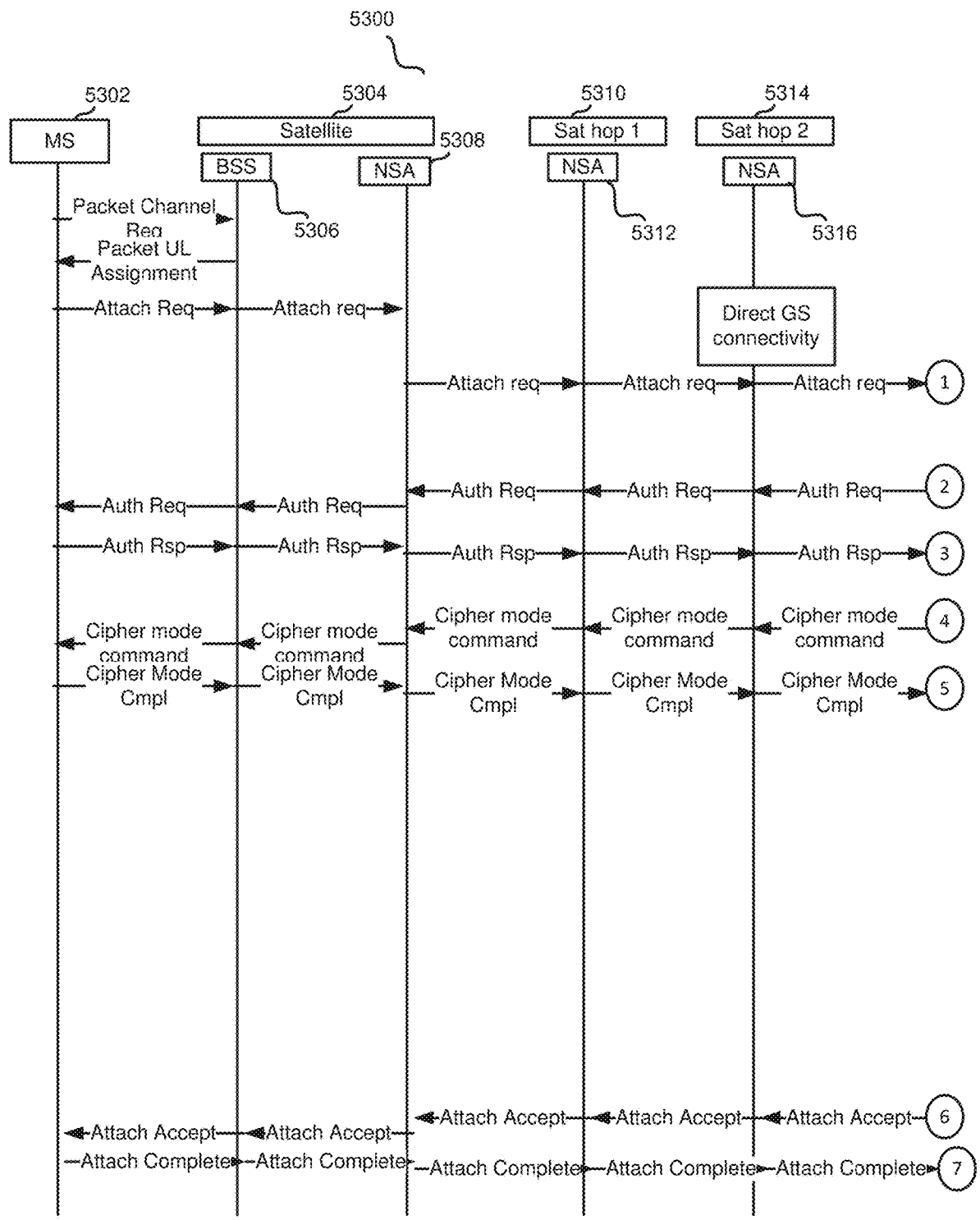
FIG. 53, comprising FIG. 53A and FIG. 53B together, illustrates the signaling flow of a combined GPRS/IMSI attach procedure, according to an embodiment.
Figure 53B:
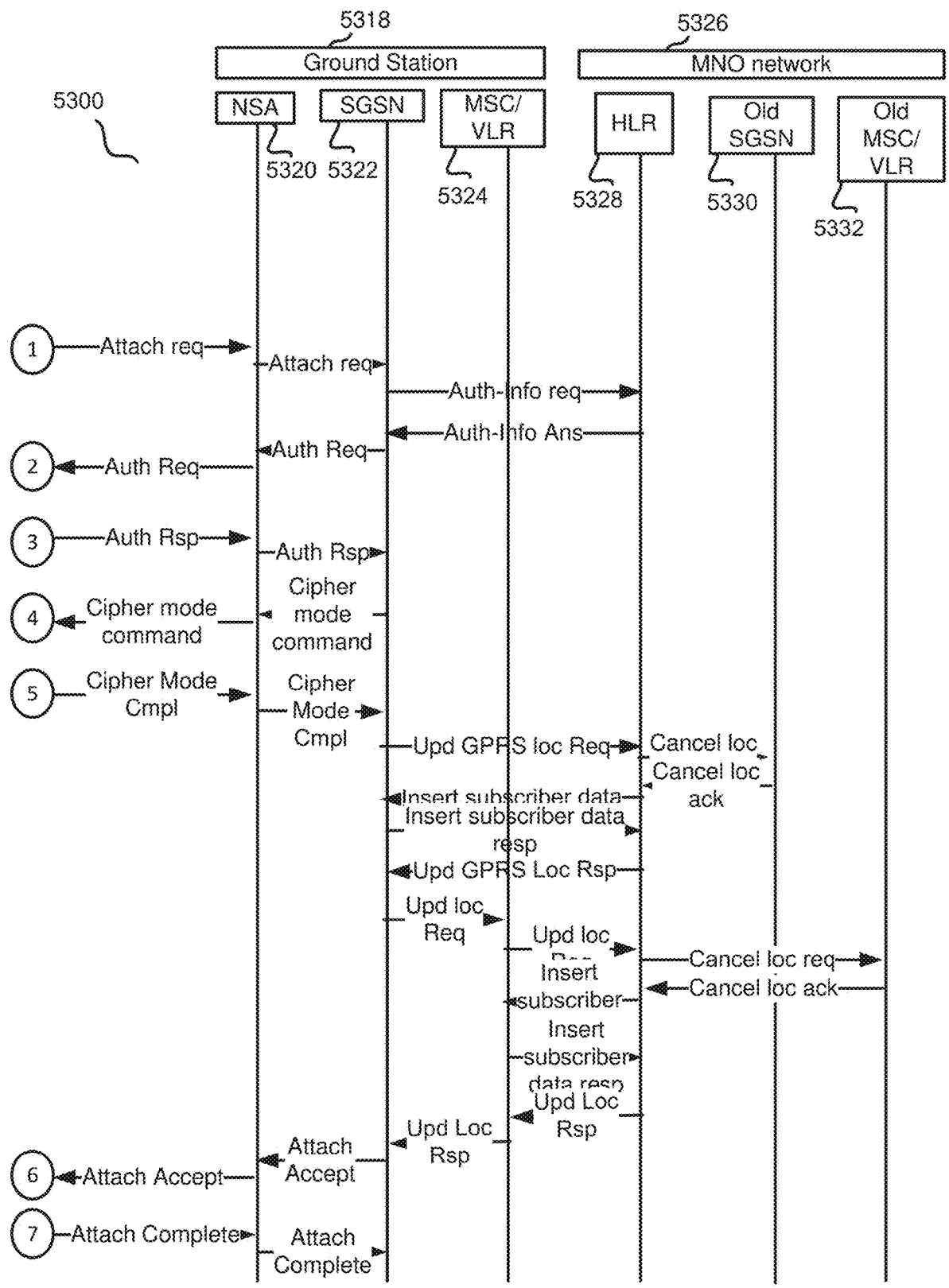

FIG. 53A and FIG. 53B together, illustrate an embodiment of a Combined GPRS/IMSI Attach procedure as initiated by a mobile station 5302 in a satellite network that can have connectivity to a ground station 5318. It illustrates one embodiment where the satellite 5304 can be connected to a ground station 5318 via hops using satellites 5310 and 5314. All the messages from the mobile station 5302 can be forwarded to the ground station 5318 and the mobile station 5302's home MNO network 5326 through hops over satellites 5310 and 5314 and all the messages from the mobile station 5302's home MNO network 5326 can be forwarded to the mobile station 5302 via the ground station 5318 and hops over satellites 5310 and 5314. The NSA components 5308, 5312 and 5316 on the satellites 5304, 5310 and 5314 and the NSA component 5320 on the ground station 5318 may maintain a session and track the status of the transactions across the session till it terminates. The NSA components 5308, 5312 and 5316 on the satellites 5304, 5310 and 5314 and the NSA component 5320 on the ground station 5318 may store the session information and metadata related to the session such as timestamps, location etc. for future analysis and/or reference.

Figure 54A:
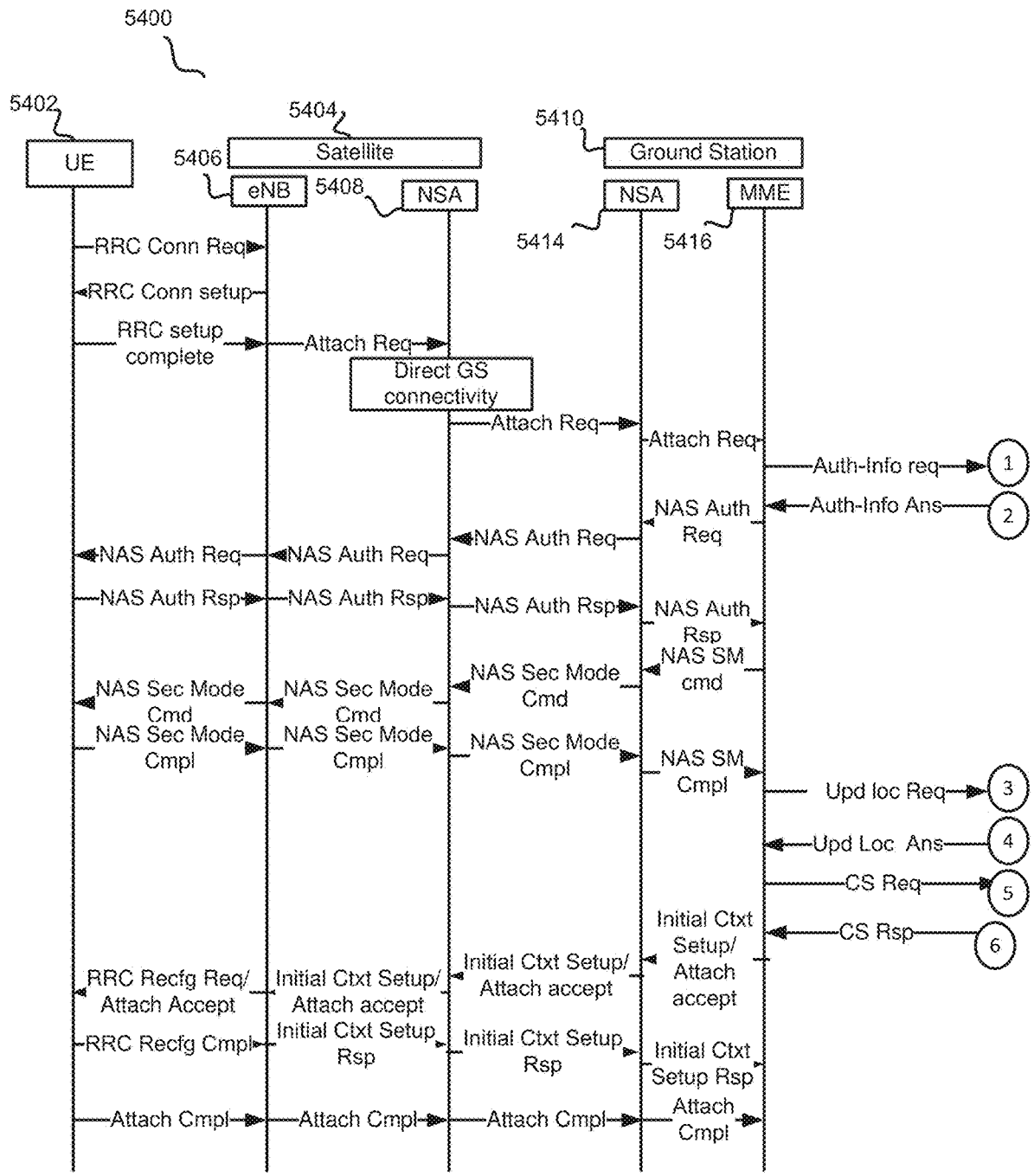
FIG. 54, comprising FIG. 54A and FIG. 54B together, illustrates the signaling flow of an EPS attach procedure, according to an embodiment.
Figure 54B:
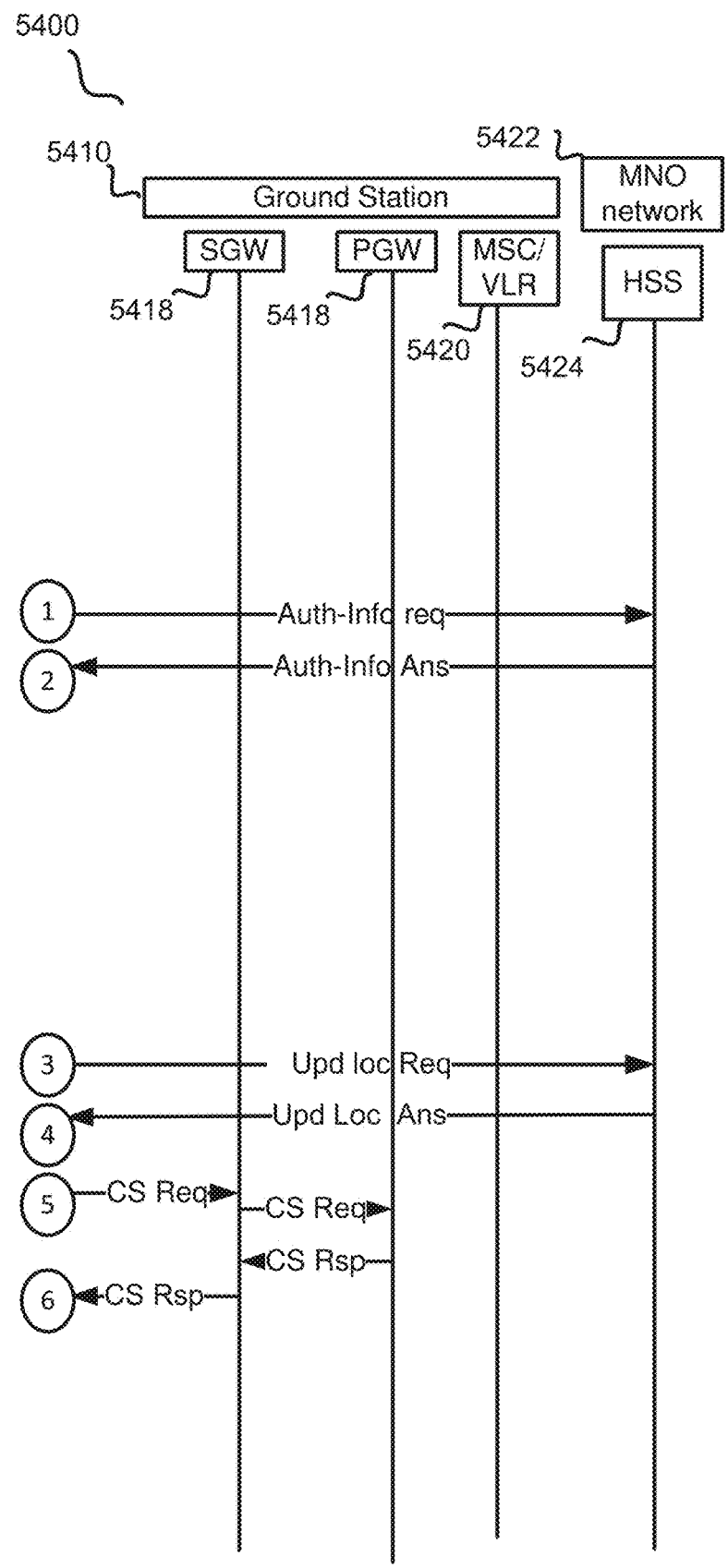

FIG. 54A and FIG. 54B together, illustrate an embodiment of a UE 5402 initiating an attach procedure for EPS services in a satellite network that can have direct connectivity to a ground station 5410. It illustrates one embodiment where the satellite 5404 can be directly connected to a ground station 5410. All the messages from the UE 5402 can be sent to the ground station 5410 and the UE 5402's home MNO network 5422 and all the messages from the UE 5402's home MNO network 5422 can be forwarded to the UE 5402 via the ground station 5410. The NSA component 5408 on the satellite 5404 and the NSA component 5414 on the ground station 5410 may maintain a session and track the status of the transactions across the session till it terminates. The NSA component 5408 on the satellite 5404 and the NSA component 5414 on the ground station 5410 may store the session information and metadata related to the session such as timestamps, location etc. for future analysis and/or reference.

Figure 55A:
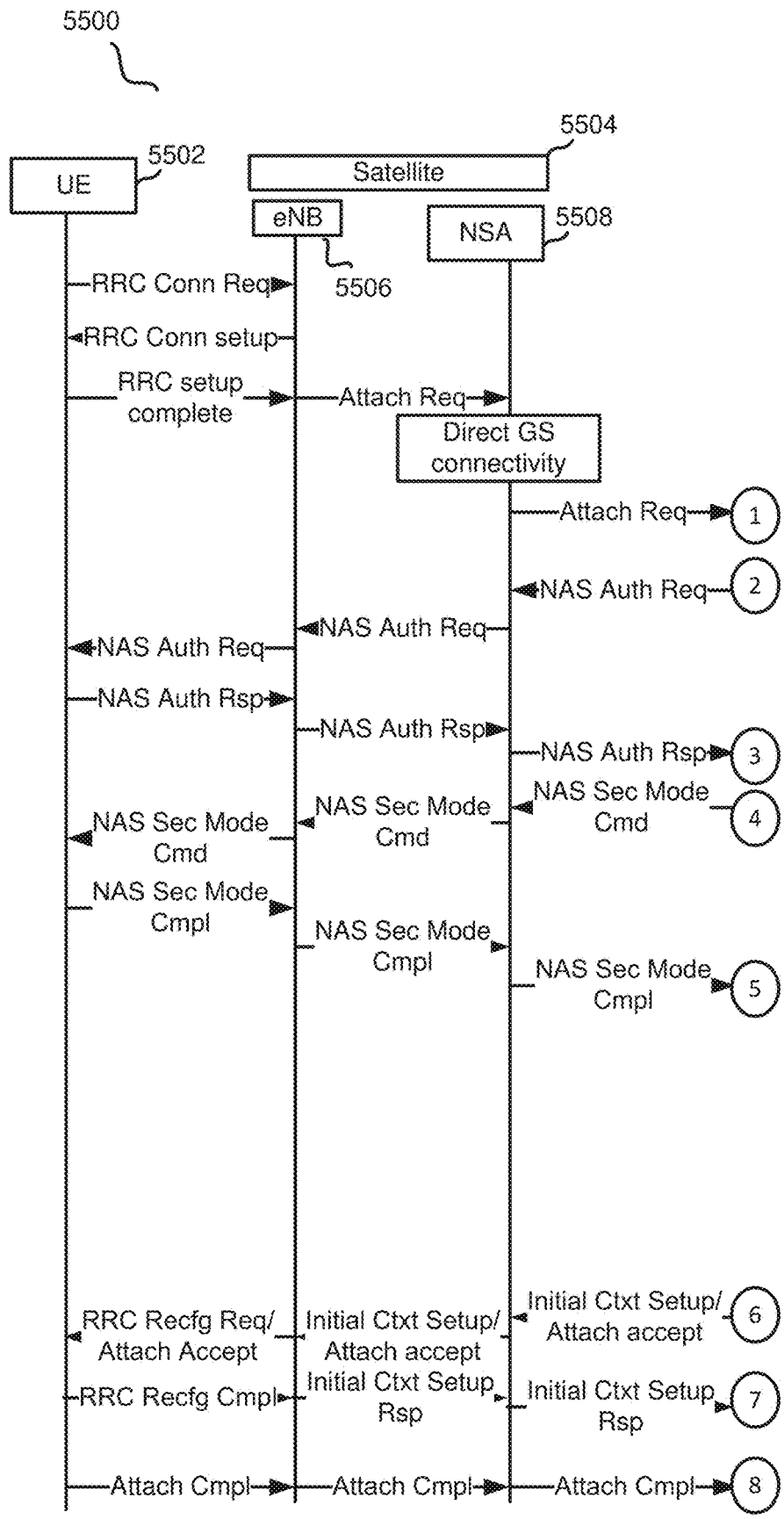
FIG. 55, comprising FIG. 55A and FIG. 55B together, illustrates the signaling flow of a combined EPS/IMSI attach procedure, according to an embodiment.
Figure 55B:
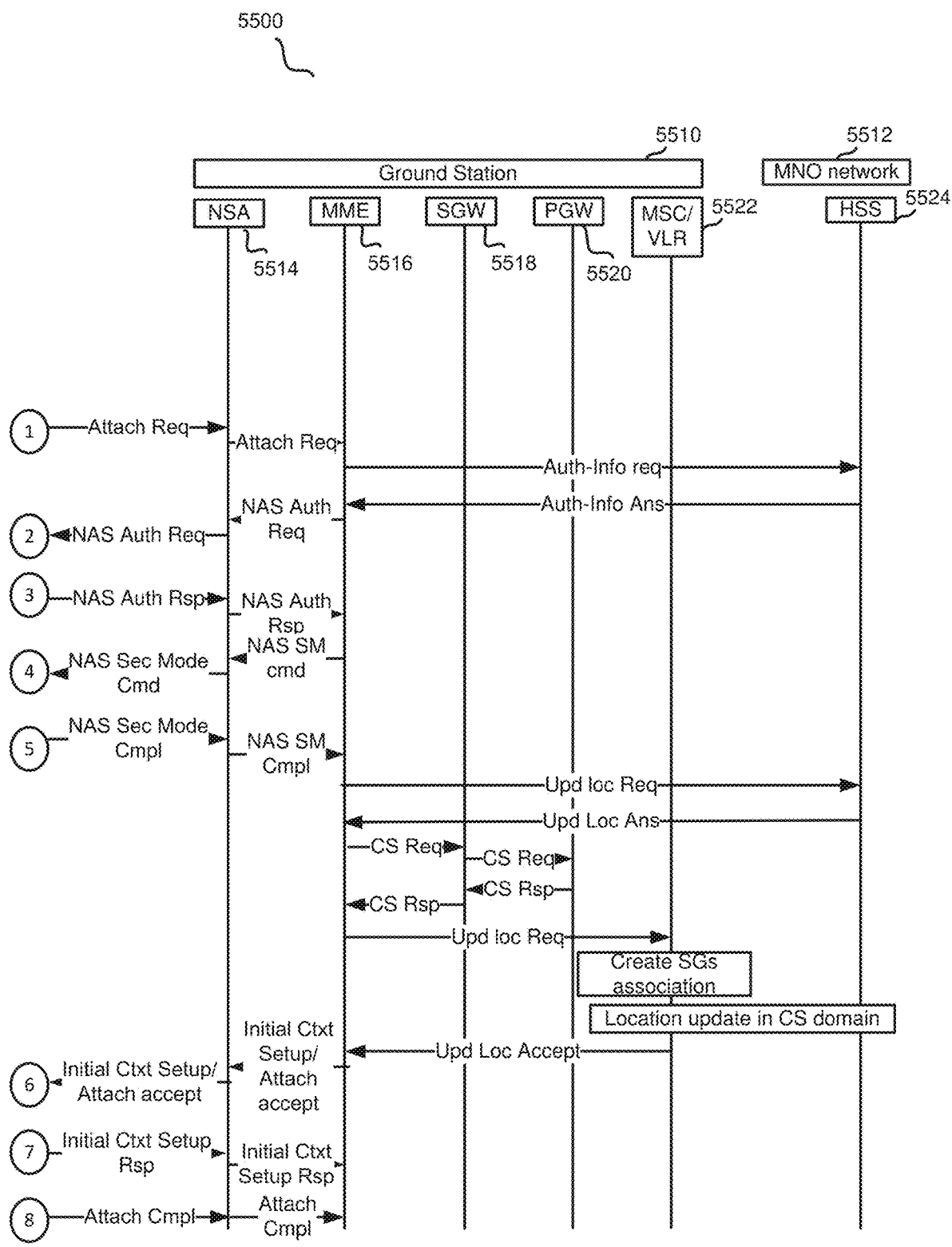

FIG. 55A and FIG. 55B together, illustrate an embodiment of a call flow for a combined (EPS/IMSI) attach from a UE 5502 requiring EPS and non-EPS services over an LTE capable satellite network that can have direct connectivity to a ground station 5510. It illustrates one embodiment where the satellite 5504 can be directly connected to a ground station 5510. All the messages from UE 5502 (user equipment, mobile station, etc.) can be sent to the ground station 5510 and UE 5502's home MNO network 5512 and all the messages from UE 5502's home MNO network 5512 can be forwarded to UE 5502 via the ground station 5510. The NSA component 5508 on the satellite 5504 and the NSA component 5514 on the ground station 5510 may maintain a session and track the status of the transactions across the session until it terminates. The NSA component 5508 on the satellite 5504 and the NSA component 5514 on the ground station 5510 may store the session information and metadata related to the session such as timestamps, location etc. for future analysis and/or reference.

There may be different types of update procedures that can be accepted from a satellite network subscribed user, including, but not limited to an LA update, wherein a GSM only user may update location area while roaming on satellite's GSM network, an LA/RA update, wherein an MS that is both GPRS-attached and IMSI-attached may perform the Combined RA/LA Update procedures, and a Combined TA/LA, wherein a UE that is both EPS-attached and IMSI-attached may perform combined TA/LA update procedures.

Figure 56A:
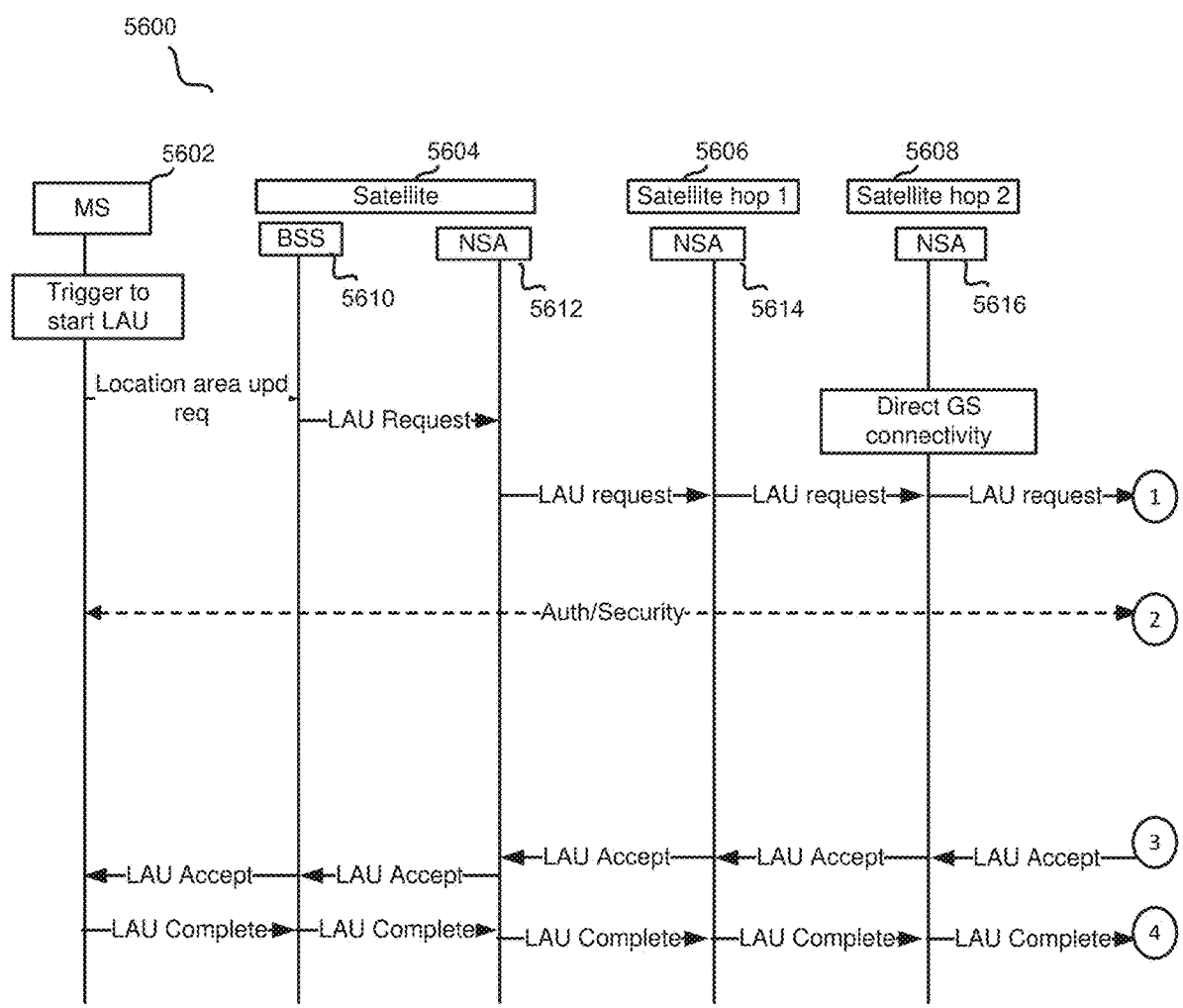
FIG. 56, comprising FIG. 56A and FIG. 56B together, illustrates the signaling flow of a location area update procedure by an IMSI attached subscriber, according to an embodiment.
Figure 56B:
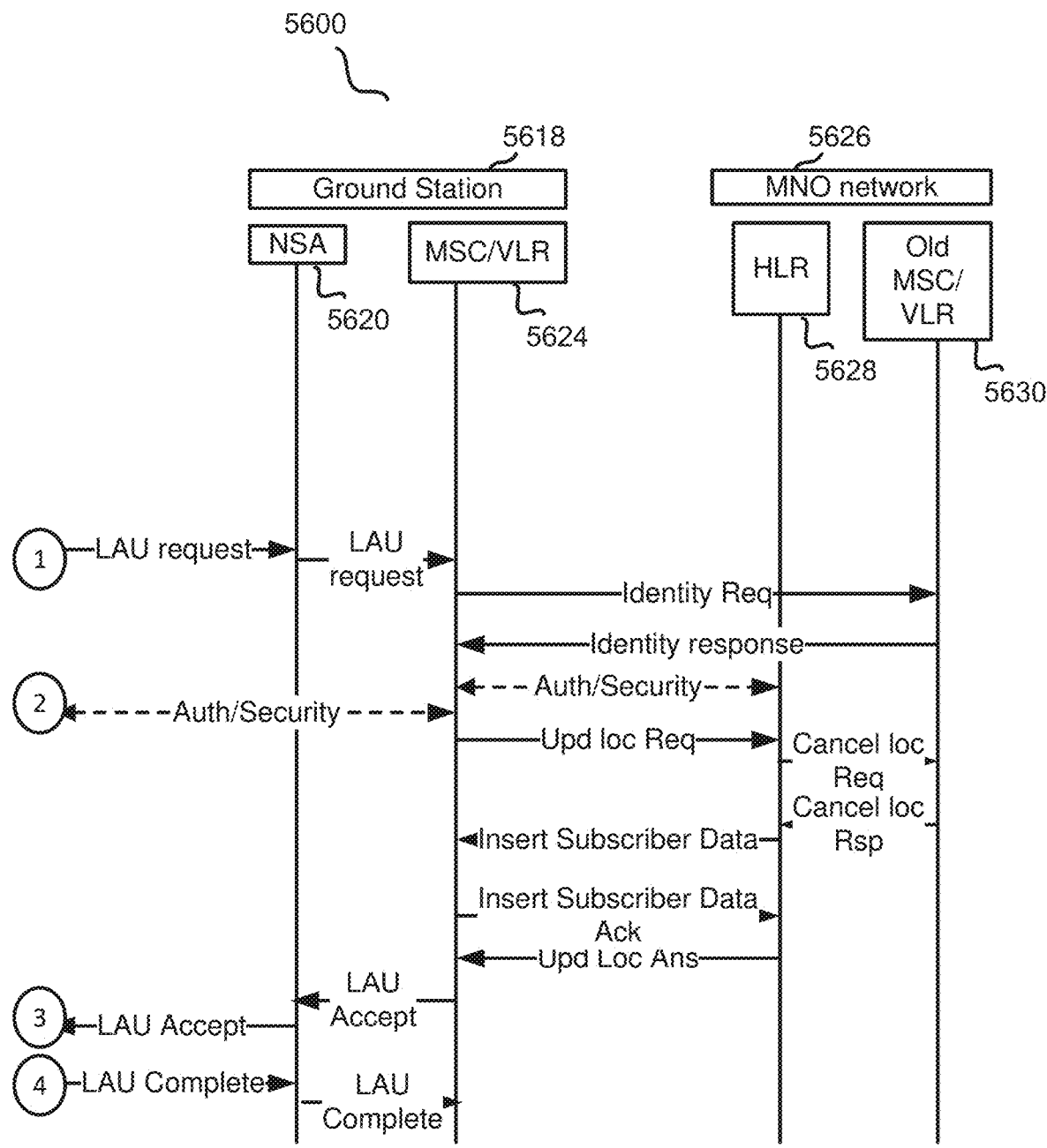

FIG. 56A and FIG. 56B together, illustrate an embodiment of a signaling flow when an MS 5602 that can operate in a CS only mode (IMSI Attached) can initiate a location area update procedure using the old LAI and old TMSI in a satellite network that can have connectivity to a ground station 5618. It illustrates one embodiment where the satellite 5604 can be connected to a ground station 5618 via hops using satellites 5606 and 5608. The old MSC/VLR 5630 can be the one in MS 5602's home MNO network 5626 or can potentially be any terrestrial MSC/VLR the user has been previously camped on. The new MSC/VLR 5624 may allocate a new TMSI and MS 5602 can include a TMSI reallocation complete message in LAU complete back to the new MSC/VLR 5624. When the MS 5602 includes IMSI in location update request (say in a case where the MS 5602 turned on without any information on previous location area), then the identity request and response messages, shown in the flow, may not occur towards the old MSC/VLR 5630. The NSA components 5612, 5614 and 5616 on the satellites 5604, 5606 and 5608 and the NSA component 5620 on the ground station 5618 may maintain a session and track the status of the transactions across the session until it terminates. The NSA components 5612, 5614 and 5616 on the satellites 5604, 5606 and 5608 and the NSA component 5620 on the ground station 5618 may store the session information and metadata related to the session such as timestamps, location etc. for future analysis and/or reference.

Figure 57A:
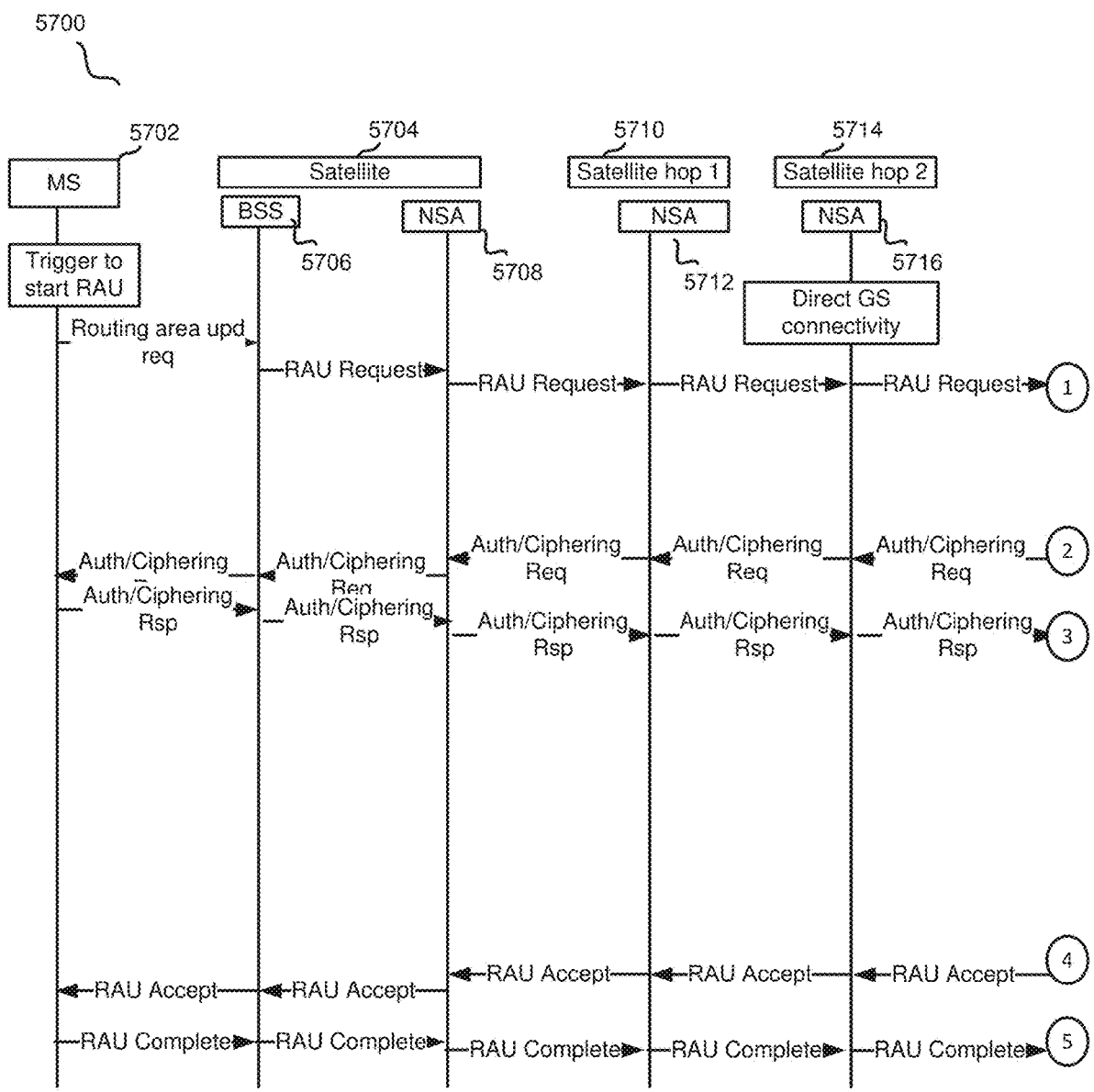
FIG. 57, comprising FIG. 57A and FIG. 57B together, illustrates the signaling flow of a routing area update procedure by a PS only subscriber, according to an embodiment.
Figure 57B:
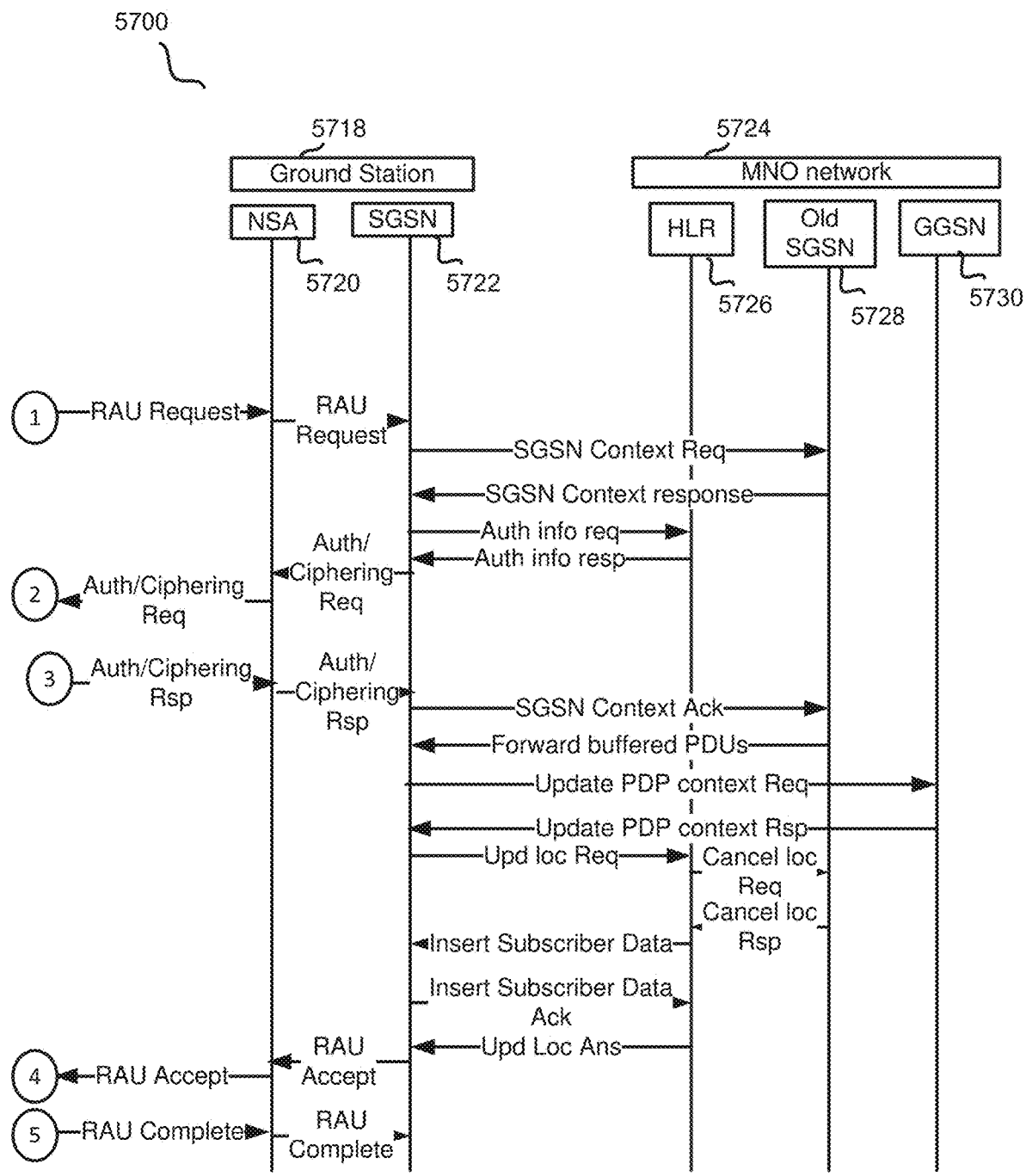

FIG. 57A and FIG. 57B together, illustrate an embodiment of a signaling flow when an MS 5702 used in a PS only mode (GPRS Attached) can initiate a routing area update procedure using the old RAI in a satellite network that can have connectivity to a ground station 5718. It illustrates one embodiment where the satellite 5704 can be connected to a ground station 5718 via hops using satellites 5710 and 5714. The old SGSN 5728 can be the one in MS 5702's home MNO network 5724 or can potentially be some terrestrial SGSN the user has been previously camped on. The new SGSN 5722 may allocate a new TMSI, and MS 5702 can include a TMSI reallocation complete message in RAU complete back to the new SGSN 5722. When the MS 5702 includes IMSI in location update request (say in a case where the MS 5702 turned on without any information on previous location area), then the identity request and response messages, shown in the flow, may not occur towards the old SGSN 5728. The NSA components 5708, 5712 and 5716 on the satellites 5704, 5710 and 5714 and the NSA component 5720 on the ground station 5718 may maintain a session and track the status of the transactions across the session until it terminates. The NSA components 5708, 5712 and 5716 on the satellites 5704, 5710 and 5714 and the NSA component 5720 on the ground station 5718 may store the session information and metadata related to the session such as timestamps, location etc. for future analysis and/or reference.

Figure 58A:
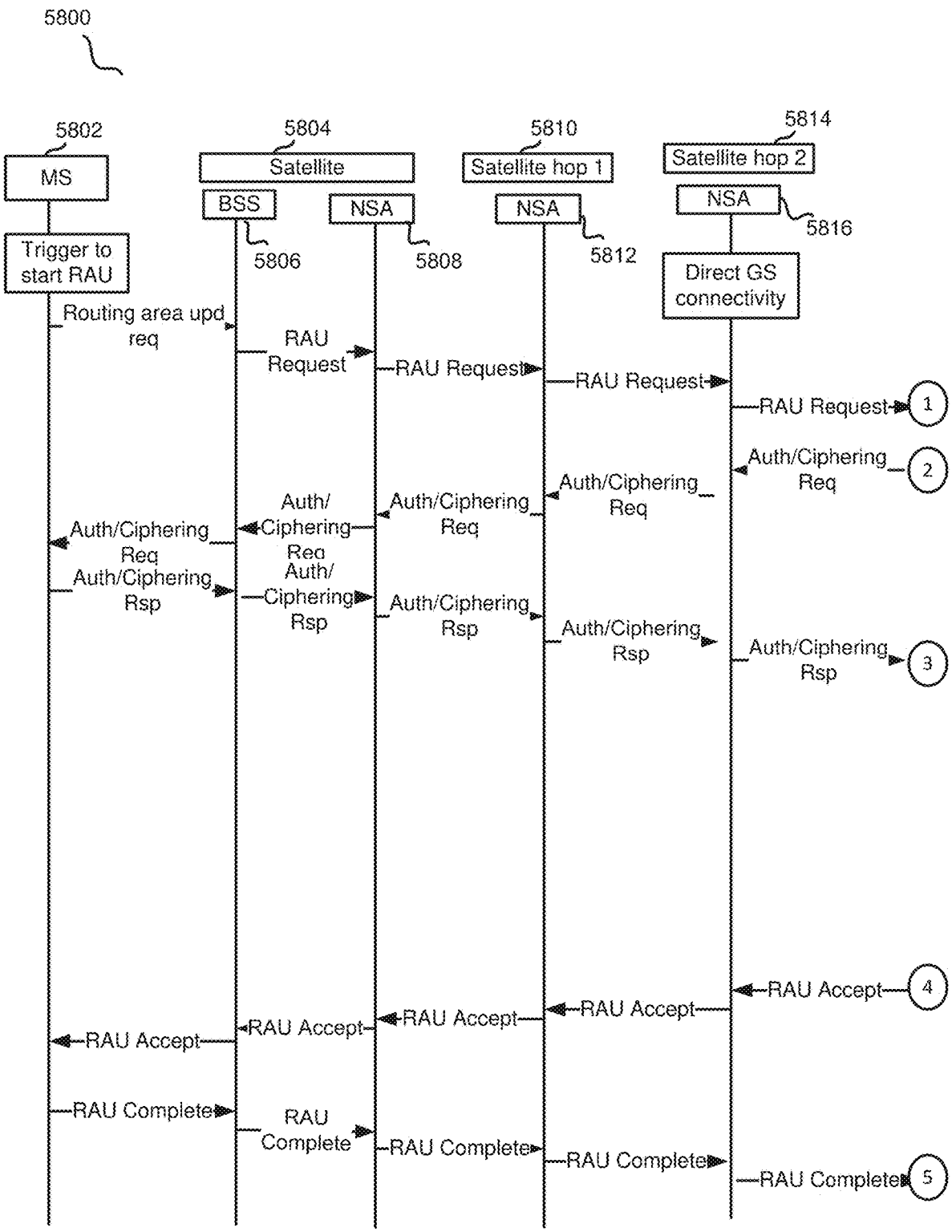
FIG. 58, comprising FIG. 58A and FIG. 58B together, illustrates the signaling flow of a combined location area update procedure, according to an embodiment.
Figure 58B:
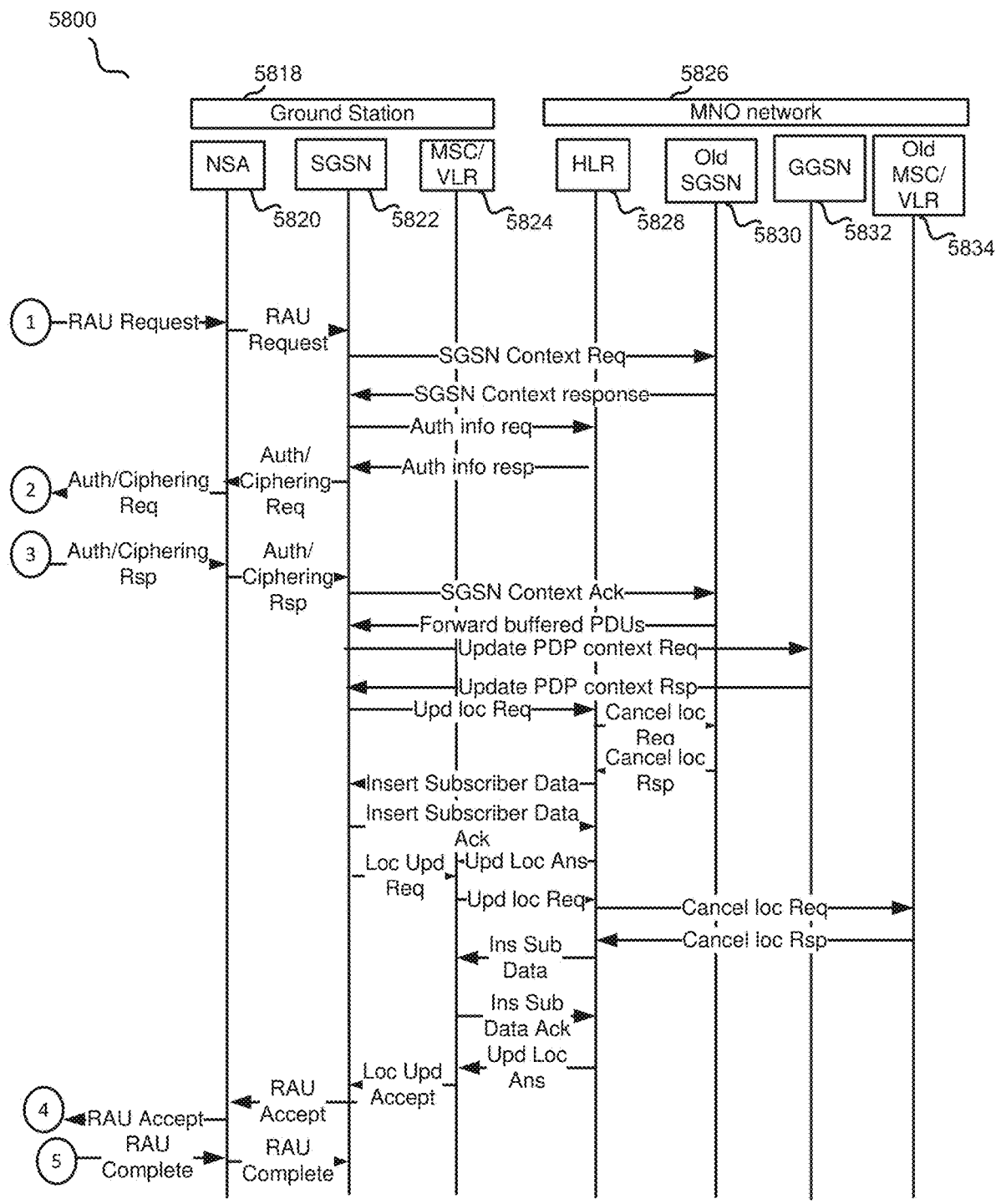

FIG. 58A and FIG. 58B together, illustrate an embodiment of a signaling flow when a MS 5802 that is GPRS attached and IMSI attached may trigger a combined RA/LA update procedure in a satellite network that can have connectivity to a ground station 5818. It illustrates one embodiment where the satellite 5804 can be connected to a ground station 5818 via hops using satellites 5810 and 5814. In an idle mode, MS 5802 can send a routing area update request indicating that an LA update may also need to be performed, in which case the new SGSN 5822 forwards the LA update to the VLR of MSC/VLR 5824. The NSA components 5808, 5812 and 5816 on the satellites 5804, 5810 and 5814 and the NSA component 5820 on the ground station 5818 may maintain a session and track the status of the transactions across the session until it terminates. The NSA components 5808, 5812 and 5816 on the satellites 5804, 5810 and 5814 and the NSA component 5820 on the ground station 5818 may store the session information and metadata related to the session such as timestamps, location etc. for future analysis and/or reference.

Figure 59A:
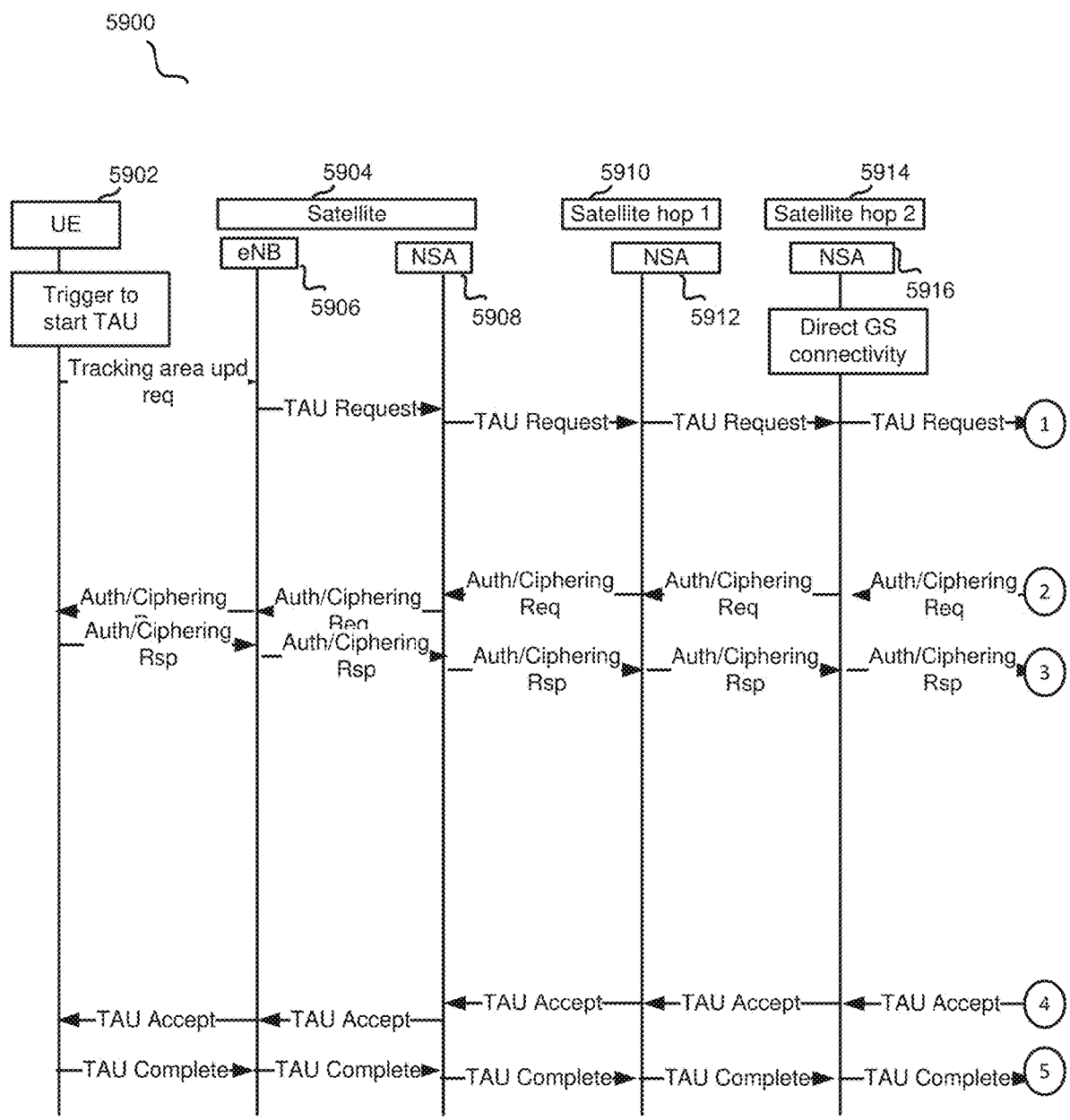
FIG. 59, comprising FIG. 59A and FIG. 59B together, illustrates the signaling flow of a tracking area update procedure by an EPS attached subscriber, according to an embodiment.
Figure 59B:
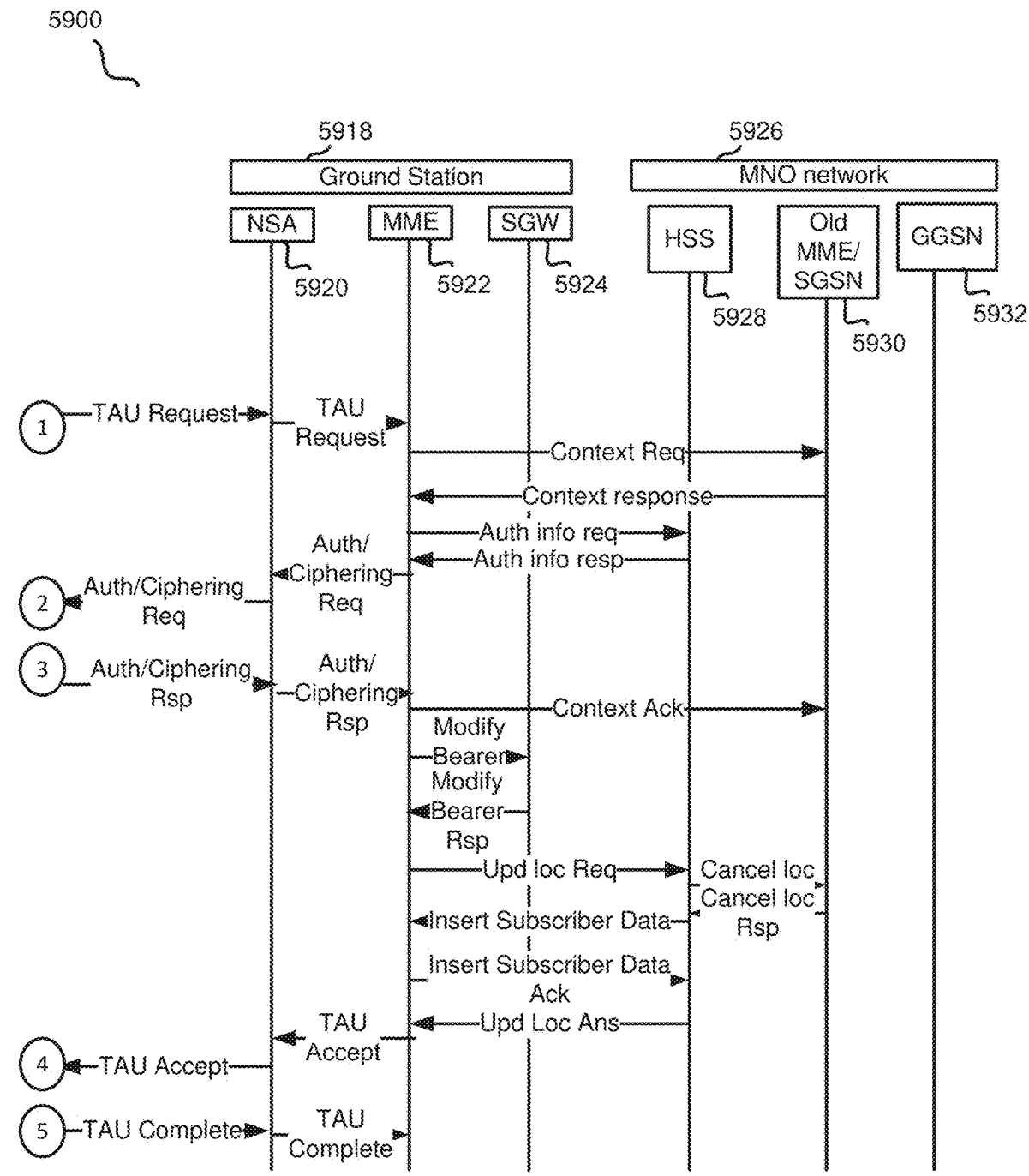

FIG. 59A and FIG. 59B together, illustrate an embodiment of a signaling flow when a UE 5902 that is E-UTRAN attached can trigger a tracking area update procedure in a satellite network that can have connectivity to a ground station 5918. It illustrates one embodiment where the satellite 5904 can be connected to a ground station 5918 via hops using satellites 5910 and 5914. The NSA components 5908, 5912 and 5916 on the satellites 5904, 5910 and 5914 and the NSA component 5920 on the ground station 5918 may maintain a session and track the status of the transactions across the session until it terminates. The NSA components 5908, 5912 and 5916 on the satellites 5904, 5910 and 5914 and the NSA component 5920 on the ground station 5918 may store the session information and metadata related to the session such as timestamps, location etc. for future analysis and/or reference.

Figure 60A:
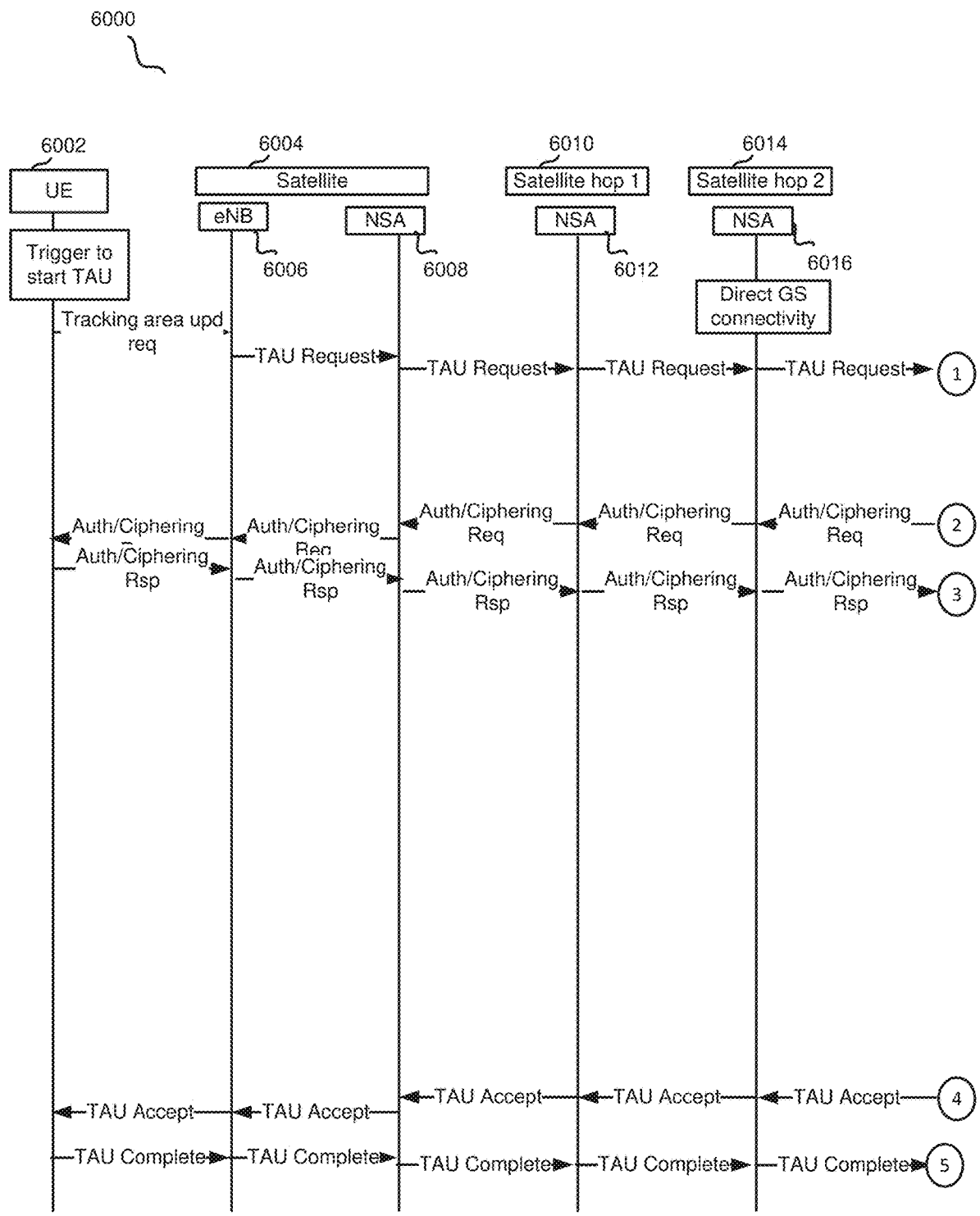
FIG. 60, comprising FIG. 60A and FIG. 60B together, illustrates the signaling flow of a combined tracking area and location area update procedure, according to an embodiment.
Figure 60B:
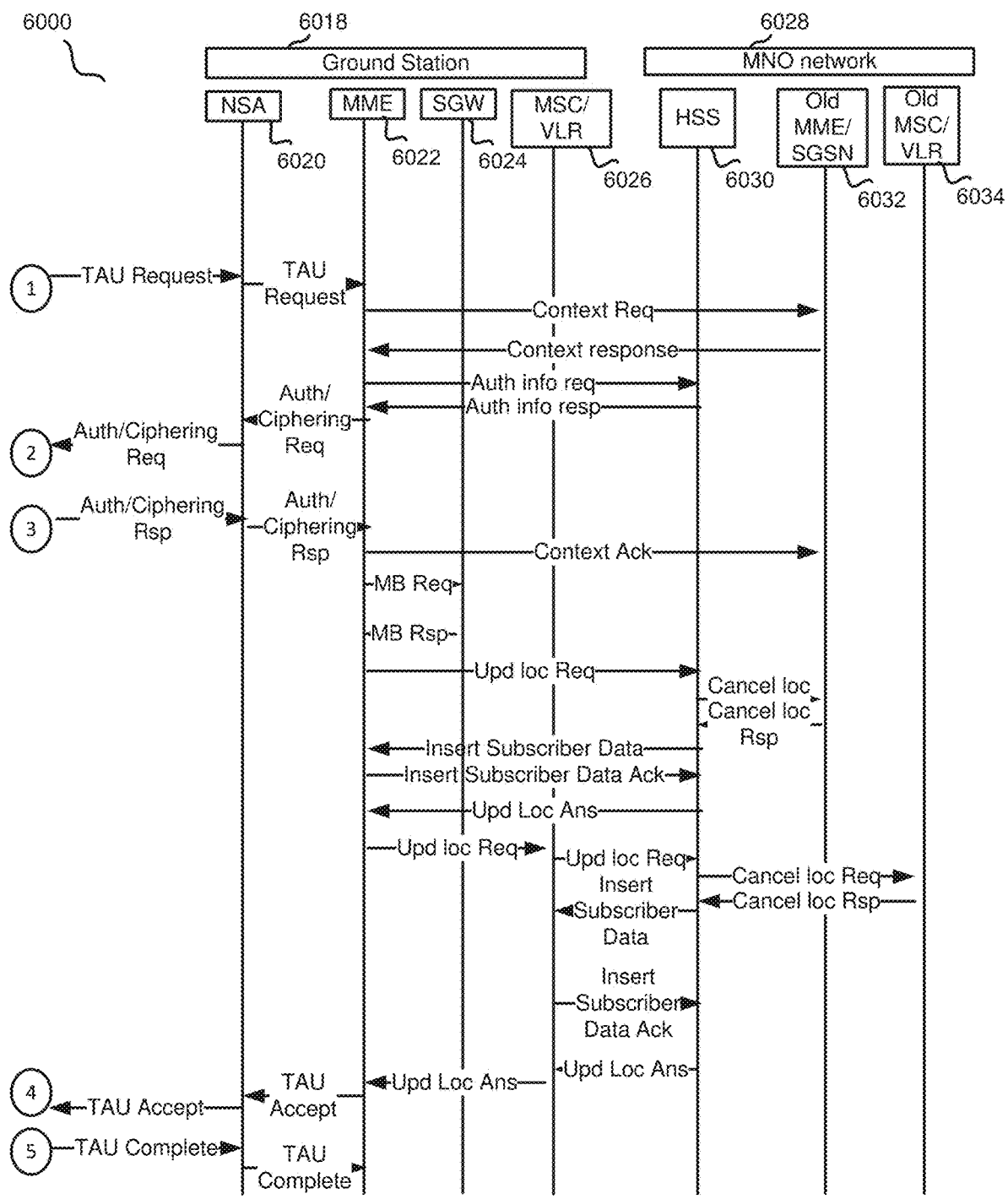

FIG. 60A and FIG. 60B together, illustrate an embodiment of a signaling flow when a UE 6002 that is E-UTRAN attached can trigger a tracking area update procedure in a satellite network that can have connectivity to a ground station 6018. It illustrates one embodiment where the satellite 6004 can be connected to a ground station 6018 via hops using satellites 6010 and 6014. The NSA components 6008, 6012 and 6016 on the satellites 6004, 6010 and 6014 and the NSA component 6020 on the ground station 6018 may maintain a session and track the status of the transactions across the session until it terminates. The NSA components 6008, 6012 and 6016 on the satellites 6004, 6010 and 6014 and the NSA component 6020 on the ground station 6018 may store the session information and metadata related to the session such as timestamps, location etc. for future analysis and/or reference.

Figure 61:
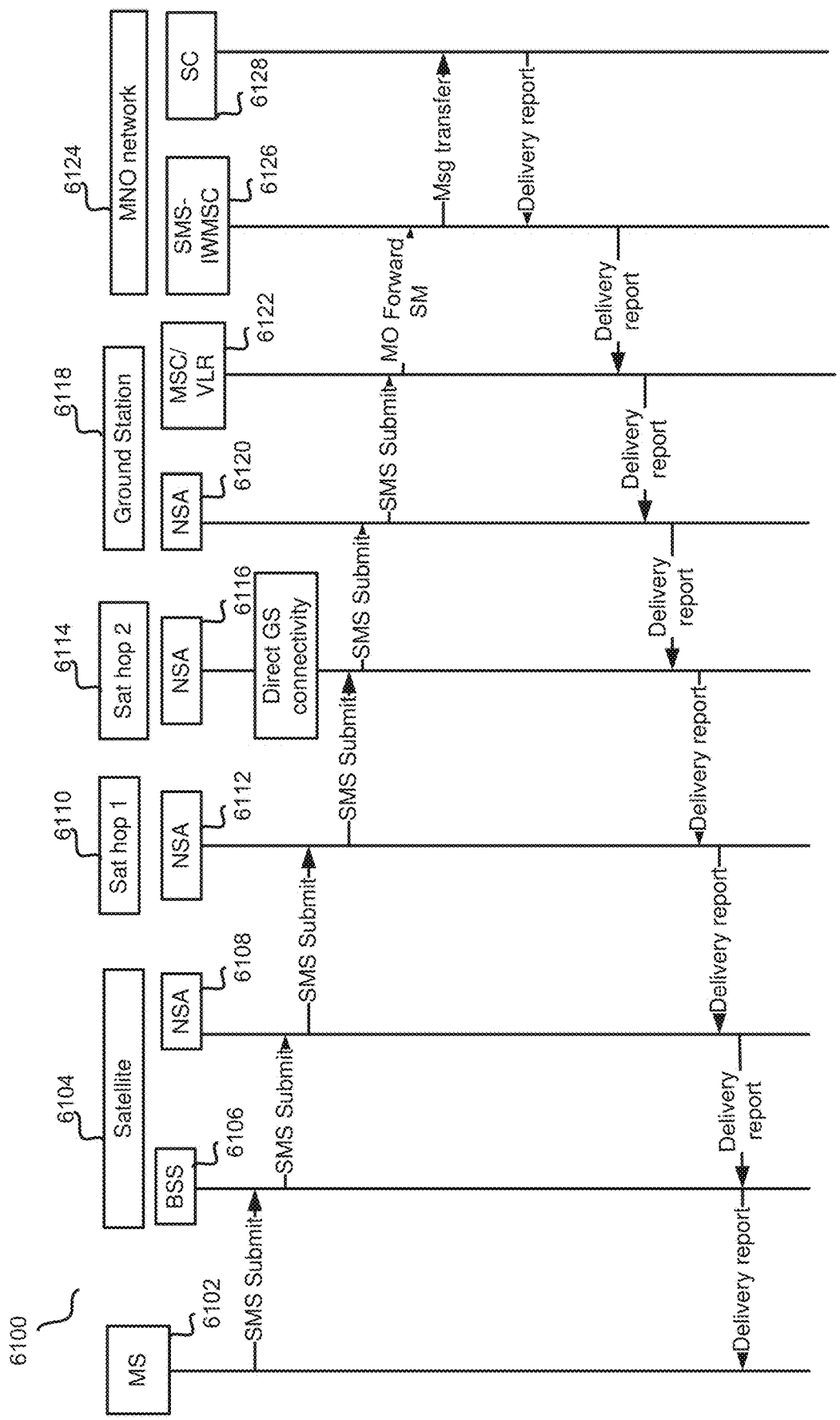
FIG. 61 illustrates the signaling flow of a mobile originated SMS over GSM from a MS, according to an embodiment.

Depending on the mode and capabilities of the user equipment, SMS can be sent over GSM, GPRS or LTE network elements. FIG. 61 illustrates an embodiment of a signaling flow of a mobile originated SMS over GSM MSC/VLR 6122 from a MS 6102 to its home network 6124's Service Center 6128 in a satellite network with connectivity to a ground station 6118 via hops using satellites 6110 and 6114. The NSA components 6108, 6112 and 6116 on the satellites 6104, 6110 and 6114 and the NSA component 6120 on the ground station 6118 may maintain a session and track the status of the transactions across the session until it terminates. The NSA components 6108, 6112 and 6116 on the satellites 6104, 6110 and 6114 and the NSA component 6120 on the ground station 6118 may store the session information and metadata related to the session such as timestamps, location etc. for future analysis and/or reference.

Figure 62:
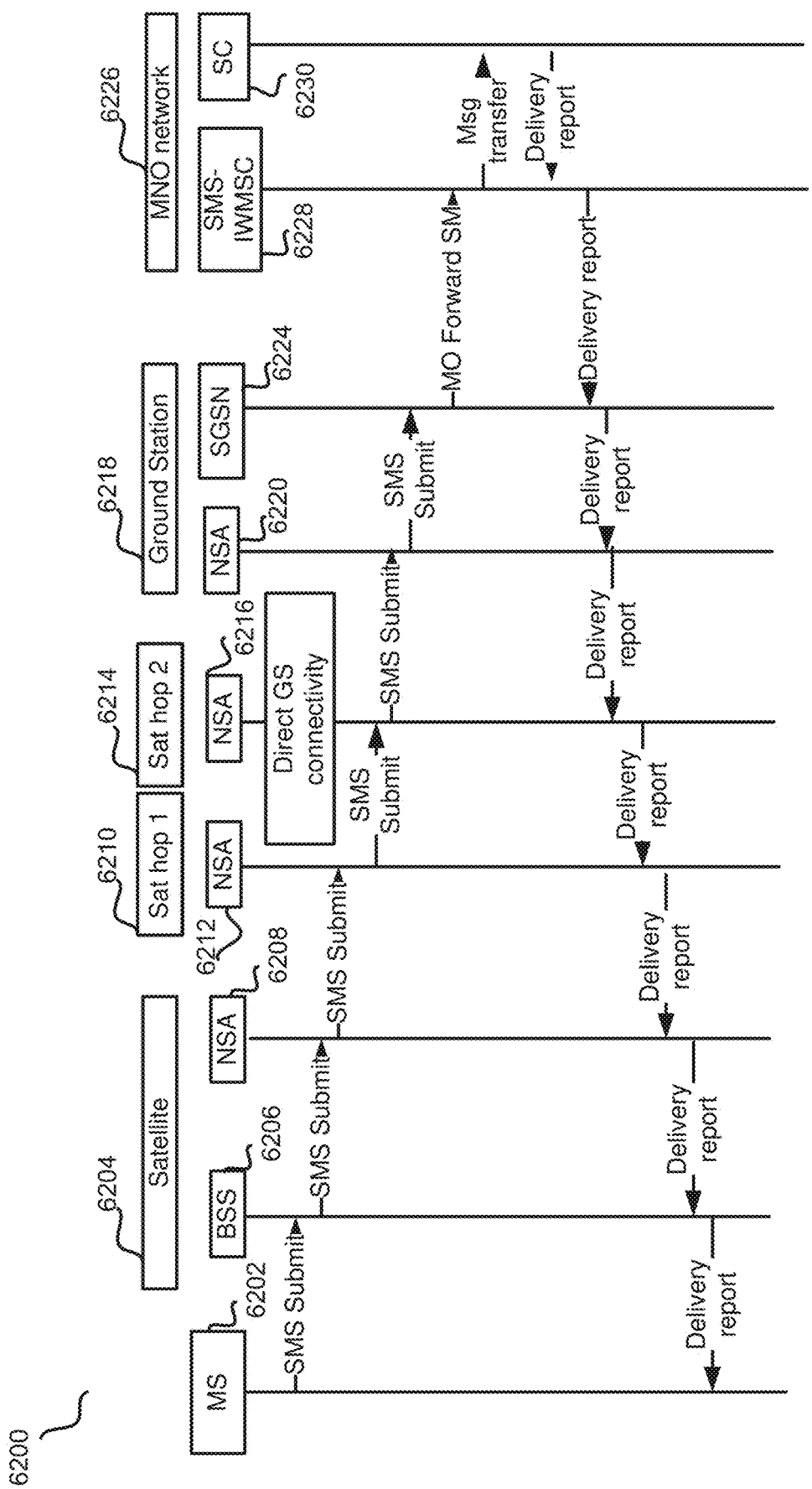
FIG. 62 illustrates the signaling flow of a mobile originated SMS over GPRS from a MS, according to an embodiment.

FIG. 62 illustrates an embodiment of a signaling flow of a mobile originated SMS over GPRS SGSN 6224 from a MS 6202 to its home network 6226's Service Center 6230 in a satellite network with connectivity to a ground station 6218 via hops using satellites 6210 and 6214. The NSA components 6208, 6212 and 6216 on the satellites 6204, 6210 and 6214 and the NSA component 6220 on the ground station 6218 may maintain a session and track the status of the transactions across the session until it terminates. The NSA components 6208, 6212 and 6216 on the satellites 6204, 6210 and 6214 and the NSA component 6220 on the ground station 6218 may store the session information and metadata related to the session such as timestamps, location etc. for future analysis and/or reference.

Figure 63A:
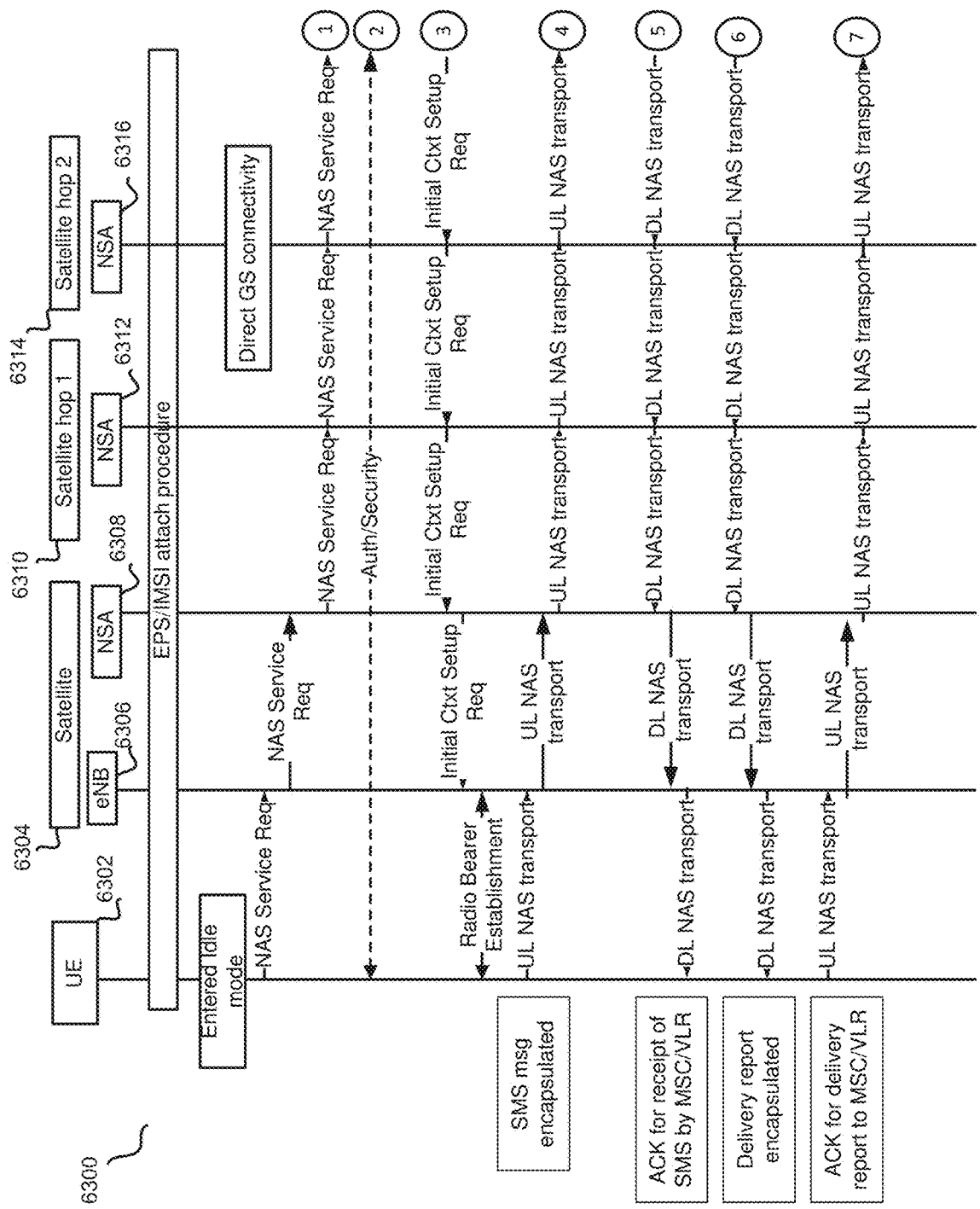
FIG. 63, comprising FIG. 63A and FIG. 63B together, illustrates the signaling flow of a mobile originated SMS over SGs interface from a UE, according to an embodiment.
Figure 63B:
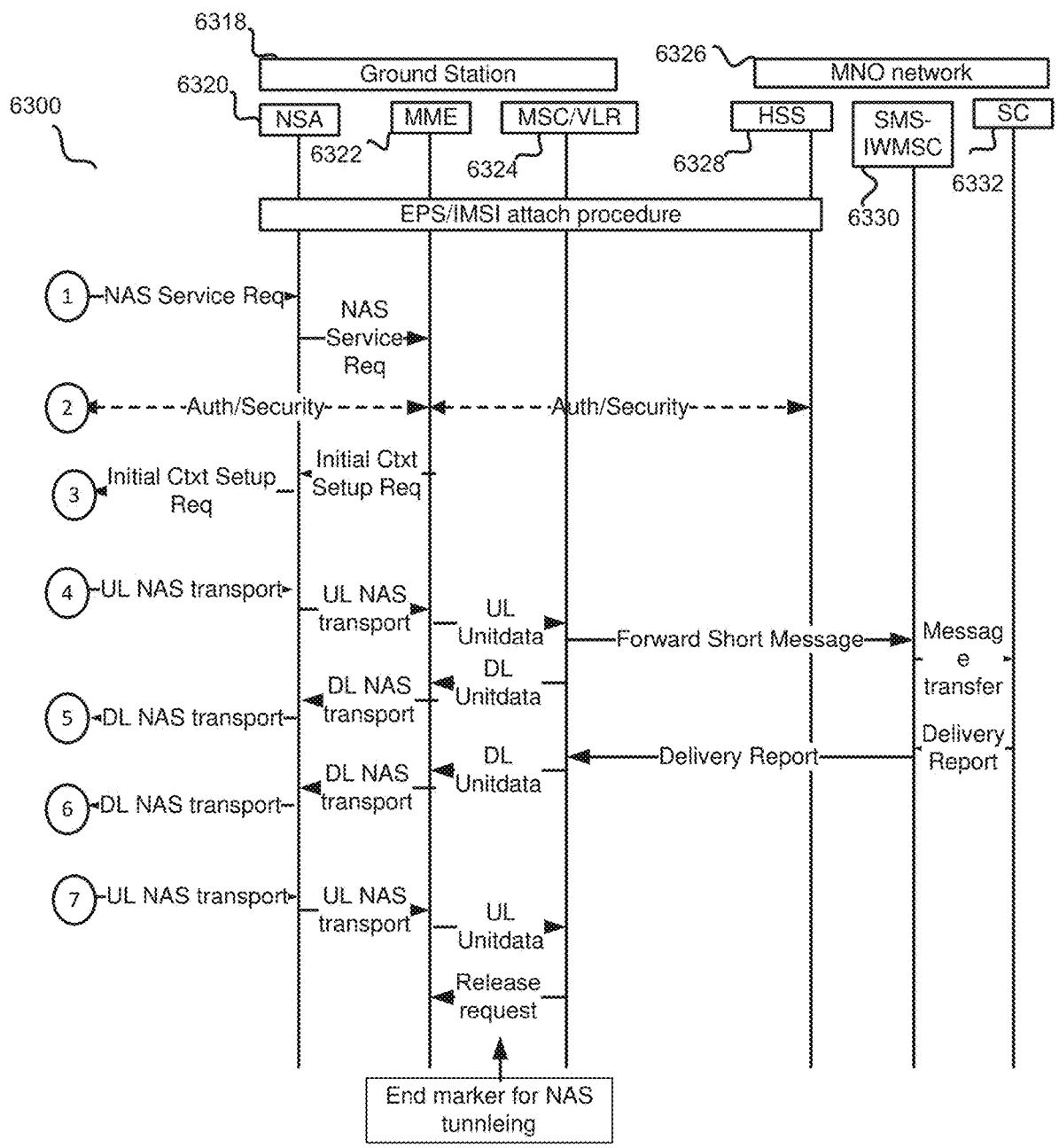

FIG. 63A and FIG. 63B together, illustrate an embodiment of a signaling flow when a user 6302 can send an SMS message over SGs interface between MME 6322 and MSC/VLR 6324 in a satellite network with connectivity to a ground station 6318 via hops using satellites 6310 and 6314. The NSA components 6308, 6312 and 6316 on the satellites 6304, 6310 and 6314 and the NSA component 6320 on the ground station 6318 may maintain a session and track the status of the transactions across the session until it terminates. The NSA components 6308, 6312 and 6316 on the satellites 6304, 6310 and 6314 and the NSA component 6320 on the ground station 6318 may store the session information and metadata related to the session such as timestamps, location etc. for future analysis and/or reference.

Figure 64A:
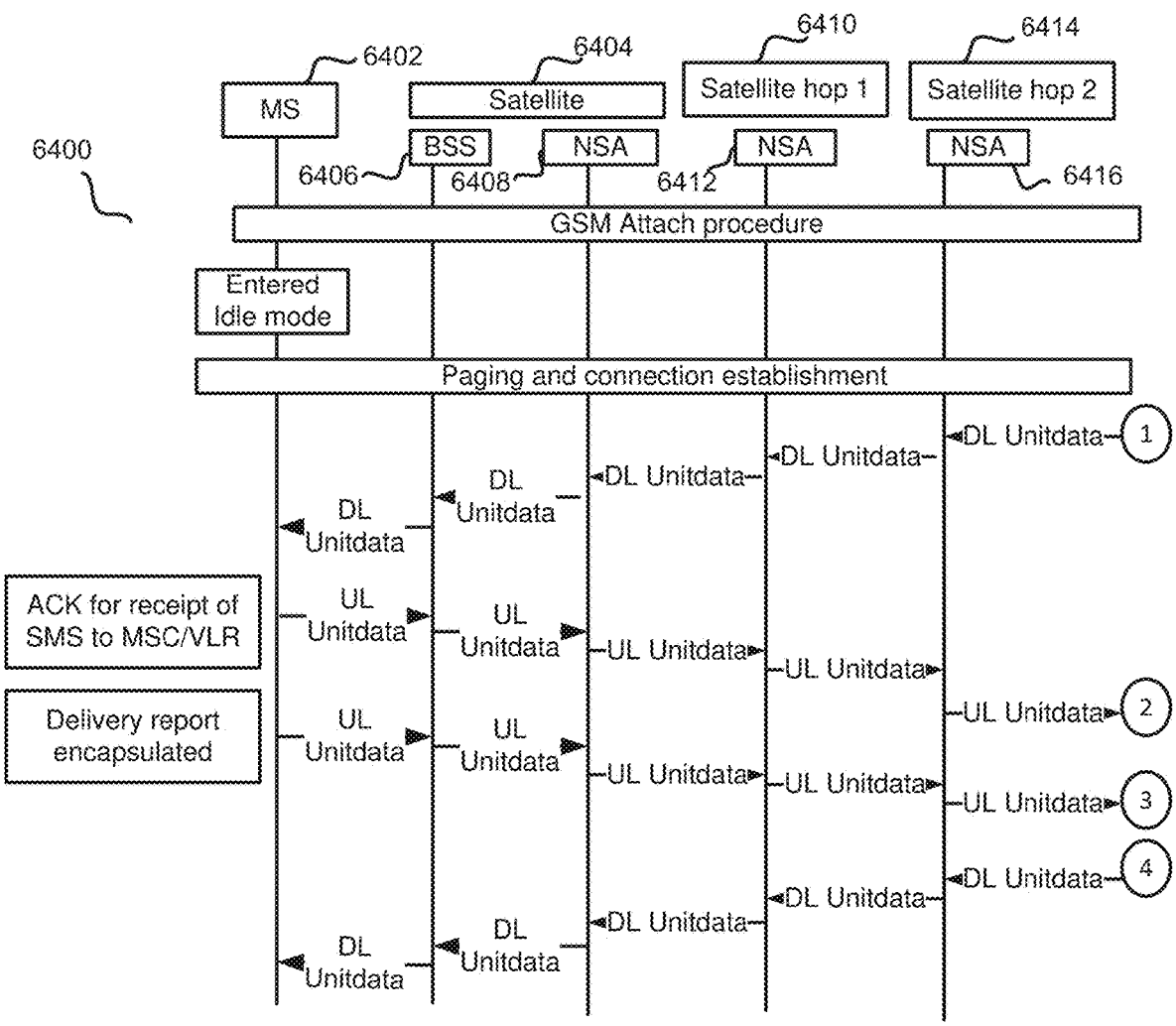
FIG. 64, comprising FIG. 64A and FIG. 64B together, illustrates the signaling flow of a mobile terminated SMS over GSM from a MS, according to an embodiment.
Figure 64B:
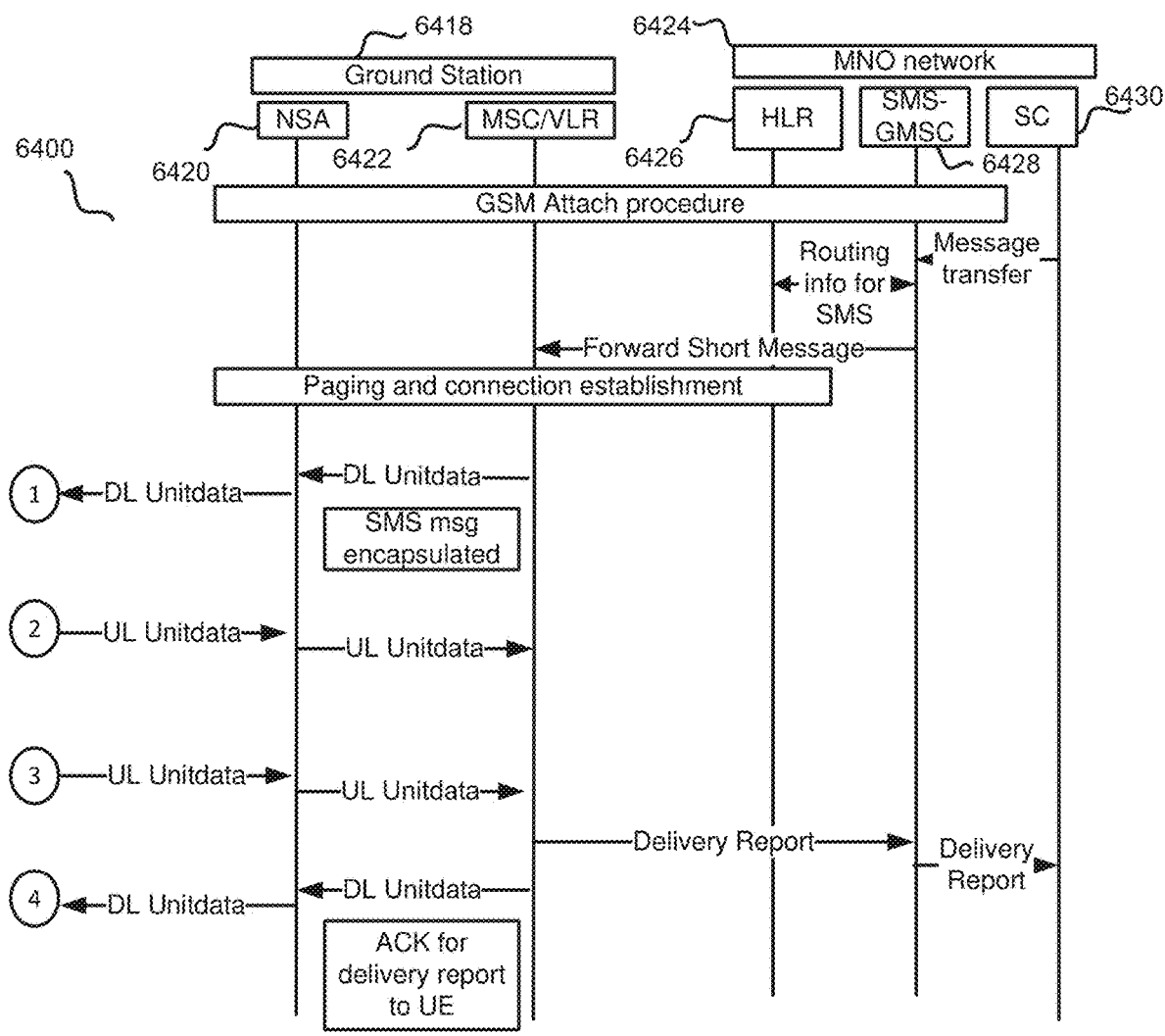

Depending on the network the user attached/registered with, the user can receive SMS over GSM, GPRS or LTE network elements. FIG. 64A and FIG. 64B together, illustrate an embodiment of a signaling flow of a mobile terminated SMS over GSM MSC/VLR 6422 from a MS 6402 to its home network 6424's Service Center 6430 in a satellite network with connectivity to a ground station 6418 via hops using satellites 6410 and 6414. The NSA components 6408, 6412 and 6416 on the satellites 6404, 6410 and 6414 and the NSA component 6420 on the ground station 6418 may maintain a session and track the status of the transactions across the session until it terminates. The NSA components 6408, 6412 and 6416 on the satellites 6404, 6410 and 6414 and the NSA component 6420 on the ground station 6418 may store the session information and metadata related to the session such as timestamps, location etc. for future analysis and/or reference.

Figure 65A:
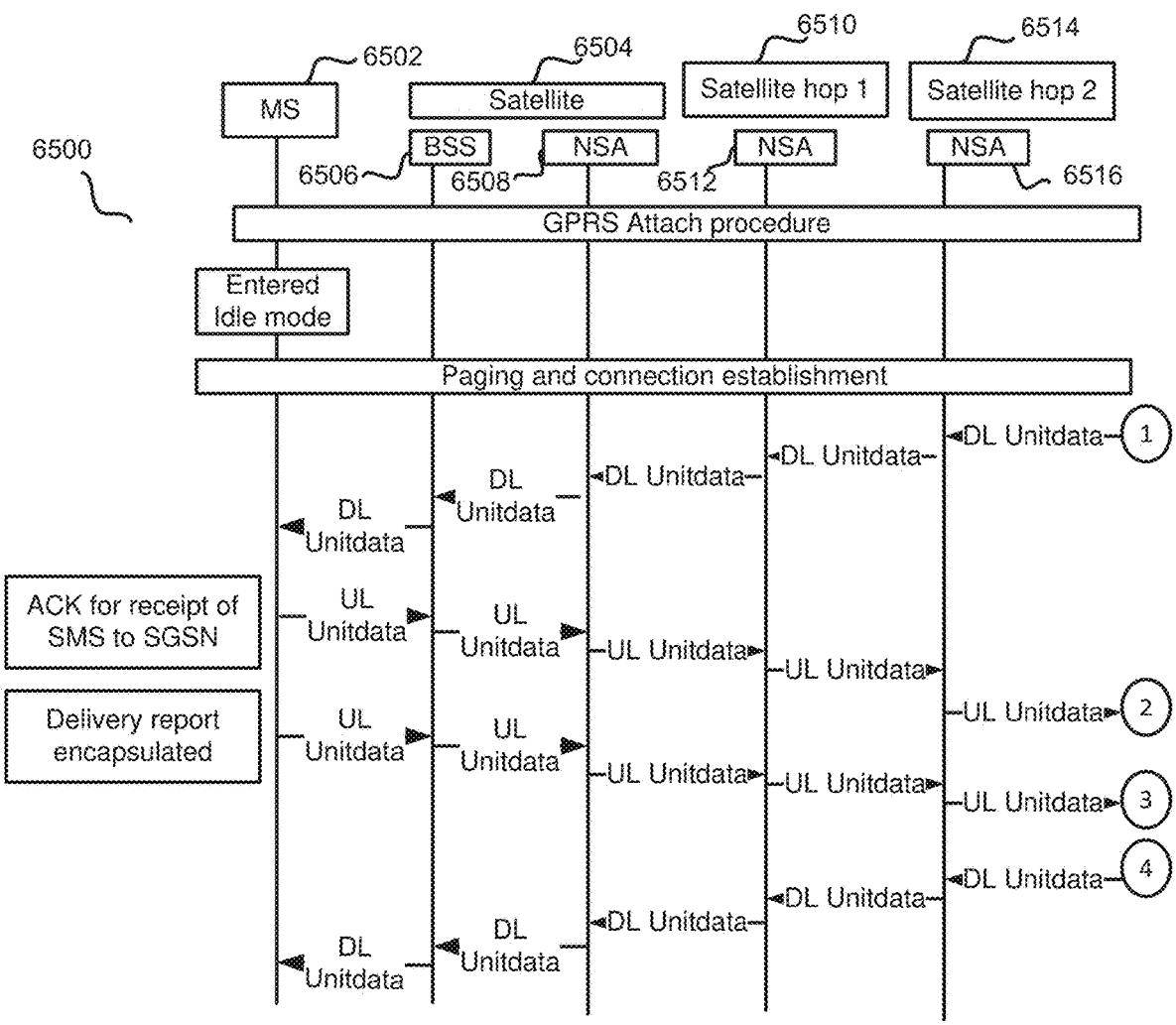
FIG. 65, comprising FIG. 65A and FIG. 65B together, illustrates the signaling flow of a mobile terminated SMS over GPRS from a MS, according to an embodiment.
Figure 65B:
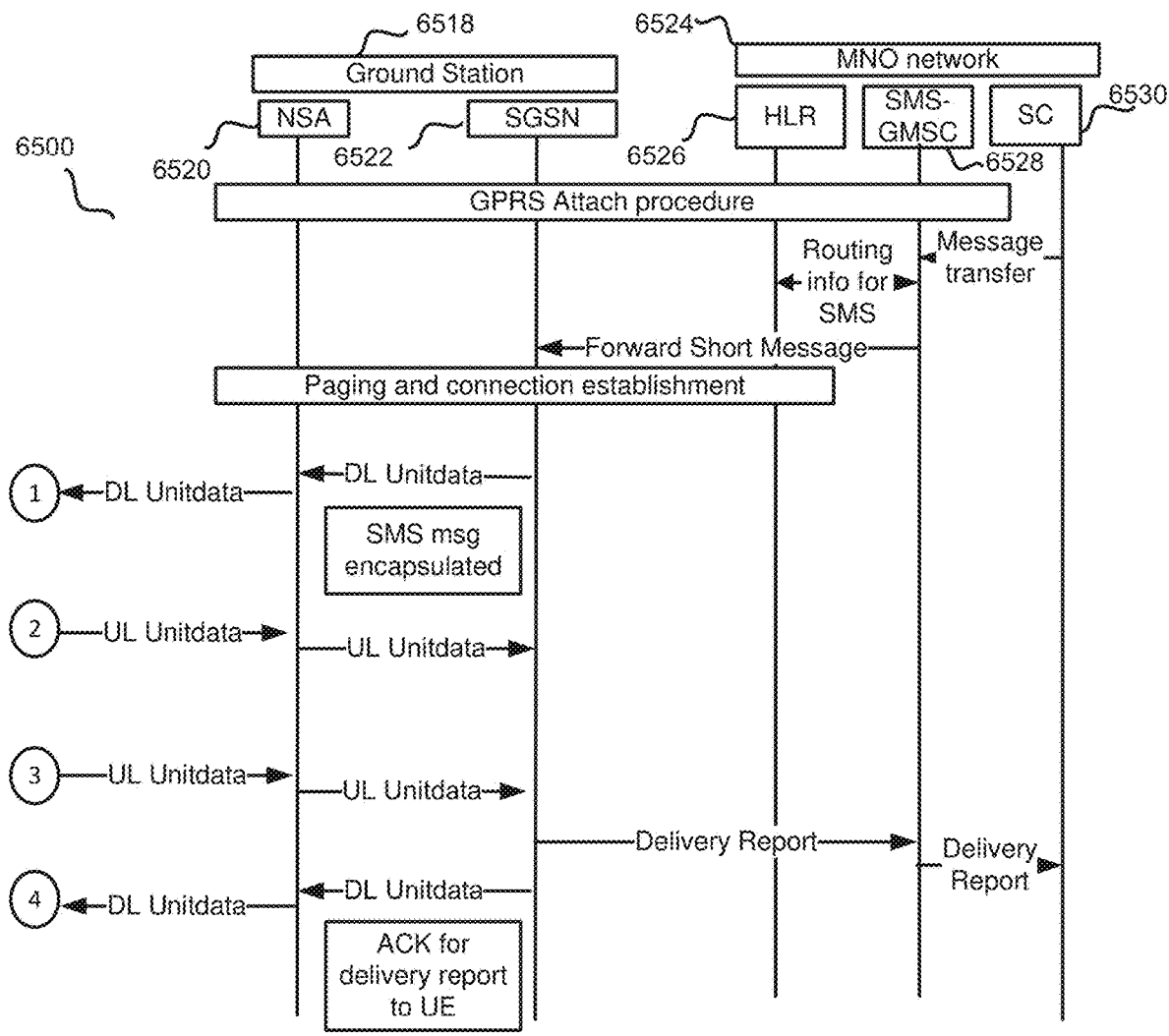

FIG. 65A and FIG. 65B together, illustrate an embodiment of a signaling flow of a mobile terminated SMS over GPRS SGSN 6522 from a MS 6502 to its home network 6524's Service Center 6530 in a satellite network with connectivity to a ground station 6518 via hops using satellites 6510 and 6514. The NSA components 6508, 6512 and 6516 on the satellites 6504, 6510 and 6514 and the NSA component 6520 on the ground station 6518 may maintain a session and track the status of the transactions across the session until it terminates. The NSA components 6508, 6512 and 6516 on the satellites 6504, 6510 and 6514 and the NSA component 6520 on the ground station 6518 may store the session information and metadata related to the session such as timestamps, location etc. for future analysis and/or reference.

Figure 66A:
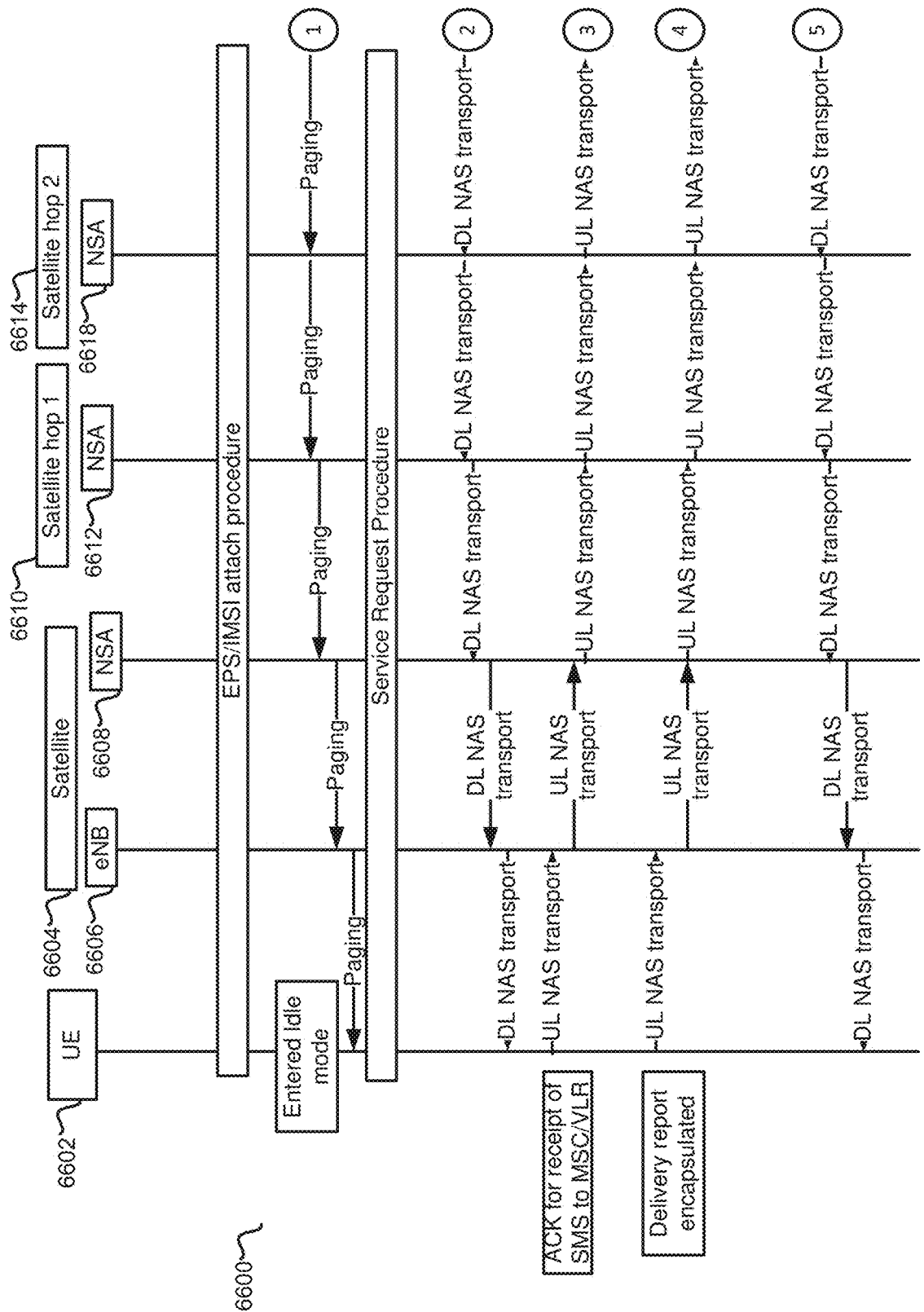
FIG. 66, comprising FIG. 66A and FIG. 66B together, illustrates the signaling flow of a mobile terminated SMS over SGs interface from a UE, according to an embodiment.
Figure 66B:
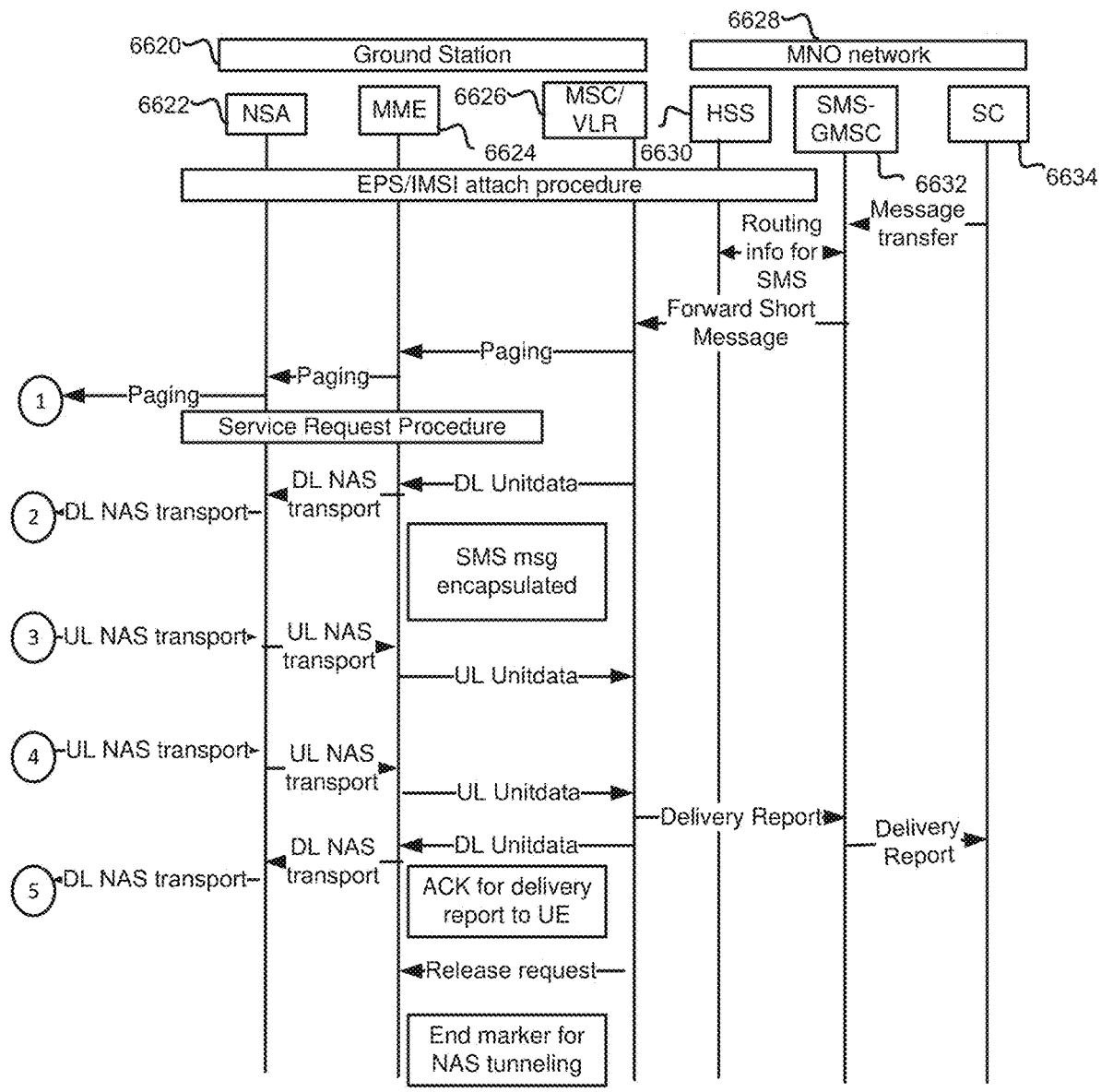

FIG. 66A and FIG. 66B together illustrate an embodiment of a signaling flow when a user 6602 can receive a mobile terminated SMS message over SGs interface between MME 6624 and MSC/VLR 6626 in a satellite network with connectivity to a ground station 6620 via two hops using satellites 6610 and 6614. The NSA components 6608, 6612 and 6618 on satellites 6604, 6610 and 6614 and the NSA component 6622 on the ground station 6620 may maintain a session and track the status of the transactions across the session until it terminates. The NSA components 6608, 6612 and 6618 on the satellites 6604, 6610 and 6614 and the NSA component 6622 on the ground station 6620 may store the session information and metadata related to the session such as timestamps, location etc. for future analysis and/or reference.

Figure 67:
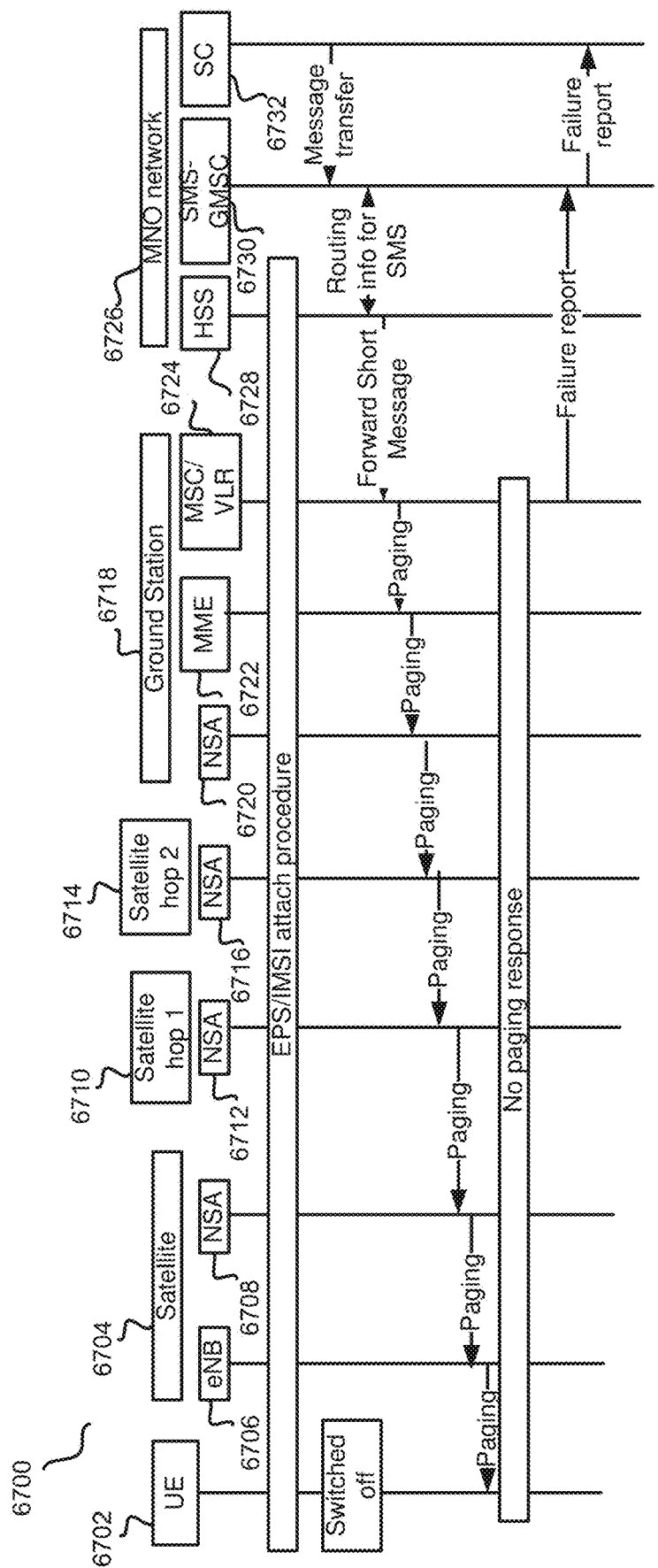
FIG. 67 illustrates the signaling flow of an unsuccessful mobile terminated SMS over inter-satellite links, according to an embodiment.

There can be multiple scenarios in which a SMS delivery attempt may be unsuccessful in the network and FIG. 67 illustrates an embodiment of such scenario where an SMS delivery attempt can be made to a UE 6702 that might be switched off in a satellite network with connectivity to ground station 6718 via hops using satellites 6710 and 6714. The paging request can be sent from UE 6702's home MNO network 6726 to the satellite hosting eNodeB 6706 that might be serving the UE 6702. The request can be sent over SGs interface between MME 6722 and MSC/VLR 6724 on the ground station 6718. The NSA components 6708, 6712 and 6716 on the satellites 6704, 6710 and 6714 and the NSA component 6720 on the ground station 6718 may maintain a session and track the status of the transactions across the session until it terminates. The NSA components 6708, 6712 and 6716 on the satellites 6704, 6710 and 6714 and the NSA component 6720 on the ground station 6718 may store the session information and metadata related to the session such as timestamps, location etc. for future analysis and/or reference.

Figure 68:
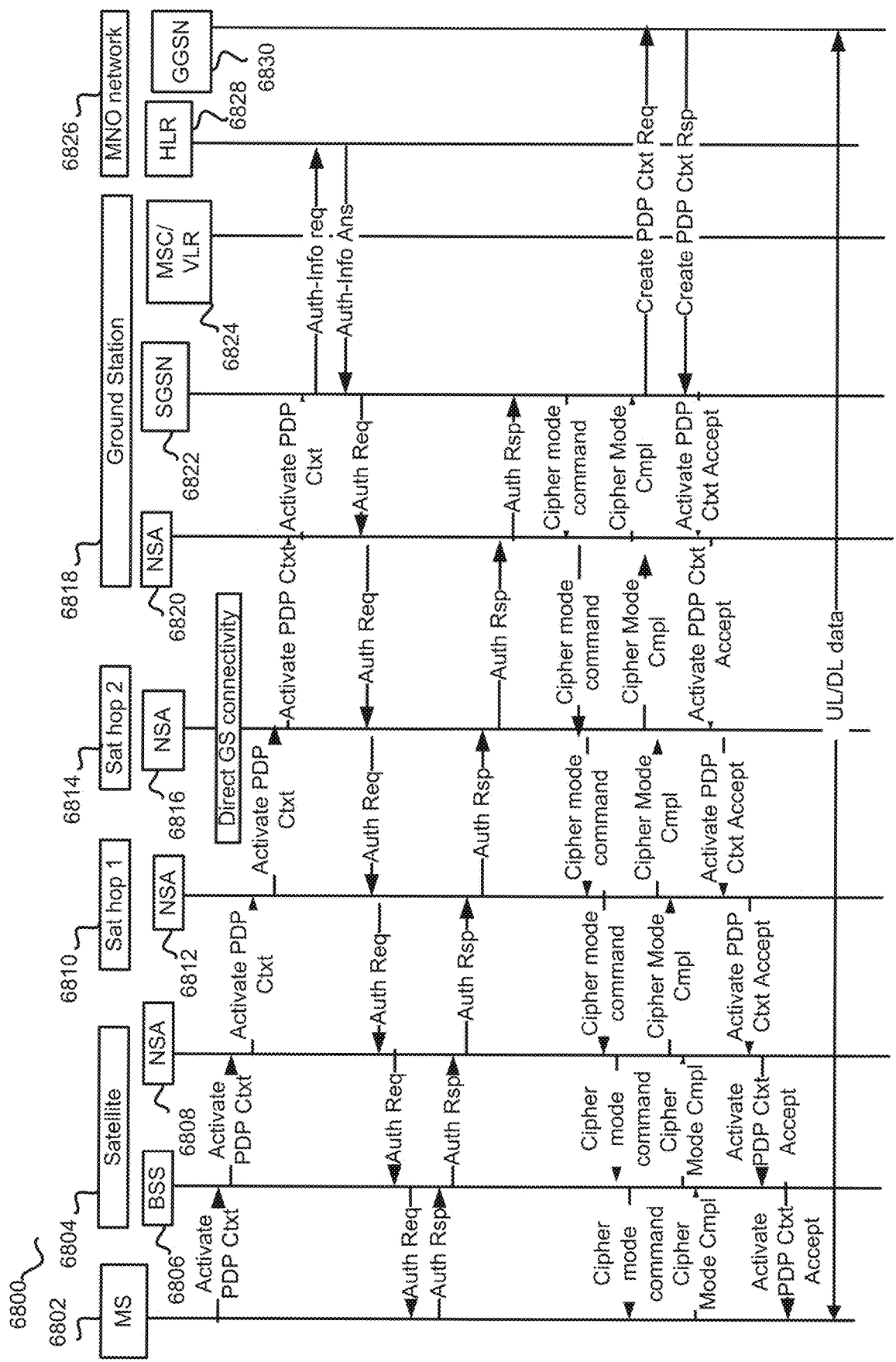
FIG. 68 illustrates the establishment of a data session over GPRS network elements in a satellite network with connectivity to ground station via satellite hops, according to an embodiment.

FIG. 68 illustrates establishment of a data session over GPRS network elements in a satellite network with connectivity to ground station 6818 via hops using satellites 6810 and 6814. NSA components 6808, 6812 and 6816 on satellites 6804, 6810 and 6814 and the NSA component 6820 on the ground station 6818 may maintain a session and track the status of the transactions across the session until it terminates. The NSA components 6808, 6812 and 6816 on satellites 6804, 6810 and 6814 and the NSA component 6820 on the ground station 6818 may store the session information and metadata related to the session such as timestamps, location etc. for future analysis and/or reference.

Figure 69A:
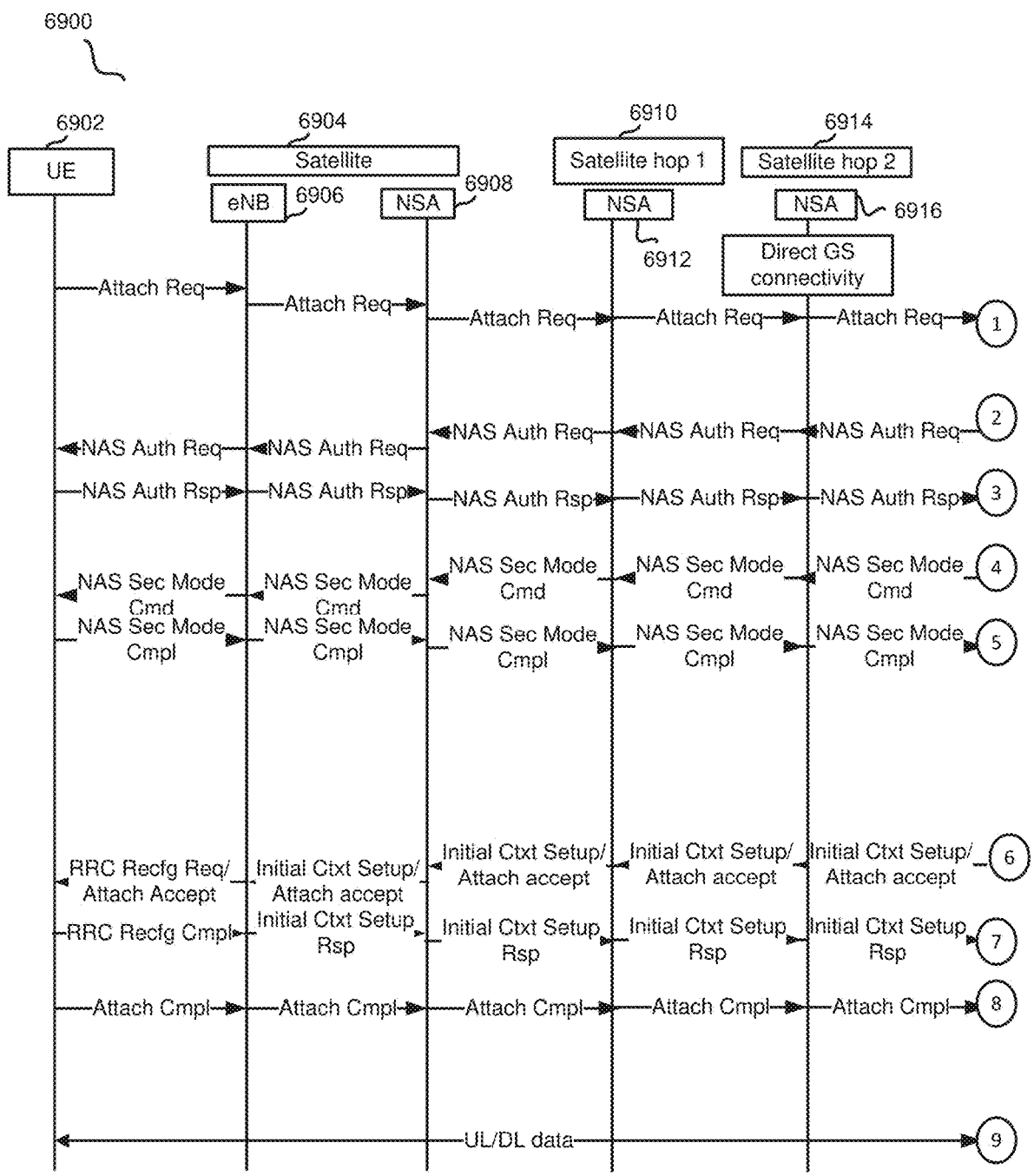
FIG. 69, comprising FIG. 69A and FIG. 69B together illustrates the establishment of a data session over LTE network elements in a satellite network with connectivity to ground station via satellite hops, according to an embodiment.
Figure 69B:
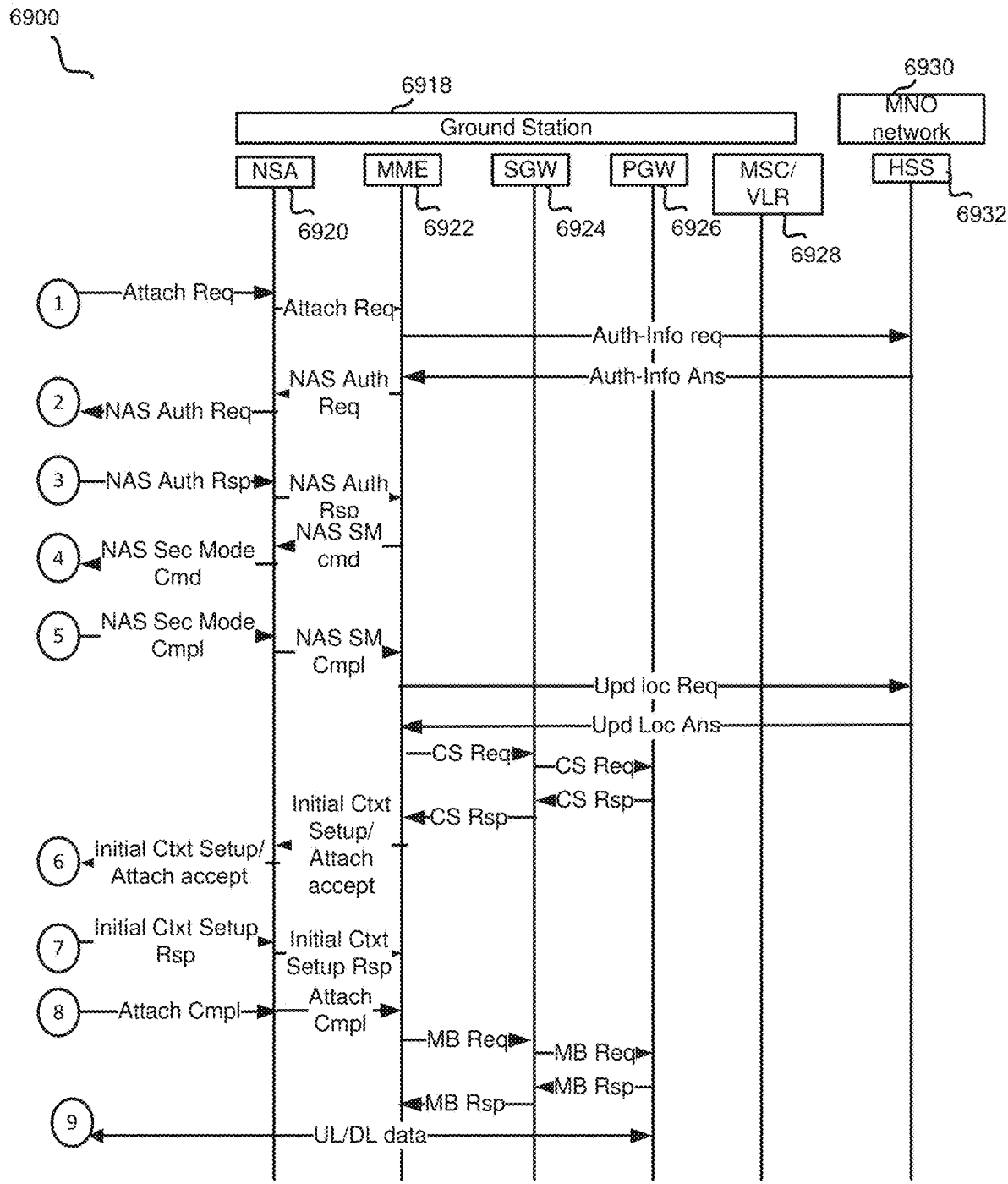

FIG. 69A and FIG. 69B together illustrate an embodiment of the information flow for a data session over LTE network in a local breakout scenario where the data session can be routed via the PGW 6926 at the ground station 6918. This does not preclude the possibility of home routing scenario where the user data may be sent to PGW on UE 6902's home MNO network 6930 from SGW 6924 on the ground station. The NSA components 6908, 6912 and 6916 on the satellites 6904, 6910 and 6914 and the NSA component 6920 on the ground station 6918 may maintain a session and track the status of the transactions across the session until it terminates. The NSA components 6908, 6912 and 6916 on the satellites 6904, 6910 and 6914 and the NSA component 6920 on the ground station 6918 may store the session information and metadata related to the session such as timestamps, location etc. for future analysis and/or reference.

Figure 70:
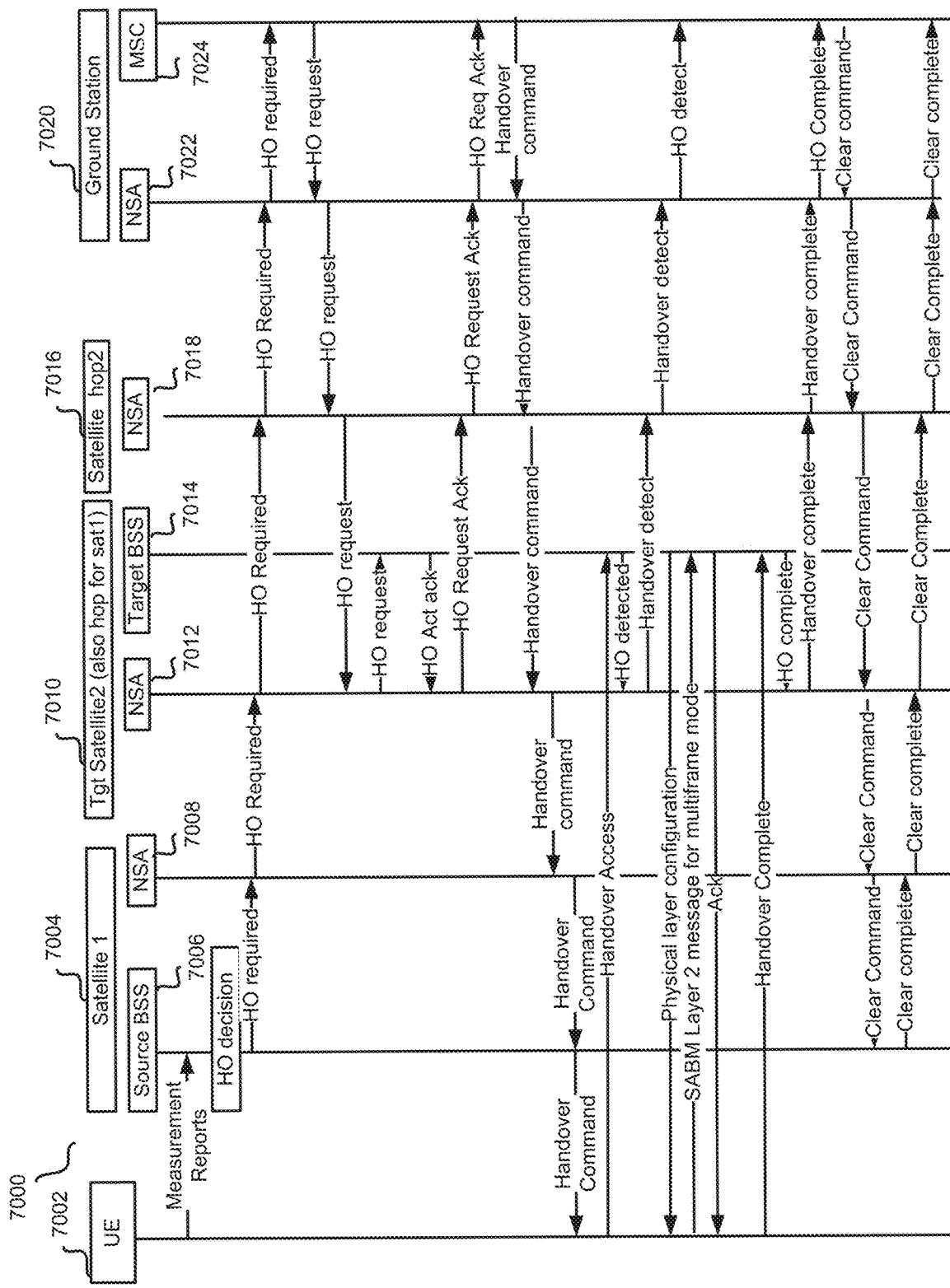
FIG. 70 illustrates the signaling flow of an intra-MSC handover procedure by a GSM/GPRS MS, according to an embodiment.

FIG. 70 illustrates the signaling flow when a GSM/GPRS MS 7002 can handover to a target BSS 7014 in the upcoming or neighbor satellite. In one embodiment, the satellite 7010 hosting the target BSS 7014 can be a hop for the satellite 7004 hosting the source BSS 7006 before reaching the MSC 7024 on the ground station 7020, which is depicted in FIG. 70. The NSA components 7008, 7012 and 7018 on the satellites 7004, 7010 and 7016 and the NSA component 7022 on the ground station 7020 may maintain a session and track the status of the transactions across the session until it terminates. The NSA components 7008, 7012 and 7018 on the satellites 7004, 7010 and 7016 and the NSA component 7022 on the ground station 7020 may store the session information and metadata related to the session such as timestamps, location etc. for future analysis and/or reference.

Figure 71A:
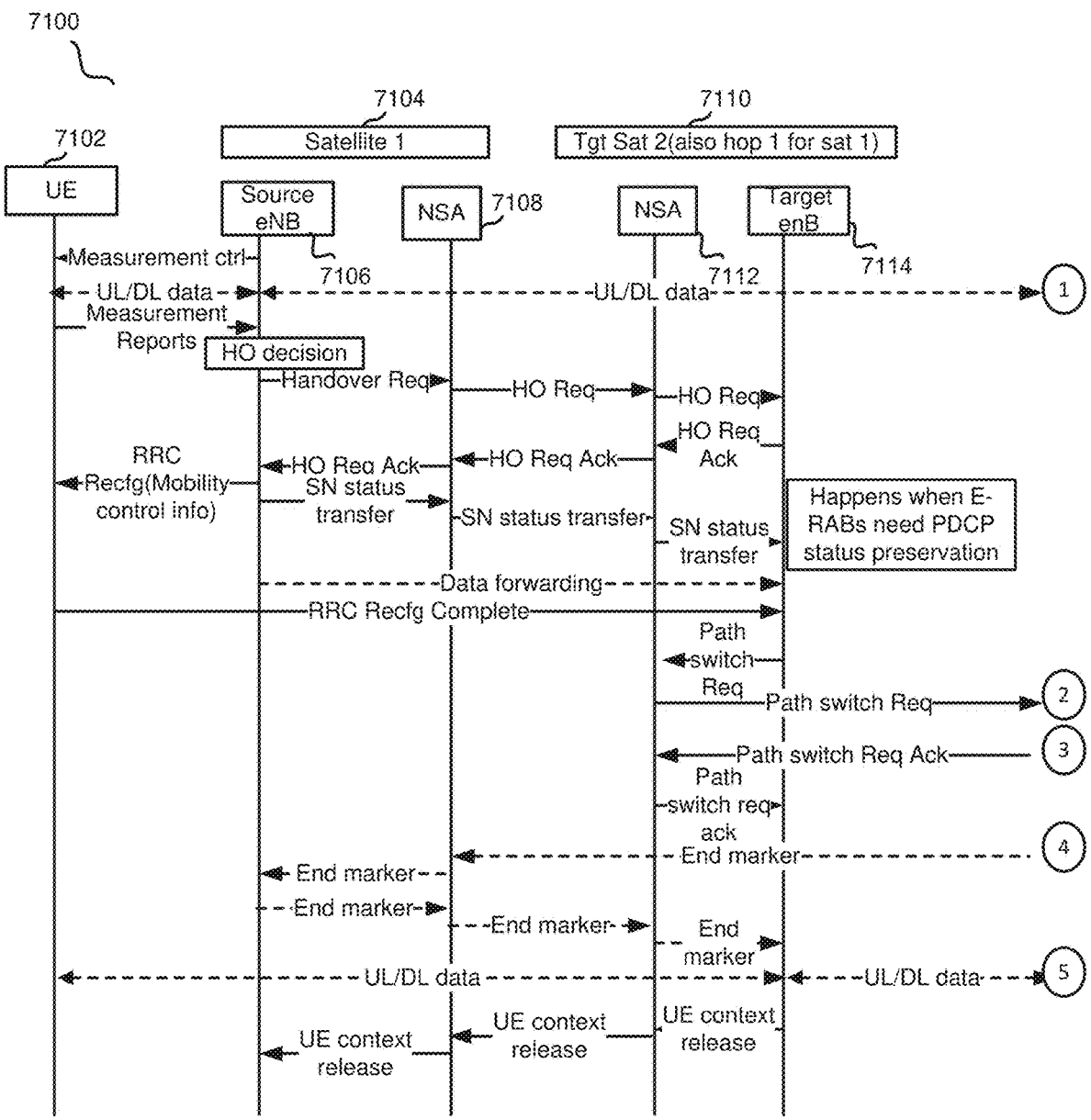
FIG. 71, comprising FIG. 71A and FIG. 71B together, illustrates the signaling flow of an X2 handover procedure by a UE, according to an embodiment.
Figure 71B:
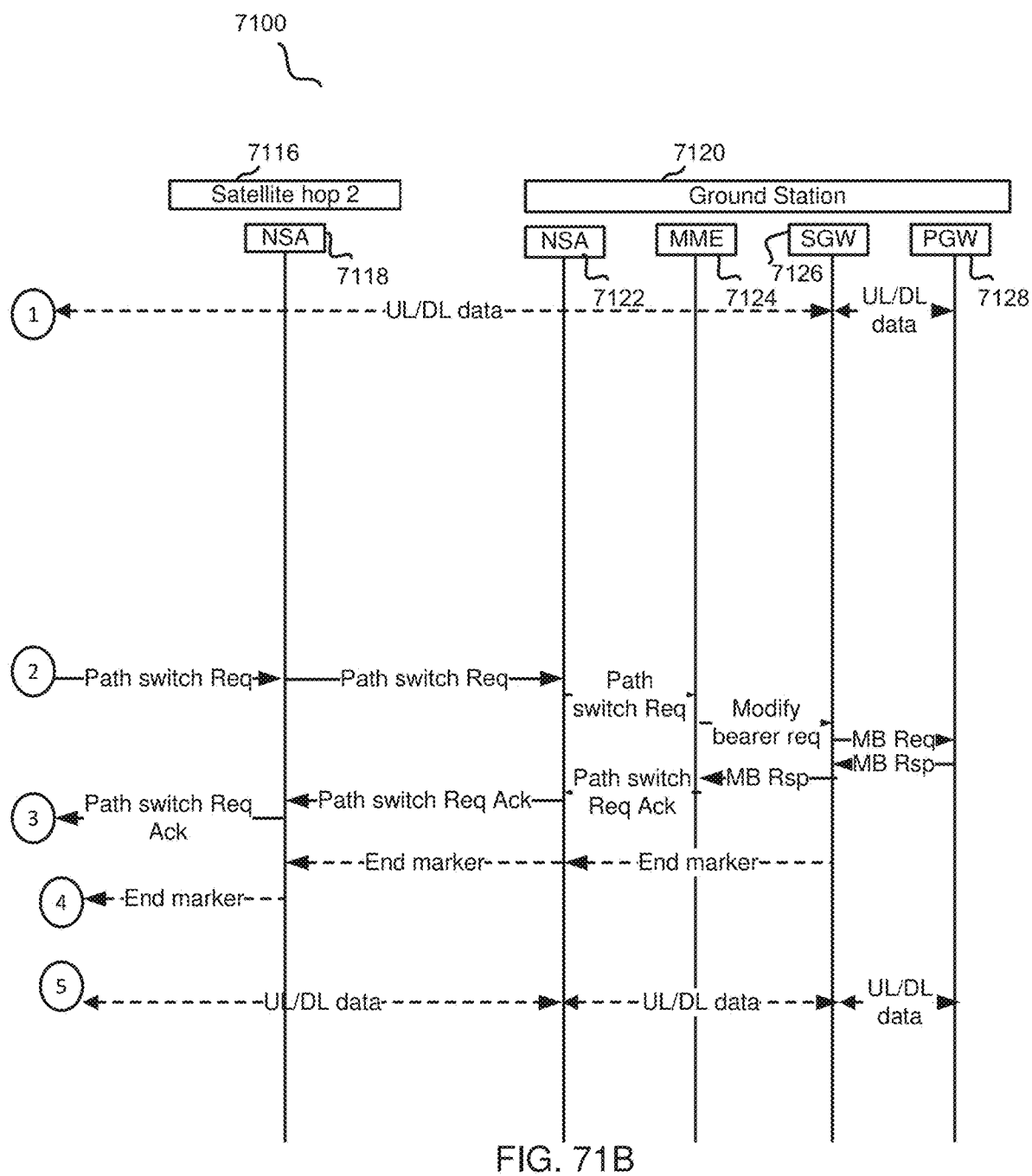

FIG. 71A and FIG. 71B together illustrate an embodiment of a signaling flow when an LTE UE 7102 can handover to a target eNodeB 7114 in the upcoming or neighbor satellite. In one embodiment, the satellite 7110 hosting the target eNodeB 7114 can be a hop for the satellite 7104 hosting the source eNodeB 7106 before reaching the MME 7124 on the ground station 7120, which is depicted in FIG. 71B. The NSA components 7108, 7112 and 7118 on the satellites 7104, 7110 and 7116 and the NSA component 7122 on the ground station 7120 may maintain a session and track the status of the transactions across the session till it terminates. The NSA components 7108, 7112 and 7118 on the satellites 7104, 7110 and 7116 and the NSA component 7122 on the ground station 7120 may store the session information and metadata related to the session such as timestamps, location etc. for future analysis and/or reference.

The cell broadcast service can be used to transfer CBS messages related to public warning over BSS and eNodeB. FIG. 72A, FIG. 72B, FIG. 73A and FIG. 73B illustrate both possibilities in the network.

Figure 72A:
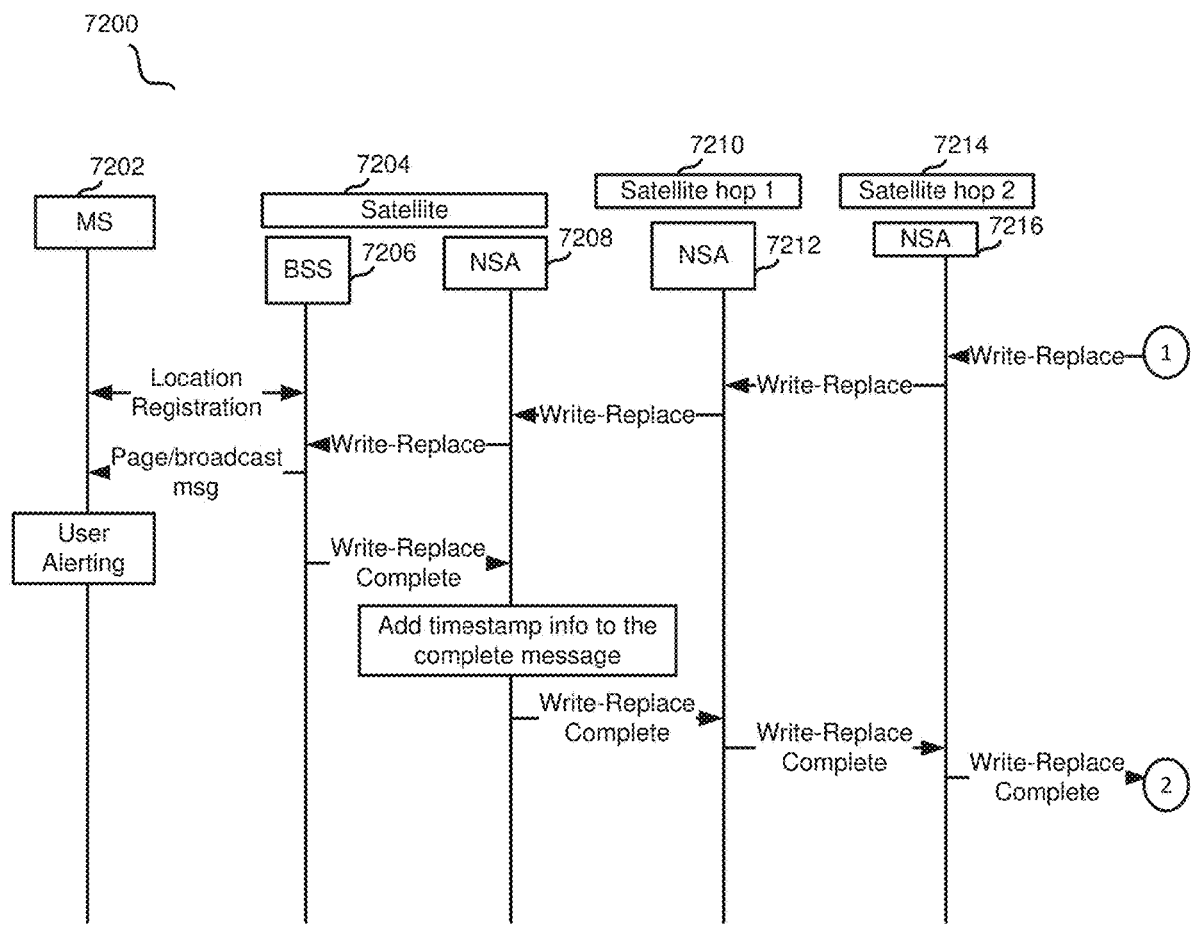
FIG. 72, comprising FIG. 72A and FIG. 72B together, illustrates an embodiment of the information flow for a cell broadcast message sent over a BSS on the satellite, according to an embodiment.
Figure 72B:
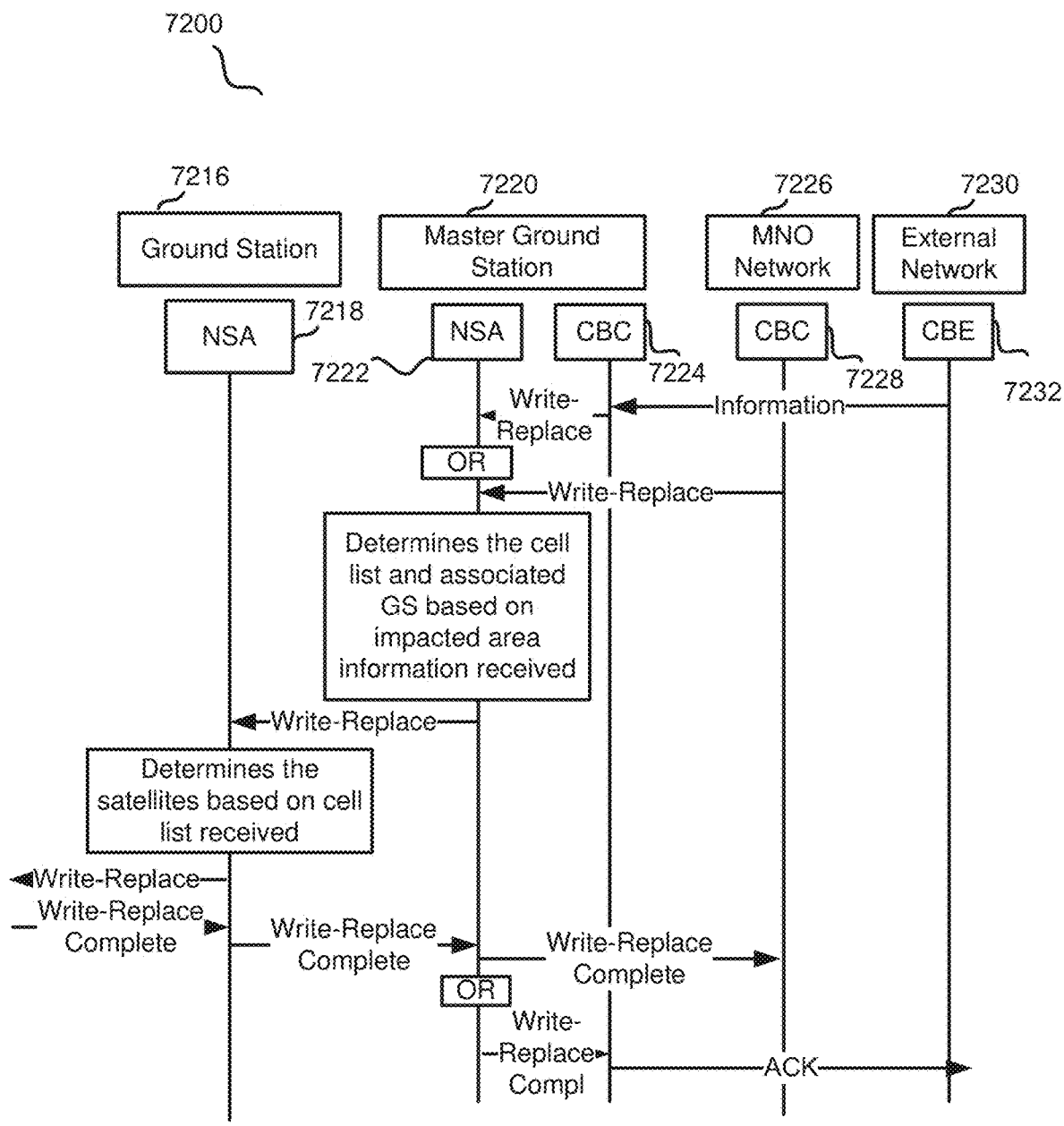
Figure 73A:
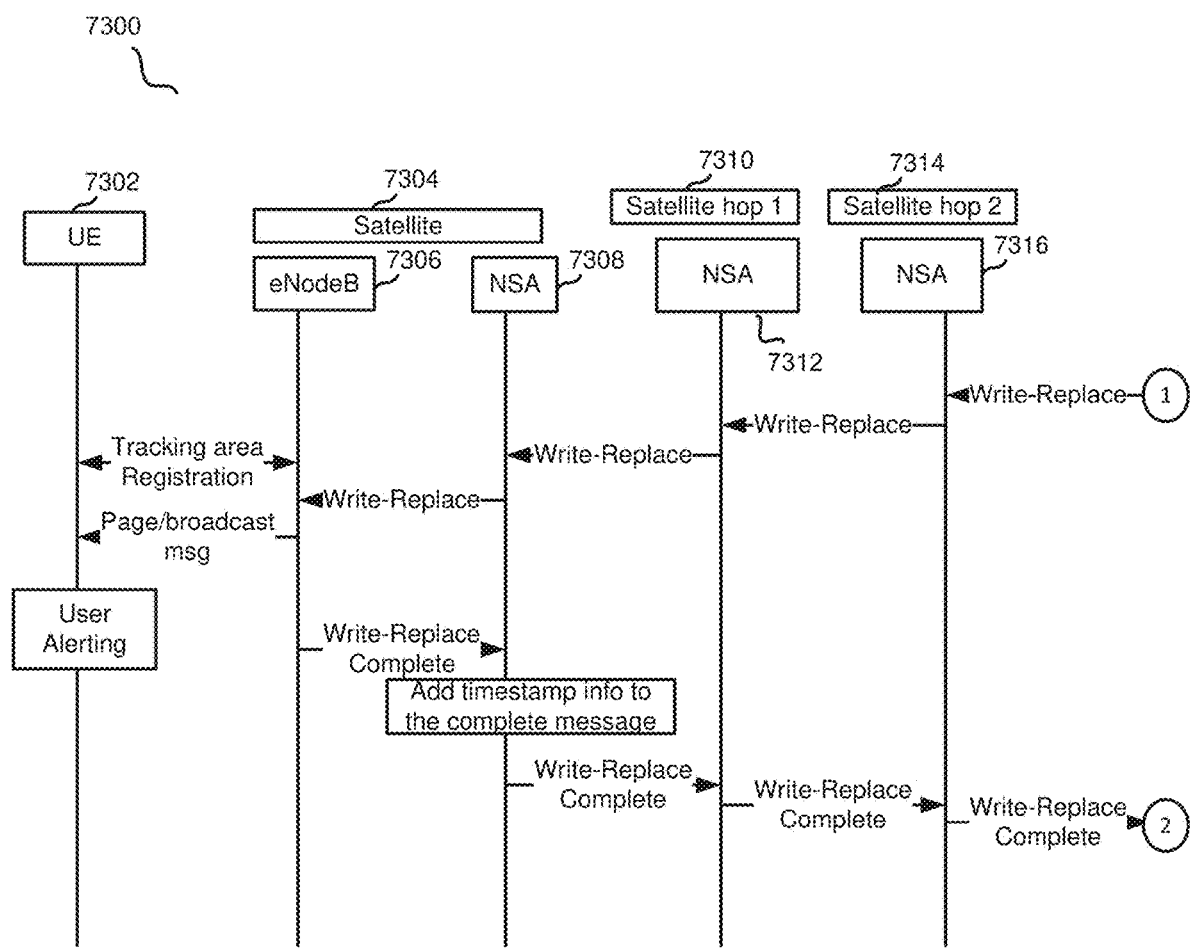
FIG. 73, comprising FIG. 73A and FIG. 73B together, illustrates an embodiment of the information flow for a cell broadcast message to be sent over an eNodeB on the satellite, according to an embodiment.
Figure 73B:
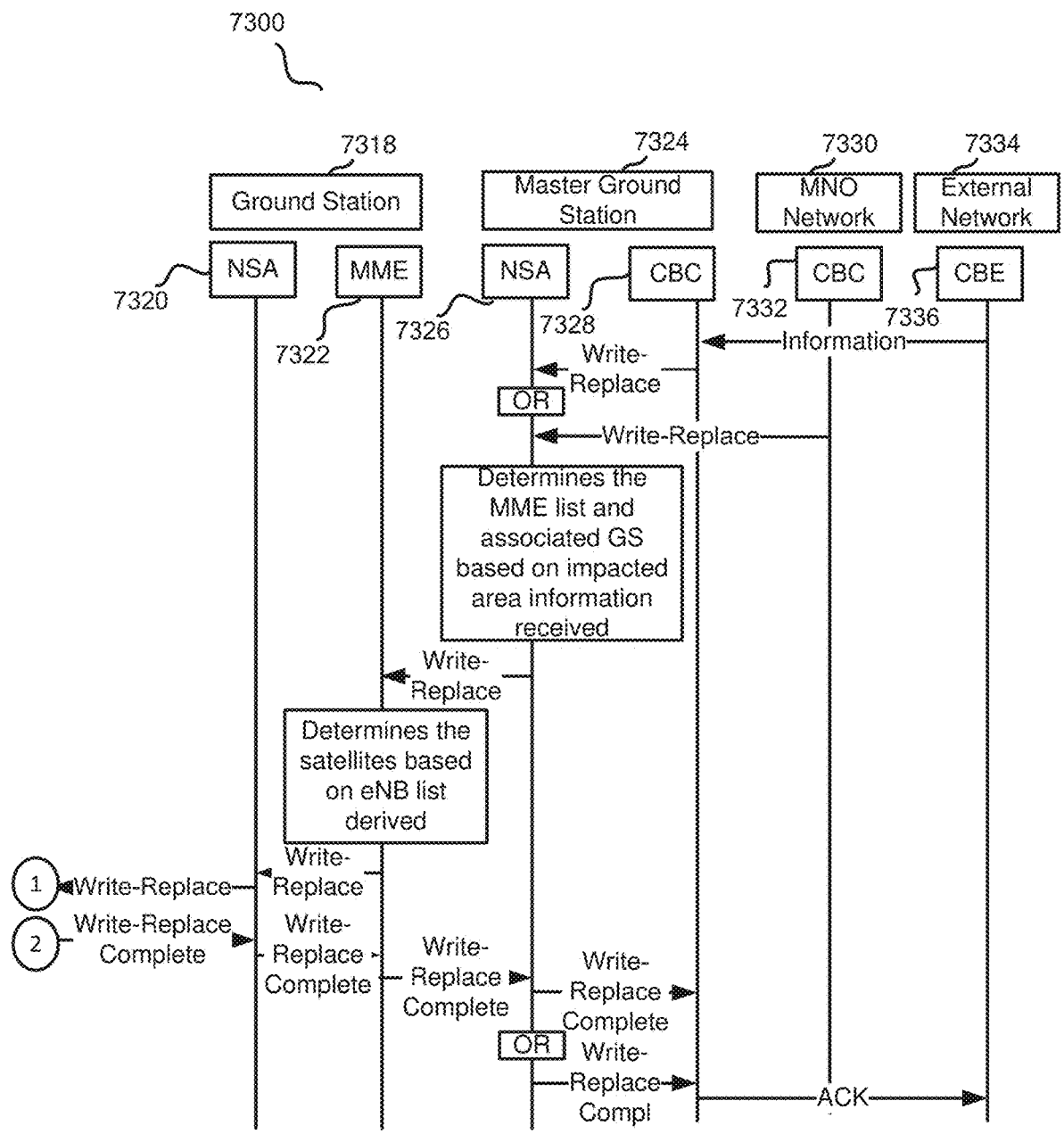

FIG. 72A and FIG. 72B together, illustrate an embodiment of the information flow for a cell broadcast message to be sent over a BSS 7206 on the satellite 7204. FIG. 73A and FIG. 73B together, illustrate an embodiment of the information flow for a cell broadcast message to be sent over an eNodeB 7306 on the satellite 7304.

When a cell broadcast message is received from either a CBE or a CBC on an MNO network, NSA 7326 on the master ground station can use the "impacted area information" to identify the set of MMEs that need to be contacted. Based on the derived cell list, it can determine which ground stations (could include the master ground station itself) need to be contacted and can send a Write-Replace Warning Request message containing the warning message to be broadcast and the delivery attributes (Message identifier, Serial Number, Tracking Area ID list, Warning Area, OMC ID, CWM Indicator) etc. to MMEs like MME 7322 on these ground stations. The warning messages can use the standard coding scheme for CBS data. The MME 7322 can use Tracking Area ID list for selecting which eNodeB(s) to forward the Write-Replace Warning Request message to. If it is a network wide message, then WRITE-REPLACE messages can be sent to all the NSA entities across all the ground stations.

Figure 74:
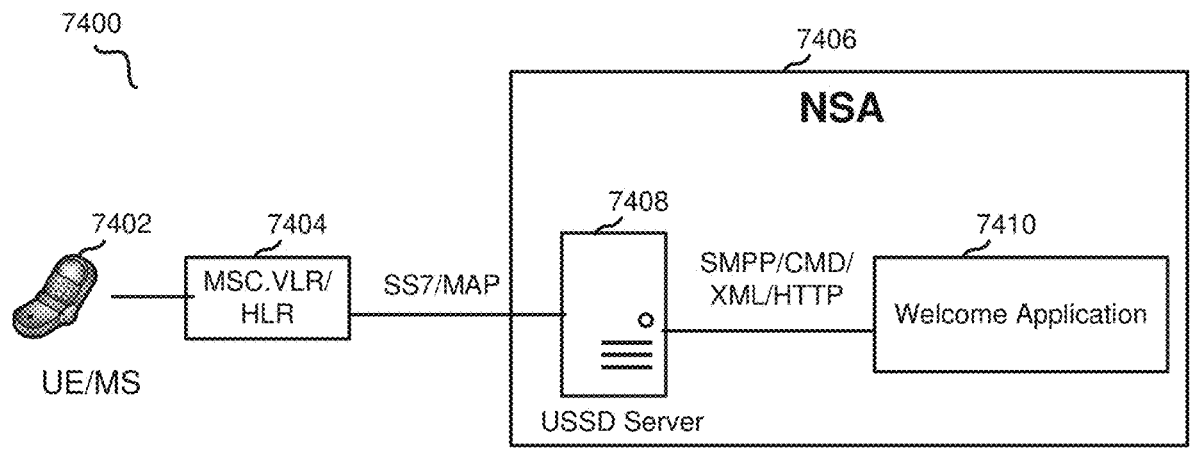
FIG. 74 illustrates the USSD notification procedure where NSA on a satellite acts as USSD handler, according to an embodiment.

FIG. 74 illustrates the USSD procedure that supports supplementary service signaling procedures which can allow PLMN specific services to be introduced. In the case of a satellite network, this may be used to send welcome messages. An NSA 7408 within satellite network system may use MAP_UNSTRUCTURED_SS_NOTIFY.

In one embodiment described in this disclosure, USSD messages can be sent over the GSM Network. When an LTE UE is the originating subscriber, the UE may need to fall back to circuit switched network (CSFB) for a USSD message to be delivered. In addition, there may no longer be a need for the "message in progress" message when there is always ground station connectivity.

An NSA 7406 of the satellite network may act as both the USSD application and the USSD handler. It can be in the satellite to accommodate the intermittent GSL coverage. The welcome message may be sent to an MS 7402 as soon as NSA 7406 detects a new MS location update, or a UE attach to the LTE network. In the case of an LTE user the NSA 7406 may need to trigger a circuit switch fall back. The SMS received USSD message may be sent to the MS 7402 after the message is received on the satellite. This procedure can occur after the circuit switch fall back of an LTE UE.

When an MNO becomes a satellite network partner, they may supply their customized welcome message. The welcome messages from all MNO partners may be periodically uploaded to the satellite (along with other data uploads). This may allow for an MNO changing the content of the message. The message may also contain a language indicator and alphabet designator for the USSD notify.

As an example, a welcome message may comprise the following text: "You are in a MNONAME extended satellite network coverage area. Message sent and received may experience delay due to satellite connectivity", English, alpha. The text can be 182 characters in length or some other length.

The procedure may be invoked by a USSD application local to NSA 7406. They may start by using the MAP_UN-STRUCTURED_SS_NOTIFY service. If the request is initiated by a local USSD application, then the MSC will open a dialogue with the VLR of an MSC/VLR 7404. The MSC of MSC/VLR 7404 can initiate a CM connection to MS 7402. Once the connection is successfully established, the message received from the VLR of MSC/VLR 7404 or a USSD application may be sent to MS 7402 using standard mapping.

Following transfer of the message, the MSC of MSC/VLR 7404 will wait for a confirmation from MS 7402. This may be sent to a USSD application 7410 as appropriate. Following this, the MSC of MSC/VLR 7404 may receive further uses of the MAP_UNSTRUCTURED_SS_RE-QUEST or MAP_UNSTRUCTURED_SS_NOTIFY services or may receive an indication to release the connection to the MS 7402 or a UE thereof. In the situation involving the welcome message, a connection to MS 7402 may be released. In the event of an error, the connection to MS 7402 can be released, and the MAP process with the VLR of MSC/VLR 7404 can be aborted for network initiated unstructured supplementary service.

7. NSA on Satellite

Figure 75:
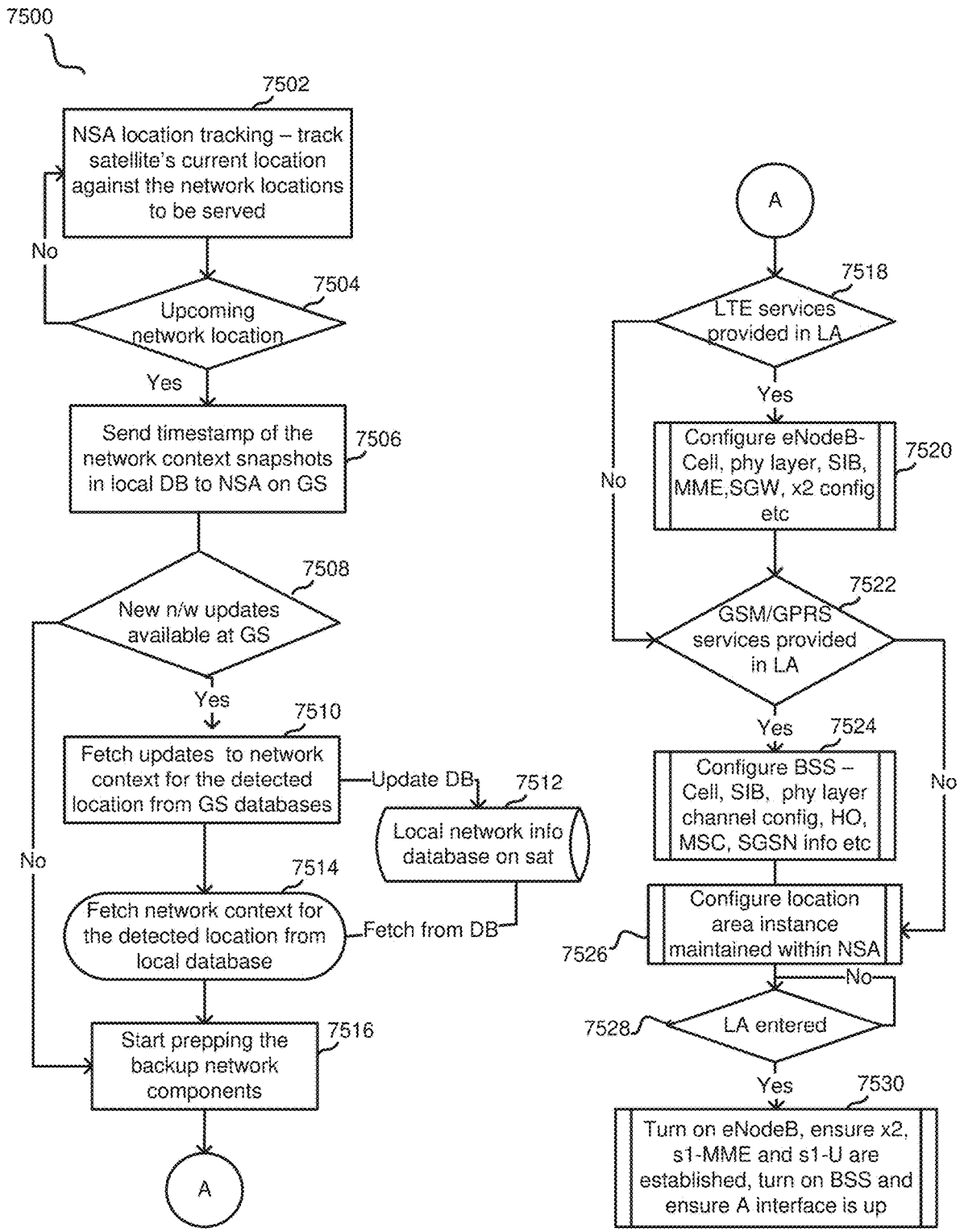
FIG. 75 illustrates NSA functionality on satellite in a GSM/GPRS/LTE network as the satellite enters a location to be served, according to an embodiment.

FIG. 75 illustrates an embodiment of the NSA functionality on satellite in an architecture depicted in FIG. 41, where the satellite is entering a location area to be served from either another location area or from a no service zone (like ocean).

Figure 76:
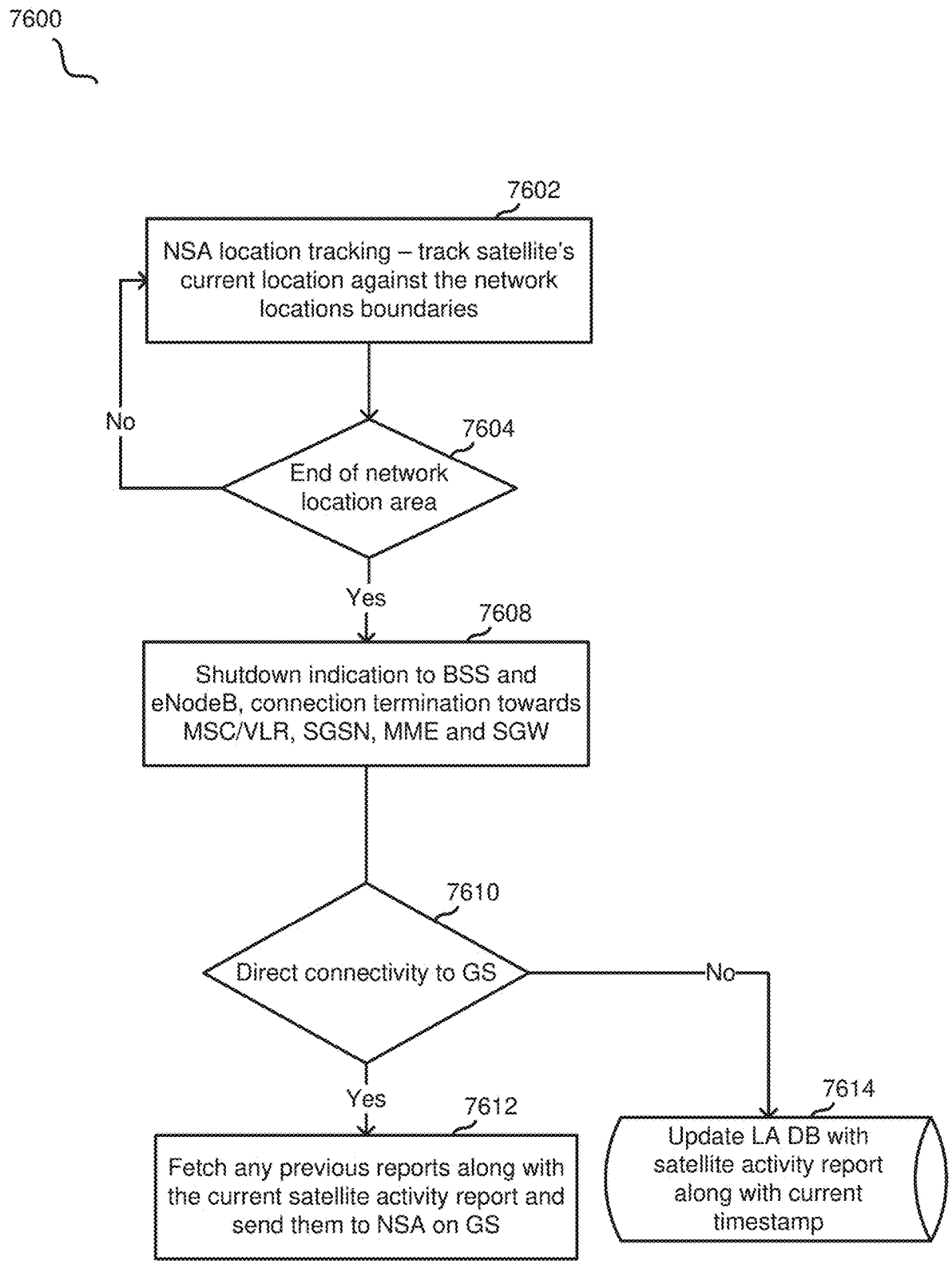
FIG. 76 illustrates NSA functionality on satellite in a GSM/GPRS/LTE network as the satellite leaves a location after serving, according to an embodiment.

FIG. 76 illustrates an embodiment of the NSA functionality on satellite in an architecture depicted in FIG. 41, where the satellite is either moving onto a different location area or to a no service zone (like ocean).

Figure 77:
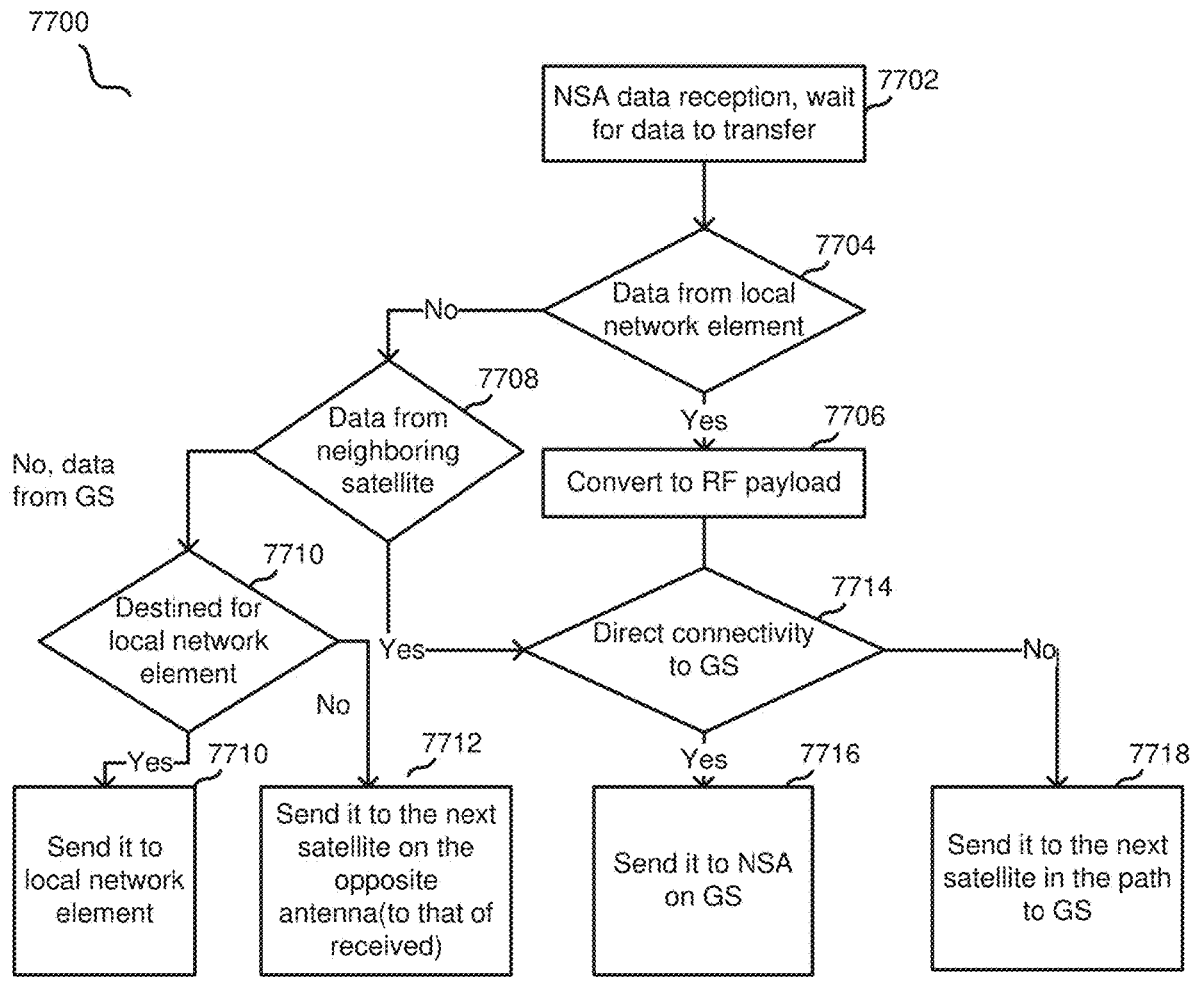
FIG. 77 illustrates the data handling at NSA on satellite in a network with continuous connectivity to a ground station, according to an embodiment.

FIG. 77 illustrates an embodiment of the NSA functionality on the satellite in an architecture depicted in FIG. 41, where the NSA can be responsible for relaying data between satellites on inter-satellite links and between satellite and the ground station when directly connected to one.

8. NSA on Ground Station

Figure 78:
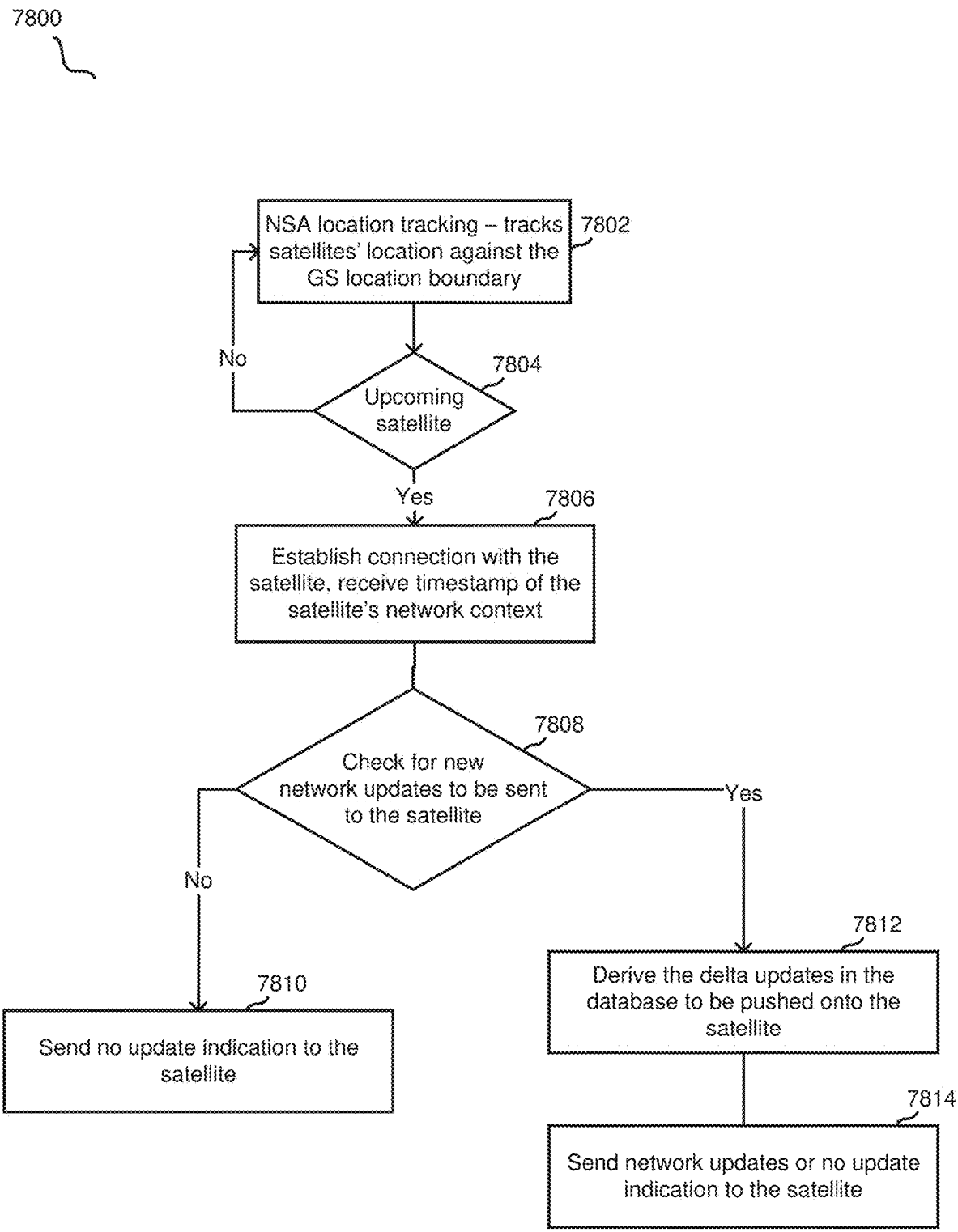
FIG. 78 illustrates NSA functionality on a ground station when a satellite is approaching the ground station, according to an embodiment.

NSA on the ground station may track the satellites and may establish connection with the ones that come into its vicinity. FIG. 78 illustrates the functionality of NSA when a satellite is approaching the ground station.

Figure 79:
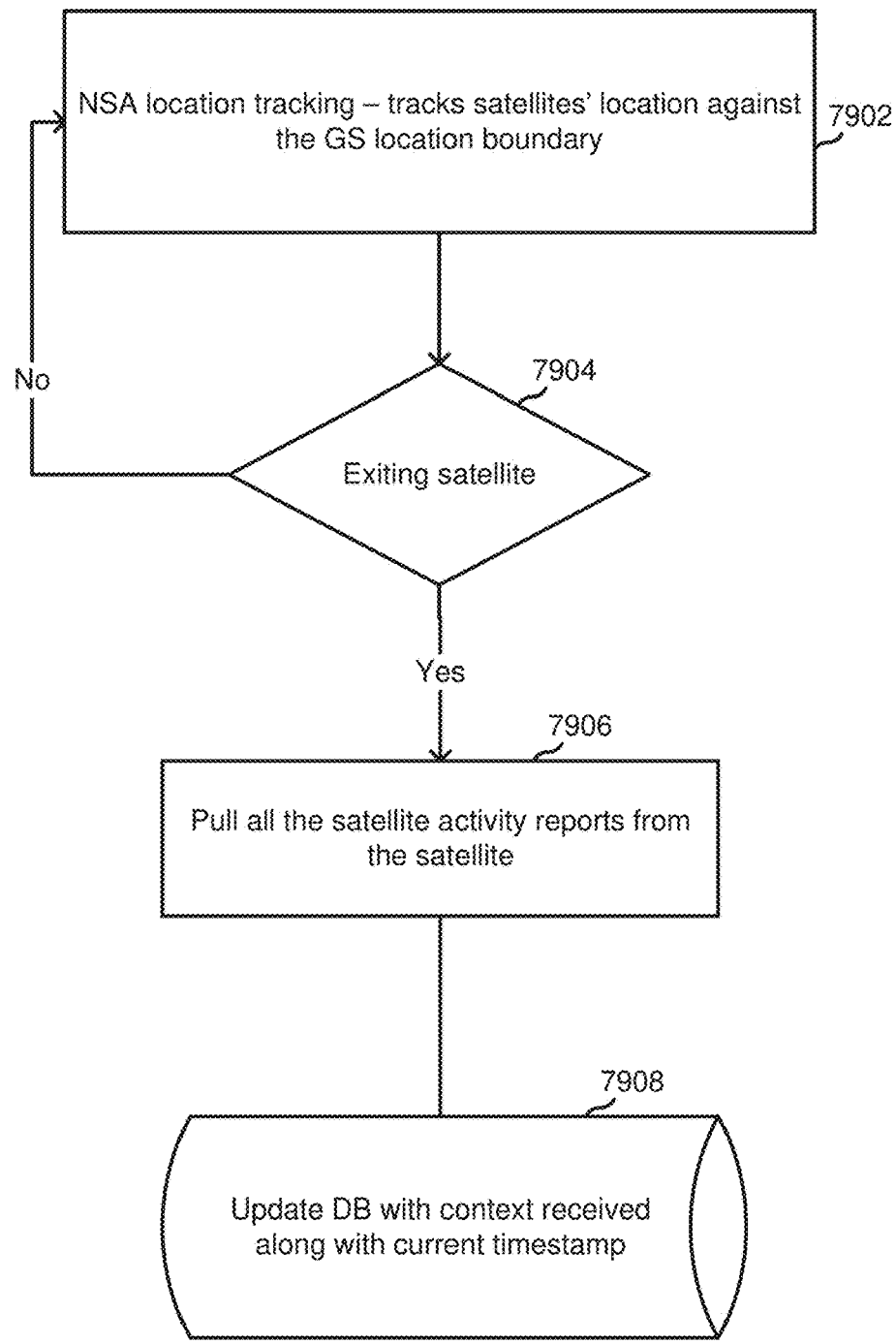
FIG. 79 illustrates NSA functionality on a ground station when a satellite is leaving the ground station, according to an embodiment.

FIG. 79 illustrates the NSA functionality when a satellite is leaving the ground station.

Figure 80:
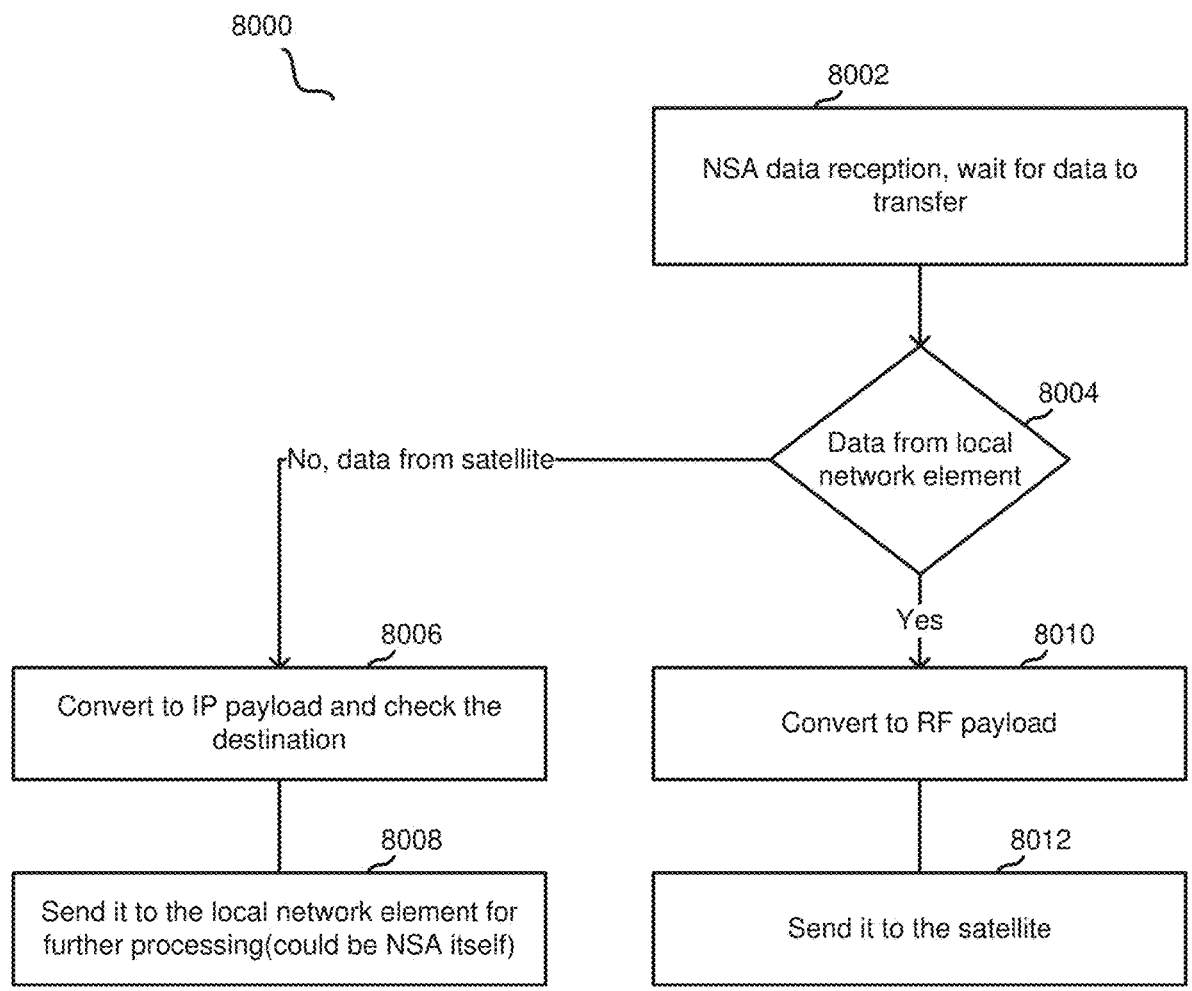
FIG. 80 illustrates the data handling at NSA on ground station in a satellite network with continuous connectivity to a ground station, according to an embodiment.

FIG. 80 illustrates an embodiment of the NSA functionality on the ground station in an architecture depicted in FIG. 41, where the NSA can be responsible for relaying data between satellites and the network elements on the ground station.

9. Scalability and Resiliency

Scalability and resiliency can be important for commercial service. This can apply to both the orbiting satellite network and the terrestrial infrastructure.

For the orbiting satellite network, the architecture logic is meant to support communication schemes with the mobile devices over the target area. Scalability from the satellite aspect can be achieved by adding and removing satellites as needed for commercial and operational reasons with the architecture used. The individual orbiting satellites may have redundant hardware, say an additional transceiver that can be used for either GSM/GPRS or LTE.

For the orbiting satellite network, in an embodiment, the scalability through adding more satellites to the network can be part of a phased approach where a new satellite can be added and the NOC may update the SSDB on the ground stations informing it of the additional asset. The new satellite with its expected ability to provide coverage may be included in the SSDB. Additionally, if a satellite is removed from the network the SSDB may also be updated. The SSDB may be used to determine the availability of a satellite that can serve a target area for providing service.

When network has continuous ground station connectivity, the satellite functions to support mobile communication can be reduced due to the existence of continuous ground station connectivity. With the dual GSM/GPRS and LTE capabilities unused functions may be removed via software and could be repurposed for other uses.

On the terrestrial network, a main network operating center (NOC) can be planned to be in the master ground station. The NOC may provide the coordination with the rest of the ground stations for service delivery availability.

Figure 81:
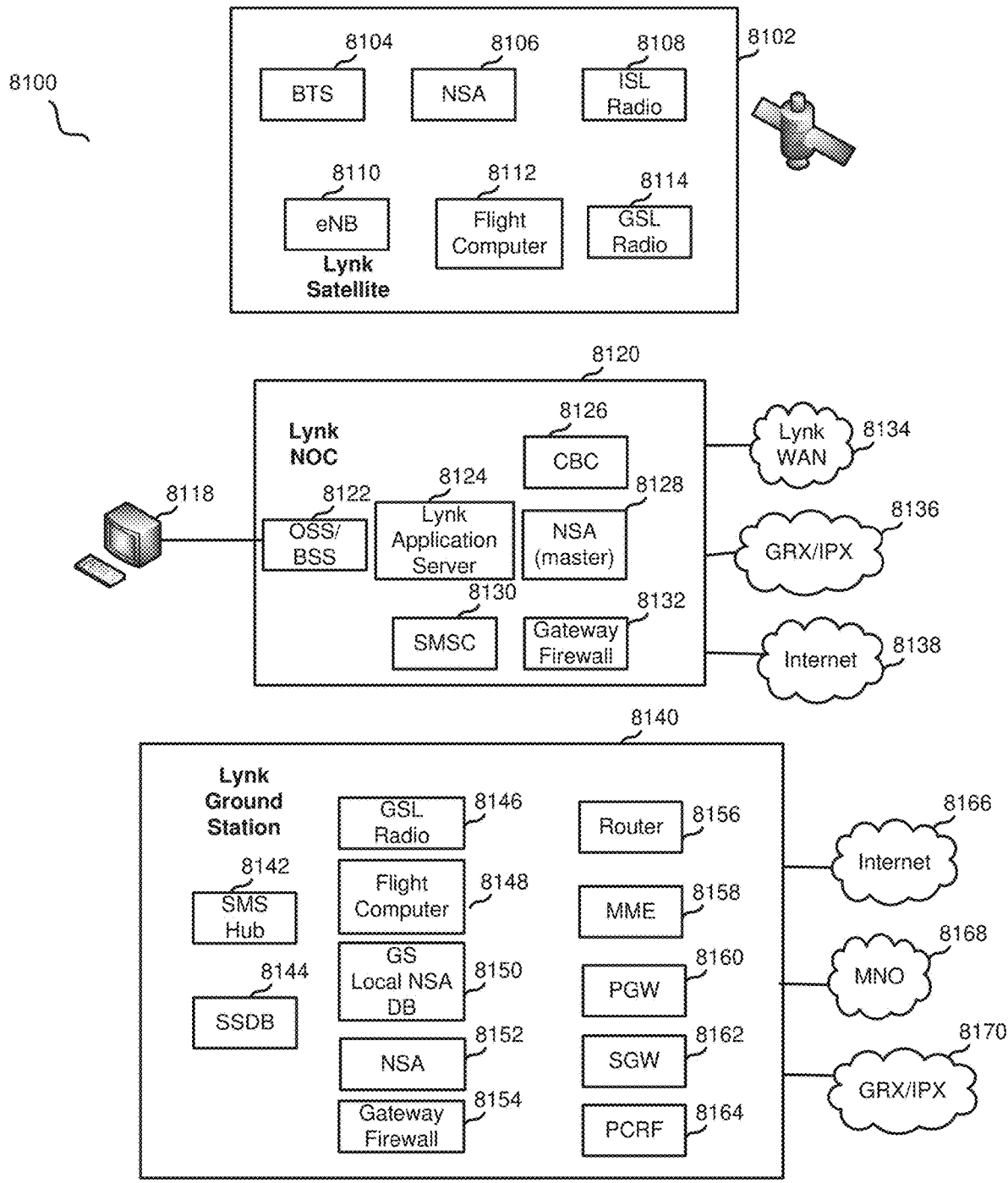
FIG. 81 illustrates the three fundamental components for the satellite network, satellite, ground station and NOC when network has continuous ground station connectivity, according to an embodiment.

FIG. 81 illustrates the three fundamental components for the satellite network, satellite, ground station and NOC when network has continuous ground station connectivity. The NOC can be collocated with the master ground station. However, there may be several ground stations requiring local functionality.

Figure 82:
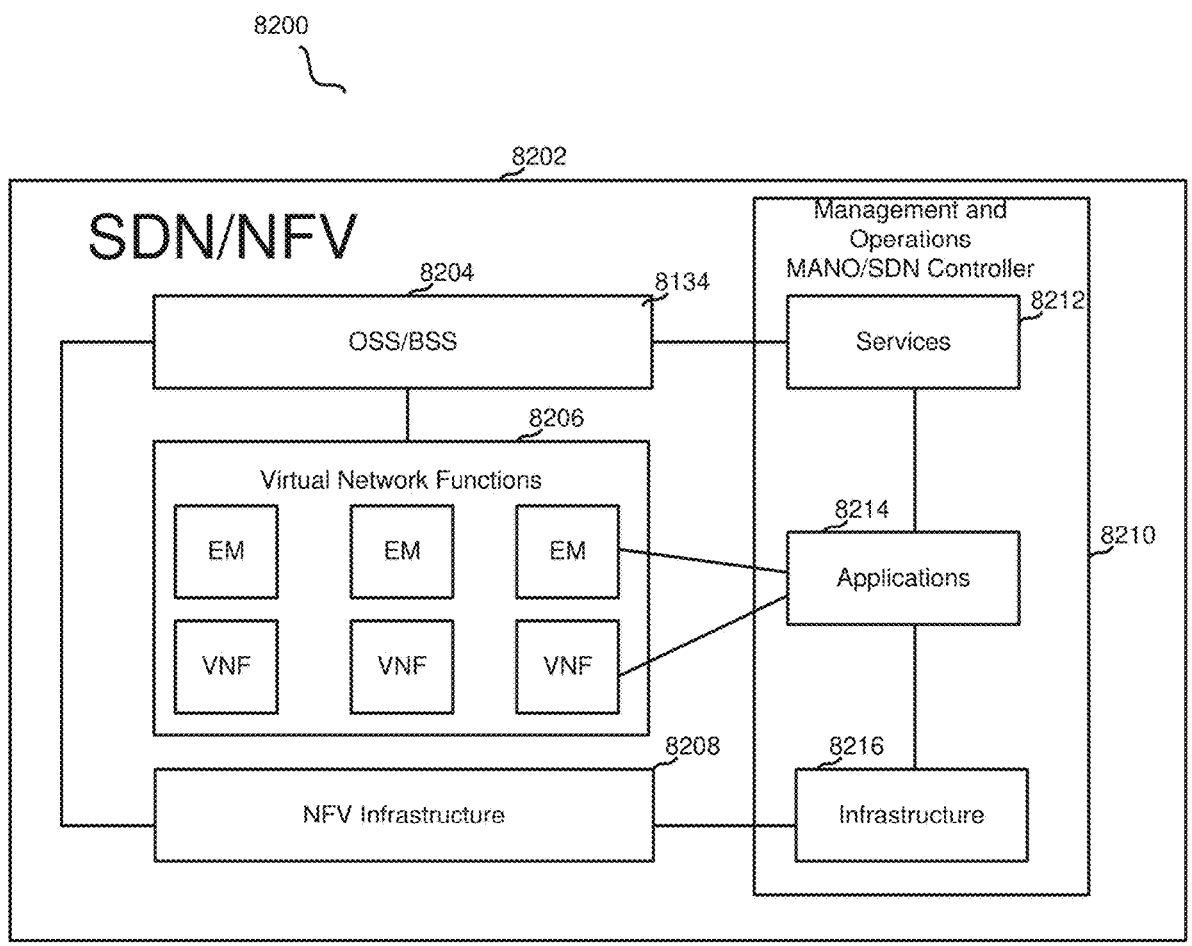
FIG. 82 illustrates a communication and processing system that uses an SDN/NFV architecture.

Scalability can be achieved using an SDN/NFV infrastructure as illustrated in FIG. 82. The terrestrial network may utilize an SDN/NFV environment. An SDN/NFV environment may be used for both scalability and resiliency. The SDN/NFV environment may allow for multiple instances of the functions shown in FIG. 82 for each sub region to be replicated through software at a local data center that may be controlled by the satellite network NOC.

There may be numerous advantages with using an SDN/NFV environment including obtaining a vendor neutral environment. The SDN/NFV may allow satellite network to adjust by region for differing loads allowing for localized load balancing. As more demand occurs a new instance of a service can be spun up or spun down as required.

Figure 83:
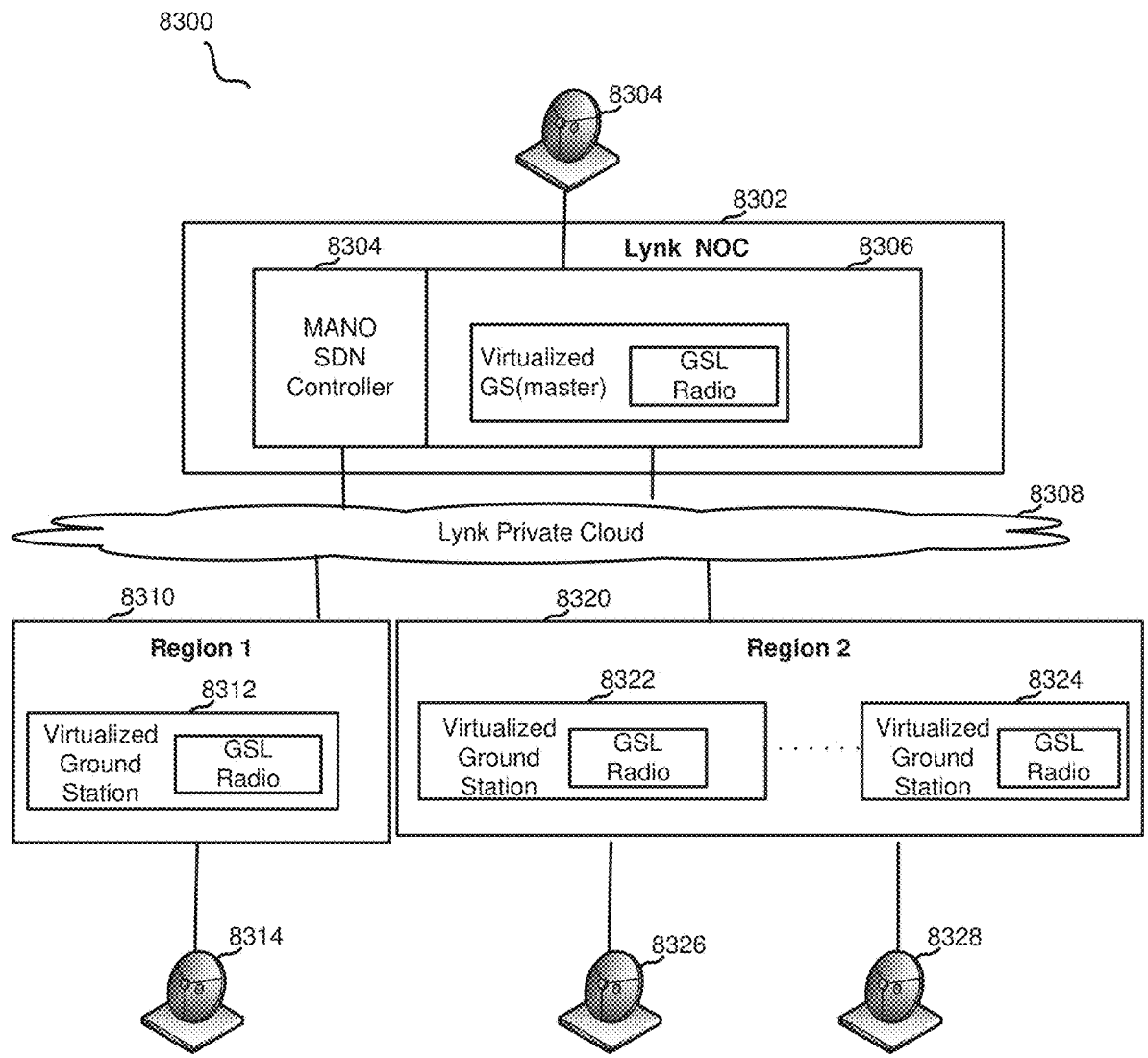
FIG. 83 illustrates a satellite network deployment in a private cloud, according to an embodiment.

In FIG. 83, a subregion is illustrated as a ground station however there can be multiple ground stations connected to a subregion. The satellite network cloud can be a private cloud that can span multiple data centers. Using an SDN/NFV environment can allow for satellite network to utilize existing data centers that may be geographically separated.

The SDN/NFV environment can also provide for a more resilient network through the MANO/SDN controller where the redundancy scheme can be based on the governance policy that is applied. The governance policy applied can be by region or global depending on what is desired or discovered during operational conditions.

Resiliency can also be achieved through database persistence which can be part of the SDN/NFV configuration. The SDN/NFV environment can also allow for a vendor neutral environment.

10. Intra-Satellite Message Routing

When two users are in the coverage of the same satellite and the base station in the satellite is operating without ground station connectivity, in a particular embodiment, it could take upwards of 120 minutes to complete the delivery of a message from user1 to user2 as per a possible timeline described below.

At time t0, MS1 & MS2 gets satellite coverage, MS1 and MS2 both execute location update procedure, MS1 send SMS to MS2 which can be buffered at NSA on the satellite. At time t0+30 minutes, satellite acquires connectivity to a ground station, forwards the location updates received from the users and forwards the SMS to the ground station, the ground station forwards to HPLMN, HPLMN sends SMS back to the ground station as this is the ground station that has or may have the connectivity to the satellite serving the location of MS2. Assuming GSL remains, the ground station can determine if or when the satellite coverage can exist for MS2. If this is around 4 minutes after the connectivity, the ground station can forward the SMS to the satellite, if not the ground station can send to the next satellite to pass over recipient MS2. The ground station can query the satellite if MS2 is still connected.

At time t0+34 minutes, assuming the satellite is able to serve MS2, MS2 can be paged triggering attach procedure on MS2, and SMS can be delivered to MS2 after successful attach procedure.

At time t0+35.5 minutes, MS2 can send a SMS reply to be sent to MS1 to the satellite, the satellite can forward it to the ground station which can then forward it to HPLMN, HPLMN can send it back to the ground station that is going to or already serving MS1 location. At this point of time, the satellite coverage might have ended for the users. The NSA on the ground station may choose the next satellite to pass over MS1 and may send SMS reply to the chosen satellite when the connectivity is established. The SMS reply may be buffered on the satellite.

At time t0+120 mins, the satellite with buffered SMS reply may pass over MS1 and may deliver the reply to MS1.

It may be advantageous to apply a special treatment in such cases. While it may seem like a rare occurrence this scenario may become more likely when a group travels to a remote area. For example, a group of surveyors may be deployed to a remote area and require communications. A lengthy delay in this case might not be acceptable. To greatly reduce or almost eliminate the delay, NSA can identify this scenario and can apply intra-satellite routing.

Intra-satellite routing may be an optional parameter that can be configured or set for each MNO. Whenever a user originates a message on the satellite the NSA on the satellite may first determine if the destination user is connected to the same satellite. NSA may then check to determine if intra-satellite routing is permitted for this MNO users. If so, intra-satellite routing may be used to circumvent the normal call completion process. Instead of forwarding the message to the ground station and on to the HPLMN the message may be relayed to user2. A record of the message may also be created by the NSA for updating and reconciling billing with the destination user's HPLMN later.

11. P-HLR Population

Figure 84:
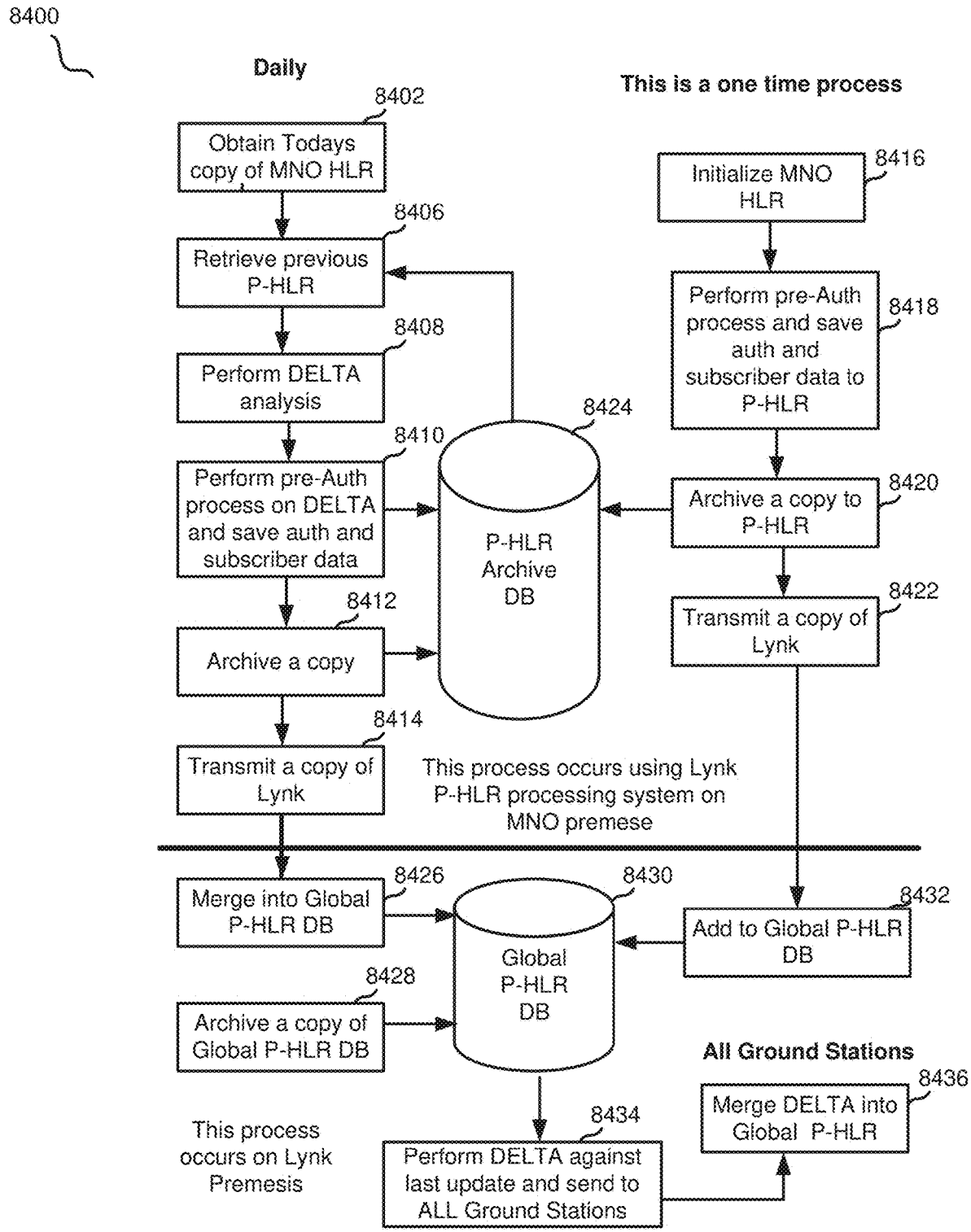
FIG. 84 illustrates the P-HLR population process at MNO premises, according to an embodiment.

FIG. 84 illustrates an embodiment of the process to create and maintain an up-to-date P-HLR for each MNO where the P-HLR can be populated at the MNO premises. The process can create the P-HLR with little disruption to the MNO's operations and to keep it as current as possible. When a new MNO signs on with the satellite network shortly before beginning actual service, the satellite network may require a current copy of their HLR/HSS data.

Due to the sensitivity of user authentication keys, the MNO may not wish to release this data to the satellite network. To meet this requirement, a process for producing this data on the MNO premises is proposed as depicted in FIG. 84. The satellite network's P-HLR may require subscriber data including the result of running the actual authentication process with a known RAND and storing the result into the P-HLR.

To provide this, the authentication process can be run against all IMSIs that are subscribers to the satellite network services. This could either be accomplished using the MNO's actual network or using an offline system at the MNO network.

The satellite network can supply a system capable of performing this process on a separate computer on the MNO premise. On a periodic basis, the P-HLR of each MNO may be updated to contain HLR data from all MNOs subscribers who have the satellite network's service option. Depending on the MNO agreement this could be all subscribers to that MNO. To reduce the volume of information, the data obtained might be limited to required subscriber data, such as the authentication data and supported service like CAMEL etc.

The initial process may be performed on all IMSIs. Subsequently it may only address changed or added/deleted IMSIs. Upon completion the results may be loaded at all the ground stations and uploaded to the satellites as soon as GSL is established. This may be performed by/for all MNO partners periodically.

The foregoing method descriptions and the process flow diagrams are provided merely as illustrative examples and are not intended to require or imply that the blocks of the various embodiments need to be performed in the order presented. As may be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments may be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

Various data structures might be present in memory or storage accessible to computer processors for use in effecting various operations described herein. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hardwired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal, or an electrical signal.

A computer system may implement the techniques described herein using customized hard-wired logic, one or more ASICs or FPGAs, firmware and/or program logic which in combination with the computer system causes or programs a computer system to be a special-purpose machine. According to one embodiment, the techniques herein are performed by a computer system in response to a processor executing one or more sequences of one or more instructions contained in memory. Such instructions may be read into a main memory from another storage medium. Execution of the sequences of instructions contained in the main memory might causes the processor to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks. Storage media is distinct from but may be used in conjunction with transmission media. Transmission media participates in transferring information between storage media. For example, transmission media includes coaxial cables, copper wire, and fiber optics. Transmission media can also take the form of acoustic or light waves, such as those generated during radio-wave and infra-red data communications. Transmission could be over connections that are wireless channels over which two or more devices can communicate to transfer data therebetween.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium, e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention, and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of authenticating a mobile user device with a mobile network operator (MNO) system, wherein the mobile user device is designated by the MNO system as an MNO subscriber, for when the mobile user device is among a set of mobile user devices that are MNO subscribers and are in an overpass region of an orbital base station, the method comprising:
    sending, from the orbital base station to the MNO system, an authentication request for devices in the set of mobile user devices, wherein sending is performed in advance of an MNO authentication request from the mobile user device;
    obtaining, in response to the authentication request, a set of authentication vectors for authentication among the set of mobile user devices to the MNO system in an absence of an end-to-end connectivity to a home terrestrial network of the MNO system;
    storing the set of authentication vectors, the set of authentication vectors including a stored signed response;
    receiving, at the orbital base station, the MNO authentication request from the mobile user device;

generating an authentication request response based on the set of authentication vectors;

sending the authentication request response to the mobile user device via the orbital base station;

receiving an authentication response from the mobile user device, the authentication response including a received signed response;

comparing the received signed response received from the mobile user device with the stored signed response; and if the received signed response and the stored signed response match, continue communication between the mobile user device and the orbital base station with the mobile user device deemed authenticated to the MNO system regardless of whether the mobile user device directly connected to the MNO system.

2. The method of claim 1, further comprising conveying a location of the mobile user device to the MNO system, via the orbital base station, as an MNO location update message.

3. The method of claim 2, further comprising:

receiving a TMSI record in response to forwarding the MNO location update message;

allocating the TMSI record to the mobile user device; and providing a location update message to the mobile user device with the TMSI record.

4. The method of claim 1, wherein storing the set of authentication vectors comprises storing the set of authentication vectors at the orbital base station.

5. The method of claim 1, wherein storing the set of authentication vectors comprises storing the set of authentication vectors at a ground station, the method further comprising forwarding, fully or partially, the set of authentication vectors to the orbital base station when the orbital base station is in range of the ground station.

6. The method of claim 1, wherein sending the authentication request to the MNO system comprises sending authentication requests for each mobile user device in the set of mobile user devices, wherein sending is performed in advance of MNO authentication requests from at least some of the set of mobile user devices.

7. The method of claim 1, wherein the set of authentication vectors comprises a signed response, a random number, and a ciphering key.

8. The method of claim 1, wherein sending, from the orbital base station to the MNO system, the authentication request comprises sending the authentication request via a ground station, the method further comprising storing the set of authentication vectors at the ground station for forwarding to the orbital base station when the orbital base station is connected for communication to the ground station.

9. The method of claim 1, wherein the set of authentication vectors further comprises subscriber data of the mobile user device, the subscriber data comprising at least a subscriber's IMSI, the subscriber's IMSI comprising an MCC and an MNC, a set of one or more allocated TMSIs, a set of one or more locations traversed, and a set of data/message/location transactions for a subscriber of the mobile user device.

10. The method of claim 1, further comprising:

setting an authentication vector refresh timer for each of a plurality of partner networks that can be used to trigger authentication requests; and acquiring a new set of authentication vectors for each existing subscriber on a periodic basis with a periodicity staggered for each MNO.

11. A computer-readable medium carrying instructions, which when executed by at least one processor of a computer system, causes the computer system to carry out the method of claim 1.

12. An orbital base station capable of communicating, directly or indirectly via a ground station, with a mobile network operator (MNO) system and capable of communicating with a mobile user device designated by the MNO system as an MNO subscriber, the orbital base station comprising:

one or more processors; and a storage medium storing instructions;

program code for connecting with the mobile user device while the mobile user device is among a set of mobile user devices that are MNO subscribers and are in an overpass region of the orbital base station;

program code for sending an authentication request to the MNO system for devices in the set of mobile user devices, wherein the instructions provide for sending in advance of an MNO authentication request from the mobile user device;

program code for obtaining, in response to the authentication request, a set of authentication vectors for authentication among the set of mobile user devices to the MNO system;

program code for storing the set of authentication vectors including a stored signed response;

program code for receiving the MNO authentication request from the mobile user device;

program code for generating an authentication request response based on the set of authentication vectors;

program code for sending the authentication request response to the mobile user device;

program code for receiving an authentication response from the mobile user device;

program code for identifying a received signed response in the authentication response;

program code for comparing the received signed response received from the mobile user device with the stored signed response; and program code for continuing communication with the mobile user device with the mobile user device deemed authenticated to the MNO system, if the received signed response and the stored signed response match, regardless of whether the mobile user device directly connected to the MNO system.

13. The orbital base station of claim 12, further comprising program code for conveying a location of the mobile user device to the MNO system as an MNO location update message.

14. The orbital base station of claim 13, further comprising:

program code for receiving a TMSI record in response to forwarding the MNO location update message;

program code for allocating the TMSI record to the mobile user device; and program code for providing a location update message to the mobile user device with the TMSI record.

15. The orbital base station of claim 12, wherein the program code for storing the set of authentication vectors comprises program code for storing the set of authentication vectors at the orbital base station.

16. The orbital base station of claim 12, wherein the program code for storing the set of authentication vectors comprises:

program code for storing the set of authentication vectors at a ground station; and program code for forwarding, fully or partially, the set of authentication vectors to the orbital base station when the orbital base station is in range of the ground station.

17. The orbital base station of claim 12, wherein the program code for sending the authentication request to the MNO system comprises program code for sending authentication requests for each mobile user device in the set of mobile user devices in advance of MNO authentication requests from at least some of the set of mobile user devices.

18. The orbital base station of claim 12, wherein the orbital base station is adapted to receive the set of authentication vectors including a signed response, a random number, and a ciphering key.

19. The orbital base station of claim 12, wherein the program code for sending, to the MNO system, the authentication request comprises program code for sending the authentication request via a ground station, the orbital base station further comprising program code for receiving the set of authentication vectors upon forwarding from the ground station when the orbital base station is connected for communication to the ground station.

20. The orbital base station of claim 12, wherein the set of authentication vectors further comprises subscriber data of the mobile user device, the subscriber data comprising at least a subscriber's IMSI, the subscriber's IMSI comprising an MCC and an MNC, a set of one or more allocated TMSIs, a set of one or more locations traversed, and a set of data/message/location transactions for a subscriber of the mobile user device.

21. The orbital base station of claim 12, further comprising:

an authentication vector refresh timer, settable for each of a plurality of partner networks that can be used to trigger authentication requests; and program code for acquiring a new set of authentication vectors for each existing subscriber on a periodic basis with a periodicity staggered for each MNO.

* * * * *